(12) United States Patent  
Snydacker et al.

(10) Patent No.: US 11,951,467 B2  
(45) Date of Patent: Apr. 9, 2024

(54) ION EXCHANGE DEVICES FOR LITHIUM EXTRACTION

(71) Applicant: Lilac Solutions, Inc., Oakland, CA (US)

(72) Inventors: David Henry Snydacker, Oakland, CA (US); Nicolás Andrés Grosso Giordano, Oakland, CA (US); Amos Indranada, Oakland, CA (US); Alysia Lukito, Oakland, CA (US); Mustafa Juzer Bootwala, Oakland, CA (US); Daniel Keane Laporte, Menlo Park, CA (US); Christina Fleming, Oakland, CA (US)

(73) Assignee: LILAC SOLUTIONS, INC., Oakland, CA (US)

( * ) Notice: Subject to any disclaimer, the term of this patent is extended or adjusted under 35 U.S.C. 154(b) by 0 days.

(21) Appl. No.: 17/859,875

(22) Filed: Jul. 7, 2022

(65) Prior Publication Data

US 2022/0349027 A1  Nov. 3, 2022

Related U.S. Application Data

(63) Continuation of application No. PCT/US2022/025810, filed on Apr. 21, 2022.
(Continued)

(51) Int. Cl.
| | | |
|---|---|---|
| B01J 8/02 | (2006.01) | |
| B01D 15/18 | (2006.01) | |
| B01J 8/04 | (2006.01) | |
| B01J 39/09 | (2017.01) | |
| B01J 47/022 | (2017.01) | |

(Continued)

(52) U.S. Cl.
CPC ........ *B01J 8/0292* (2013.01); *B01D 15/1842* (2013.01); *B01J 8/04* (2013.01); *B01J 8/0453* (2013.01); *B01J 39/09* (2017.01); *B01J 47/022* (2013.01); *C02F 1/42* (2013.01); *C22B 3/42* (2013.01); *C22B 26/12* (2013.01); *B01J 8/02* (2013.01); *B01J 8/0242* (2013.01);
(Continued)

(58) Field of Classification Search
None
See application file for complete search history.

(56) References Cited

U.S. PATENT DOCUMENTS

| | | |
|---|---|---|
| 2,608,465 A | 8/1952 | Henderson |
| 2,609,341 A | 9/1952 | Walter |

(Continued)

FOREIGN PATENT DOCUMENTS

| | | |
|---|---|---|
| AR | 092617 A1 | 4/2015 |
| CN | 101764209 A | 6/2010 |

(Continued)

OTHER PUBLICATIONS

Liu et al. (Biochem. Biophys. Methods, 2004, 60, 205-232). (Year: 2004).*

(Continued)

*Primary Examiner* — Clare M Perrin
(74) *Attorney, Agent, or Firm* — WILSON SONSINI GOODRICH & ROSATI

(57) ABSTRACT

The present invention relates to the extraction of lithium from liquid resources such as natural and synthetic brines, leachate solutions from clays and minerals, and recycled products.

30 Claims, 9 Drawing Sheets

Related U.S. Application Data

(60) Provisional application No. 63/179,153, filed on Apr. 23, 2021.

(51) Int. Cl.
    *C02F 1/42*          (2023.01)
    *C22B 3/42*          (2006.01)
    *C22B 26/12*        (2006.01)
    *B01J 39/02*        (2006.01)
    *C02F 101/10*      (2006.01)
    *C02F 103/08*      (2006.01)

(52) U.S. Cl.
    CPC ......... *B01J 39/02* (2013.01); *C02F 2001/425* (2013.01); *C02F 2101/10* (2013.01); *C02F 2103/08* (2013.01)

(56) References Cited

U.S. PATENT DOCUMENTS

| | | |
|---|---|---|
| 3,207,577 A | 9/1965 | Mizuma |
| 3,793,433 A | 2/1974 | Seeley et al. |
| 3,920,544 A | 11/1975 | Weiss |
| 4,058,585 A | 11/1977 | MacKay et al. |
| 4,116,858 A | 9/1978 | Lee et al. |
| 4,159,311 A | 6/1979 | Bauman et al. |
| 4,291,001 A | 9/1981 | Repsher et al. |
| 4,347,327 A | 8/1982 | Lee et al. |
| 4,382,124 A | 5/1983 | Meitzner et al. |
| 4,665,049 A | 5/1987 | Miyai et al. |
| 4,747,949 A | 5/1988 | Barkey |
| 5,039,382 A | 8/1991 | Suzuki et al. |
| 5,242,119 A | 9/1993 | Jariyasunant |
| 5,626,750 A | 5/1997 | Chinn |
| 5,639,861 A | 6/1997 | Steffier |
| 6,171,489 B1 | 1/2001 | Ballard et al. |
| 6,325,976 B1 * | 12/2001 | Small .................. G01N 30/96 |
| | | 204/542 |
| 7,390,466 B2 | 6/2008 | Boryta et al. |
| 7,435,477 B2 | 10/2008 | Adachi et al. |
| 7,541,016 B2 | 6/2009 | Gorshkov et al. |
| 7,820,327 B2 | 10/2010 | Yumoto et al. |
| 8,454,816 B1 | 6/2013 | Harrison et al. |
| 8,506,851 B2 | 8/2013 | Ravet et al. |
| 8,679,224 B2 | 3/2014 | Brown et al. |
| 8,741,150 B2 | 6/2014 | Chung et al. |
| 8,778,289 B2 | 7/2014 | Chon et al. |
| 8,926,874 B2 | 1/2015 | Chung et al. |
| 9,034,294 B1 | 5/2015 | Harrison |
| 9,598,291 B2 | 3/2017 | Chon et al. |
| 9,677,181 B2 | 6/2017 | Bourassa et al. |
| 9,795,943 B2 | 10/2017 | Chung et al. |
| 9,994,931 B2 | 6/2018 | Chon et al. |
| 10,017,838 B2 | 7/2018 | Chon et al. |
| 10,056,656 B2 | 8/2018 | Song |
| 10,150,056 B2 | 12/2018 | Snydacker |
| 10,322,950 B2 | 6/2019 | Snydacker et al. |
| 10,336,624 B2 | 7/2019 | Song |
| 10,392,258 B2 | 8/2019 | Song |
| 10,439,200 B2 | 10/2019 | Snydacker et al. |
| 10,478,751 B2 | 11/2019 | Chung et al. |
| 10,505,178 B2 | 12/2019 | Snydacker et al. |
| 10,604,414 B2 | 3/2020 | Featherstone et al. |
| 10,648,090 B2 | 5/2020 | Snydacker et al. |
| 10,695,694 B2 | 6/2020 | Snydacker |
| 11,253,848 B2 | 2/2022 | Snydacker |
| 11,339,457 B2 | 5/2022 | Snydacker |
| 11,358,875 B2 | 6/2022 | Snydacker et al. |
| 11,365,128 B2 | 6/2022 | Marston et al. |
| 11,377,362 B2 | 7/2022 | Snydacker et al. |
| 11,583,830 B2 | 2/2023 | Brown |
| 11,638,916 B1 | 5/2023 | Jones |
| 2003/0231996 A1 | 12/2003 | Shiu et al. |
| 2004/0005267 A1 | 1/2004 | Boryta et al. |
| 2005/0139549 A1 | 6/2005 | Yoshida et al. |
| 2005/0196370 A1 | 9/2005 | Yu et al. |
| 2007/0138020 A1 | 6/2007 | Balagopal et al. |
| 2009/0013829 A1 | 1/2009 | Harris et al. |
| 2010/0116748 A1 | 5/2010 | Rasmussen et al. |
| 2011/0044882 A1 | 2/2011 | Buckley et al. |
| 2011/0067230 A1 | 3/2011 | Tan et al. |
| 2011/0174739 A1 | 7/2011 | Chung et al. |
| 2013/0001168 A1 | 1/2013 | Kim et al. |
| 2013/0306565 A1 | 11/2013 | Davis |
| 2014/0113197 A1 | 4/2014 | Xiao et al. |
| 2014/0239221 A1 | 8/2014 | Harrison et al. |
| 2015/0013499 A1 | 1/2015 | Asano et al. |
| 2015/0083667 A1 | 3/2015 | Stouffer |
| 2015/0152523 A1 | 6/2015 | Sharma |
| 2015/0197830 A1 | 7/2015 | Chon et al. |
| 2015/0203542 A1 | 7/2015 | Bagnoli et al. |
| 2015/0258501 A1 | 9/2015 | Chung et al. |
| 2016/0115040 A1 | 4/2016 | Yi et al. |
| 2016/0161453 A1 | 6/2016 | De Los Reyes |
| 2016/0230250 A1 | 8/2016 | Chung et al. |
| 2016/0289154 A1 * | 10/2016 | Scates .................. B01D 15/362 |
| 2017/0022617 A1 | 1/2017 | Magnan et al. |
| 2017/0028395 A1 | 2/2017 | Bewsey |
| 2017/0175228 A1 | 6/2017 | Hunwick |
| 2017/0189855 A1 | 7/2017 | Xiang et al. |
| 2017/0217796 A1 | 8/2017 | Snydacker et al. |
| 2017/0233261 A1 | 8/2017 | Sharma |
| 2018/0016153 A1 | 1/2018 | Sharma |
| 2018/0080133 A1 | 3/2018 | Smith et al. |
| 2018/0133619 A1 | 5/2018 | Snydacker |
| 2018/0222760 A1 | 8/2018 | Reed |
| 2018/0245180 A1 | 8/2018 | Cheng et al. |
| 2018/0304202 A1 * | 10/2018 | Kariveti .................... C02F 1/42 |
| 2018/0318755 A1 | 11/2018 | Aines et al. |
| 2018/0339286 A1 | 11/2018 | Bazzi et al. |
| 2019/0024212 A1 | 1/2019 | Lien |
| 2019/0044126 A1 * | 2/2019 | Snydacker ........... B01D 15/362 |
| 2019/0062207 A1 | 2/2019 | Jin |
| 2019/0225854 A1 * | 7/2019 | Harrison .................. C01D 3/04 |
| 2019/0233297 A1 | 8/2019 | Kim et al. |
| 2019/0248667 A1 | 8/2019 | Featherstone et al. |
| 2019/0256987 A1 | 8/2019 | Snydacker et al. |
| 2019/0273245 A1 | 9/2019 | Snydacker et al. |
| 2019/0276327 A1 | 9/2019 | Brown |
| 2020/0165699 A1 | 5/2020 | Snydacker et al. |
| 2020/0189925 A1 | 6/2020 | Featherstone et al. |
| 2020/0232105 A1 | 7/2020 | Snydacker et al. |
| 2020/0289958 A1 | 9/2020 | Snydacker |
| 2020/0298207 A1 | 9/2020 | Brown |
| 2021/0077990 A1 | 3/2021 | Snydacker et al. |
| 2021/0206651 A1 | 7/2021 | Napier et al. |
| 2021/0222270 A1 | 7/2021 | Napier et al. |
| 2021/0300774 A1 | 9/2021 | Kim et al. |
| 2021/0346822 A1 | 11/2021 | Ireland |
| 2021/0380429 A1 | 12/2021 | Snydacker et al. |
| 2022/0121470 A1 | 4/2022 | Saxena et al. |
| 2022/0194796 A1 | 6/2022 | Kim et al. |
| 2022/0212184 A1 | 7/2022 | Snydacker |
| 2022/0235436 A1 | 7/2022 | Snydacker |
| 2022/0290272 A1 | 9/2022 | Kölbel et al. |
| 2022/0340440 A1 | 10/2022 | Wang |
| 2022/0348475 A1 | 11/2022 | Snydacker et al. |
| 2022/0372594 A1 | 11/2022 | Chon |
| 2023/0019776 A1 | 1/2023 | Bishkin |
| 2023/0047281 A1 | 2/2023 | Bhattacharyya et al. |
| 2023/0064968 A1 | 3/2023 | Smith et al. |
| 2023/0079295 A1 | 3/2023 | Matsumoto et al. |

FOREIGN PATENT DOCUMENTS

| | | |
|---|---|---|
| CN | 101961634 A | 2/2011 |
| CN | 102872792 A | 1/2013 |
| CN | 103794779 A | 5/2014 |
| CN | 105238927 A | 1/2016 |
| CN | 105251436 A | 1/2016 |
| CN | 105289455 A | 2/2016 |
| CN | 205151853 U | 4/2016 |
| CN | 105555978 A | 5/2016 |
| CN | 106311190 A | 1/2017 |

(56) References Cited

FOREIGN PATENT DOCUMENTS

| | | |
|---|---|---|
| CN | 106622103 A | 5/2017 |
| CN | 106673023 A | 5/2017 |
| CN | 107043116 A | 8/2017 |
| CN | 209123481 U | 7/2019 |
| DE | 102016212048 A1 | 1/2018 |
| EP | 0551002 A1 | 7/1993 |
| EP | 2945211 B1 | 11/2018 |
| FR | 3034781 A1 | 10/2016 |
| JP | H0626661 B2 | 4/1994 |
| JP | H08236114 A | 9/1996 |
| JP | 2002167626 A | 6/2002 |
| JP | 2003500318 A | 1/2003 |
| JP | 2004230215 A | 8/2004 |
| JP | 2005296811 A | 10/2005 |
| JP | 2006159039 A | 6/2006 |
| JP | 2009507839 A | 2/2009 |
| JP | 2010042395 A | 2/2010 |
| JP | 2014055312 A | 3/2014 |
| JP | 2015020090 A | 2/2015 |
| JP | 5898021 B2 | 4/2016 |
| JP | 2017131863 A | 8/2017 |
| JP | 2018535309 A | 11/2018 |
| JP | 2019099874 A | 6/2019 |
| KR | 20120015658 A | 2/2012 |
| KR | 20120063424 A | 6/2012 |
| KR | 20140082065 A | 7/2014 |
| KR | 20160126314 A | 11/2016 |
| WO | WO-2010035956 A2 | 4/2010 |
| WO | WO-2010056322 A1 | 5/2010 |
| WO | WO-2010103173 A1 | 9/2010 |
| WO | WO-2011133165 A1 | 10/2011 |
| WO | WO-2012005545 A2 | 1/2012 |
| WO | WO-2014047347 A1 | 3/2014 |
| WO | WO-2015123762 A1 | 8/2015 |
| WO | WO-2015171109 A1 | 11/2015 |
| WO | WO-2016064689 A2 | 4/2016 |
| WO | WO-2016172017 A1 | 10/2016 |
| WO | WO-2017005113 A1 | 1/2017 |
| WO | WO-2017020090 A1 | 2/2017 |
| WO | WO-2017039724 A1 | 3/2017 |
| WO | WO-2017136328 A1 | 8/2017 |
| WO | WO-2017137885 A1 | 8/2017 |
| WO | WO-2018089932 A1 | 5/2018 |
| WO | WO-2018129949 A1 | 7/2018 |
| WO | WO-2019000095 A1 | 1/2019 |
| WO | WO-2019028148 A1 | 2/2019 |
| WO | WO-2019028174 A2 | 2/2019 |
| WO | WO-2019126862 A1 | 7/2019 |
| WO | WO-2019160982 A1 | 8/2019 |
| WO | WO-2019168941 A1 * 9/2019 ............. B01J 39/10 | |
| WO | WO-2021142147 A1 | 7/2021 |
| WO | WO-2021204375 A1 | 10/2021 |
| WO | WO-2021212214 A1 | 10/2021 |
| WO | WO-2021252381 A1 | 12/2021 |
| WO | WO-2022084145 A1 | 4/2022 |
| WO | WO-2022109156 A1 | 5/2022 |
| WO | WO-2022226219 A1 | 10/2022 |
| WO | WO-2022260542 A1 | 12/2022 |
| WO | WO-2023081448 A1 | 5/2023 |
| WO | WO-2023192192 A1 | 10/2023 |
| WO | WO-2023192195 A1 | 10/2023 |
| WO | WO-2023192623 A2 | 10/2023 |
| WO | WO-2023205073 A1 | 10/2023 |
| WO | WO-2023215313 A1 | 11/2023 |

OTHER PUBLICATIONS

Chitrakar et al. Lithium recovery from salt lake brine by H2TiO3. Dalton Trans 43:8933-8939 (2014).
Chitrakar et al. Selective Uptake of Lithium Ion from Brine by H1.33Mn1.67O4 and H1.6Mn1.6O4. Chem Lett 41:1647-1649 (2012).
Cho et al. High-Performance ZrO2-Coated LiNiO2 Cathode Material. Electrochem Solid-State Lett 4(10):A159-A161 (2001).
Department of Energy. Ion Exchange Materials for Lithium Extraction (Topic: 15, Subtopic: e)—Abstract. Available at https://www.sbir.gov/sbirsearch/detail/1307793 (3 pgs.) (2017).
Larumbe et al. Effect of a SiO2 coating on the magnetic properties of Fe3O4 nanoparticles. J Phys Condens Matter 24(26):266007 (2012).
Miyai et al. Bench scale studies on lithium recovery from sea water. Nippon Kaisui Gakkai-Shi—Bulletin Of The Society Of Sea Waterscience, Japan 49(4):226-230 (1995) (English Abstract).
Nishihama et al. Selective recovery process of lithium from seawater using integrated ion exchange methods. Solvent Extraction and Ion Exchange 29:421-431 (2011).
Oh et al. Double Carbon Coating of LifePO4 as High Rate Electrode for Rechargeable Lithium Batteries. Adv. Mater. 22:4842-4845 (2010).
Pareja et al. Corrosion behaviour of zirconia barrier coatings on galvanized steel. Surface and Coatings Technology 200(22-23):6606-6610 (2006).
Patel et al. Ionic and electronic conductivities of atomic layer deposition thin film coated lithium ion battery cathode particles. RSC Advances 6:98768-98776 (2016).
PCT/US2017/061384 International Search Report and Written Opinion dated Feb. 14, 2018.
PCT/US2018/044821 International Search Report and Written Opinion dated Oct. 12, 2018.
PCT/US2018/044868 International Search Report and Written Opinion dated Mar. 6, 2019.
PCT/US2019/017885 International Search Report and Written Opinion dated Jun. 14, 2019.
PCT/US2019/019780 International Search Report and Written Opinion dated Jun. 14, 2019.
PCT/US2021/012534 International Search Report and Written Opinion dated Apr. 27, 2021.
PCT/US2021/036227 International Search Report and Written Opinion dated Nov. 2, 2021.
PCT/US2021/059921 International Search Report and Written Opinion dated Mar. 14, 2022.
PCT/US2022/025810 Invitation to Pay Additional Fees dated Jul. 5, 2022.
Reichel et al. Lithium recovery from lithium-containing micas using sulfur oxidizing microorganisms. Minerals Engineering 106:18-21 (2017).
Rioyo et al. Lithium Extraction from Spodumene by the Traditional Sulfuric Acid Process: A Review. Mineral Processing and Extractive Metallurgy Review 43(1):97-106 (2020).
Tarakina et al. Defect crystal structure of new TiO(OH)2 hydroxide and related lithium salt Li2TiO3. Dalton Trans 39:8168-8176 (2010).
Umeno et al. Preparation and Adsorptive Properties of Membrane-Type Adsorbents for Lithium Recovery from Seawater. Ind Eng Chem Res 41(17):4281-4287 (2002).
Xiao et al. Adsorption and desorption behavior of lithium ion in spherical PVC-MnO2 ion sieve. Industrial & engineering chemistry research, 51(33):10921-10929 (2012).
Xiao et al. Lithium ion recovery from brine using granulated polyacrylamide-MnO 2 ion-sieve. Chemical Engineering Journal 279:659-666 (2015).
Zandvakili et al. Preparation and characterisation of lithium ion exchange composite for the recovery of lithium from brine. Mineral Processing and Extractive Metallurgy 127(3):176-181 (2017).
Belharouak et al. Synthesis and electrochemical analysis of vapor-deposited carbon-coated LiFePO4. Electrochemistry Communications 7(10):983-988 (2005).
Co-pending U.S. Appl. No. 17/737,718, inventors Snydacker; David Henry et al., filed May 5, 2022.
Doan et al. Preparation of carbon coated LiMnPO"4 powders by a combination of spray pyrolysis with dry ball-milling followed by heat treatment. Advanced Powder Technology 21(2):187-196 (2010).
Lu et al. Soft chemical synthesis and adsorption properties of MnO2 center dot 0.5H(2)O, a high performance ion sieve for lithium. Acta Chimica Sinica 65(12):1135-1139 (2007).
PCT/US2022/025810 International Search Report and Written Opinion dated Sep. 30, 2022.

(56) References Cited

OTHER PUBLICATIONS

Thackeray et al., Li 2 MnO 3-stabilized LiMO 2 (M=Mn, Ni, Co) electrodes for lithium-ion batteries. J Mat Chem., 17:3112 (2007).

U.S. Appl. No. 16/888,517 Office Action dated Aug. 12, 2022.

Xie et al. Preparation and Lithium Extraction of Li1.6Mn1.6O4/ PVDF Porous Film. Chinese Journal of Chemical Engineering pp. 1-3 2014) Retrieved from the Internet: URL:https://d.wanfangdata. com.cn/periodical/ChlQZXJpb2RpY2FsQ0hJTmV3UzlwMjlwND E1Eg10Z3hiMjAxNDAxMDMxG ghva3phOTI2ZQ°/O3D°/O3D.

Yang et al., TiO2 Coating Modification for Lithium Ion Sieve. Material Reports 31:435-438 (2017) (English Abstract).

Zaghib et al. Safe and fast-charging Li-ion battery with long shelf life for power applications. J Power Sources 196:3949-3954 (2011).

Zhang et al. Li2SnO3 derived secondary Li—Sn alloy electrode for lithium-ion batteries. J. Alloys Compd. 415:229-233 (2006).

Chitrakar et al., A New Type of Manganese Oxide (MnO2.0.5H2O) Derived from Li1.6Mn1.6O4 and Its Lithium Ion-Sieve Properties. Chem. Mater. 12:3151-3157 (2000).

Ooi et al., Mechanism of lithium (1+) insertion in spinel-type manganese oxide. Redox and ion-exchange reactions. Langmuir 7:1167-1171 (1991).

U.S. Appl. No. 16/843,641 Office Action dated Mar. 21, 2023.

Co-pending U.S. Appl. No. 18/199,494, inventor Snydacker; David Henry, filed May 19, 2023.

Co-pending U.S. Appl. No. 18/200,306, inventor Snydacker; David Henry, filed May 22, 2023.

Co-pending U.S. Appl. No. 18/365,090, inventors Grosso; Giordano Nicolas Andres et al., filed Aug. 3, 2023.

Co-pending U.S. Application No. 18/476,180, inventors Snydacker; David Henry et al., filed Sep. 27, 2023.

Co-pending U.S. Appl. No. 18/477,278, inventors Snydacker; David Henry et al., filed Sep. 28, 2023.

Dlamini et al. Polymeric ion exchanger supported ferric oxide nanoparticles as adsorbents for toxic metal ions from aqueous solutions and acid mine drainage. J Environ Health Sci Eng 17(2):719-730 (2019).

Ma et al. CN 105251436 A Supplemental Machine Translation, original document published Jan. 20, 2016, translated Aug. 10, 2023.

PCT/US2023/016438 International Search Report and Written Opinion dated Jun. 27, 2023.

PCT/US2023/016443 International Search Report and Written Opinion dated Jul. 25, 2023.

PCT/US2023/017172 International Search Report and Written Opinion dated Sep. 19, 2023.

PCT/US2023/018806 International Search Report and Written Opinion dated Jun. 30, 2023.

PCT/US2023/020726 International Search Report and Written Opinion dated Aug. 25, 2023.

Schultze et al. Recovering Lithium Chloride From a Geothermal Brine. US Department of the Interior, Bureau of Mines. vol. 8883 (18 pgs) (1984).

U.S. Appl. No. 16/843,641 Office Action dated Jul. 14, 2023.

Xu et al. Extraction of lithium with functionalized lithium ion-sieves. Progress in Materials Science 84:276-313 (2016).

Anonymous. Pure Energy Minerals Reports High Lithium Recoveries From Successful Mini-Pilot Testing Campaign. (Dec. 13, 2016) Retrieved from the Internet: URL:https://pureenergyminerals. com/pure-energy-minerals-reports-high-lithium-recoveries-from-successful-mini-pilot/.

Molnar et al. Preliminary Economic Assessment (Rev. 1) of the Clayton Valley Lithium Project. (Jan. 28, 2019) Retrieved from the Internet: URL:https://wp-pureenergyminerals-2023.s3.ca-central-1. amazonaws.com/media/2018/04/PureEnergy_ClaytonValleyPEA_ Rev1_23March2018.pdf.

PCT/US2023/080369 International Invitation to Pay Additional Fees dated Jan. 26, 2024.

Renew et al. Geothermal Thermoelectric Generation (G-TEG) with Integrated Temperature Driven Membrane Distillation and Novel Manganese Oxide for Lithium Extraction. (Jun. 1, 2017) Retrieved from the Internet: URL:https://www.osti.gov/servlets/purl/ 1360976.

Song et al. Lithium extraction from Chinese salt-lake brines: opportunities, challenges, and future outlook. Environ. Sci.: Water Res. Technol., 3:593-597 (2017).

\* cited by examiner

ION EXCHANGE DEVICES FOR LITHIUM EXTRACTION

CROSS-REFERENCE

This patent application is a continuation of International Application No. PCT/US2022/025810, filed Apr. 21, 2022, which claims the benefit of U.S. Provisional Patent Application No. 63/179,153 filed Apr. 23, 2021, which are incorporated herein by reference in their entireties.

BACKGROUND OF THE INVENTION

Lithium is an essential element for high-energy rechargeable batteries and other technologies. Lithium is found in a variety of liquid solutions, including natural and synthetic brines and leachate solutions from minerals and recycled products.

SUMMARY OF THE INVENTION

Lithium can be extracted from liquid resources using an ion exchange process based on inorganic ion exchange materials. Inorganic ion exchange materials absorb lithium ions from a liquid resource while releasing hydrogen ions, and then elute lithium ions in acid while absorbing hydrogen ions. The ion exchange process can be repeated to extract lithium ions from a liquid resource and yield a concentrated lithium ion solution. The concentrated lithium ion solution can be further processed into chemicals for the battery industry or other industries.

Disclosed herein is a device for lithium extraction from a liquid resource, the device comprising: 1) one or more beds comprising an ion exchange material; and 2) one or more flow distributors, wherein said flow distributors are configured to direct a flow of a liquid through the one or more beds, wherein the ion exchange material exchanges lithium ions and hydrogen ions, and wherein the one or more flow distributors and one or more beds are configured to minimize the hydrostatic pressure required to flow liquid through the ion exchange material. In some embodiments, the device further comprises a regulator configured to modulate the pressure of said liquid resource across said one or more flow distributors. In some embodiments, the one or more flow distributors comprise perforated tubes or plates. In some embodiments, the pressure of said liquid across said one or more flow distributors and ion exchange material is reduced in comparison to a device without said one or more flow distributors. In some embodiments, the pressure of said liquid across said one or more flow distributors and ion exchange material is less than 50 psi. In some embodiments, the pressure of said liquid across said one or more flow distributors and ion exchange material is less than 10 psi. In some embodiments, the pressure of said liquid resource across said one or more flow distributors and ion exchange material is from about 0.1 psi to about 1 psi. In some embodiments, the pressure of said liquid resource across said one or more flow distributors and ion exchange material is from about 1 psi to about 10 psi. In some embodiments, the pressure of said liquid resource across said one or more flow distributors and ion exchange material is from about 10 psi to about 20 psi. In some embodiments, the pressure of said liquid resource across said one or more flow distributors and ion exchange material is from about 20 psi to about 40 psi. In some embodiments, the pressure of said liquid resource across said one or more flow distributors and ion exchange material is from about 40 psi to about 80 psi. In some embodiments, the pressure of said liquid resource across said one or more flow distributors and ion exchange material is from about 80 psi to about 160 psi. In some embodiments, the one or more beds is a plurality of beds, and each bed is configured to receive fluid through a first flow distributor and discharge the fluid to a second flow distributor. In some embodiments, said liquid resource is configured to flow through a plurality of beds in parallel. In some embodiments, said liquid resource is configured to flow through a plurality of beds in series. In some embodiments, one or more beds are mounted inside said vessel with structural supports.

Disclosed herein is a device for lithium extraction from a liquid resource, the device comprising) a bed comprising ion exchange material; 2) an aqueous solution; 2) a volume of gas; and 3) a level measurement device, wherein the ion exchange material exchanges lithium ions and hydrogen ions, and wherein the fluid level in the vessel is controlled. In some embodiments, the aqueous solution is the liquid resource, an acidic solution, or a wash solution. In some embodiments, the level measurement device is a level sensor. In some embodiments, the fluid level in said vessel is controlled using a control valve. In some embodiments, the fluid level in said vessel is controlled by adjusting the pressure of the volume of gas. In some embodiments, the bed comprising ion exchange material is fluidized in the fluid inside the vessel.

Disclosed herein is a device for lithium extraction from a liquid resource, the device comprising a cylindrical vessel containing an interior compartment loaded with ion exchange material, arranged such that said liquid resource flows through said ion exchange material in a direction that is oriented radially to said cylindrical vessel. Disclosed herein is a device for lithium extraction from a liquid resource, comprising a vessel containing a bed of ion exchange material located between two non-intersecting permeable partitions, and wherein flow occurs from one partition to another and across the ion exchange bed. Disclosed herein is a device for lithium extraction from a liquid resource, comprising a vessel containing ion exchange material located between two partitions. In some embodiments, said partitions are cylindrical. In some embodiments, said partitions are concentric. In some embodiments, said partitions are rectangular. In some embodiments, said partitions are permeable. In some embodiments, said permeable partitions are porous. In some embodiments, said partitions are concentric permeable cylinders.

Disclosed herein is a vessel comprising an ion exchange material and a permeable pipe near the center of the vessel, facilitating flow of a liquid through the ion exchange material in a direction oriented radially to the vessel. In some embodiments, the ion exchange material exchanges lithium ions and hydrogen ions.

Disclosed herein is a device for lithium extraction from a liquid resource, comprising 1) a vessel housing, said vessel housing comprising an inner cylindrical vessel and) an outer cylindrical vessel, and 2) with ion exchange material housed between said inner cylindrical vessel and said outer cylindrical vessel. In some embodiments, said inner cylindrical vessel and said outer cylindrical vessel are permeable to facilitate flow of said liquid resource through said ion exchange material. In some embodiments, said inner cylindrical vessel and/or said outer cylindrical vessel are fixed with holes, slits, nozzles, meshes, or a combination thereof to facilitate flow of said liquid resource through said ion exchange material while containing said ion exchange material inside of said vessel housing. In some embodiments, the ion exchange material exchanges lithium ions and hydrogen ions.

Disclosed herein is a device for lithium extraction from a liquid resource, comprising a cylindrical vessel containing ion exchange material located between an outer concentric cylindrical structure and an inner concentric cylindrical structure, and wherein said inner cylindrical structure, said outer cylindrical structure, and said ion exchange material are in fluid communication. In some embodiments, said liquid resource flows in a radial orientation through said ion exchange material from near the outside of said outer concentric cylindrical structure to near the inside of said inner concentric cylindrical structure. In some embodiments, said liquid resource flows in a radial orientation through said ion exchange material from near the inside of said inner concentric cylindrical structure to near the outside of said outer concentric cylindrical structure.

Disclosed herein is a device for lithium extraction from a liquid resource, comprising a vessel comprising internal flow distributors and containing an ion exchange material. Disclosed herein is a device for lithium extraction from a liquid resource, comprising a vessel loaded with an ion exchange material, wherein said liquid resource enters said vessel from multiple flow distributors located near two opposite ends of said vessel and exits said vessel from one or more flow distributors located near the center point between said two opposite ends of the vessel. Disclosed herein is a device for lithium extraction from a liquid resource, comprising a vessel loaded with ion exchange material wherein said liquid resource exits said vessel from multiple flow distributors located near two opposite ends of said vessel and enters said vessel from one or more flow distributors located near the center point between said two opposite ends of the vessel. Disclosed herein is a device for lithium extraction from a liquid resource, comprising one or more vessels containing one or more candles, wherein each said candle comprises a cylindrical partition that is permeable to flow of said liquid resource, and wherein the space enclosed by said partition contains an ion exchange material. In some embodiments, said liquid resource flows into said vessel, through said permeable partition, into the space enclosed by the permeable partition, through the ion exchange material, and then exits the vessel. In some embodiments, said liquid resource flows into said vessel, into the space enclosed by said permeable partition, through the permeable partition, through the ion exchange material, and then exits the vessel. In some embodiments, said one or more vessels comprise four or more candles. In some embodiments, said one or more vessels comprise eight or more candles. In some embodiments, said one or more vessels comprise 20 or more candles. In some embodiments, said one or more vessels comprise 50 or more candles. In some embodiments, said one or more vessels comprise 100 or more candles.

Disclosed herein is a device for lithium extraction from a liquid resource, comprising: a) a vessel; b) a wound ion exchange element inside said vessel, wherein said element comprises: a. a non-porous membrane, b. optionally a first flow distribution scaffold, c. optionally a first porous membrane, d. a bed of ion exchange material, e. optionally a second porous membrane, f. optionally a second flow distribution scaffold. Disclosed herein is a device for lithium extraction from a liquid resource, comprising: a) a vessel; b) a wound ion exchange element inside the vessel, wherein said element comprises: a. a non-porous membrane, b. a first flow distribution scaffold, c. a first porous membrane, d. a bed of ion exchange material, e. a second porous membrane, f. a second flow distribution scaffold. Disclosed herein is a device for lithium extraction from a liquid resource, comprising: a) a vessel; b) a wound ion exchange element inside the vessel, wherein said element comprises: a. a non-porous membrane, b. a first flow distribution scaffold, c. a bed of ion exchange material, d. a second flow distribution scaffold. Disclosed herein is a device for lithium extraction from a liquid resource, comprising: a) a vessel; b) a wound ion exchange element inside the vessel, wherein said element comprises: a. a non-porous membrane, b. a first porous membrane, c. a bed of ion exchange material, d. a second porous membrane. Disclosed herein is a device for lithium extraction from a liquid resource, comprising: a) a vessel; b) a wound ion exchange element inside the vessel, wherein said element comprises: a. a first flow distribution scaffold, b. a first porous membrane, c. a bed of ion exchange material, d. a second porous membrane, e. a second flow distribution scaffold. In some embodiments, said ion exchange element reduces the physical footprint of a thin bed of ion exchange material. In some embodiments, the ion exchange material is contained between two porous membranes. In some embodiments, the ion exchange material is contained between two flow distribution scaffolds. In some embodiments, flow distribution scaffolds are porous. In some embodiments, any of the membranes are wound into a roll to form spiral.

Disclosed herein is a device for lithium extraction from a liquid resource, comprising a vessel loaded with ion exchange material and a filler material. In some embodiments, the ion exchange bed further contains one or more filler materials that do not exchange lithium for hydrogen ions. In some embodiments, the ion exchange bed is loaded with said filler materials near the inlet or outlet of the ion exchange bed. In some embodiments, the ion exchange bed mixed with said filler material. Disclosed herein is a device for lithium extraction from a liquid resource, comprising a vessel loaded with ion exchange material and mixed with a filler material. In some embodiments, the vessel loaded with ion exchange material and a filler material, and wherein the filler material is mixed with the ion exchange material to reduce pressure across the ion exchange material. In some embodiments, the vessel loaded with ion exchange material and a filler material, and wherein the filler material is mixed with the ion exchange material to improve the strength of the bed of ion exchange material. In some embodiments, the vessel loaded with ion exchange material and a filler material, and wherein the filler material is mixed with the ion exchange material to provide support for the one or more beds of ion exchange material. In some embodiments, the filler material enables a uniform pressure drop across the entire cross-section of the bed when said liquid resource, or any other fluid entering the vessel, flows through said bed. In some embodiments, said filler material is inert to acid and brine. In some embodiments, said filler material is constructed from a polymer or ceramic. In some embodiments, said filler material has pores containing an ion exchange material. In some embodiments, said filler material has pores larger than about 10 microns or about 100 microns containing an ion exchange material. In some embodiments, said filler material has pores larger than about 1 millimeter, about 1 centimeter, or about 10 centimeters containing an ion exchange material. In some embodiments, said filler material has pores larger than about 10 centimeters or about 25 centimeters containing an ion exchange material. In some embodiments, said filler material has pores smaller than about 10 microns or about 100 microns containing an ion exchange material. In some embodiments, said filler material has pores smaller than about 1 millimeter, about 1 centimeter, or about 10 centimeters containing an ion exchange material. In some embodiments, said filler material has pores smaller than about 10 centimeters or about 25 centimeters containing ion exchange material. In some embodiments, said filler material is a rigid scaffolding.

Disclosed herein is a system for lithium extraction from a liquid resource, comprising a network of one or more vessels described herein. Disclosed herein is a system for lithium extraction from a liquid resource, comprising a network of multiple vessels described herein, wherein said liquid resource flows through one vessel and into another vessel. Disclosed herein is a system for lithium extraction from a liquid resource, comprising a network of a plurality of vessels described herein, wherein said liquid resource flows through one or more vessels of the plurality of vessels sequentially. Disclosed herein is a system for lithium extraction from a liquid resource, comprising a network of multiple vessels described herein, wherein said liquid resource flows through one vessel, through a unit which increases the pH of the liquid resource, and into another vessel. In some embodiments, the ion exchange material comprises porous ion exchange beads. In some embodiments, said ion exchange material comprises porous ion exchange beads with a mean diameter of 50 microns to 100 microns. In some embodiments, said ion exchange material comprises porous ion exchange beads with a mean diameter of 100 microns to 200 microns. In some embodiments, said ion exchange material comprises porous ion exchange beads with a mean diameter of 200 microns to 300 microns. In some embodiments, said ion exchange material comprises porous ion exchange beads with a mean diameter of 200 microns to 400 microns. In some embodiments, said ion exchange material comprises porous ion exchange beads with a mean diameter of 400 microns to 600 microns. In some embodiments, said ion exchange material comprises porous ion exchange beads with a mean diameter of 400 microns to 800 microns. In some embodiments, the change in hydrostatic pressure of the liquid resource when it flows through the ion exchange material is less than 10 psi. In some embodiments, the change in hydrostatic pressure of the liquid resource when it flows through the ion exchange material is less than 20 psi. In some embodiments, the change in hydrostatic pressure of the liquid resource when it flows through the ion exchange material is less than 50 psi. In some embodiments, the change in hydrostatic pressure of the liquid resource when it flows through the ion exchange material is less than 100 psi. In some embodiments, the change in hydrostatic pressure of the liquid resource when it flows through the ion exchange material is less than 200 psi. In some embodiments, the change in hydrostatic pressure from the inlet to the outlet of any of the vessels is less than 10 psi. In some embodiments, the change in hydrostatic pressure from the inlet to the outlet of any of the vessels is less than 20 psi. In some embodiments, the change in hydrostatic pressure from the inlet to the outlet of any of the vessels is less than 50 psi. In some embodiments, the change in hydrostatic pressure from the inlet to the outlet of any of the vessels is less than 100 psi. In some embodiments, the change in hydrostatic pressure from the inlet to the outlet of any of the vessels is less than 200 psi. In some embodiments, the system further comprises a pH modulating setup for increasing the pH of the liquid resource in the system. In some embodiments, the system further comprises a pH modulating setup for increasing the pH of the liquid resource in the system to neutralize the liquid resource. In some embodiments, a perforated material is used to immobilize the ion exchange material. In some embodiments, a mesh material is used to immobilize the ion exchange material. In some embodiments, a perforated material and mesh material are used to immobilize the ion exchange material. In some embodiments, the ion exchange material absorbs lithium from the liquid resource while releasing protons. In some embodiments, the ion exchange material releases lithium while absorbing protons. In some embodiments, said ion exchange material is loaded with lithium from the liquid resource, and then the lithium is eluted from said ion exchange material using an acid. In some embodiments, said ion exchange material is contained in said vessel using nozzles, slits, holes, or meshes constructed of polymer or ceramic material. In some embodiments, said ion exchange material is contained in said vessel using nozzles, slits, holes, meshes, or a combination thereof constructed of polyether ether ketone, polypropylene, polyethylene, polysulfone, polyester, polyamide, polytetrafluoroethylene, polyvinylidene difluoride, ethylene tetrafluoroethylene, stainless steel, coated stainless steel, stainless steel coated in polymer, titanium, high nickel alloy, or a combination thereof. In some embodiments, said ion exchange material comprises $LiFePO_4$, $LiMnPO_4$, $Li_2MO_3$ (M=Ti, Mn, Sn), $Li_4Ti_5O_{12}$, $Li_4Mn_5O_{12}$, $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $Li_2CuP_2O_7$, modifications thereof, solid solutions thereof, or a combination thereof. In some embodiments, said ion exchange material is a coated ion exchange material with a coating that is selected from an oxide, a polymer, or combinations thereof. In some embodiments, said ion exchange material is a coated ion exchange material with a coating that is selected from $SiO_2$, $TiO_2$, $ZrO_2$, polyvinylidene difluoride, polyvinyl chloride, polystyrene, polybutadiene, polydivinylbenzene, or combinations thereof. In some embodiments, said liquid resource is a natural brine, a pretreated brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

Disclosed herein is a method for forming ion exchange beds, comprising: a) forming a slurry comprising ion exchange beads; b) flowing said slurry into a compartment within a vessel; and c) flowing a liquid through said compartment to compact said ion exchange beads. Disclosed herein is a method for forming ion exchange beds, comprising: a) forming a slurry comprising ion exchange beads; b) flowing said slurry into a porous compartment; c) introducing a flow diversion device to direct flow through a section of said porous compartment; and d) flowing a liquid through said compartment to compact said ion exchange beads. Disclosed herein is a method for forming ion exchange beds, comprising: a) forming a slurry comprising ion exchange beads; b) flowing said slurry into a porous compartment; and c) flowing a liquid through a section of said compartment to compact said ion exchange beads. Disclosed herein is a method for forming ion exchange beds, comprising: a) Loading ion exchange beads into a porous compartment within a vessel; b) introducing a flow diversion device to direct flow through a section of said compartment; and c) flowing a liquid through said section of said compartment to compact said ion exchange beads. Disclosed herein is a method for forming ion exchange beds, comprising: a)

loading ion exchange beads into a porous compartment within a vessel; b) flowing a liquid through said section of compartment to compact said ion exchange beads. In some embodiments, inert beads serve to direct flow to certain parts of the vessel.

Disclosed herein is a device for forming ion exchange beds, comprising: a) a device for making a slurry comprising ion exchange beads; b) a device for flowing said slurry into a compartment within a vessel; and c) a device for flowing a liquid through said compartment to compact said ion exchange beads. Disclosed herein is a device for forming ion exchange beds, comprising: a) a device for making a slurry comprising ion exchange beads; b) a device for flowing said slurry into a porous compartment; c) a device for diverting flow and directing it through a section of said porous compartment to compact the ion exchange bed. Disclosed herein is a device for forming ion exchange beds, comprising: a) a device for forming a slurry comprising ion exchange beads; b) a device for flowing said slurry into a porous compartment; and c) a device for flowing a liquid through a section of said compartment to compact said ion exchange beads. Disclosed herein is a device for forming ion exchange beds, comprising: a) a device for loading ion exchange beads into a porous compartment within a vessel; b) a device for diverting flow and directing it through a section of said porous compartment to compact the ion exchange bed. Disclosed herein is a device for forming ion exchange beds, comprising: a) a device for loading ion exchange beads into a porous compartment within a vessel; b) a device for flowing a liquid through a section of said compartment to compact said ion exchange beads. Disclosed herein is a device for forming ion exchange beds, comprising: a) a device for loading ion exchange beads into a porous compartment within a vessel; b) a device for flowing a liquid said compartment to compact said ion exchange beads. Disclosed herein is a device for forming ion exchange beds, comprising a device for diverting flow through a vessel and directing it to a section of an ion exchange bed to compact said ion exchange bed. Disclosed herein is a device for forming ion exchange beds, comprising a device for diverting flow through a vessel and directing it to a section of an ion exchange bed to compact said ion exchange bed, wherein said ion exchange beds exchanges lithium ions and hydrogen ions. Disclosed herein is a device for forming ion exchange beads into ion exchange beds for lithium extraction. In some embodiments, said device conforms to the shape of the vessel. In some embodiments, said device serves to restrict flow to sections of the ion exchange bed. In some embodiments, one or more of said devices serve to restrict flow to sections of the ion exchange bed. In some embodiments, the flow restriction device blocks flow to sections of the bed adjacent to it. In some embodiments, the flow restriction device allows flow to sections of the bed adjacent to it, and blocks flows to other sections of the bed. In some embodiments, the flow restriction device blocks flow perpendicular to its axis of symmetry. In some embodiments, the flow restriction device enables flow perpendicular to its axis of symmetry. In some embodiments, the flow restriction device blocks flow parallel to its axis of symmetry. In some embodiments, the flow restriction device allows flow parallel to its axis of symmetry. In some embodiments, the flow restriction device contains a pipe. In some embodiments, inert beads serve to direct flow to certain parts of the vessel. In some embodiments, the device is used to form ion exchange beds for the system described herein. In some embodiments, the device is used to form ion exchange beds for the system described herein. Disclosed herein is a method for forming ion exchange beads into ion exchange beds within any of the systems described herein. Disclosed herein is a method of extracting lithium from a liquid resource with the vessels, devices, or systems described herein.

Disclosed herein is a depleted lithium ion exchange eluate solution comprising: a) water; b) lithium, wherein the concentration of lithium is less than 200 milligrams per liter; c) sodium, wherein the concentration of sodium is greater than about 10,000 milligrams per liter and less than about 150,000 milligrams per liter; d) calcium, wherein the concentration of calcium is greater than about 100 milligram per liter and less than about 30,000 milligrams per liter; and e) magnesium, wherein the concentration of magnesium is greater than about 100 milligrams per liter and less than about 30,000 milligrams per liter. In some embodiments, the concentration of lithium is less than 150 milligrams per liter. In some embodiments, the concentration of lithium is less than 100 milligrams per liter. In some embodiments, the concentration of sodium is about 10,000 milligrams per liter and less than about 100,000 milligrams per liter. In some embodiments, the concentration of sodium is about 50,000 milligrams per liter and less than about 150,000 milligrams per liter. In some embodiments, the concentration of calcium is about 1,000 milligram per liter and less than about 30,000 milligrams per liter. In some embodiments, the concentration of calcium is about 1,000 milligram per liter and less than about 10,000 milligrams per liter. In some embodiments, the concentration of magnesium is about 1,000 milligram per liter and less than about 30,000 milligrams per liter. In some embodiments, the concentration of magnesium is about 1,000 milligram per liter and less than about 10,000 milligrams per liter.

An aspect described herein is a device for the extraction of lithium ions from a liquid resource, comprising: a) an ion exchange material; and b) one or more vessels holding this ion exchange material in a bed to facilitate optimal flow of the liquid resource and other fluids over the ion exchange material.

In some embodiments, the ion exchange material is loaded in a vessel. In some embodiments, the ion exchange material is loaded in a plurality of vessels. In some embodiments, the vessels have interior structures to direct flows of the liquid resource and other fluids through the ion exchange material. In some embodiments, the internal structures are arranged to minimize pumping pressure through the ion exchange material. In some embodiments, the vessels are configured for radial flow of the liquid resource and other fluid through the ion exchange material.

In some embodiments, a pH modulating setup is connected to the vessels loaded with the ion exchange material. In some embodiments, the vessels further comprise a plurality of injection ports, wherein the plurality of injection ports is used to increase the pH of the liquid resource in the system. In some embodiments, the pH modulating setup further comprises one or more tanks.

In some embodiments, the pH modulating setup is a tank comprising: a) one or more compartments; and b) a means for moving the liquid resource through the one or more compartments. In some embodiments, the ion exchange material is loaded in at least one compartment. In some embodiments, the tank further comprises a means for circulating the liquid resource throughout the tank. In some embodiments, the means for circulating the liquid resource throughout the tank is a mixing device. In some embodiments, the tank further comprises an injection port.

In some embodiments, one or more vessels loaded with ion exchange material are separated by pH modulating devices. In some embodiments, a liquid resource is flowed through one vessel, treated with a base to increase the pH of the liquid resource, and then flowed through another vessel.

In some embodiments, at least one of the plurality of vessels comprises an acidic solution. In some embodiments, at least one of the plurality of vessels comprises a liquid resource.

In some embodiments, the ion exchange material comprises a plurality of ion exchange particles. In some embodiments, the plurality of ion exchange particles in the ion exchange material is selected from uncoated ion exchange particles, coated ion exchange particles and combinations thereof. In some embodiments, the ion exchange material is a porous ion exchange material. In some embodiments, the porous ion exchange material comprises a network of pores that allows liquids to move quickly from the surface of the porous ion exchange material to the plurality of ion exchange particles. In some embodiments, the ion exchange material is in the form of porous ion exchange beads. In some embodiments, the liquid resource is a natural brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

An aspect described herein is a device for lithium extraction from a liquid resource comprising one or more vessels independently configured to simultaneously accommodate flow of the liquid resource through each vessel with low pumping pressure.

An aspect described herein is a device for lithium extraction from a liquid resource comprising a filter bank configured to accommodate flow of the liquid resource through ion exchange material. An aspect described herein is a device for lithium extraction from a liquid resource comprising a network of filter banks configured to accommodate flow of the liquid resource through ion exchange material.

An aspect described herein is a device for lithium extraction from a liquid resource comprising a vessel with fluid level control to accommodate flow of the liquid resource through ion exchange material. An aspect described herein is a device for lithium extraction from a liquid resource comprising a network of vessels with fluid level control configured to accommodate flow of the liquid resource through ion exchange material.

An aspect described herein is a device for lithium extraction from a liquid resource comprising a vessel with internal structural supports to accommodate flow of the liquid resource through ion exchange material. An aspect described herein is a device for lithium extraction from a liquid resource comprising a network of vessels with internal structural supports configured to accommodate flow of the liquid resource through ion exchange material.

An aspect described herein is a device for lithium extraction from a liquid resource comprising a radial-flow vessel configured to accommodate flow of the liquid resource through ion exchange material. An aspect described herein is a device for lithium extraction from a liquid resource comprising a network of radial-flow vessels configured to accommodate flow of the liquid resource through ion exchange material.

An aspect described herein is a device for lithium extraction from a liquid resource comprising a perforated vessel configured to accommodate flow of the liquid resource through ion exchange material. An aspect described herein is a device for lithium extraction from a liquid resource comprising a network of perforated vessels configured to accommodate flow of the liquid resource through ion exchange material.

An aspect described herein is a device for lithium extraction from a liquid resource comprising a vessel with inlets at the top and bottom and an outlet in the middle configured to accommodate flow of the liquid resource through ion exchange material. An aspect described herein is a device for lithium extraction from a liquid resource comprising a network of vessels with inlets at the top and bottom and an outlet in the middle configured to accommodate flow of the liquid resource through ion exchange material.

An aspect described herein is a device for lithium extraction from a liquid resource comprising a vessel with outlets at the top and bottom and an inlet in the middle configured to accommodate flow of the liquid resource through ion exchange material. An aspect described herein is a device for lithium extraction from a liquid resource comprising a network of vessels with outlets at the top and bottom and an inlet in the middle configured to accommodate flow of the liquid resource through ion exchange material.

An aspect described herein is a device for lithium extraction from a liquid resource comprising a vessel with outlets at the top and bottom and an inlet in the middle configured to accommodate flow of the liquid resource through ion exchange material. An aspect described herein is a device for lithium extraction from a liquid resource comprising a network of vessels with outlets at the top and bottom and an inlet in the middle configured to accommodate flow of the liquid resource through ion exchange material.

An aspect described herein is a device for lithium extraction from a liquid resource comprising a vessel containing multiple porous structures loaded with ion exchange material to accommodate flow of the liquid resource through ion exchange material. An aspect described herein is a device for lithium extraction from a liquid resource comprising a network of vessels containing multiple porous structures loaded with ion exchange material configured to accommodate flow of the liquid resource through ion exchange material.

An aspect described herein is a device for lithium extraction from a liquid resource comprising a vessel containing ion exchange material and filler material to accommodate flow of the liquid resource through ion exchange material. An aspect described herein is a device for lithium extraction from a liquid resource comprising a network of vessels containing ion exchange material and filler material configured to accommodate flow of the liquid resource through ion exchange material.

An aspect described herein is a device for lithium extraction from a liquid resource, comprising a vessel with internal flow distributors directing flow of said liquid resource through multiple beds of ion exchange material inside said vessel. Another aspect described herein is a device for lithium extraction from a liquid resource, comprising: a) a vessel; b) multiple beds of ion exchange material inside said vessel; and c) flow distributors directing flow of said liquid resource through said beds of ion exchange material. Another aspect described herein is a device for lithium extraction from a liquid resource, comprising: a) a vessel defining a plurality of flow distributors therein; and b) a plurality of beds of ion exchange material disposed within the vessel and in fluid communication with the plurality of flow distributors, such that a fluid is configured to be directed to flow across the plurality of beds of ion exchange material via the plurality of flow distributors.

The device of any one of claims 1-3, wherein each bed of the plurality of beds is configured to receive the fluid through a corresponding flow distributors of the plurality of flow distributors, and discharge the fluid to another corresponding flow distributors of the plurality of channels.

In some embodiments, said liquid resource flows through said multiple beds of ion exchange material in parallel. In some embodiments, said liquid resource flows through said multiple beds of ion exchange material in series. In some embodiments, said beds of ion exchange material are mounted inside said vessel with structural supports.

An aspect described herein is a device for lithium extraction from a liquid resource, comprising a vessel containing a bed of ion exchange material and a volume of gas which is controlled using a level sensor. Another aspect described herein is a device for lithium extraction from a liquid resource, comprising a cylindrical vessel containing an interior compartment loaded with ion exchange material arranged such that said liquid resource flows through said ion exchange material in a direction that is oriented radially to said cylindrical vessel. Another aspect described herein is a device for lithium extraction from a liquid resource, comprising a cylindrical vessel containing ion exchange material located between two concentric cylindrical structures. Another aspect described herein is a device for lithium extraction from a liquid resource, comprising a vessel containing ion exchange material and a perforated pipe near the center of the vessel facilitating flow of said liquid resource through the ion exchange material in a direction oriented radially to the vessel. Another aspect described herein is a device for lithium extraction from a liquid resource, comprising an inner cylindrical vessel and an outer cylindrical vessel with ion exchange material housed between said inner cylindrical vessel and said outer cylindrical vessel. Another aspect described herein is a device for lithium extraction from a liquid resource, comprising a cylindrical vessel containing ion exchange material located between an outer concentric cylindrical structure and an inner concentric cylindrical structure, wherein an inlet to the cylindrical vessel is in fluid communication with an inner volume defined by the inner concentric cylindrical structure, such that said liquid resource is configured to enter the cylindrical vessel into the inner volume and pass through the inner concentric cylindrical structure, the ion exchange material, and the outer concentric cylindrical structure before exiting the cylindrical vessel.

In some embodiments, for a device described herein, said inner cylindrical vessel and said outer cylindrical vessel are permeable to facilitate flow of said liquid resource through said ion exchange material. In some embodiments, for a device described herein, said inner cylindrical vessel and said outer cylindrical vessel are fixed with holes, slits, nozzles, meshes, or combinations thereof to facilitate flow of said liquid resource through said ion exchange material while containing said ion exchange material inside of said vessel. In some embodiments, for a device described herein, said liquid resource flows in a radial orientation through said ion exchange material from near the outside of said vessel to near the inside of said vessel. In some embodiments, for a device described herein, said liquid resource flows in a radial orientation through said ion exchange material from near the inside of said vessel to near the outside of said vessel.

An aspect described herein is a device for lithium extraction from a liquid resource, comprising a vessel comprising internal flow distributors and containing ion exchange material. Another aspect described herein is a device for lithium extraction from a liquid resource, comprising a vessel loaded with ion exchange material wherein said liquid resource enters said vessel from multiple flow distributors located near two opposite ends of said vessel and exits said vessel from one or more flow distributors located near the center point between said two opposite ends of the vessel. Another aspect of a device described herein is a device for lithium extraction from a liquid resource, comprising a vessel loaded with ion exchange material wherein said liquid resource exits said vessel from multiple flow distributors located near two opposite ends of said vessel and enters said vessel from one or more flow distributors located near the center point between said two opposite ends of the vessel.

An aspect described herein is a device for lithium extraction from a liquid resource, comprising a vessel containing one or more candles wherein each said candle comprises two concentric structures that are permeable to flow of said liquid resource and contain ion exchange material. Another aspect described herein is a device for lithium extraction from a liquid resource, comprising a vessel containing one or more candles wherein each said candle comprises two concentric cylindrical structures that are permeable to flow of said liquid resource and contain ion exchange material.

In some embodiments, for a device described herein, said liquid resource flows into said vessel, through the outer concentric structure, through the ion exchange material, through the inner concentric structure, and then exits the vessel. In some embodiments, for a device described herein, said liquid resource flows into said vessel, through the inner concentric structure, through the ion exchange material, through the outer concentric structure, and then exits the vessel. In some embodiments, for a device described herein, said candles number more than four. In some embodiments, for a device described herein, said candles number more than eight. In some embodiments, for a device described herein, said candles number more than 20. In some embodiments, for a device described herein, said candles number more than 50. In some embodiments, for a device described herein, said candles number more than 100.

An aspect described herein is a device for lithium extraction from a liquid resource, comprising a vessel loaded with ion exchange material and filler material. Another aspect described herein is a device for lithium extraction from a liquid resource, comprising a vessel loaded with filler materials near the top and/or bottom of the vessel and also loaded with ion exchange material. Another aspect described herein is a device for lithium extraction from a liquid resource, comprising a vessel loaded with ion exchange material and filler material mixed together. Another aspect described herein is a device for lithium extraction from a liquid resource, comprising a vessel loaded with ion exchange material with filler material mixed with the ion exchange material to reduce pressure across the ion exchange material. Another aspect described herein is a device for lithium extraction from a liquid resource, comprising a vessel loaded with ion exchange material with filler material mixed with the ion exchange material to improve the strength of the bed of ion exchange material.

In some embodiments, said filler material is inert to acid and brine. In some embodiments, said filler is constructed from a polymer or ceramic. In some embodiments, said filler material has pores containing ion exchange material. In some embodiments, said filler material has pores larger smaller than 10 microns containing ion exchange material. In some embodiments, said material filler has pores larger smaller than 100 microns containing ion exchange material. In some embodiments, said filler material has pores larger smaller than 1 millimeter containing ion exchange material. In some embodiments, said filler material has pores larger smaller than 1 centimeter containing ion exchange material. In some embodiments, said filler material has pores larger than 1 centimeter containing ion exchange material. In some embodiments, said filler material has pores larger than 10 centimeters containing ion exchange material. In some embodiments, said filler material has pores larger than about 10 microns or about 100 microns containing ion exchange material. In some embodiments, said filler material has pores larger than about 1 millimeter, about 1 centimeter, or about 10 centimeters containing ion exchange material. In some embodiments, said filler material has pores larger than about 10 centimeters or about 25 centimeters containing ion exchange material. In some embodiments, said filler material has pores smaller than about 10 microns or about 100 microns containing ion exchange material. In some embodiments, said filler material has pores smaller larger than about 1 millimeter, about 1 centimeter, or about 10 centimeters containing ion exchange material. In some embodiments, said filler material has pores smaller larger than about 10 centimeters or about 25 centimeters containing ion exchange material. In some embodiments, said filler material is a rigid scaffolding.

An aspect described herein is a device for lithium extraction from a liquid resource, comprising a network of multiple vessels corresponding to a vessel described herein. Another aspect described herein is a device for lithium extraction from a liquid resource, comprising a network of multiple vessels corresponding to a vessel described herein, wherein brine flows through one vessel and into another vessel. Another aspect described herein is a device for lithium extraction from a liquid resource, comprising a network of multiple vessels corresponding to a vessel described herein, wherein brine flows through one vessel, through a unit which increases the pH of the brine, and into another vessel. Another aspect described herein is a device for lithium extraction from a liquid resource, comprising a network of multiple vessels corresponding to a vessel described herein, wherein brine flows through one vessel, through a unit which increases the pH of the brine, and into another vessel. A device for lithium extraction from a liquid resource, comprising a network of a plurality of vessels corresponding to a vessel described herein, wherein said liquid resource flows through one or more vessels of the plurality of vessels sequentially.

In some embodiments, for a device described herein, the ion exchange material comprises porous ion exchange beads. In some embodiments, for a device described herein, said ion exchange material comprises porous ion exchange beads with a mean diameter of 50 microns to 100 microns. In some embodiments, for a device described herein, said ion exchange material comprises porous ion exchange beads with a mean diameter of 100 microns to 200 microns. In some embodiments, for a device described herein, said ion exchange material comprises porous ion exchange beads with a mean diameter of 200 microns to 300 microns. In some embodiments, for a device described herein, said ion exchange material comprises porous ion exchange beads with a mean diameter of 200 microns to 400 microns. In some embodiments, for a device described herein, said ion exchange material comprises porous ion exchange beads with a mean diameter of 400 microns to 600 microns. In some embodiments, for a device described herein, said ion exchange material comprises porous ion exchange beads with a mean diameter of 400 microns to 800 microns. In some embodiments, for a device described herein, flow of said liquid resource through said ion exchange material applies a pressure on said ion exchange material of less than 20 psi. In some embodiments, for a device described herein, flow of said liquid resource through said ion exchange material applies a pressure on said ion exchange material of less than 50 psi. In some embodiments, for a device described herein, flow of said liquid resource through said ion exchange material applies a pressure on said ion exchange material of less than 100 psi. In some embodiments, for a device described herein, flow of said liquid resource through said ion exchange material applies a pressure on said ion exchange material of less than 200 psi. In some embodiments, for a device described herein, the device further comprises a pH modulating setup for increasing the pH of the liquid resource in the system. In some embodiments, for a device described herein, the device further comprises a pH modulating setup for increasing the pH of the liquid resource in the system to neutralize a fluid (e.g., the liquid resource). In some embodiments, for a device described herein, perforated material is used to immobilize the ion exchange material. In some embodiments, for a device described herein, mesh material is used to immobilize the ion exchange material. In some embodiments, for a device described herein, perforated material and mesh material are used to immobilize the ion exchange material. In some embodiments, for a device described herein, the ion exchange material absorbs lithium from the brine while releasing protons. In some embodiments, for a device described herein, said ion exchange material is loaded with lithium from the brine and then the lithium is eluted from said ion exchange material using acid. In some embodiments, for a device described herein, said ion exchange material is contained in said vessel using nozzles, slits, holes, or meshes constructed of polymer or ceramic material. In some embodiments, for a device described herein, said ion exchange material is contained in said vessel using nozzles, slits, holes, meshes, or combinations thereof constructed of polyether ether ketone, polypropylene, polyethylene, polysulfone, polyester, polyamide, polytetrafluoroethylene, polyvinylidene difluoride, ethylene tetrafluoroethylene, stainless steel, coated stainless steel, stainless steel coated in polymer, titanium, high nickel alloy, or combinations thereof. In some embodiments, for a device described herein, said ion exchange material is selected from LiFePO4, LiMnPO4, Li2MO3 (M=Ti, Mn, Sn), Li4Ti5O12, Li4Mn5O12, LiMn2O4, Li1.6Mn1.6O4, LiMO2 (M=Al, Cu, Ti), Li4TiO4, Li7Ti11O24, Li3VO4, Li2Si3O7, Li2CuP2O7, modifications thereof, solid solutions thereof, or combinations thereof. In some embodiments, for a device described herein, said ion exchange material is a coated ion exchange material with a coating that is selected from an oxide, a polymer, or combinations thereof. In some embodiments, for a device described herein, said ion exchange material is a coated ion exchange material with a coating that is selected from SiO2, TiO2, ZrO2, polyvinylidene difluoride, polyvinyl chloride, polystyrene, polybutadiene, polydivinylbenzene, or combinations thereof. In some embodiments, for a device described herein, said liquid resource is a natural brine, a pretreated brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
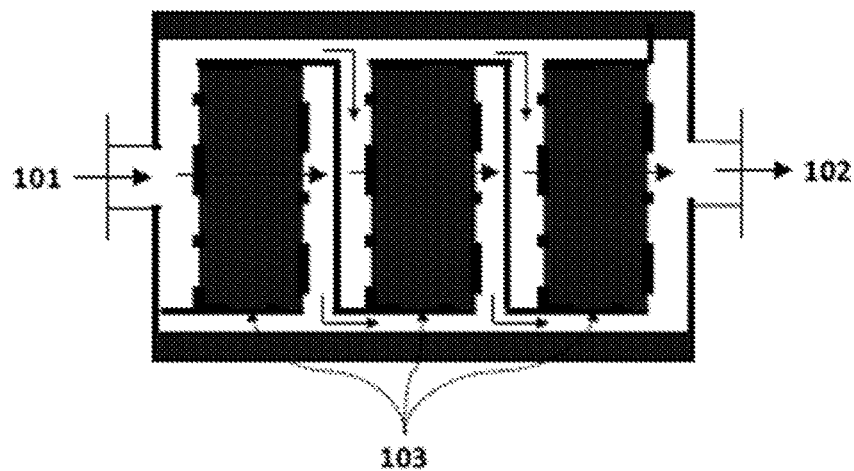
FIG. 1 illustrates a lithium extraction device comprising a vessel with one or more filter banks loaded with ion exchange beads.

Lithium is an essential element for batteries and other technologies. Lithium is found in a variety of liquid resources, including natural and synthetic brines and leachate solutions from minerals, clays, and recycled products. Lithium is extracted from such liquid resources using an ion exchange process based on inorganic ion exchange materials. These inorganic ion exchange materials absorb lithium from a liquid resource while releasing hydrogen, and then elute lithium in acid while absorbing hydrogen. This ion exchange process is optionally repeated to extract lithium from a liquid resource and yield a concentrated lithium solution. The concentrated lithium solution is optionally further processed into chemicals for the battery industry or other industries.

Ion exchange beads, including ion exchange particles, ion exchange material, ion exchange media, porous ion exchange beads, and/or coated ion exchange particles, are loaded into ion exchange vessels. Alternating flows of brine, acid, and other solutions are optionally flowed through an ion exchange column or vessel to extract lithium from the brine and produce a lithium concentrate, which is eluted from the column or vessel using the acid. As brine flows through the ion exchange column or vessel, the beads absorb lithium while releasing hydrogen, wherein both the lithium and hydrogen are cations. After the beads have absorbed lithium, acid is used to elute the lithium from the ion exchange beads to produce an eluate or lithium-enriched solution.

Ion exchange beads may have small diameters less than about one millimeter or less, causing a high pressure difference across a packed bed of the beads during pumping of the liquid resource and other fluids through the bed. To minimize pressure across the packed bed and to minimize associated pumping energy, vessels with optimized geometries are used to reduce the flow distance through the packed bed of ion exchange beads. These vessels may be networked with pH modulation units to achieve adequate control of the pH of the liquid resource. In some embodiments a network of vessels loaded with ion exchange materials may comprise two vessels, three vessels, four vessels, five vessels, six vessels, seven vessels, eight vessels, nine vessels, 10 vessels, 11 vessels, 12 vessels, 13-14 vessels, 15-20 vessels, 20-30 vessels, 30-50 vessels, 50-70 vessels, 70-100 vessels, or more than 100 vessels.

Minimizing pressure across the packed bed is important for maximizing the efficiency of lithium extraction by ion exchange beads. For example, ion exchange beads of average particle diameter of about 0.5 mm are arranged in a bed with a flow bath of 1 m in length. When brine is flown through said bed, the resulting pressure drop is 75 psi, and 80% of the available lithium in the brine is recovered. As illustrated in example 4, if ion exchange beads of average particle diameter of about 0.25 mm are arranged in a bed with a flow bath of 1 m in length, the resulting pressure drop when brine is flown is 100 psi, making it impractical for commercial use. Instead, these beads are arranged into four 25 cm beds using a vessel designed for minimal flow distance, as described in this patent. When such a vessel is used, the pressure drop is of only 25 psi, and 90% of the lithium in the brine is recovered. Thus, the use of vessels designed for minimal flow distance across an ion exchange bed can improve performance and facilitate the successful commercial practice of lithium extraction by ion exchange.

Maximizing the performance of the ion exchange is advantageous for lithium production by ion exchange. Disclosed herein is a system, and associated methods and processes, for maximizing the performance of ion exchange by minimizing the resistance to flow of liquids across the ion exchange beads. In some embodiments, minimizing the flow resistance of liquids to flow across the ion exchange beds, which include the liquid resource from which lithium is extracted, water used for washing of the ion exchange beads, and acid used to elute lithium, results in a lower energy associated for pumping through the ion exchange beds, and improved process performance parameters. In some embodiments, such improved performance is manifested by a lower pressure drop for flow of the same amount of liquid across the ion exchange material using in the vessels and systems described herein. In some embodiments, such improved performance is manifested by a higher lithium production rate for flow of the same amount of liquid across the ion exchange material using in the vessels and systems described herein. In some embodiments, such improved performance is manifested by a higher lithium purity of lithium produced for flow of the same amount of liquid across the ion exchange material using in the vessels and systems described herein.

Vessels for Beds of Ion Exchange Beads with Minimal Flow Distance

For commercial production of lithium using ion exchange, it is desirable to construct large-scale ion exchange modules containing large quantities of ion exchange beads. However, most large vessels capable of holding about one tonne or more of ion exchange beads have large fluid flow distances of about one meter or more. These fluid flow distances cause large pressure drops. To reduce the pressure drop across the ion exchange bed, the ion exchange beads are loaded into vessels facilitating flow across the ion exchange beads with a shorter fluid flow distance. These vessels are designed to evenly distribute flow of the liquid resource and other fluids through the ion exchange beads.

In some embodiments, the vessel are oriented vertically, horizontally, or at any angle relative to the horizontal axis. In some embodiments, the vessel are cylindrical, rectangular, spherical, another shape, or a combinations thereof. In some embodiments, the vessel can have a constant cross-sectional area or a varying cross-sectional area.

In some embodiments, the vessel has a height to diameter ratio of less than about 0.1, 0.5, less than about 1, less than about 2, less than about 5, less than about 10, more than about 0.1, more than about 0.5, more than about 1, more than about 2, more than about 5, more than about 10. In one embodiment, the vessel internal is coated with a polymeric or rubber material. In one embodiment the vessel is equipped with an outlet collector tray. In one embodiment the vessel has multiple injection ports for the inlet or outlet flow. In one embodiment the flow is introduced from the bottom, top, middle of the vessel, or a combination of thereof. In one embodiment the vessel is outfitted with baffles or plates to break fluid jets.

The types of vessels used for packed beds of ion exchange material with minimal flow resistance are described in the examples 1 to 18 and associated FIGS. 1 to 18.

Ion Exchange Beads Contained within Vessels with Minimal Flow Distance

In some embodiments, the ion exchange beads contained within such a vessel have an average particle diameter less than about 10 μm, less than about 20 μm, less than about 30 μm, less than about 40 μm, less than about 50 μm, less than about 60 μm, less than about 70 μm, less than about 80 μm, less than about 90 μm, less than about 100 μm, less than about 200 μm, less than about 300 μm, less than about 400 μm, less than about 500 μm, less than about 600 μm, less than about 700 μm, less than about 800 μm, less than about 900 μm, less than about 1000 μm, less than about 2000 μm. In some embodiments, the ion exchange beads have an average particle diameter more than about 10 μm, more than about 20 μm, more than about 30 μm, more than about 40 μm, more than about 50 μm, more than about 60 μm, more than about 70 μm, more than about 80 μm, more than about 90 μm, more than about 100 μm, more than about 200 μm, more than about 300 μm, more than about 400 μm, more than about 500 μm, more than about 600 μm, more than about 700 μm, more than about 800 μm, more than about 900 μm, more than about 1000 μm, more than about 2000 μm. In some embodiments, the ion exchange beads have a typical particle size from about 10 μm to about 20 μm, from about 20 μm to about 40 μm, from about 40 μm to about 80 μm, from about 80 μm to about 200 μm, from about 100 μm to about 400 μm, from about 200 μm to about 800 μm, from about 400 μm to about 1000 μm, from about 600 μm to about 2000 μm, from about 1000 μm to about 2000 μm.

Figure 7:
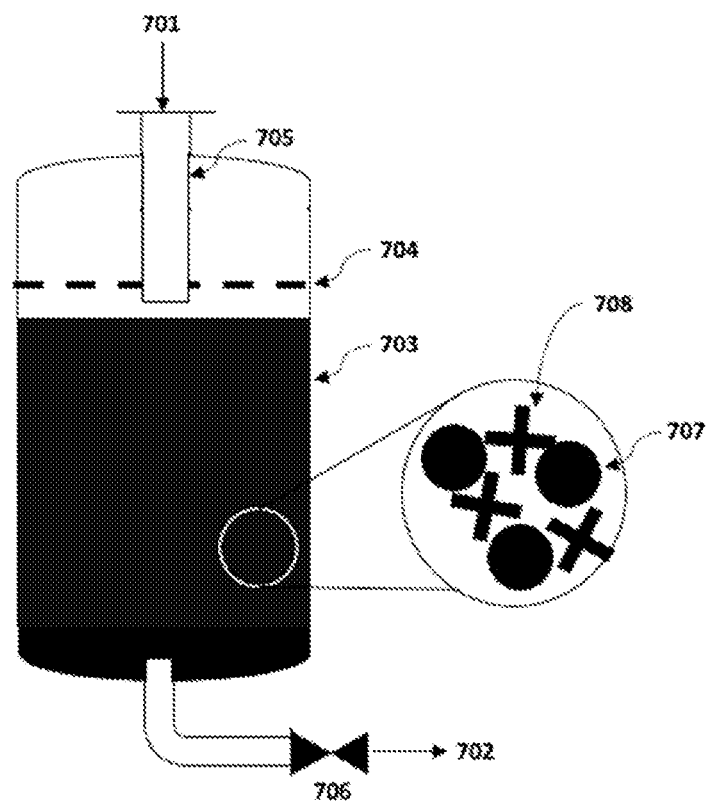
FIG. 7 illustrates a lithium extraction device comprising a vessel with a fluid level controller loaded with ion exchange beads co-loaded with inert filler material.
Figure 8:
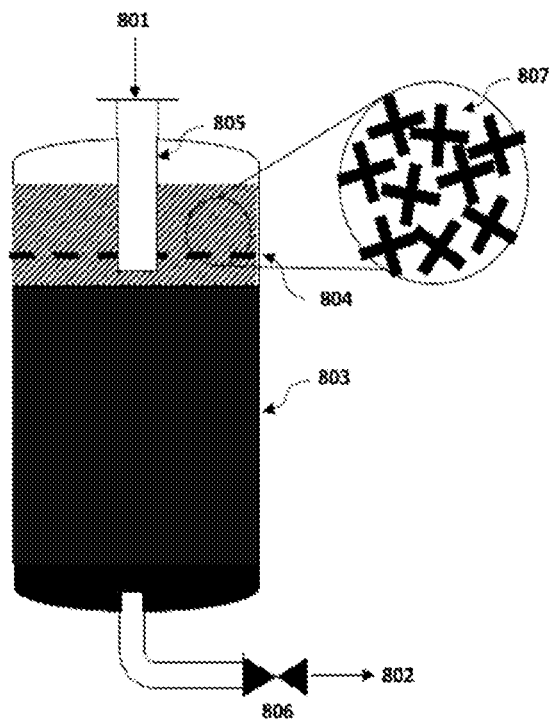
FIG. 8 illustrates a lithium extraction device comprising a vessel with a fluid level controller loaded with ion exchange beads and inert filler.

In some embodiments, the ion exchange beads contained within such a vessel are co-loaded with inert beads that do not undergo ion-exchange processes. This is illustrated in FIGS. 7 and 8 and associated examples 7 and 8. Such co-loading of ion-exchange beads with inert beads may aid in more optimal flow distribution of process fluids, and/or in decreasing the resistance to flow through a bed of ion-exchange beads. In some embodiments, the inert beads may be loaded into the vessel adjacent to the ion exchange beads, mixed with the ion exchange beads, or a combination thereof. In some embodiments, inert beads consist of a polymer, a ceramic, a metal, a carbide, a nitride, an oxide, a phosphate, a fluoride, a polymer, carbon, a carbonaceous material, or combinations thereof. In a further aspect, the inert beads are coated. In some embodiments, the coating material comprises a chloro-polymer, a fluoro-polymer, a chloro-fluoro-polymer, a hydrophilic polymer, a hydrophobic polymer, co-polymers thereof, mixtures thereof, or combinations thereof. In a further aspect, the coating material comprises a co-polymer, a block co-polymer, a linear polymer, a branched polymer, a cross-linked polymer, a heat-treated polymer, a solution processed polymer, co-polymers thereof, mixtures thereof, or combinations thereof. In a further aspect, the coating material comprises low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly (chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluoro-3,6-dioxa-4-methyl-7-octene-sulfonic acid (NAFION® (copolymer of perfluoro-3,6-dioxa-4-methyl-7-octene-sulfonic acid and tetrafluoroethylene)), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof. In one embodiment, the coating material comprises low density polyethylene. In one embodiment, the coating material comprises polypropylene. In one embodiment, the coating material comprises polytetrafluoroethylene (PTFE). In one embodiment, the coating material comprises polyvinylidene fluoride (PVDF). In one embodiment, the coating material comprises polyvinyl chloride (PVC). In one embodiment, the coating material comprises ethylene tetrafluoroethylene polymer (ETFE).

In some embodiments, inert beads have an average particle diameter less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, inert beads have an average particle diameter more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, inert beads have a typical particle size from about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm.

In some embodiments, the ion exchange beads contained within such a vessel are co-loaded with a dissolvable particle. In some embodiments, dissolvable particles can include a carbonate, a sulfate, a chloride, a fluoride, a bromide, a phosphate, a nitrate, an organic anion, a polymer, or a combination thereof. In some embodiments, dissolvable particles can include sodium, ammonium, potassium, magnesium, calcium, lithium, aluminum, or a combination thereof. In some embodiments, the dissolvable particles are dissolved from the ion-exchange bed after co-loading into the bed. In some embodiments, dissolution is achieved by treatment with water, acid, base or a combination thereof. In some embodiments, dissolution is achieved by treatment with water, acid, base, or a combination thereof at elevated temperature. In some embodiments, acid used for dissolution includes hydrochloric, phosphoric, sulfuric, citric, acetic, nitric, carbonic acids, or a combination thereof. In some embodiments, based use for dissolution includes sodium hydroxide, lithium hydroxide, potassium hydroxide, magnesium hydroxide, calcium hydroxide, or a combination thereof.

Embodiments Comprising Vessels for Beds of Ion Exchange Beads Wherein Fluid Flow is Oriented Radially In some embodiments, the vessel containing the above ion exchange beads or inert beads is comprised of a plurality of concentric walls: an outer-wall that contains all internal components of the vessel, an outer perforated wall, and an inner perforated wall. The dimensions of the outer wall is larger than the dimensions of the outer perforated wall, which is larger than the dimensions of the inner perforated wall. In some embodiments, ion exchange beads are contained in the compartment formed by the space between the inner- and outer-perforated walls. In some embodiments, flow of a liquid occurs through the space inside of the inner-perforated wall to and from the ion-exchange bead compartment. In some embodiments, liquid flow occurs through the space between the outer vessel wall and the outer perforated, to and from the ion-exchange bead compartment. Such a vessel is described in examples 3 and 11 and associated FIGS. 3 and 11.

In some embodiments, said vessel does not contain an inner perforated wall, such that all ion exchange media are contained within an outer perforated wall. In some embodiments, said vessel does not contain an outer perforated wall, such that all ion exchange media are contained within the outer wall of the vessel, surrounding an inner-perforated wall.

Figure 3:
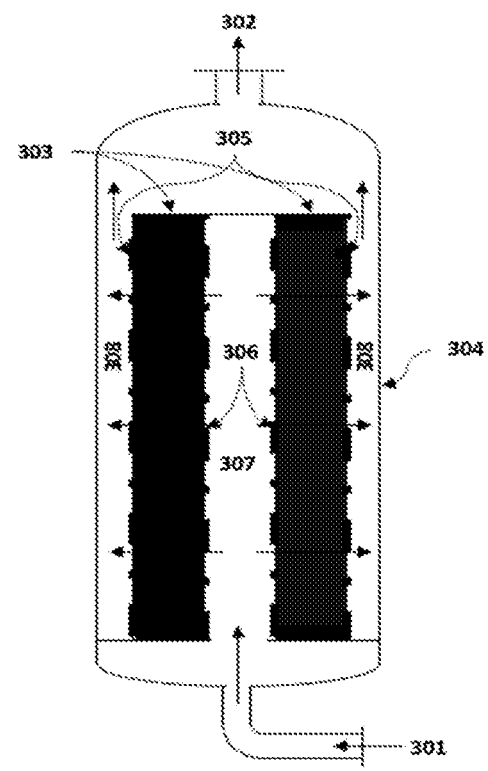
FIG. 3 illustrates a lithium extraction device comprising a vessel with at least one radial-flow packed ion-exchange bed with minimal flow resistance.

In some embodiments, flow of a liquid resource occurs in and out of the vessel as follows: from the top and bottom of the compartment formed by the outer-perforated wall the outer wall of the vessel, through the outer-perforated wall, into and through the compartment containing the ion-exchange beads, through the inner-perforated wall, and out of the top and bottom of the compartment formed by the inner-perforated walls. In some embodiments, flow of a liquid resource occurs in and out of the vessel as follows: from the top and bottom of the compartment formed by the inner-perforated wall, through the inner-perforated wall, into and through the compartment containing the ion-exchange beads, through the outer-perforated wall, and out of the compartment formed by the outer-perforated wall and the outside wall of the vessel. This latter scenario is illustrated in FIG. 3 and associated example 3.

In some embodiments, flow of an acidic solution occurs in and out of the vessel as follows: from the top and bottom of the compartment formed by the outer-perforated wall the outer wall of the vessel, through the outer-perforated wall, into and through the compartment containing the ion-exchange beads, through the inner-perforated wall, and out of the top and bottom of the compartment formed by the inner-perforated walls. In some embodiments, flow of an acidic solution occurs in and out of the vessel as follows: from the top and bottom of the compartment formed by the inner-perforated wall, through the inner-perforated wall, into and through the compartment containing the ion-exchange beads, through the outer-perforated wall, and out of the compartment formed by the outer-perforated wall and the outside wall of the vessel.

In some embodiments, the ion exchange beads are contacted with a liquid resource containing lithium, wherein flow occurs from the larger diameter perforated wall to the smaller diameter perforated wall through the shortest possible path across the ion exchange bead bed, resulting in absorption of lithium by said ion exchange beads. In some embodiments, the ion exchange beads are contacted with a liquid resource containing lithium, wherein flow occurs from the smaller diameter perforated wall to the larger diameter perforated wall, as illustrated in FIG. 3 and associated example 3, resulting in absorption of lithium by said ion exchange beads. In some embodiments, the ion exchange beads that have absorbed lithium are contacted with hydrogen ions from acid, wherein flow occurs from the larger diameter perforated wall to the smaller diameter perforated wall, resulting in release of absorbed lithium to produce a lithium eluate. In some embodiments, the ion exchange beads that have absorbed lithium are contacted with hydrogen ions from acid, wherein flow occurs from the smaller diameter perforated wall to the larger diameter perforated wall, resulting in release of absorbed lithium to produce a lithium eluate.

In some embodiments, the ion exchange beads are contacted with a liquid resource containing lithium, wherein flow occurs from the top and bottom of the compartment containing the ion exchange beads, and into the smaller-diameter perforated wall, resulting in absorption of lithium by said ion exchange beads. In some embodiments, the ion exchange beads are contacted with a liquid resource containing lithium, wherein flow occurs from the smaller-diameter perforated wall to the top and the bottom of the compartment containing the ion exchange beads, resulting in absorption of lithium by said ion exchange beads. In some embodiments, the ion exchange beads are contacted with a liquid resource containing lithium, wherein flow occurs from the smaller-diameter perforated wall to the top or the bottom of the compartment containing the ion exchange beads, resulting in absorption of lithium by said ion exchange beads. In some embodiments, the ion exchange beads that have absorbed lithium are contacted with hydrogen ions from acid, wherein flow occurs from the top and bottom of the compartment containing the ion exchange beads, and into the smaller-diameter perforated wall, resulting in release of absorbed lithium to produce a lithium eluate. In some embodiments, the ion exchange beads that have absorbed lithium are contacted with hydrogen ions from acid, wherein flow occurs from the smaller-diameter perforated wall to the top and the bottom of the compartment containing the ion exchange beads, resulting in release of absorbed lithium to produce a lithium eluate. In some embodiments, the ion exchange beads that have absorbed lithium are contacted with hydrogen ions from acid, wherein flow occurs from the smaller-diameter perforated wall to the top or the bottom of the compartment containing the ion exchange beads, resulting in release of absorbed lithium to produce a lithium eluate.

In some embodiments, the compartment containing the ion-exchange beads consists of uniform inner- and outer-diameter perforated wall with constant radius along the vertical length of the vessel. In some embodiments, the compartment containing the ion-exchange beads consists of inner- and outer-diameter perforated walls with changing diameter to result in a fluid flow distance that varies along the vertical length of the vessel, thus facilitating the even distribution of fluid flow the compartment containing the ion exchange beads. In one embodiment, the length of the ion exchange bed at the center of the vessel (relative to its longitudinal axis) is at a minimum, whereas the length of the ion exchange bed at the top and bottom of the vessel (relative to its longitudinal axis) is at a maximum. In another embodiment, the length of the ion exchange bed at the top and bottom of the vessel (relative to its longitudinal axis) is at a minimum, whereas the length of the ion exchange bed at the center of the vessel (relative to its longitudinal axis) is at a maximum.

In some embodiments, the compartment containing the ion-exchange beads are contacted with fluid that flows across the shorter flow path, in the radial direction relative to the vessel. In some embodiments, the compartment containing the ion-exchange beads are contacted with fluid that flows across the longer flow path, in the axial direction relative to the vessel. In some embodiments, the compartment containing the ion-exchange beads are contacted with fluid in both the radial and the axial direction relative to the vessel.

In one embodiment, the ion exchange compartment is partially filled with ion exchange beads, such that ion exchange beads freely move within their containing compartment during contacting with fluid. In some embodiments, the ion exchange compartment within the reactor vessel is filled to its capacity with ion exchange beads, such that ion exchange beads are fixed in place and cannot freely move within the containing compartment during contacting with fluid. In one embodiment, the ion exchange compartment within the reactor vessel is partially filled, and becomes completely filled by the change in volume of ion exchange beads that occurs when contacting said beads with certain fluids. In some embodiments, the vessel is configured such that ion exchange beads may enter and leave the ion-exchange bead compartment conveyed by the fluid which they are contacting, whether this fluid flow happens in the axial or radial direction, in the out-in or in-out direction, in the top-down or down-top direction. In one embodiment, the ion exchange beads may be loaded into and unloaded from said compartments axially through the top or bottom, or radially through the inner- or outer-perforated walls.

In some embodiments, the typical length of the reactor vessel is less than about 10 cm, less than about 20 cm, less than about 40 cm, less than about 60 cm, less than about 80 cm, less than about 100 cm, less than about 200 cm, less than about 400 cm, less than about 600 cm, less than about 800 cm, less than about 1 m, less than about 2 m, less than about 4 m, less than about 6 m, less than about 8 m, less than about 10 m, less than about 20 m, less than about 40 m. In some embodiments, the typical length of the reactor vessel is more than about 10 cm, more than about 20 cm, more than about 40 cm, more than about 60 cm, more than about 80 cm, more than about 100 cm, more than about 200 cm, more than about 400 cm, more than about 600 cm, more than about 800 cm, more than about 1 m, more than about 2 m, more than about 4 m, more than about 6 m, more than about 8 m, more than about 10 m, more than about 20 m, more than about 40 m. In some embodiments, the typical length of the reactor vessel is from about 10 cm to about 20 cm, from about 20 cm to about 40 cm, from about 40 cm to about 80 cm, from about 80 cm to about 2 m from about 1 m to about 4 m, from about 2 m to about 8 m, from about 4 m to about 10 m, from about 6 m to about 20 m, from about 10 m to about 40 m.

In some embodiments, the typical radius of the inner-perforated wall within the vessel is less than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical radius of the inner-perforated wall within the vessel is more than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical radius of the inner-perforated wall within the vessel is from about 1 cm to about 2 cm, from about 2 cm to about 4 cm, from about 4 cm to about 8 cm, from about 8 cm to about 20 cm, from about 20 cm to about 40 cm, from about 40 cm to about 80 cm, from about 80 cm to about 120 cm, from about 120 cm to about 2 m, from about 2 m to about 4 m, from about 4 m to about 8 m.

In some embodiments, the typical radius of the outer-perforated wall within the vessel is less than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical radius of the outer-perforated wall within the vessel is more than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical radius of the outer-perforated wall within the vessel is from about 1 cm to about 2 cm, from about 2 cm to about 4 cm, from about 4 cm to about 8 cm, from about 8 cm to about 20 cm, from about 20 cm to about 40 cm, from about 40 cm to about 80 cm, from about 80 cm to about 120 cm, from about 120 cm to about 2 m, from about 2 m to about 4 m, from about 4 m to about 8 m.

In some embodiments, the size of the openings in the inner-perforated walls are constant or almost-constant throughout the length and circumference of said wall. In some embodiments, the diameter of the openings in the inner-perforated walls vary along the length of said wall, being largest at the top and bottom and smallest at the center, largest at the center and smallest at the top and bottom, largest at the top and smallest at the bottom, smallest at the top and largest at the bottom, a combination thereof, or randomly distributed. In some embodiments, the dimension of the openings in the inner-perforated wall also vary along the circumference of said wall. In some embodiments, the choice of pore opening size along the length and circumference of inner-perforated wall, relative to the inlet- and outlet-streams, benefits the even distribution of flow throughout the bed of ion-exchange beads and ensures minimum flow resistance. In some embodiments, the number of perforations per square centimeter in the outer-perforated walls is varied along the outer-perforated walls to achieve optimal flow distribution through the vessel and through the ion exchange beads. In some embodiments, the openings on the outer-perforated walls are shaped as vertical or horizontal slits, squares, crosses, rectangles, triangles, irregular shapes, or a combination thereof. In some embodiments, the openings in inner-perforated walls are of dimension of less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, the perforated openings in inner-perforated walls are of dimension of more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, the perforated openings in inner-perforated walls are of dimension of about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm.

In some embodiments, the dimension of the openings in the outer-perforated walls are constant or almost-constant throughout the length and circumference of said wall. In some embodiments, the dimension of the openings in the outer-perforated walls vary along the length of said wall, being largest at the top and bottom and smallest at the center, largest at the center and smallest at the top and bottom, largest at the top and smallest at the bottom, smallest at the top and largest at the bottom, a combination thereof, or randomly distributed. In some embodiments, the dimension of the openings in the outer-perforated wall also varies along the circumference of said wall. In some embodiments, the choice of pore opening dimension along the length and circumference of outer-perforated wall, relative to the inlet- and outlet-streams, benefits the even distribution of flow throughout the bed of ion-exchange beads and ensures minimum flow resistance. In some embodiments, the number of holes per square centimeter in the outer-perforated walls is varied along the outer-perforated walls to achieve optimal flow distribution through the vessel and through the ion exchange beads. In some embodiments, the openings on the outer-perforated walls are shaped as circles, ovals, vertical or horizontal slits, squares, crosses, rectangles, triangles, irregular shapes, or a combination thereof.

In some embodiments, the openings in outer-perforated walls have an opening of less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm, less than about 4000 µm, less than about 8000 µm, or less than about 10000 µm. In some embodiments, the perforated openings in outer-perforated walls are of dimension of more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm, more than about 4000 µm, more than about 8000 µm, or more than about 10000 µm. In some embodiments, the perforated openings in outer-perforated walls are of dimension of about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm, from about 2000 µm to about 4000 µm, from about 4000 µm to about 8000 µm, from about 6000 µm to about 10000 µm.

In some embodiments, the outer- and inner-perforated walls are surrounded by a porous partition that provides support for the ion-exchange bead bed, chemical protection, aids filtration, or a combination thereof. In some embodiments, the porous partition is a porous polymer partition. In some embodiments, the porous partition is a mesh or polymer membrane. In some embodiments, the porous partition comprises one or more meshes of similar or different composition, of similar or different aperture sizes, of similar or different percent open area. In some embodiments, the porous partition comprises one or more meshes to provide structural support and/or filtration capabilities. In some embodiments, the porous partition comprises a polyether ether ketone mesh, a polypropylene mesh, a polyethylene mesh, a polysulfone mesh, a polyester mesh, a polyamide mesh, a polytetrafluoroethylene mesh, an ethylene tetrafluoroethylene polymer mesh, a stainless steel mesh, a stainless steel mesh coated in polymer, a stainless steel mesh coated in ceramic, a titanium mesh, or a combination thereof, wherein the mesh is a coarse mesh, a fine mesh, or a combination thereof.

In some embodiments, the porous partition consists of openings in that are of a typical characteristic size of less than about 1 µm, less than about 2 µm, less than about 5 µm, less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, the porous partition consists of openings in that are of a typical characteristic size of more than about 1 µm, more than about 2 µm, more than about 5 µm, more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, the porous partition consists of openings in that are of a typical characteristic size from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm. In some embodiments, the porous partition consists of openings in that are of a typical characteristic size of from about 1 µm to about 2 µm, from about 2 µm to about 4 µm, from about 4 µm to about 10 µm, from about 10 µm to about 20 µm, from about 20 µm to about 40 µm, from about 40 µm to about 100 µm, from about 100 µm to about 200 µm, from about 200 µm to about 400 µm, from about 400 µm to about 1000 µm, from about 1000 µm to about 2000 µm. In some embodiments, the porous partition consists of openings in that are of a typical characteristic size of from about 1 µm to about 10 µm, from about 10 µm to about 100 µm, from about 100 µm to about 1000 µm, from about 1000 µm to about 10000 µm.

In some embodiments, the typical characteristic opening of the porous polymer partition varies along the length of the porous partition. In some embodiments, the variation in the characteristic opening of the porous partition is chosen such that uniform perpendicular flow is maintained along the entire length of the porous polymer partition. In some embodiments, the variation in the characteristic opening of the porous partition is chosen to direct flow to certain areas of the ion exchange bed. In some embodiments, the pore size of the porous polymer partition varies along the porous partition. In some embodiments, the pore density of the porous polymer partition varies along the porous partition. In some embodiments, the flow resistance of the porous polymer partition varies along the porous partition. In some embodiments, the number of pores of the porous polymer partition varies along the porous partition. In some embodiments, the thickness of the porous polymer partition varies along the porous partition. In some embodiments, the porous polymer partition is varied along one or more axes to control pressure drop through the porous polymer partition.

In some embodiments, the dimension of openings in the porous partition varies along the length of the porous partition. In some embodiments, the variation in the dimension of openings in the porous partition is chosen such that uniform flow is maintained along the entire length of the porous partition. In some embodiments, the variation in the openings of the porous partition is chosen to direct flow to certain areas of the ion exchange bed. In some embodiments, the pore size of the porous partition varies along the porous partition. In some embodiments, the pore density of the porous partition varies along the porous partition. In some embodiments, the flow resistance of the porous partition varies along the porous partition. In some embodiments, the number of pores of the porous partition varies along the porous partition. In some embodiments, the thickness of the porous partition varies along the porous partition. In some embodiments, the porous partition is varied along one or more axes to control pressure drop through the porous partition.

In some embodiments, the porous partition is typical characteristic size of less than about 1 µm, less than about 2 µm, less than about 5 µm, less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, the porous partition consists of openings in that are of a typical characteristic size of more than about 1 µm, more than about 2 µm, more than about 5 µm, more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, the porous partition consists of openings in that are of a typical characteristic size from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000

μm, from about 1000 μm to about 2000 μm. In some embodiments, the porous partition consists of openings in that are of a typical characteristic size of from about 1 μm to about 2 μm, from about 2 μm to about 4 μm, from about 4 μm to about 10 μm, from about 10 μm to about 20 μm, from about 20 μm to about 40 μm, from about 40 μm to about 100 μm, from about 100 μm to about 200 μm, from about 200 μm to about 400 μm, from about 400 μm to about 1000 μm, from about 1000 μm to about 2000 μm. In some embodiments, the porous partition consists of openings in that are of a typical characteristic size of from about 1 μm to about 10 μm, from about 10 μm to about 100 μm, from about 100 μm to about 1000 μm, from about 1000 μm to about 10000 μm.

In some embodiments, the internal components of the vessel are configured to provide optimal distribution of fluid flow for the liquid resource containing lithium, the acid containing hydrogen ions, and any other fluid required for operation of the vessel. In some embodiments, the compartment formed between the outer-perforated wall and the outer wall of the vessel serves to distribute flow entering or exiting the ion exchange bead compartment through the outer-perforated wall; this compartment is hereby referred to as the outer-flow distribution compartment. In some embodiments, the compartment formed inside the inner-perforated wall serves to distribute flow entering or exiting the ion exchange bead compartment through the inner-perforated wall; this compartment is hereby referred to as the inner-flow distribution compartment.

In one embodiment, the outer-flow distribution and/or the inner-flow distribution compartments are empty, partially filled, or fully filled with fluid, or a combination thereof. In some embodiments, the outer-flow distribution and/or the inner-flow distribution compartments are cylindrical, rectangular, spherical, or a combination thereof. In some embodiments, the outer-flow distribution and/or the inner-flow distribution compartments have a constant cross-sectional area or a varying cross-sectional area.

In one embodiment, the outer-flow distribution and/or the inner-flow distribution compartments contain internal beams to provide structural support for the vessel, while also providing more optimal flow distribution. In one embodiment, the outer-flow distribution and/or the inner-flow distribution compartments contain pipes and tubes that direct flow into individual perforations in the inner- and outer-perforated walls. In one embodiment, the outer-flow distribution and/or the inner-flow distribution compartments contain trays that direct flow. In some embodiments, the In some embodiments, the outer-flow distribution and/or the inner-flow distribution compartments contain filler material to provide structural support for the vessel, while also providing more optimal flow distribution. In some embodiments, the filler material is comprised of a polymer, ceramic, metal, ion-exchange beads, or a combination thereof. In some embodiments, the filler material contained within the outer-flow distribution and/or the inner-flow distribution compartments have an average particle diameter of less than about 10 μm, less than about 20 μm, less than about 30 μm, less than about 40 μm, less than about 50 μm, less than about 60 μm, less than about 70 μm, less than about 80 μm, less than about 90 μm, less than about 100 μm, less than about 200 μm, less than about 300 μm, less than about 400 μm, less than about 500 μm, less than about 600 μm, less than about 700 μm, less than about 800 μm, less than about 900 μm, less than about 1000 μm, less than about 2000 μm; more than about 10 μm, more than about 20 μm, more than about 30 μm, more than about 40 μm, more than about 50 μm, more than about 60 μm, more than about 70 μm, more than about 80 μm, more than about 90 μm, more than about 100 μm, more than about 200 μm, more than about 300 μm, more than about 400 μm, more than about 500 μm, more than about 600 μm, more than about 700 μm, more than about 800 μm, more than about 900 μm, more than about 1000 μm, more than about 2000 μm; from about 10 μm to about 20 μm, from about 20 μm to about 40 μm, from about 40 μm to about 80 μm, from about 80 μm to about 200 μm, from about 100 μm to about 400 μm, from about 200 μm to about 800 μm, from about 400 μm to about 1000 μm, from about 600 μm to about 2000 μm, from about 1000 μm to about 2000 μm.

In some embodiments, flow into and out from the outer-flow distribution compartment occurs from the top, the side, the bottom of said compartment, or a combination thereof. In some embodiments, flow into and out from the inner-flow distribution compartment occurs from the top, the side, or the bottom of said compartment, or a combination thereof.

In some embodiments, the vessel contains an additional flow distribution manifold at the top, bottom, or side of the vessel. In some embodiments, said flow distribution compartment contains pipes, tubing, or internal partition to direct flow into and from the inner-flow distribution compartment, and into and from the outer-flow distribution compartment. In some embodiments, the flow distribution manifold has inlets and outlets at the top, bottom, or side of said manifold.

In some embodiments, a single vessel contains one outer pressure-bearing wall, within which multiple ion exchange beds are contained, and wherein each ion-exchange bed is contained between two non-intersecting concentric porous walls, such that flow occurs radially from one of the porous walls to the other and across the ion-exchange bed. Example 17 exemplifies one embodiment of such a vessel. In some embodiments, flow occurs into the inner-flow distribution compartment of a plurality of ion-exchange beds, outwards through the inner-porous wall and the ion exchange bed, through the outer porous wall, and the fluid is collected inside a single vessel where it exits the vessel. In some embodiments, flow occurs into the vessel containing the plurality of ion-exchange beds, through the outer porous wall, inwards through the ion exchange bed, through the inner-porous wall, through the plurality of inner-flow distribution compartments, and out of the vessel.

In some embodiments, such a vessel contains more than 2, more than 4, more than 8, more than 16, more than 32, more than 100 individual ion-exchange beds. In some embodiments, such a vessel contains 2, 3, 4, 5, 8, 10, 15, 20, 25, 30, 40, 50, 60, 80, or 100 individual ion-exchange beds.

In some embodiments the inner-flow distribution compartment of one or more of these ion exchange-beds is in fluid communication with one or more inner-flow distribution compartment of another ion-exchange bed contained within the same vessel. In some embodiments the inner-flow distribution compartment of one or more of these ion exchange-beds is in fluid communication with one or more inner-flow distribution compartment of another ion-exchange bed contained within a different vessel.

Embodiments Comprising Vessels for Multiple Beds of Ion Exchange Beads

In some embodiments, the vessel containing ion-exchange beads is comprised of multiple and separate ion-exchange compartments arranged within a single vessel. These embodiments are described in examples 1, 4, 9, 12, and 17, and the associated figures.

In some embodiments, a liquid resource flows into one side of each ion-exchange compartment, and exits on the other side of exchange compartment, having undergone an ion-exchange process. In some embodiments, the vessel is constructed such that a flow distribution network delivers the liquid resource to each one of these ion-exchange compartments independently. In some embodiments, the vessel is constructed such that a flow distribution network recovers the liquid resource that underwent ion-exchange from each one of these ion-exchange compartments independently. In some embodiments, this allows for multiple simultaneous and concurrent ion exchange processes within the same vessel. In some embodiments, the separation of ion-exchange media into several independent ion-exchange compartments results in minimal flow distance through ion exchange beads.

In some embodiments, such a vessel are constructed by using a series of filter banks wherein the filters contain ion exchange beads, as exemplified in examples 1 and 9, and associated figures. In some embodiments, such a vessel are constructed where multiple ion-exchange compartments are arranged vertically or horizontally. In some embodiments, such filter banks are separated to load and unloaded the ion exchange beads. In some embodiments, the ion exchange beads are conveyed into the filter banks as a slurry to load the ion exchange beads into the ion exchange vessel. In some embodiments, loading of the ion exchange beads occurs in the same direction, opposite direction, orthogonal direction, or other direction relative the normal direction of flow during the ion exchange process. In some embodiments, the tension holding the filter bank together is increased, decreased, or maintained during the ion exchange process.

In one embodiment, there is only one ion-exchange compartment in the vessel for packed beds of ion exchange beads with minimal flow distance. In some embodiments, there is more than one ion-exchange compartments in the vessel for packed beds of ion exchange beads with minimal flow distance. In some embodiments, there are less than about two, less than about three, less than about five, less than about ten, less than about twenty, less than about thirty, less than about fifty, less than about one-hundred, more than about two, more than about three, more than about five, more than about ten, more than about twenty, more than about thirty, more than about fifty, more than about one-hundred ion-exchange compartments in the vessel.

In some embodiments, ion-exchange compartments are added or removed from the vessel by mechanical means, such that the number of ion-exchange compartments are adjusted. In some embodiments, ion-exchange compartments and their components are mechanically separated to clean out, replace, and fill in compartments and partitions between compartments.

In some embodiments, the devices, vessels, system, and methods described herein utilize a flow distribution compartment to optimize the flow of various solutions or gases through the devices, vessels, ad systems. In some embodiments, the flow distribution compartment is an inner flow distribution compartment and/or outer flow distribution compartment. In some embodiments, the flow distribution compartment are optionally treated with a lithium containing resource, hydrogen ion-containing acid, water, or other solutions for the purposes of adjusting the concentration, composition, pH, or contaminant level of the fluid flowing through the vessel. This is achieved by means of an optional inlet- and outlet-flows to and from the flow distribution compartment. In some embodiments, the inlet- and outlet flows to and from the flow distribution compartments are located at the top, bottom, or side of said compartments. In some embodiments, the inlet- and outlet flows to and from the flow distribution compartments are injected and remove from the internal space of said compartments by means of piping, tubing, or other internal components that protrude into said compartment.

In some embodiments, the compartment containing the ion-exchange beads are optionally treated with water or other solutions for the purposes of adjusting the concentration, composition, pH, or contaminant level of the fluid flowing through the vessel. This is achieved by means of an optional inlet- and outlet-flows to and from said compartment. In some embodiments, such inlet- and outlet flows are located at the top, bottom, or side of said compartments. In some embodiments, the inlet- and outlet flows to and from said compartment are injected and remove from the internal space of said compartments by means of piping, tubing, or other internal components that protrude into said compartment.

In one embodiment, the ion exchange compartment within each ion-exchange compartment is partially filled with ion exchange beads, such that ion exchange beads freely move within their containing compartment during contacting with fluid. In some embodiments, the ion exchange compartment is filled to its capacity with ion exchange beads, such that ion exchange beads are fixed in place and cannot freely move within the containing compartment during contacting with fluid. In one embodiment, the ion exchange compartment is partially filled, and becomes completely filled by the change in volume of ion exchange beads that occurs when contacting said beads with certain fluids. In some embodiments, the ion exchange compartment is configured such that ion exchange beads may enter and leave the ion-exchange compartment conveyed by the fluid which they are contacting, in the top-down or down-top direction. In one embodiment, the ion exchange beads may be loaded into and unloaded from said compartments through the top or bottom of the compartments, through the sides, or by mechanically separating and opening the ion-exchange compartment to expose the compartment and subsequently filling said compartment with ion-exchange beads.

In some embodiments, the typical length of the vessel containing the ion-exchange compartments is less than about 10 cm, less than about 20 cm, less than about 40 cm, less than about 60 cm, less than about 80 cm, less than about 100 cm, less than about 200 cm, less than about 400 cm, less than about 600 cm, less than about 800 cm, less than about 1 m, less than about 2 m, less than about 4 m, less than about 6 m, less than about 8 m, less than about 10 m, less than about 20 m, less than about 40 m. In some embodiments, the typical length of the said vessel is more than about 10 cm, more than about 20 cm, more than about 40 cm, more than about 60 cm, more than about 80 cm, more than about 100 cm, more than about 200 cm, more than about 400 cm, more than about 600 cm, more than about 800 cm, more than about 1 m, more than about 2 m, more than about 4 m, more than about 6 m, more than about 8 m, more than about 10 m, more than about 20 m, more than about 40 m. In some embodiments, the typical length of said vessel is from about 10 cm to about 20 cm, from about 20 cm to about 40 cm, from about 40 cm to about 80 cm, from about 80 cm to about 2 m from about 1 m to about 4 m, from about 2 m to about 8 m, from about 4 m to about 10 m, from about 6 m to about 20 m, from about 10 m to about 40 m.

In some embodiments, the height and width of the vessel containing the ion-exchange compartments is less than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the height and width of the vessel containing the ion-exchange compartments is more than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the height and width of the vessel containing the ion-exchange compartments is from about 1 cm to about 2 cm, from about 2 cm to about 4 cm, from about 4 cm to about 8 cm, from about 8 cm to about 20 cm, from about 20 cm to about 40 cm, from about 40 cm to about 80 cm, from about 80 cm to about 120 cm, from about 120 cm to about 2 m, from about 2 m to about 4 m, from about 4 m to about 8 m.

In some embodiments, the typical thickness of the distribution compartment within the vessel containing the ion-exchange compartments is less than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical thickness of the distribution compartment within the vessel containing the ion-exchange compartments is more than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical thickness of the distribution compartment within the vessel containing the ion-exchange compartments is from about 1 cm to about 2 cm, from about 2 cm to about 4 cm, from about 4 cm to about 8 cm, from about 8 cm to about 20 cm, from about 20 cm to about 40 cm, from about 40 cm to about 80 cm, from about 80 cm to about 120 cm, from about 120 cm to about 2 m, from about 2 m to about 4 m.

In some embodiments, the typical thickness of the compartment containing ion-exchange beads within the vessel containing the ion-exchange compartments is less than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical thickness of the compartment containing ion-exchange beads within the vessel containing the ion-exchange compartments is more than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical thickness of the compartment containing ion-exchange beads within the vessel containing the ion-exchange compartments is from about 1 cm to about 2 cm, from about 2 cm to about 4 cm, from about 4 cm to about 8 cm, from about 8 cm to about 20 cm, from about 20 cm to about 40 cm, from about 40 cm to about 80 cm, from about 80 cm to about 120 cm, from about 120 cm to about 2 m, from about 2 m to about 4 m.

In some embodiments, the devices, vessels, system, and methods described herein utilize a flow distribution compartment to optimize the flow of various solutions or gases through the devices, vessels, ad systems. In some embodiments, the flow distribution compartment is an inner flow distribution compartment and/or outer flow distribution compartment. In some embodiments, there is a partition between the flow distribution compartment and the compartment containing the ion-exchange beads. In some embodiments, the partition is a permeable partition. In some embodiments, the permeable partition is a slitted partition that provides support for the ion-exchange bead bed, chemical protection, aids filtration, or a combination thereof. In some embodiments, the permeable partition is a porous partition that provides support for the ion-exchange bead bed, chemical protection, aids filtration, or a combination thereof. In some embodiments, the partition between the flow distribution compartment and the compartment containing the ion-exchange beads consists of a porous partition that provides support for the ion-exchange bead bed, chemical protection, aids filtration, or a combination thereof. In some embodiments, the porous partition is a porous polymer partition. In some embodiments, the porous partition is a mesh or polymer membrane. In some embodiments, the porous partition comprises one or more meshes of similar or different composition, of similar or different aperture sizes, of similar or different percent open area. In some embodiments, the porous partition comprises one or more meshes to provide structural support and/or filtration capabilities. In some embodiments, the porous partition comprises a v-wire screen, a sintered metal screen, a sintered polymer screen, a flat screen, a cylindrical screen, a screen comprised of wire with cylindrical cross section, a screen comprised of wire with square cross section, a screen comprised of wire with rectangular cross section, a screen comprised of wire with rhomboidal cross section, a screen comprised of wire with triangular cross section, a screen comprised of wire with irregular cross section, a slotted wire screen, a mesh, or a combination thereof, wherein said porous partition is coarse, fine, or a combination thereof. In some embodiments, the porous partition comprises polyether ether ketone, polypropylene, polyethylene, polysulfone mesh, polyester mesh, polyamide, polytetrafluoroethylene, ethylene tetrafluoroethylene polymer, stainless steel, stainless steel mesh coated in polymer, stainless steel mesh coated in ceramic, titanium, or a combination thereof. In some embodiments, the porous partition comprises ion exchange particles. In some embodiments, the porous partition comprises porous ion exchange particles. In some embodiments, the porous partition comprises a mixture of ion exchange particles with other polymers described above. In some embodiments, the porous partition comprises multiple layers.

In some embodiments, the porous partition consists of openings in that are of a typical characteristic size of less than about 1 µm, less than about 2 µm, less than about 5 µm, less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, the porous partition consists of openings in that are of a typical characteristic size of more than about 1 µm, more than about 2 µm, more than about 5 µm, more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300

µm, more than about 400 µm, more than about 500 µm, more than about 600 µm, more than about 700 µm, more than about 800 µm, more than about 900 µm, more than about 1000 µm, more than about 2000 µm. In some embodiments, the porous partition consists of openings in that are of a typical characteristic size from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm. In some embodiments, the porous partition consists of openings in that are of a typical characteristic size of from about 1 µm to about 2 µm, from about 2 µm to about 4 µm, from about 4 µm to about 10 µm, from about 10 µm to about 20 µm, from about 20 µm to about 40 µm, from about 40 µm to about 100 µm, from about 100 µm to about 200 µm, from about 200 µm to about 400 µm, from about 400 µm to about 1000 µm, from about 1000 µm to about 2000 µm. In some embodiments, the porous partition consists of openings in that are of a typical characteristic size of from about 1 µm to about 10 µm, from about 10 µm to about 100 µm, from about 100 µm to about 1000 µm, from about 1000 µm to about 10000 µm.

In one embodiment, the flow distribution compartment and/or ion-exchange bead compartment is empty, partially filled, or fully filled with fluid, or a combination thereof. In some embodiments, the flow distribution compartment and/or ion-exchange bead compartment are cylindrical, rectangular, irregular, or a combination thereof. In some embodiments, the flow distribution compartment has a constant cross-sectional area or a varying cross-sectional area.

In one embodiment, the flow distribution compartment and/or ion-exchange bead compartment contains internal beams to provide structural support for the vessel. In some embodiments, internal beams are positioned to optimize flow distribution. In one embodiment, the flow distribution compartment and/or ion-exchange bead compartment contain pipes and tubes that direct flow into individual perforations in the inner- and outer-perforated walls. In one embodiment the flow distribution compartment and/or ion-exchange bead compartment contain trays that direct flow.

In some embodiments, the flow distribution compartment and/or ion-exchange bead compartment contain filler material to provide structural support for the vessel, while also providing more optimal flow distribution. In some embodiments, the filler material is comprised of a polymer, ceramic, metal, ion-exchange beads, or a combination thereof. In some embodiments, the filler material contained within the outer-flow distribution and/or the inner-flow distribution compartments have an average particle diameter of less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm; more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm; from about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm.

Embodiments Comprising Vessels Containing Flow Distributors

In some embodiments, the vessel containing ion exchange beads is comprised of a one or more ion-exchange compartments. In some embodiments, flow distributors are located at the top, bottom, and at one or more locations within each of these ion exchange compartments. Embodiments exemplifying such vessels re included in examples 4, 5, 6, 12, 13, 18, and associated figures.

In some embodiments, the number of flow distributors within the vessel is about one, about two, about three, about four, about five, about six, about seven, about eight, about nine, about ten, about fifteen, about twenty, about twenty-five, about thirty, about forty, about fifty. In some embodiments, the arrangement of these flow distributors are uniformly spaced or irregularly spaced.

In some embodiments, the fluid enters said vessel from multiple flow distributors, and exits said vessel from multiple flow distributors. One embodiment of such a vessel is exemplified in example 18 and associated figure. In some embodiments, flow enters the vessel from 1, from 2, from 4, from 8, from 12, from 20, from 1 to 2, from 2 to 4, from 4 to 8, from 8 to 12, from 12 to 20 independent flow distributors. In some embodiments, flow exits the vessel from 1, from 2, from 4, from 8, from 12, from 20, from 1 to 2, from 2 to 4, from 4 to 8, from 8 to 12, from 12 to 20 independent flow distributors.

In some embodiments, the flow distributor comprises perforated tubes or plates that are connected to each other. In some embodiments, these tubes or plates are of circular cross-section, oval cross-section, square cross-section, rectangular cross-section, cross-shaped cross-section, star-shaped cross-section, irregular cross-section, another geometric cross-section, or a combination thereof. In some embodiments, all flow distributors in the vessel are of the same shape and type. In some embodiments, different flow distributors in the vessel vary in their shape and size.

In some embodiments, the openings or perforations in the flow distributor are shaped as circles, ovals, vertical or horizontal slits, squares, crosses, rectangles, triangles, irregular shapes, or a combination thereof. In some embodiments, the openings in the flow distributor have a dimension of less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm, less than about 4000 µm, less than about 8000 µm, or less than about 10000 µm. In some embodiments, the openings in flow distributor are of dimension of more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm, more than about 4000 µm, more than about 8000 µm, or more than about 10000 µm. In some embodiments, the openings in the flow distributor are of dimension of about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm, from about 2000 µm to about 4000 µm, from about 4000 µm to about 8000 µm, from about 6000 µm to about 10000 µm.

In some embodiments, the tubes or plates of the flow distributor are surrounded by a porous partition that provides support for the ion-exchange bead bed, chemical protection, aids filtration, or a combination thereof. In some embodiments, the porous partition is a porous polymer partition. In some embodiments, the porous partition is a mesh or polymer membrane. In some embodiments, the porous partition comprises one or more meshes of similar or different composition, of similar or different aperture sizes, of similar or different percent open area. In some embodiments, the porous partition comprises one or more meshes to provide structural support and/or filtration capabilities. In some embodiments, the porous partition comprises a v-wire screen, a sintered metal screen, a sintered plastic screen, a cylindrical wire screen, a slotted wire screen, a mesh, or a combination thereof, wherein said porous partition is coarse, fine, or a combination thereof. In some embodiments, the porous partition comprises polyether ether ketone, polypropylene, polyethylene, polysulfone mesh, polyester mesh, polyamide, polytetrafluoroethylene, ethylene tetrafluoroethylene polymer, stainless steel, stainless steel mesh coated in polymer, stainless steel mesh coated in ceramic, titanium, or a combination thereof.

In some embodiments, the porous partition consists of openings in that are of a typical characteristic size of less than about 1 µm, less than about 2 µm, less than about 5 µm, less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, the porous partition consists of openings in that are of a typical characteristic size of more than about 1 µm, more than about 2 µm, more than about 5 µm, more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, the porous partition consists of openings in that are of a typical characteristic size from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm. In some embodiments, the porous partition consists of openings in that are of a typical characteristic size of from about 1 µm to about 2 µm, from about 2 µm to about 4 µm, from about 4 µm to about 10 µm, from about 10 µm to about 20 µm, from about 20 µm to about 40 µm, from about 40 µm to about 100 µm, from about 100 µm to about 200 µm, from about 200 µm to about 400 µm, from about 400 µm to about 1000 µm, from about 1000 µm to about 2000 µm. In some embodiments, the porous partition consists of openings in that are of a typical characteristic size of from about 1 µm to about 10 µm, from about 10 µm to about 100 µm, from about 100 µm to about 1000 µm, from about 1000 µm to about 10000 µm.

In some embodiments, one or more flow distributors are used to inject a liquid resource, hydrogen ion containing acid, water, or other process fluid into the ion exchange compartment. In some embodiments, one or more flow distributors are used to retrieve a liquid resource, hydrogen ion containing acid, water, or other process fluid from the ion exchange compartment.

In some embodiments, the vessel contains an additional flow distribution manifold at the top, bottom, or side of the vessel. In some embodiments, said flow distribution compartment contains pipes, tubing, or internal partition to direct flow into and from the inner-flow distribution compartment, and into and from the outer-flow distribution compartment. In some embodiments, the flow distribution manifold has inlets and outlets at the top, bottom, or side of said manifold.

In some embodiments, the flow distributors described above comprise candles, wherein each comprises two concentric structures that are permeable to flow. One embodiment exemplifying such a vessel is described in example 6 and associated figure. In some embodiments, one or more candles are contained within each vessel. In some embodiments, said candles are act as flow distributors. In some embodiments, said candles are filled with ion exchange material. In some embodiments candles are shaped as cylinders, spheres, squares, rectangles, are scalloped, or a combination thereof. In some embodiments, said candles are oriented horizontally, vertically, at an angle with respect to the length of the vessel, or a combination thereof. In some embodiments said candles comprise a porous pipe, a polymer mesh, a filter bag, a screen, or a combination thereof. In some embodiments, said candles number more than two. In some embodiments, for a device described herein, said candles number more than four. In some embodiments, for a device described herein, said candles number more than eight. In some embodiments, for a device described herein, said candles number more than 20. In some embodiments, for a device described herein, said candles number more than 50. In some embodiments, for a device described herein, said candles number more than 100.

Embodiments Comprising Vessels Partially Filled with Ion Exchange Beads and Fluid In some embodiments, the vessel containing ion exchange beads is comprised of a tank partially filled with ion exchange beads. Embodiments of such a vessel are described in examples 2, 7, 8, 10 and associated figures.

In some embodiments, said tank contains a fluid which are a lithium containing resource, hydrogen ion-containing acid, water, or other solutions for the purposes of adjusting the concentration, composition, pH, or contaminant level of the fluid flowing through the vessel. In some embodiments, the fluid level is carefully controlled to maintain a fluid level that is higher than the level of ion-exchange beads in the tank.

In some embodiments, the level of fluid is monitored by visual inspection of the tank. In some embodiments, the level of fluid is monitored by measuring of a tank level based on a float sensor, capacitance sensor, infrared sensor, ultrasonic sensor, pressure sensor, radar sensor, any other fluid sensor or a combination thereof. In some embodiments, level control is achieved by careful control of fluid flow into the tank and out of the tank, by means of mechanical adjustment of valves, pumps, pressures, and any other parameters that affect fluid flow into and out of the vessel. In some embodiments, the pressure of gas inside of the tank is used to control the rate of discharge from the tank and therefore the fluid level in the tank.

In one embodiment, the ion exchange beads are agitated and can freely move within their containing compartment during contacting with fluid. In some embodiments, the agitation causes the ion exchange beads to be fluidized in the liquid in contact with said ion exchange beads. In some embodiments, agitation occurs with a mechanical agitator, an eductor, fluid recirculation, baffles, shaking, or a combination thereof. In some embodiments, the vessel contains one or more baffles arranged in parallel to the shaft of the mechanical agitator, to improve mixing. In some embodiments, the vessel is agitated with a mechanical agitator comprising a motor, a shaft, and one or more impellers mounted on said shaft. In some embodiments, said one or more impellers comprise propellers, anchor impellers, hydrofoils, pitched blade turbines, curved blade turbines, spiral turbine, flat blade turbines, radial blades, or a combination thereof. In some embodiments, said impellers contain one or more blades. In some embodiments, the shaft and impellers are comprised of carbon steel, stainless steel, titanium, Hastelloy, or a combination thereof. In some embodiments, the shaft and impellers are coated with glass, epoxy, rubber, a polymer coating, or combinations thereof.

In some embodiments, the ion exchange beads are not agitated, such that they remain fixed in place during contacting with fluid. In some embodiments, a screen, mesh or other partition is optionally included within the tank in order to control the location and restrict the movement of ion exchange beads during the contact with fluid. In some embodiments, the tank is configured such that ion exchange beads may enter and leave the ion-exchange compartment conveyed by the fluid which they are contacting, in the top-down or down-top direction. In one embodiment, the ion exchange beads may be loaded into and unloaded from said tank through the top or bottom of the tank or through its sides.

In some embodiments, the tank containing ion-exchange beads are optionally treated with a lithium containing resource, hydrogen ion-containing acid, alkali, water, or other solutions for the purposes of adjusting the concentration, composition, pH, or contaminant level of the fluid flowing through the vessel. This is achieved by means of an optional inlet- and outlet-flows to and from the tank. In some embodiments, the inlet- and outlet flows to and from the tank are located at the top, bottom, or side of said tank. In some embodiments, the inlet- and outlet flows to and from the tank are injected and removed from the internal space of said tank by means of piping, tubing, or other internal components that protrude into said compartment.

In some embodiments, the typical length of the tank containing the ion-exchange beads is less than about 10 cm, less than about 20 cm, less than about 40 cm, less than about 60 cm, less than about 80 cm, less than about 100 cm, less than about 200 cm, less than about 400 cm, less than about 600 cm, less than about 800 cm, less than about 1 m, less than about 2 m, less than about 4 m, less than about 6 m, less than about 8 m, less than about 10 m, less than about 20 m, less than about 40 m. In some embodiments, the typical length of the tank containing the ion-exchange beads is less than about 10 cm, more than about 20 cm, more than about 40 cm, more than about 60 cm, more than about 80 cm, more than about 100 cm, more than about 200 cm, more than about 400 cm, more than about 600 cm, more than about 800 cm, more than about 1 m, more than about 2 m, more than about 4 m, more than about 6 m, more than about 8 m, more than about 10 m, more than about 20 m, more than about 40 m. In some embodiments, the typical length of the tank containing the ion-exchange beads is less than about 10 cm to about 20 cm, from about 20 cm to about 40 cm, from about 40 cm to about 80 cm, from about 80 cm to about 2 m from about 1 m to about 4 m, from about 2 m to about 8 m, from about 4 m to about 10 m, from about 6 m to about 20 m, from about 10 m to about 40 m.

In some embodiments, the typical radius or width of the tank containing the ion-exchange beads is less than about 10 cm, less than about 20 cm, less than about 40 cm, less than about 60 cm, less than about 80 cm, less than about 100 cm, less than about 200 cm, less than about 400 cm, less than about 600 cm, less than about 800 cm, less than about 1 m, less than about 2 m, less than about 4 m, less than about 6 m, less than about 8 m, less than about 10 m. In some embodiments, the typical radius or width of the tank containing the ion-exchange beads is less than about 10 cm, more than about 20 cm, more than about 40 cm, more than about 60 cm, more than about 80 cm, more than about 100 cm, more than about 200 cm, more than about 400 cm, more than about 600 cm, more than about 800 cm, more than about 1 m, more than about 2 m, more than about 4 m, more than about 6 m, more than about 8 m, more than about 10 m. In some embodiments, the typical radius or width of the tank containing the ion-exchange beads is less than about 10 cm to about 20 cm, from about 20 cm to about 40 cm, from about 40 cm to about 80 cm, from about 80 cm to about 2 m from about 1 m to about 4 m, from about 2 m to about 8 m, from about 4 m to about 10 m.

In some embodiments, the vessel containing ion exchange beads is comprised of a one or more ion-exchange compartments. In some embodiments, the vessel containing ion exchange beads is comprised of a one or more flow distribution compartments. In some embodiments, any of the compartments within the vessel are cylindrical, rectangular, spherical, cross-shaped, scalloped, concave, convex, torus-shaped, any another shape, or a combinations thereof. In some embodiments, the compartments can occupy the partial length of the vessel or only a sub-part.

In some embodiments, the number of compartments within the vessel is about one, about two, about three, about four, about five, about six, about seven, about eight, about nine, about ten, about fifteen, about twenty, about twenty-five, about thirty, about forty, about fifty. In some embodiments, the arrangement of compartments are uniformly spaced or irregularly spaced. In some embodiments, one or more flow distribution compartments are located within one or more of the ion-exchange compartments. In some embodiments, one or more flow ion-exchange compartments are located within one or more of the flow-distribution compartments.

In some embodiments, a screen, mesh or other partition is optionally included within the tank in order to control the location and restrict the movement of ion exchange beads during the contact with fluid. In some embodiments, said partition separates the ion-exchange compartments from the flow-distribution compartments. In some embodiments, said partition separates the flow-distribution compartments from the ion-exchange compartments. In some embodiments, this porous partition optionally provides support for the ion-exchange bead bed, chemical protection, aids filtration, or a combination thereof. In some embodiments, the porous partition is a porous polymer partition. In some embodiments, the porous partition is a mesh or polymer membrane. In some embodiments, the porous partition comprises one or more meshes of similar or different composition, of similar or different aperture sizes, of similar or different percent open area. In some embodiments, the porous partition comprises one or more meshes to provide structural support and/or filtration capabilities. In some embodiments, the porous partition comprises polyether ether ketone, polypropylene, polyethylene, polysulfone, polyester, polyamide, polytetrafluoroethylene, ethylene tetrafluoroethylene polymer, stainless-steel, stainless steel coated in polymer, stainless steel mesh coated in ceramic, coated steel, titanium, Hastelloy C276 mesh or a combination thereof, wherein the opening in the partition are coarse, fine, or a combination thereof. In one embodiment, the porous partition comprises a Hastelloy C276 screen. In one embodiment, the porous partition comprises a titanium screen. In one embodiment, the porous partition comprises a 316 stainless steel screen.

In some embodiments, said porous partition is fixed into the vessel-compartment walls. In some embodiments, the porous partition is flexibly and not physically bonded to the vessel-compartment walls. In some embodiments, the porous partition is free to move, shake, wave, rotate, expand, or contract within one or more of the compartments within the vessel. In some embodiments, the porous partition expands throughout operation. In some embodiments, the porous partition contracts throughout operation.

In some embodiments, the porous partition has a thickness of less than about 1 µm, less than about 2 µm, less than about 5 µm, less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, the porous partition has a thickness of more than about 1 µm, more than about 2 µm, more than about 5 µm, more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, the porous partition consists of openings in that are of a typical characteristic size from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm. In some embodiments, the porous partition has a thickness of from about 1 µm to about 2 µm, from about 2 µm to about 4 µm, from about 4 µm to about 10 µm, from about 10 µm to about 20 µm, from about 20 µm to about 40 µm, from about 40 µm to about 100 µm, from about 100 µm to about 200 µm, from about 200 µm to about 400 µm, from about 400 µm to about 1000 µm, from about 1000 µm to about 2000 µm. In some embodiments, the porous partition consists of openings in that are of a typical characteristic size of from about 1 µm to about 10 µm, from about 10 µm to about 100 µm, from about 100 µm to about 1000 µm, from about 1000 µm to about 10000 µm.

In some embodiments, the porous partition consists of openings in that are of a typical characteristic size of less than about 1 µm, less than about 2 µm, less than about 5 µm, less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, the porous partition consists of openings in that are of a typical characteristic size of more than about 1 µm, more than about 2 µm, more than about 5 µm, more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, the porous partition consists of openings in that are of a typical characteristic size from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm. In some embodiments, the porous partition consists of openings in that are of a typical characteristic size of from about 1 µm to about 2 µm, from about 2 µm to about 4 µm, from about 4 µm to about 10 µm, from about 10 µm to about 20 µm, from about 20 µm to about 40 µm, from about 40 µm to about 100 µm, from about 100 µm to about 200 µm, from about 200 µm to about 400 µm, from about 400 µm to about 1000 µm, from about 1000 µm to about 2000 µm. In some embodiments, the porous partition consists of openings in that are of a typical characteristic size of from about 1 µm to about 10 µm, from about 10 µm to about 100 µm, from about 100 µm to about 1000 µm, from about 1000 µm to about 10000 µm.

In some embodiments, the tank containing the ion-exchange beads contains internal beams to provide structural support for the vessel, while also providing more optimal flow distribution. In one embodiment, the flow distribution compartment and/or ion-exchange bead compartment contain pipes and tubes that direct flow into individual perforations in the inner- and outer-perforated walls. In one embodiment the flow distribution compartment and/or ion-exchange bead compartment contain trays that direct flow.

In some embodiments, tank containing the ion-exchange beads contains filler material to provide structural support for the vessel, while also providing more optimal flow distribution. Embodiments exemplifying the use of such filler material are included in examples 7 and 8 and associated figures. In some embodiments, the filler material is comprised of a polymer, ceramic, metal, ion-exchange beads, or a combination thereof. In some embodiments, the filler material contained within the outer-flow distribution and/or the inner-flow distribution compartments have an average particle diameter of less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm; more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm; from about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm.

In some embodiments, the vessel contains an additional flow distribution manifold at the top, bottom, or side of the tank. In some embodiments, said flow distribution compartment contains pipes, tubing, or internal partition to direct flow into and from the inner-flow distribution compartment, and into and from the outer-flow distribution compartment. In some embodiments, the flow distribution manifold has inlets and outlets at the top, bottom, or side of said manifold.

In embodiments, the vessel is designed to evenly distribute flow throughout the ion exchange beads. In some embodiments, the vessel has flow distributors in the form of a hub and lateral distributor, header and lateral distributors, filter plates, spray nozzle, distributor trays, concentric perforated pipes, or a combination of thereof. In one embodiment the lateral distributors are outfitted with resin retaining mesh, membrane, screen, or filter nozzle. In one embodiment, the mesh is supported with a secondary support layer for strength. In one embodiment the porous mesh is wrapped around a cylindrical support at the center of the vessel. In one embodiment, the mesh is made out of a polymer, ceramic, or metal. In one embodiment, the flow distributor is located at the top, bottom, middle, at any other location within the vessel, or a combination of thereof. In one embodiment the vessel has a plate with nozzles attached to it.

In some embodiments, flow distribution within the ion-exchange vessel occurs via one or more of a pipe, tubing, channels, slits, beams, baffles, baskets, scallops, nozzles, or a mesh. In some embodiments, the components that direct flow within the vessel are perforated. In some embodiments, the openings or perforations in the components that distribute flow are shaped as circles, ovals, vertical or horizontal slits, squares, crosses, rectangles, triangles, irregular shapes, or a combination thereof.

In one embodiment, the vessel has an internal nozzle designed to distribute flow evenly. In one embodiment, the vessel has nozzles placed equidistant with each other on a support plate. In one embodiment the nozzles are spaced out so that each nozzle covers the same area. In one embodiment the nozzles have slits or holes of width of less than 0.1 µm, less than 1 µm, less than 10 µm, less than 100 µm, or less than 1 mm. In one embodiment, the vessel has mesh with holes less than 0.1 µm, less than 1 µm, less than 10 µm, less than 100 µm, or less than 1000 µm.

Other Embodiments Comprising Vessels with Optimal Flow Distribution

In some embodiments, vessels have flow distributors to direct flow to and from compartments within the vessel which contain ion exchange materials. In some embodiments, flow distribution occurs via flow distribution elements that have a characteristic opening through which fluid flows. In some embodiments, said flow distribution elements comprise one or more of a pipes, tubing, channels, slits, beams, baffles, baskets, scallops, nozzles, or a mesh. In some embodiments, the one or more of pipes, tubing, channels, slits, beams, baffles, baskets, scallops, nozzles, or a mesh comprise an opening or perforation. In some embodiments, the characteristic opening or perforation of said flow distribution elements have a dimension of less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm, less than about 4000 µm, less than about 8000 µm, or less than about 10000 µm. In some embodiments, the openings or perforation in one or more for the flow distribution components have a dimension of less than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm, more than about 4000 µm, more than about 8000 µm, or more than about 10000 µm. In some embodiments, the openings or perforation in one or more for the flow distribution components have a dimension of less than about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm, from about 2000 µm to about 4000 µm, from about 4000 µm to about 8000 µm, from about 6000 µm to about 10000 µm.

In some embodiments, efficient flow distribution within the ion-exchange vessel occurs via one or more shaped objects or particle that are packed within one or more of the compartments that comprise the ion-exchange vessel. In some embodiments, such shaped objects or particles are termed "filler material", "inert material", "packing material", or "packing"; these terms are used interchangeably. In some embodiments, the vessel is filled with filler material for bed support or flow distribution. In one embodiment, the filler material is made from glass, silica, gravel, activated carbon, ceramic, alumina, zeolite, calcite, polymers, copolymers, a mixture thereof or a combination of thereof. In some embodiments, the filler material could be made from polyvinyl chloride, high density polyethylene, low density polyethylene, polypropylene, polyvinylidene difluoride, polytetrafluoroethylene, polystyrene, Acrylonitrile butadiene styrene, Polyether ether ketone, copolymers thereof, mixture thereof, or combinations In one embodiment the filler material is placed on top of the vessel, on the bottom of the vessel, or both. In one embodiment the filler material is mixed with the ion-exchange resin. Another aspect described herein is a device for lithium extraction from a liquid resource, comprising a vessel loaded with one or more beds of ion exchange material and a filler material, wherein the filler material is mixed with the one or more beds of ion exchange material, thereby providing support for the one or more beds and/or enabling for better flow distribution for said liquid resource or another fluid entering the vessel. Said better flow distribution ensures that all of the ion exchange material within the ion exchange bed contacts the same amount of liquid across all of the ion exchange bead, and that the hydrostatic pressure required to drive fluid flow across the bed is uniform across the cross section of the ion exchange bed.

In some embodiments, efficient flow distribution within the ion-exchange vessel occurs via one or more shaped objects or particle that are packed within one or more of the compartments that comprise the ion-exchange vessel. In some embodiments, the filler material is shaped as a sphere, spheroid, ovaloid, cross, tube, torus, ring, saddle ring, tubes, triangles, other complex geometric shape, or a combination thereof. In some embodiments, the packing is distributed with a random particle density. In some embodiments, the filler material is distributed with uniform particle density. In some embodiments, the filler material consists of one of more types of filler material, randomly added and distributed within the distribution chamber. In some embodiments, the filler material consists of one of more types of filler material, added and distributed within the fluid distribution chamber within well-defined regions. In some embodiments, parts of the of fluid distribution chamber are empty, and parts of the same chamber contain filler material. In some embodiments, the filler material have an average particle diameter of less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm; more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm; from about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm.

In some embodiments, the ion exchange beads are loaded into the ion-exchange vessel as a slurry. In some embodiments, the liquid component of such slurry is water, acid, base, or a solvent. In some embodiments, the percentage of liquid in the slurry is less than about 1%, less than about, 2%, less than about 5%, less than about 10%, less than about 20%, less than about 50%, less than about 75%, less than about 90%, more than about 1%, more than about, 2%, more than about 5%, more than about 10%, more than about 20%, more than about 50%, more than about 75%, more than about 90%, between about 0% and 5%, between about 5% and 10%, between about 10% and 20%, between about 20% and 50%, between about 50% and 75%, between about 75% and 90%, between about 90% and 100%. In some embodiments, the ion exchange beads are loaded into the ion-exchange vessel as a dry powder.

In some embodiments, one or more of the vessels containing ion-exchange beads described above are arranged such that the outlet stream of one vessel is directed into the inlet of another vessel. In some embodiments, such streams are treated between ion exchange vessels. In some embodiments, the treatment occurs with a lithium containing resource, hydrogen ion-containing acid, water, or other solutions for the purposes of adjusting the concentration, composition, pH, or contaminant level of the fluid in the stream.

Embodiments Comprising Wound Ion Exchange Elements

In some embodiments, the vessel containing ion exchange beads is comprised of a wound ion exchange element. One embodiment of such an ion exchange element is described in example 15 and associated figure. In some embodiments, said element is constructed by stacking (a) a non-porous membrane, (b) optionally a first flow distribution scaffold, a (c) optionally a first porous membrane, (d) a bed of ion exchange material, (e) optionally a second porous membrane, (f) optionally a second flow distribution scaffold. This stack is wound into a spiral to form an ion exchange element. In some embodiments, fluid flows through a first flow distribution scaffold, through the first porous membrane and into the ion exchange bed, and out of the second porous membrane, where it is collected and exits the vessel through the second flow distribution scaffold. In some embodiments, by containing the ion exchange membrane between two porous membranes, flow are distributed over a large surface area and flown through an ion exchange bed with minimal flow distance, resulting in minimum driving force for fluid flow. In some embodiments, by winding the stack into a spiral, the physical footprint of the ion exchange element is minimized. In some embodiments, one or more of the elements (a)-(f) are not present.

In some embodiments, the vessel containing ion exchange beads is comprised of an ion exchange element. In some embodiments, said ion exchange element is a wound ion exchange element. In some embodiments, said ion exchange element comprises membranes. In some embodiments, said ion exchange element comprises one or more porous membranes. In some embodiments, said ion exchange element comprises one or more non-porous membranes. In some embodiments, said ion exchange element comprises a stack of membranes. In some embodiments, said ion exchange element comprises a stack of membranes and ion-exchange material. In some embodiments, said element is constructed by stacking (a) a non-porous membrane, (b) optionally a first flow distribution scaffold, a (c) optionally a first porous membrane, (d) a bed of ion exchange material, (e) optionally a second porous membrane, (f) optionally a second flow distribution scaffold, in the stated order or in a different order of the components (a)-(f). In some embodiments, one or more components are wound into a spiral to form an ion exchange element. In some embodiments, fluid flows through a one or more flow distribution scaffolds. In some embodiments, fluid flows through one or more porous membranes. In some embodiments, fluid flows through the ion exchange bed. In some embodiments, flow is distributed over a large surface area using the flow distribution scaffold, resulting in minimal flow distance. In some embodiments, the element is wound into a spiral to minimize the physical footprint of the ion exchange element. In some embodiments, the element is a flat ion exchange element.

In some embodiments, the vessel containing ion exchange beads is comprised of a wound ion exchange element. In some embodiments, said element is constructed by stacking (a) a non-porous polymer membrane, (b) a first flow distribution scaffold comprising a large-opening polymer mesh, a (c) a first porous polymer membrane, (d) a thin bed of ion exchange material, (e) a second porous polymer membrane, (f) and a second flow distribution scaffold. This stack is then wound around a perforated tube with holes whose internal diameter is the same as the thickness of the ion exchange bed. This wound stack is the ion exchange element. In some embodiments, fluid flows through a first flow distribution scaffold, through the first porous membrane and into the ion exchange bed, and out of the second porous membrane, where it is collected and exits the vessel through the second flow distribution scaffold. By containing the ion exchange membrane between two porous membranes, flow is distributed over a large surface area and flown through an ion exchange bed with minimal flow distance, resulting in minimum driving force for fluid flow. By winding the stack into a spiral, the physical footprint of the ion exchange element are minimized.

In some embodiments, the vessel containing ion exchange beads is comprised of a rightly wound ion exchange element. In some embodiments, said element is constructed by stacking (a) a non-porous polymer membrane, (b) a flow distribution scaffold comprising a polymer mesh with openings of about 1 to about 5 mm, a (c) a first porous polymer membrane with pore sizes smaller than about 5 microns, (d) a bed of ion exchange material about 5 mm long, (e) a second porous polymer membrane with a pore size of about 5 microns, (f) and a second flow distribution scaffold with mesh openings of about 4 mm. The elements of the stack are glued together using a polyurethane adhesive. The second flow distribution scaffold (f) is glued to a perforated pipe with 3 mm round holes. The stack is then spun around this center pipe, such that the second flow distribution scaffold (f) completely encircles the perforated pipe and then contacts one of the sides of the non-porous membrane (a). This wound stack is the ion exchange element. In some embodiments, fluid flows through a first flow distribution scaffold, through the first porous membrane and into the ion exchange bed, and out of the second porous membrane, where it is collected and exits the vessel through the second flow distribution scaffold. By containing the ion exchange membrane between two porous membranes, flow is distributed over a large surface area and flown through an ion exchange bed with minimal flow distance, resulting in minimum driving force for fluid flow. By winding the stack into a spiral, the physical footprint of the ion exchange element are minimized.

In some embodiments, the vessel containing ion exchange beads is comprised of a tightly wound ion exchange element. In some embodiments, said element is constructed by stacking (a) a non-porous polymer membrane, (b) a flow distribution scaffold comprising a polymer mesh with openings of about 1 to about 5 mm, a (c) a first porous polymer membrane with pore sizes smaller than about 5 microns, (d) a bed of ion exchange material about 5 mm long, (e) a second porous polymer membrane with a pore size of about 5 microns, (f) and a second flow distribution scaffold with mesh openings of about 4 mm. Some elements of the stack are glued together using a polyurethane adhesive. The second flow distribution scaffold (f) is glued to a perforated pipe with 3 mm round holes. The stack is then spun around this center pipe, such that the second flow distribution scaffold (f) completely encircles the perforated pipe and then contacts one of the sides of the non-porous membrane (a). This wound stack is the ion exchange element. In some embodiments, fluid flows through a first flow distribution scaffold, through the first porous membrane and into the ion exchange bed, and out of the second porous membrane, where it is collected and exits the vessel through the second flow distribution scaffold. By containing the ion exchange membrane between two porous membranes, flow is distributed over a large surface area and flown through an ion exchange bed with minimal flow distance, resulting in minimum driving force for fluid flow. By winding the stack into a spiral, the physical footprint of the ion exchange element is minimized.

In some embodiments, the vessel containing ion exchange beads is comprised of a tightly wound ion exchange element. In some embodiments, said element is constructed by stacking several thin elements that are 84, by 12". First, (a) a non-porous polymer membrane is laid flat, (b) then a flow distribution mesh comprising polypropylene with openings of about 5 mm is laid on top of this, then a (c) a porous polymer microfiltration polyvinyl difluoride membrane with pore sizes smaller than about 5 microns is laid on top of this, then (d) a bed of ion exchange material about 5 mm thick is laid on top of this, then (e) a porous polymer microfiltration polyvinyl difluoride membrane with pore sizes smaller than about 1 microns is laid on top of this, finally (f) a second polypropylene flow distribution scaffold with mesh openings of about 2 mm is laid on top of this. Elements (c)-(e) are glued together and sealed around all using a polyurethane adhesive. The short side of the second flow distribution scaffold (f) is glued to a perforated pipe with 3 mm round holes, which is 12" long and ½" in diameter. The stack is then spun around this center pipe around ~30 times, such that the second flow distribution scaffold (f) completely encircles the perforated pipe and then contacts one of the sides of the non-porous membrane (a) many times. This wound stack is the ion exchange element. This element is placed in a vessel that is 14" long and 6" in diameter. In some embodiments, fluid flows through into to top of the vessel in the axial direction of the cylindrical wound element, and enters in a direction axial to the cylinder through the (b) flow distribution mesh; this fluid flows through the first porous membrane and into the ion exchange bed, and out of the second porous membrane, where it is collected through the second flow distribution scaffold; because the second flow distribution scaffold is connected to the perforated tube, the perforated tube collects all effluent and removes it through the vessel through a pipe. By containing the ion exchange membrane between two porous membranes, flow is distributed over a large surface area and flown through an ion exchange bed with minimal flow distance, resulting in minimum driving force for fluid flow during the ion exchange process. By winding the stack into a spiral, the physical footprint of the ion exchange element is minimized.

In some embodiments, the length of the ion exchange element is less than 5 cm, less than 10 cm, less than 20 cm, less than 50 cm, less than 100 cm, less than 200 cm, less than 500 cm. In some embodiments, the length of the ion exchange element is more than 5 cm, more than 10 cm, more than 20 cm, more than 50 cm, more than 100 cm, more than 200 cm, more than 500 cm. In some embodiments, the length of the ion exchange element is between about 5 cm and about 10 cm, between about 10 cm and about 20 cm, between about 20 cm and about 50 cm, between about 50 cm and about 100 cm, between about 100 cm and about 200 cm, between about 200 cm and about 500 cm.

In some embodiments, the diameter of the ion exchange element is less than 1 cm, less than 2 cm, less than 4 cm, less than 6 cm, less than 10 cm, less than 20 cm, less than 50 cm, less than 100 cm. In some embodiments, the diameter of the ion exchange element is more than 1 cm, more than 2 cm, more than 4 cm, more than 6 cm, more than 10 cm, more than 20 cm, more than 50 cm, more than 100 cm. In some embodiments, the diameter of the ion exchange element is between about 1 cm and about 2 cm, between about 2 cm and about 4 cm, between about 4 cm and about 6 cm, between about 6 cm and about 10 cm, between about 10 cm and about 20 cm, between about 20 cm and about 50 cm, between about 50 cm and about 100 cm.

In some embodiments, the stacked components of the ion exchange element, before they are wound, have a width that is less than 10 cm, less than 20 cm, less than 40 cm, less than 60 cm, less than 100 cm, less than 200 cm, less than 500 cm, less than 1000 cm. In some embodiments, the width of the membrane stack before it is wound is more than 10 cm, more than 20 cm, more than 40 cm, more than 60 cm, more than 100 cm, more than 200 cm, more than 500 cm, more than 1000 cm. In some embodiments, the width of the membrane stack before it is wound is between about 10 cm and about 20 cm, between about 20 cm and about 40 cm, between about 40 cm and about 60 cm, between about 60 cm and about 100 cm, between about 100 cm and about 200 cm, between about 200 cm and about 500 cm, between about 500 cm and about 1000 cm.

In some embodiments, the number of number of windings in the element is more than about 1, more than about 2, more than about 4, more than about 10, more than about 50, more than about 100. In some embodiments, the number of number of windings in the element is less than about 1, less than about 2, less than about 4, less than about 10, less than about 50, less than about 100. In some embodiments, the number of number of windings in the element is from about 1 to about 2, from about 2 to about 4, from about 4 to about 6, from about 10 to about 50, from about 50 to about 100.

In some embodiments, the non-porous membrane is comprised of low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly(chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluoro-3,6-dioxa-4-methyl-7-octene-sulfonic acid (NAFION® (copolymer of perfluoro-3,6-dioxa-4-methyl-7-octene-sulfonic acid and tetrafluoroethylene)), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof.

In some embodiments, the porous membranes are comprised of low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly(chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluoro-3,6-dioxa-4-methyl-7-octene-sulfonic acid (NAFION® (copolymer of perfluoro-3,6-dioxa-4-methyl-7-octene-sulfonic acid and tetrafluoroethylene)), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof.

In some embodiments, the porous membranes have openings. In some embodiments, the porous membranes have openings that are circular, tubular, square, rectangular, rhomboidal, star-shaped, slit-shaped, irregularly shaped, or a combination thereof. In some embodiments, the porous membranes have openings of less than about 0.02 µm, less than about 0.1 µm, less than about 0.2 µm, less than about 1 µm, less than about 2 µm, less than about 5 µm, less than about 10 µm, less than about 25 µm, less than about 100 µm, less than about 1000 µm. In some embodiments, the porous membranes have openings of more than about 0.02 µm, more than about 0.1 µm, more than about 0.2 µm, more than about 1 µm, more than about 2 µm, more than about 5 µm, more than about 10 µm, more than about 25 µm, more than about 100 µm. In some embodiments, the porous membranes have openings of about 0.02 µm to about 0.1 µm, from about 0.1 µm to about 0.2 µm, from about 0.2 µm to about 0.5 µm, from about 0.5 µm to about 1 µm, from about 1 µm to about 5 µm, from about 5 µm to about 10 µm, from about 10 µm to about 25 µm, from about 25 µm to about 100 µm In some embodiments, the flow distribution scaffolds are comprised of low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly(chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluoro-3,6-dioxa-4-methyl-7-octene-sulfonic acid (NAFION® (copolymer of perfluoro-3,6-dioxa-4-methyl-7-octene-sulfonic acid and tetrafluoroethylene)), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof.

In some embodiments, flow distribution scaffolds are open so as to allow flow. In some embodiments, the flow distribution scaffolds have openings that are circular, tubular, square, rectangular, rhomboidal, star-shaped, slit-shaped, irregularly shaped, or a combination thereof. In some embodiments, the flow distribution scaffolds have openings of less than about 2 µm, less than about 10 µm, less than about 100 µm, less than about 1 mm, less than about 1 cm, less than about 5 cm, less than about 10 cm. In some embodiments, the flow distribution scaffolds have openings of more than about 2 µm, more than about 10 µm, more than about 100 µm, more than about 1 mm, more than about 1 cm, more than about 5 cm, more than about 10 cm. In some embodiments, the flow distribution scaffolds have openings of between about 2 µm and about 10 µm, between about 10 µm and about 100 µm, between about 100 µm and about 1 mm, between about 1 cm and about 5 cm, between about 5 cm about 10 cm.

In some embodiments, the ion-exchange elements is placed in an ion-exchange vessel. In some embodiments, two or more ion-exchange elements are placed in an ion-exchange vessel. In some embodiments, two or more ion-exchange elements are connected in series. In some embodiments, two or more ion-exchange elements are connected in parallel. In some embodiments, two or more ion-exchange vessels containing one or more ion-exchange elements are connected in series. In some embodiments, two or more ion-exchange vessels containing one or more ion-exchange elements are connected in parallel.

In some embodiments, the ion-exchange vessel contains flow diversion devices to distribute flow into the ion-exchange element. In some embodiments, said flow diversion devices are comprised of polytetrafluoroethylene (PTFE), polychloroprene (neoprene), ethylene propylene dine monomer (EPDM), Viton, nitrile rubber (Buna-N), silicone, fluoropolymer, polyurethane, flouorosilicone, or a combination thereof.

In some embodiments, the ion-exchange vessel contains a flow distributor tube to collect the effluent from the ion-exchange element. In some embodiments, said flow distributor tube is porous. In some embodiments, the porous flow distributor tube is comprised of a polymer, metal, or ceramic. In some embodiments, the porous partition comprises polyether ether ketone, polypropylene, polyethylene, polysulfone, polyester, polyamide, polytetrafluoroethylene, ethylene tetrafluoroethylene polymer, stainless steel, stainless steel coated in polymer, stainless steel coated in ceramic, titanium, Hastelloy, zirconium, tantalum, a composite thereof, a copolymer thereof, or a combination thereof. In some embodiments, the flow distributor tube consists of openings in that are of a typical characteristic size of less than about 1 µm, less than about 2 µm, less than about 5 µm, less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, the flow distributor tube consists of openings in that are of a typical characteristic size of more than about 1 µm, more than about 2 µm, more than about 5 µm, more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, the flow distributor tube consists of openings in that are of a typical characteristic size from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm.

In some embodiments, fluid such as a liquid lithium resource, wash solution, or acid flows through the wound ion-exchange element. In some embodiments, the fluid that has passed through the wound ion-exchange element is discarded. In some embodiments, the fluid that has passed through the wound ion-exchange element is recirculated to the inlet of the ion-exchange element. In some embodiments, flow is reversed such that the outlet of the ion-exchange element becomes the inlet, and the inlet becomes the outlet.

In some embodiments, the pressure at the inlet of the wound ion-exchange element is less than about 1 psi, less than about 2 psi, less than about 5 psi, less than about 10 psi, less than about 50 psi, less than about 100 psi, less than about 500 psi, less than about 1000 psi, less than about 5000 psi. In some embodiments, the pressure at the inlet of the wound ion-exchange element is more than about 1 psi, more than about 2 psi, more than about 5 psi, more than about 10 psi, more than about 50 psi, more than about 100 psi, more than about 500 psi, more than about 1000 psi, more than about 5000 psi. In some embodiments, the pressure at the inlet of the wound ion-exchange element is from about 1 psi to about 2 psi, from about 2 psi to about 5 psi, from about 5 psi to about 10 psi, from about 10 psi to about 50 psi, from about 50 psi to about 100 psi, from about 100 psi to about 500 psi, from about 500 psi to about 1000 psi, from about 1000 psi to about 5000 psi.

In some embodiments, the pressure at the outlet of the wound ion-exchange element is less than about 1 psi, less than about 2 psi, less than about 5 psi, less than about 10 psi, less than about 50 psi, less than about 100 psi, less than about 500 psi, less than about 1000 psi, less than about 5000 psi. In some embodiments, the pressure at the outlet of the wound ion-exchange element is more than about 1 psi, more than about 2 psi, more than about 5 psi, more than about 10 psi, more than about 50 psi, more than about 100 psi, more than about 500 psi, more than about 1000 psi, more than about 5000 psi. In some embodiments, the pressure at the outlet of the wound ion-exchange element is from about 1 psi to about 2 psi, from about 2 psi to about 5 psi, from about 5 psi to about 10 psi, from about 10 psi to about 50 psi, from about 50 psi to about 100 psi, from about 100 psi to about 500 psi, from about 500 psi to about 1000 psi, from about 1000 psi to about 5000 psi.

System for Loading Vessels with Ion Exchange Beads

It is desirable to achieve uniform flow distribution throughout the ion exchange bed to ensure optimal performance of ion exchange beads. In some embodiments, uniform flow distribution implies the same hydrostatic pressure drop for fluid flow across the entire cross-sectional area of the bed. In some embodiments, uniform flow distribution implies the same hydrostatic pressure drop for fluid flow across the entire cross-sectional area of the bed, perpendicular to the direction of flow. In some embodiments, such uniform pressure drop ensures that the same amount of liquid will flow through all sections of the ion exchange bed, thus ensuring uniform contact of the ion exchange material with the liquid resource, wash solution, acidic eluent, or any combination thereof.

The ion exchange beads is packed into uniform ion exchange beds to improve flow distribution uniformity. This packing ensures uniform structure of the ion exchange bed. The process of packing the ion exchange bed into a uniform ion exchange bed is termed "packing", "forming", or "shaping" the ion exchange bed. For the purposes of this invention, the terms "packing", "forming", or "shaping" are used interchangeably.

One embodiment of a system for shaping ion exchange beads into ion exchange beds with optimal flow distribution is described in example 16 and the associated figure.

In order to shape the ion exchange beads into ion exchange beds, said beads are first loaded into an ion exchange vessel. In some embodiments, the ion exchange beads are loaded into the vessel by flowing into the vessel as a slurry, applying vacuum through the vessel and pulling the beads into the vessel, pouring the slurry into the vessel with a slurry transfer device, pumping the slurry into the vessel with a slurry transfer device, or a combination thereof. In some embodiments, the ion exchange beads are loaded as a dry powder. In some embodiments, the ion exchange beads are loaded as a solid. In some embodiments, the ion exchange beads are loaded as a dry powder by pouring them into the ion exchange vessel as a powder. In some embodiments, the ion exchange beads are loaded as a dry powder by pouring them into the ion exchange vessel while tapping them loading container. In some embodiments, the ion exchange beads are loaded as a dry powder by pneumatically conveying them into the ion exchange vessel using a blower, a vacuum, compressed air, a conveyor belt, a fan, or combinations thereof.

In some embodiments, the loaded beads are packed to shape the ion exchange bed into an optimal flow distribution. In some embodiments, packing is done by flowing fluid through ion exchange beads. In some embodiments, a certain flow rate and pressure are maintained during flow across the ion exchange bed to achieve uniform packing of the ion exchange beads. In some embodiments, the fluid for packing is water, aqueous solution, brine, acidic solution, organic solvents, air, nitrogen gas, argon gas, or a combination thereof.

In some embodiments, the fluid velocity used for packing is less than 1 cm/min, less than 5 cm/min, less than 10 cm/min, less than 20 cm/min, less than 30 cm/min, less than 40 cm/min, less than 50 cm/min, less than 100 cm/min, less than 200 cm/min, less than 500 cm/min, less than 10 m/min, less than 100 m/min, or a combination thereof. In some embodiments, the fluid velocity used for packing is more than 1 cm/min, more than 5 cm/min, more than 10 cm/min, more than 20 cm/min, more than 30 cm/min, more than 40 cm/min, more than 50 cm/min, more than 100 cm/min, more than 200 cm/min, more than 500 cm/min, more than 10 m/min, more than 100 m/min, or a combination thereof. In some embodiments, the fluid velocity is from about 1 cm/min to about 5 cm/min, from about 5 cm/min to about 20 cm/min, from about 20 cm/min to about 100 cm/min, from about 100 cm/min to about 200 cm/min, from about 200 cm/min to about 500 cm/min, from about 500 cm/min to about 10 m/min, from about 10 m/min to about 100 m/min, or a combination thereof. In some embodiments, the fluid velocity is varied throughout the packing process to shape the ion exchange beds. In some embodiments, the fluid velocity is increased throughout the packing process. In some embodiments, the fluid velocity is decreased throughout the packing process. In some embodiments, the fluid velocity is first increased and then decreased. In some embodiments, the fluid velocity varies sinusoidally with time. In some embodiments, the fluid velocity is varied up, down, sinusodially, with varying speed, or a combination thereof.

In some embodiments, flow is directed in the same direction as fluid flow during the ion-exchange process, in the opposite direction as fluid flow during the ion-exchange process, in a tangential direction as fluid flow during the ion-exchange process, in an orthogonal direction as fluid flow during the ion-exchange process, in an intermediate direction as fluid flow during the ion-exchange process, or in a combination thereof. In some embodiments, the fluid is flown across ion exchange beads, axially along the longest orientation of the ion exchange bed. In some embodiments, the fluid is flown across ion exchange beads, radially across the radial orientation of the ion exchange bed. In some embodiments, the fluid is flown across ion exchange beads, along the shortest orientation of the ion exchange bed. In some embodiments, the fluid is flown in a combination of axially along the longest orientation of the ion exchange bed, along the shortest orientation of the ion exchange bed, or radially across the radial orientation of the ion exchange bed.

In some embodiments, the ion exchange beads are packed in the same chamber where the ion exchange process occurs. In some embodiments, the ion exchange beads are packed in a separate chamber from where ion exchange process occurs.

In some embodiments, the ion exchange beads are packed by applying pressure on the ion exchange bed. In some embodiments, pressure is applied to the ion exchange bed with weights or hydraulic force caused by fluid flow.

In some embodiments, the weight applied to the ion exchange bed is less than 1 kg, less than 5 kg, less than 10 kg, less than 50 kg, less than 100 kg, less than 500 kg or less than 1000 kg. In some embodiments, the weight applied to the ion exchange bed is more than 1 kg, more than 5 kg, more than 10 kg, more than 50 kg, more than 100 kg, more than 500 kg, or more than 1000 kg. In some embodiments, the weight applied to the ion exchange bed is from 1 kg to 5 kg, from 5 kg to 10 kg, from 10 kg to 50 kg, from 50 kg to 100 kg, from 100 kg to 500 kg, or from 500 kg to 1000 kg.

In some embodiments the hydraulic force applied to the ion exchange bead is less than 50 psi, less than 150 psi, less than 500 psi, less than 1000 psi, less than 2500 psi, or less than 5000 psi. In some embodiments the hydraulic force applied to the ion exchange bead is more than 50 psi, more than 150 psi, more than 500 psi, more than 1000 psi, more than 2500 psi, or more than 5000 psi. In some embodiments, the hydraulic force applied to the ion exchange bead is from 50 psi to 150 psi, from 150 psi to 500 psi, from 500 psi to 1000 psi, from 1000 psi to 2500 psi, from 2500 psi to 5000 psi.

An aspect described herein is a fluid diversion device that forms ion exchange beads into ion exchange beds with uniform and optimal flow properties for lithium extraction by ion exchange. An aspect described herein is a fluid diversion device that forms ion exchange beads into ion exchange beds with homogenous density or near-homogenous density. An aspect described herein is a fluid diversion device that forms ion exchange beads into ion exchange beds with homogenous density or near-homogenous density.

In some embodiments, said fluid diversion device is cylindrical, square, rectangular, triangular, oval-shaped, star-shaped, irregularly shaped, mixtures thereof or combinations thereof. In some embodiments, said fluid diversion device conforms to the shape of the vessel where it is used. In some embodiments, said fluid diversion device conforms to the shape of the pipe where it is placed. In some embodiments, said fluid diversion device changes shape depending on the fluid that is flowing into it, from it, or through it. In some embodiments, said fluid diversion device changes shape before, during, at several points, or after the ion-exchange bed shaping process. In some embodiments, said fluid diversion device changes shape depending on the pressure being applied on it by a fluid.

In some embodiments, the fluid diversion device blocks fluid flow by sealing compartments of the vessel. In some embodiments, this device blocks flow with o-rings, gaskets, expanding flexible rings, balloons, or a combination of thereof. In some embodiments, the fluid diversion device seals comprise polytetrafluoroethylene (PTFE), polychloroprene (neoprene), ethylene propylene dine monomer (EPDM), Viton, nitrile rubber (Buna-N), silicone, fluoropolymer, polyurethane, flouorosilicone, or a combination thereof.

In some embodiments, the fluid diversion device blocks sections of the ion exchange bed so as to direct flow to specific sections of the ion exchange bed that are to be formed and packed. In some embodiments, said fluid diversion device blocks flow by occupying the space inside a flow distributor in order to prevent flow through said flow distributor and into the ion exchange bed. In some embodiments, said fluid diversion device blocks flow through sections of the flow distributor that delivers fluid to the ion exchange bed. In some embodiments, said fluid diversion device blocks flow through sections of the flow distributor that collects fluid the ion exchange bed. In some embodiments, said fluid diversion device blocks flow by blocking the pores of the porous partition dividing compartments in the ion exchange vessel.

In some embodiments, one, two, three, four, five, six, seven, eight, nine, or ten fluid diversion devices are used within a single vessel, on their own, in combination, or changing in number and type throughout the duration of the packing treatment.

In some embodiments, more than one fluid diversion device is present within the same ion exchange vessel. In some embodiments, more than about two, more than about four, more than about six, more than about 10, more than about 20, more than about 50 fluid diversion device is present within the same ion exchange vessel. In some embodiments, less than about two, less than about four, less than about six, less than about 10, less than about 20, less than about 50 fluid diversion device is present within the same ion exchange vessel. In some embodiments, between about one and about two, between about two and about four, between about four and about six, between about four and about 10, between about 10 and about 20, between about 20 and about 50 fluid diversion device is present within the same ion exchange vessel.

In some embodiments, forming of the ion exchange bed occurs by using said fluid diversion device to pack sections of the ion exchange bed, until the entirety of the ion exchange chamber is packed. In some embodiments, forming of the ion exchange bed occurs by continuously moving the fluid diversion device along the length of the ion exchange vessel. In some embodiments, the ion exchange bed is packed in less than 4 sections, less than 8 sections, less than 20 sections, less than 50 sections, less than 100 sections. In some embodiments, the ion exchange bed is packed in more than 1 section, more than 4 sections, more than 8 sections, more than 20 sections, more than 50 sections, more than 100 sections, In some embodiments, the ion exchange bed is packed from about 1 to about 4 sections, about 4 sections to about 8 sections, from about 8 sections to about 20 sections, from about 20 sections to about 50 sections, from about 50 sections to about 100 sections.

In some embodiments, fluid flows up, down, at an angle, through, or across said fluid diversion device. In some embodiments, said fluid diversion device contains a pipe through which fluid flows. In some embodiments, said fluid diversion device moves along a pipe. In some embodiments, the fluid moves to different positions of a vessel. In some embodiments, the fluid moves to different positions in the vessel in response to fluid flow. In some embodiments, the fluid moves to different positions in the vessel in response to pressure. In some embodiments, the fluid moves to different positions in the vessel in response to the liquid level in the vessel.

In some embodiments, the fluid diversion device blocks sections with lengths less than 1 cm, less than 5 cm, less than 15 cm, less than 50 cm, less than 100 cm, or less than 200 cm. In some embodiments, the fluid diversion device blocks sections with lengths more than 1 cm, more than 5 cm, more than 15 cm, more than 50 cm, more than 100 cm, or more than 200 cm. In some embodiments, the fluid diversion device blocks sections with lengths from 1 cm to 5 cm, from 5 cm to 15 cm, from 15 cm to 50 cm, from 50 cm to 100 cm, from 100 cm to 200 cm.

In some embodiments, the fluid diversion device has a length of less than 1 cm, less than 5 cm, less than 15 cm, less than 50 cm, less than 100 cm, or less than 200 cm. In some embodiments, the fluid diversion has a length of more than 1 cm, more than 5 cm, more than 15 cm, more than 50 cm, more than 100 cm, or more than 200 cm. In some embodiments, the fluid diversion device has a length of from 1 cm to 5 cm, from 5 cm to 15 cm, from 15 cm to 50 cm, from 50 cm to 100 cm, from 100 cm to 200 cm. In some embodiments, the fluid diversion device has a width of less than 1 cm, less than 5 cm, less than 15 cm, less than 50 cm, less than 100 cm, or less than 200 cm. In some embodiments, the fluid diversion has a width of more than 1 cm, more than 5 cm, more than 15 cm, more than 50 cm, more than 100 cm, or more than 200 cm. In some embodiments, the fluid diversion device has a width of from 1 cm to 5 cm, from 5 cm to 15 cm, from 15 cm to 50 cm, from 50 cm to 100 cm, from 100 cm to 200 cm. In some embodiments, the fluid diversion device has a radius of less than 1 cm, less than 5 cm, less than 15 cm, less than 50 cm, less than 100 cm, or less than 200 cm. In some embodiments, the fluid diversion has a radius of more than 1 cm, more than 5 cm, more than 15 cm, more than 50 cm, more than 100 cm, or more than 200 cm. In some embodiments, the fluid diversion device has a radius of from 1 cm to 5 cm, from 5 cm to 15 cm, from 15 cm to 50 cm, from 50 cm to 100 cm, from 100 cm to 200 cm.

In some embodiments, packing is aided by using inert beads to restrict the fluid flow path from certain sections of the vessel. In some embodiments, the inert beads are loaded on a separate compartment from the ion exchange beads; this restricts fluid flow in the compartment that contains said inert beads and directs flow to the compartment containing ion-exchange beads. In some embodiments, the inert beads are loaded on the same compartment with the ion exchange beads; this restricts fluid flow in areas of the compartment that contain said inert beads and directs flow to the ion-exchange beads.

In some embodiments, the inert beads are loaded into the vessel by flowing into the vessel as a slurry, applying vacuum through the vessel and pulling the beads into the vessel, pouring the slurry into the vessel with a slurry transfer device, or a combination thereof. In some embodiments, the inert beads are unloaded into the vessel by flowing into the vessel as a slurry, applying vacuum through the vessel and pulling the beads into the vessel, pouring the slurry into the vessel with a slurry transfer device, or a combination thereof. In some embodiments, the inert beads are loaded as a dry powder. In some embodiments, the inert beads are loaded as a solid. In some embodiments, the inert beads are loaded as a dry powder by pouring them into the ion exchange vessel as a powder. In some embodiments, the inert beads are loaded as a dry powder by pouring them into the ion exchange vessel while tapping them loading container. In some embodiments, the inert beads are loaded as a dry powder by pneumatically conveying them into the ion exchange vessel using a blower, a vacuum, compressed air, a conveyor belt, a fan, or combinations thereof.

In some embodiments, the inert beads consist of a polymer, a ceramic, a metal, a carbide, a nitride, an oxide, a phosphate, a fluoride, a polymer, carbon, a carbonaceous material, or combinations thereof. In some embodiments, the inert beads comprise a chloro-polymer, a fluoro-polymer, a chloro-fluoro-polymer, a hydrophilic polymer, a hydrophobic polymer, co-polymers thereof, mixtures thereof, or combinations thereof. In a further embodiment, a coating is applied to these inert beads. In some embodiments, the coating material comprises a co-polymer, a block co-polymer, a linear polymer, a branched polymer, a cross-linked polymer, a heat-treated polymer, a solution processed polymer, co-polymers thereof, mixtures thereof, or combinations thereof. In a further aspect, a coating material comprises low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly(chlorotrifluoroethylene) (PCTFE), ethylene chlorotrifluoro ethylene (Halar), polyvinylfluoride (PVF), fluorinated ethylenepropylene (FEP), perfluorinated elastomer, chlorotrifluoroethylenevinylidene fluoride (FKM), perfluoropolyether (PFPE), perfluoro-3,6-dioxa-4-methyl-7-octene-sulfonic acid (NAFION® (copolymer of perfluoro-3,6-dioxa-4-methyl-7-octene-sulfonic acid and tetrafluoroethylene)), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof.

In some embodiments, the inert beads are shaped as a sphere, spheroid, ovaloid, cross, tube, torus, ring, saddle ring, tubes, triangles, cylinders, rhombus, square, rectangle, other complex geometric shapes, or a combination thereof.

In some embodiments, the inert beads have an average particle diameter less than about 1 µm, less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, inert beads have an average particle diameter more than about 1 µm, more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, inert beads have a typical particle size from about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm.

In some embodiments, said filler material is inert to acid and brine. In some embodiments, said filler is constructed from a polymer or ceramic. In some embodiments, said filler material has pores containing ion exchange material. In some embodiments, said filler material has pores larger smaller than 10 microns containing ion exchange material. In some embodiments, said material filler has pores larger smaller than 100 microns containing ion exchange material. In some embodiments, said filler material has pores larger smaller than 1 millimeter containing ion exchange material. In some embodiments, said filler material has pores larger smaller than 1 centimeter containing ion exchange material. In some embodiments, said filler material has pores larger than 1 centimeter containing ion exchange material. In some embodiments, said filler material has pores larger than 10 centimeters containing ion exchange material. In some embodiments, said filler material has pores larger than about 10 microns or about 100 microns containing ion exchange material. In some embodiments, said filler material has pores larger than about 1 millimeter, about 1 centimeter, or about 10 centimeters containing ion exchange material. In some embodiments, said filler material has pores larger than about 10 centimeters or about 25 centimeters containing ion exchange material. In some embodiments, said filler material has pores smaller than about 10 microns or about 100 microns containing ion exchange material. In some embodiments, said filler material has pores smaller larger than about 1 millimeter, about 1 centimeter, or about 10 centimeters containing ion exchange material. In some embodiments, said filler material has pores smaller larger than about 10 centimeters or about 25 centimeters containing ion exchange material. In some embodiments, said filler material is a rigid scaffolding.

In some embodiments, a screen, mesh, or other partition is optionally included within the ion exchange vessel, in order to control the location and restrict the movement of ion exchange beads during the contact with fluid. In some embodiments, said partition separates the ion-exchange compartments from the flow-distribution compartments. In some embodiments, said partition separates the flow-distribution compartments from the ion-exchange compartments. In some embodiments, this porous partition optionally provides support for the ion-exchange bead bed, chemical protection, aids filtration, or a combination thereof. In some embodiments, the porous partition is a porous polymer partition. In some embodiments, the porous partition is a mesh or polymer membrane. In some embodiments, the porous partition comprises one or more meshes of similar or different composition, of similar or different aperture sizes, of similar or different percent open area. In some embodiments, the porous partition comprises one or more meshes to provide structural support and/or filtration capabilities. In some embodiments, the porous partition comprises a polyether ether ketone mesh, a polypropylene mesh, a polyethylene mesh, a polysulfone mesh, a polyester mesh, a polyamide mesh, a polytetrafluoroethylene mesh, an ethylene tetrafluoroethylene polymer mesh, a stainless-steel mesh, a stainless steel mesh coated in polymer, a stainless steel mesh coated in ceramic, a titanium mesh, or a combination thereof, wherein the mesh is a coarse mesh, a fine mesh, or a combination thereof.

In some embodiments the porous partition is a porous pipe. In some embodiment the porous pipe comprises low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly(chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluoro-3,6-dioxa-4-methyl-7-octene-sulfonic acid (NAFION® (copolymer of perfluoro-3,6-dioxa-4-methyl-7-octene-sulfonic acid and tetrafluoroethylene)), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof. In some embodiments the porous pipe comprises sintered metals, stainless steel, titanium, stainless steel coated in ceramic, hastelloy, monel, inconel, or a combination thereof.

In some embodiments the porous pipe consists of openings in that are of a typical characteristic size of less than about 1 µm, less than about 2 µm, less than about 5 µm, less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, the porous partition consists of openings in that are of a typical characteristic size of more than about 1 µm, more than about 2 µm, more than about 5 µm, more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, the porous partition consists of openings in that are of a typical characteristic size from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm. In some embodiments, the porous partition consists of openings in that are of a typical characteristic size of from about 1 µm to about 2 µm, from about 2 µm to about 4 µm, from about 4 µm to about 10 µm, from about 10 µm to about 20 µm, from about 20 µm to about 40 µm, from about 40 µm to about 100 µm, from about 100 µm to about 200 µm, from about 200 µm to about 400 µm, from about 400 µm to about 1000 µm, from about 1000 µm to about 2000 µm. In some embodiments, the porous partition consists of openings in that are of a typical characteristic size of from about 1 µm to about 10 µm, from about 10 µm to about 100 µm, from about 100 µm to about 1000 µm, from about 1000 µm to about 10000 µm.

Other Embodiments of Devices for Extracting Lithium from a Liquid Resource

In one aspect described herein, is a device for lithium extraction from a liquid resource comprising one or more vessels independently configured to simultaneously accommodate ion exchange beads moving in one direction and alternately acid, brine, and optionally other solutions moving in the net opposite direction.

In one aspect described herein, there is a device for lithium extraction from a liquid resource comprising an ion exchange vessel, an ion exchange material, and a pH modulating setup for increasing the pH of the liquid resource in the ion exchange vessel.

In one aspect described herein, is a device for lithium extraction from a liquid resource comprising an ion exchange vessel, an ion exchange material, a pH modulating setup for increasing the pH of the liquid resource in the stirred tank reactor, and a compartment for containing the ion exchange material in the stirred tank reactor while allowing for removal of liquid resource, washing fluid, and acid solutions from the ion exchange vessel.

In one embodiment, at least one of the one or more vessels are fitted with a conveyer system suitably outfitted to move porous ion exchange beads upward and simultaneously allow a net flow of acid, brine, and optionally other solutions, downward. In one embodiment, the conveyor system comprises fins with holes. In one embodiment, wherein the fins slide upward over a sliding surface that is fixed in place. In one embodiment, the fins slide upward over a sliding surface that is fixed in place. In one embodiment, all of the one or more vessels are fitted with a conveyor system suitably outfitted to move porous ion exchange beads upward and simultaneously allow a net flow of acid, brine, and optionally other solutions, downward. In one embodiment, there are an even number of vessels. In one embodiment, there are an odd number of vessels. In one embodiment, the vessels are columns.

In some embodiments, structures with holes are used to move the ion exchange material through one or more vessels. In some embodiments, the holes in the structures may be less than 10 microns, less than 100 microns, less than 1,000 microns, or less than 10,000 microns. In some embodiments, the structures may be attached to a conveyer system. In some embodiments, the structures may comprise a porous compartment, porous partition, or other porous structure. In some embodiments, the structures may contain a bed of fixed or fluidized ion exchange material. In some embodiments, the structures may contain ion exchange material while allowing brine, aqueous solution, or acid solution to pass through the structures.

In one embodiment, porous ion exchange beads comprise ion exchange particles that reversibly exchange lithium and hydrogen and a structural matrix material and having a pore network. In one embodiment, the liquid resource comprises a natural brine, a dissolve salt flat, a concentrated brine, a processed brine, a filtered brine, a liquid from an ion exchange process, a liquid from a solvent extraction process, a synthetic brine, leachate from ores, leachate from minerals, leachate from clays, leachate from recycled products, leachate from recycled materials, or combinations thereof.

Ion Exchange Material

An aspect of the invention described herein is a system wherein the ion exchange material comprises a plurality of ion exchange particles. In an embodiment, the plurality of ion exchange particles in the ion exchange material is selected from uncoated ion exchange particles, coated ion exchange particles and combinations thereof. In an embodiment, the ion exchange material is a porous ion exchange material. In an embodiment, the porous ion exchange material comprises a network of pores that allows liquids to move quickly from the surface of the porous ion exchange material to the plurality of ion exchange particles. In an embodiment, the ion exchange material is in the form of porous ion exchange beads. In an embodiment, the liquid resource is a natural brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

Ion exchange materials are typically small particles, which together constitute a fine powder. In some embodiments small particle size minimizes the diffusion distance that lithium must travel into the core of the ion exchange particles. In some cases, these particles are optionally coated with protective surface coatings to minimize dissolution of the ion exchange materials while allowing efficient transfer of lithium and hydrogen to and from the particles.

In an embodiment, the coated ion exchange particles are comprised of an ion exchange material and a coating material wherein the ion exchange material comprises $Li_4Mn_5O_{12}$, $Li_{1.6}Mn_{1.6}O_4$, $Li_2MO_3$ (M=Ti, Mn, Sn), $LiFePO_4$, solid solutions thereof, or combinations thereof and the coating material comprises $TiO_2$, $ZrO_2$, $MoO_2$, $Li_2TiO_3$, $Li_2ZrO_3$, $LiNbO_3$, $AlF_3$, $SiC$, $Si_3N_4$, graphitic carbon, amorphous carbon, diamond-like carbon, or combinations thereof. The coated ion exchange particles have an average diameter less than about 100 nm, less than about 1,000 nm, or less than about 10,000 nm, and the coating thickness is less than about 1 nm, less than about 10 nm, or less than about 100 nm. The particles are created by first synthesizing the ion exchange material using a method such as hydrothermal, solid state, or microwave. The coating material is then deposited on the surface of the ion exchange material using a method such as chemical vapor deposition, hydrothermal, solvothermal, sol-gel, precipitation, or microwave. The coated ion exchange particles are treated with an acid solution prepared with hydrochloric acid, sulfuric acid, nitric acid, or combinations thereof wherein the concentration of the acid solution is greater than about 0.1 M, greater than about 1.0 M, greater than about 5 M, greater than about 10 M, or combinations thereof. During acid treatment, the particles absorb hydrogen while releasing lithium. The ion exchange material is converted to a hydrated state with a hydrogen-rich composition. The coating material allows diffusion of hydrogen and lithium respectively to and from the ion exchange material while providing a protective barrier that limits dissolution of the ion exchange material. After treatment in acid, the hydrated coated ion exchange particles are treated with a liquid resource wherein the liquid resource is a natural brine, a dissolved salt flat, a concentrated brine, a processed brine, a synthetic brine, liquid from an ion exchange process, liquid from a solvent extraction process, leachate from minerals, leachate from clays, leachate from recycled products, leachate from recycled materials, or combinations thereof. The coated ion exchange particles absorb lithium while releasing hydrogen. The lithium salt solution is then collected. The coated ion exchange particles are capable then perform the ion exchange reaction repeatedly over a number of cycles greater than about 10 cycles, greater than about 30 cycles, greater than about 100 cycles, or greater than about 300 cycles.

One major challenge for lithium extraction using inorganic ion exchange particles is the loading of the particles into an ion exchange column in such a way that brine and acid are optionally pumped efficiently through the column with minimal clogging. The materials are optionally formed into beads, and the beads are optionally loaded into the column. This bead loading creates void spaces between the beads, and these void spaces facilitate pumping through the column. The beads hold the ion exchange particles in place and prevent free movement of the particles throughout the column. When the materials are formed into beads, the penetration of brine and acid solutions into the beads become slow and challenging. A slow rate of convection and diffusion of the acid and brine solutions into the bead slows the kinetics of lithium absorption and release. Such slow kinetics can create problems for column operation. Slow kinetics can require slow pumping rates through the column. Slow kinetics can also lead to low lithium recovery from the brine and inefficient use of acid to elute the lithium.

In some embodiments, the ion exchange beads are porous ion exchange beads with networks of pores that facilitate the transport into the beads of solutions that are pumped through an ion exchange column. Pore networks are optionally strategically controlled to provide fast and distributed access for the brine and acid solutions to penetrate into the bead and deliver lithium and hydrogen to the ion exchange particles.

In some embodiments, the ion exchange beads are formed by mixing ion exchange particles, a matrix material, and a filler material. These components are mixed and formed into a bead. Then, the filler material is removed from the bead to leave behind pores. The filler material is dispersed in the bead in such a way to leave behind a pore structure that enables transport of lithium and hydrogen with fast kinetics. This method optionally involves multiple ion exchange materials, multiple polymer materials, and multiple filler materials.

Another major challenge for lithium extraction using inorganic ion exchange materials is dissolution and degradation of the materials, especially during lithium elution in acid but also during lithium uptake in liquid resources. To yield a concentrated lithium solution from the ion exchange process, it is desirable to use a concentrated acid solution to elute the lithium. However, concentrated acid solutions dissolve and degrade inorganic ion exchange materials, which decrease the performance and lifespan of the materials. Therefore, the porous ion exchange beads optionally contain coated ion exchange particle for lithium extraction that are comprised of an ion exchange material and a coating material protecting the particle surface. The coating protects the ion exchange material from dissolution and degradation during lithium elution in acid, during lithium uptake from a liquid resource, and during other aspects of an ion exchange process. This coated particle enables the use of concentrated acids in the ion exchange process to yield concentrated lithium solutions.

In this invention, the ion exchange material is selected for high lithium absorption capacity, high selectivity for lithium in a liquid resource relative to other ions such as sodium and magnesium, strong lithium uptake in liquid resources including those with low concentrations of lithium, facile elution of lithium with a small excess of acid, and fast ionic diffusion. A coating material is optionally selected to protect the particle from dissolution and chemical degradation during lithium recovery in acid and also during lithium uptake in various liquid resources. A coating material optionally is also selected to facilitate diffusion of lithium and hydrogen between the particles and the liquid resources, to enable adherence of the particles to a structural support, and to suppress structural and mechanical degradation of the particles.

When the porous ion exchange beads are used in an ion exchange column, the liquid resource containing lithium is pumped through the ion exchange column so that the ion exchange particles absorb lithium from the liquid resource while releasing hydrogen. After the beads have absorbed lithium, an acid solution is pumped through the column so that the particles release lithium into the acid solution while absorbing hydrogen. The column is optionally operated in co-flow mode with the liquid resource and acid solution alternately flowing through the column in the same direction, or the column is optionally operated in counter-flow mode with a liquid resource and acid solution alternately flowing through the column in opposite directions. Between flows of the liquid resource and the acid solution, the column is optionally treated or washed with water or other solutions for purposes such as adjusting pH in the column or removing potential contaminants. The beads optionally form a fixed or moving bed, and the moving bed optionally moves in counter-current to the brine and acid flows. The beads are optionally moved between multiple columns with moving beds where different columns are used for brine, acid, water, or other flows. Before or after the liquid resource flows through the column, the pH of the liquid is optionally adjusted with NaOH or other chemicals to facilitate the ion exchange reaction as well as handling or disposal of the spent liquid resource. Before or after the liquid resource flows through the column, the liquid resource is optionally subjected to other processes including other ion exchange processes, solvent extraction, evaporation, chemical treatment, or precipitation to remove lithium, to remove other chemical species, or to otherwise treat the brine.

When the ion exchange particles are treated with acid, a lithium solution is produced. This lithium solution is optionally further processed to produce lithium chemicals. These lithium chemicals are optionally supplied for an industrial application. In some embodiments, an ion exchange material is selected from the following list: an oxide, a phosphate, an oxyfluoride, a fluorophosphate, or combinations thereof. In some embodiments, an ion exchange material is selected from the following list: $LiFePO_4$, $LiMnPO_4$, $Li_2MO_3$ (M=Ti, Mn, Sn), $Li_4Ti_5O_{12}$, $Li_4Mn_5O_{12}$, $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $Li_2CuP_2O_7$, $Al(OH)_3$, $LiCl \cdot xAl(OH)_3 \cdot yH_2O$, $SnO_2 \cdot xSb_2O_5 \cdot yH_2O$, $TiO_2 \cdot xSb_2O_5 \cdot yH_2O$, solid solutions thereof, or combinations thereof. In a further aspect, an ion exchange material comprises $LiFePO_4$, $Li_2SnO_3$, $Li_2MnO_3$, $Li_2TiO_3$, $Li_4Ti_5O_{12}$, $Li_4Mn_5O_{12}$, $Li_{1.6}Mn_{1.6}O_4$, solid solutions thereof, or combinations thereof.

In a further aspect described herein, the coating material allows diffusion to and from the ion exchange material. In particular, the coating material facilitates diffusion of lithium and hydrogen between the particles and the liquid resources, enables adherence of the particles to a structural support, and suppresses structural and mechanical degradation of the particles. In a further aspect described herein, the coating material comprises a carbide, a nitride, an oxide, a phosphate, a fluoride, a polymer, carbon, a carbonaceous material, or combinations thereof. In a further aspect, the coating material comprises polyvinylidene difluoride, polyvinyl chloride, a fluoro-polymer, a chloro-polymer, or a fluoro-chloro-polymer. In a further aspect, a coating material comprises $Nb_2O_5$, $Ta_2O_5$, $MoO_2$, $TiO_2$, $ZrO_2$, $SnO_2$, $SiO_2$, $Li_2O$, $Li_2TiO_3$, $Li_2ZrO_3$, $Li_2MoO_3$, $LiNbO_3$, $LiTaO_3$, $Li_2SiO_3$, $Li_2Si_{2O5}$, $Li_2MnO_3$, $ZrSiO_4$, $AlPO_4$, $LaPO_4$, $ZrP_2O_7$, $MoP_2O_7$, $Mo_2P_3O_{12}$, $BaSO_4$, $AlF_3$, SiC, TiC, ZrC, $Si_3N_4$, ZrN, BN, carbon, graphitic carbon, amorphous carbon, hard carbon, diamond-like carbon, solid solutions thereof, or combinations thereof. In a further aspect, a coating material comprises $TiO_2$, $ZrO_2$, $SiO_2$, $Li_2TiO_3$, $Li_2ZrO_3$, $Li_2MnO_3$, $ZrSiO_4$, or $LiNbO_3$. In a further aspect, a coating material comprises a chloro-polymer, a fluoro-polymer, a chloro-fluoro-polymer, a hydrophilic polymer, a hydrophobic polymer, co-polymers thereof, mixtures thereof, or combinations thereof. In a further aspect, a coating material comprises a co-polymer, a block co-polymer, a linear polymer, a branched polymer, a cross-linked polymer, a heat-treated polymer, a solution processed polymer, co-polymers thereof, mixtures thereof, or combinations thereof. In a further aspect, a coating material comprises low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly(chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluoro-3,6-dioxa-4-methyl-7-octene-sulfonic acid (NAFION® (copolymer of perfluoro- 3,6-dioxa-4-methyl-7-octene-sulfonic acid and tetrafluoroethylene)), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof. In a further aspect, a coating is deposited onto an ion exchange particle by dry mixing, mixing in solvent, emulsion, extrusion, bubbling one solvent into another, casting, heating, evaporating, vacuum evaporation, spray drying, vapor deposition, chemical vapor deposition, microwaving, hydrothermal synthesis, polymerization, co-polymerization, cross-linking, irradiation, catalysis, foaming, other deposition methods, or combinations thereof. In a further aspect, a coating is deposited using a solvent comprising N-methyl-2-pyrrolidone, dimethyl sulfoxide, tetrahydrofuran, dimethylformamide, dimethylacetamide, methyl ethyl ketone, ethanol, acetone, other solvents, or combinations thereof. In a further aspect, a coating is deposited using a solvent comprising N-methyl-2-pyrrolidone, dimethyl sulfoxide, tetrahydrofuran, dimethylformamide, dimethylacetamide, methyl ethyl ketone, ethanol, acetone, or combinations thereof.

In a further aspect described herein, the coated ion exchange particles have an average diameter less than about 10 nm, less than about 100 nm, less than about 1,000 nm, less than about 10,000 nm, or less than about 100,000 nm. In a further aspect, the coated ion exchange particles have an average size less than about 100 nm, less than about 1,000 nm, or less than about 10,000 nm. In a further aspect, the coated ion exchange particles are optionally secondary particles comprised of smaller primary particles that have an average diameter less than about 10 nm, less than about 100 nm, less than about 1,000 nm, less than about 10,000 nm, or less than about 100,000 nm. In a further aspect, the coating optionally coats the primary ion exchange particles. In a further aspect, the coating optionally coats the secondary ion exchange particles. In a further aspect, the coating optionally coats the secondary ion exchange particles. In a further aspect, the coating optionally coats both the primary ion exchange particles and the secondary ion exchange particles. In a further aspect, the primary ion exchange particles optionally have a first coating and the secondary ion exchange particles optionally have a second coating that is optionally identical, similar, or different in composition to the first coating.

In some embodiments described herein, the coating material has a thickness less than about 1 nm, less than about 10 nm, less than about 100 nm, less than about 1,000 nm, or less than about 10,000 nm. In further embodiments, the coating material has a thickness less than about 5 nm, less than about 50 nm, or less than about 500 nm. In some embodiments, the ion exchange particles have a coating material with a thickness selected from the following list: less than 1 nm, less than 10 nm, less than 100 nm, or less than 1,000 nm. In some embodiments, the coating material has a thickness selected from the following list: less than 1 nm, less than 10 nm, or less than 100 nm. In certain embodiments, the coating material has a thickness between about 0.5 nm to about 1000 nm. In some embodiments, the coating material has a thickness between about 1 nm to about 100 nm.

In a further aspect described herein, the ion exchange material and the coating material form one or more concentration gradients where the chemical composition of the particle ranges between two or more compositions. In a further aspect, the chemical composition optionally varies between the ion exchange materials and the coating in a manner that is continuous, discontinuous, or continuous and discontinuous in different regions of the particle. In a further aspect, the ion exchange materials and the coating materials form a concentration gradient that extends over a thickness less than about 1 nm, less than about 10 nm, less than about 100 nm, less than about 1,000 nm, less than about 10,000 nm, or less than about 100,000 nm. In a further aspect, the ion exchange materials and the coating materials form a concentration gradient that extends over a thickness of about 1 nm to about 1,000 nm.

In a further aspect described herein, the ion exchange material is synthesized by a method such as hydrothermal, solvothermal, sol-gel, solid state, molten salt flux, ion exchange, microwave, ball milling, chemical precipitation, co-precipitation, vapor deposition, or combinations thereof. In a further aspect, the ion exchange material is synthesized by a method such as chemical precipitation, hydrothermal, solid state, or combinations thereof.

In a further aspect described herein, the coating material is deposited by a method such as chemical vapor deposition, atomic layer deposition, physical vapor deposition, hydrothermal, solvothermal, sol-gel, solid state, molten salt flux, ion exchange, microwave, chemical precipitation, co-precipitation, ball milling, pyrolysis, or combinations thereof. In a further aspect, the coating material is deposited by a method such as sol-gel, chemical precipitation, or combinations thereof. In a further aspect, the coating materials is deposited in a reactor that is optionally a batch tank reactor, a continuous tank reactor, a batch furnace, a continuous furnace, a tube furnace, a rotary tube furnace, or combinations thereof.

In some embodiments, a coating material is deposited with physical characteristics selected from the following list: crystalline, amorphous, full coverage, partial coverage, uniform, non-uniform, or combinations thereof.

In some embodiments, multiple coatings are optionally deposited on the ion exchange material in an arrangement selected from the following list: concentric, patchwork, or combinations thereof.

In some embodiments, the matrix is selected from the following list: a polymer, an oxide, a phosphate, or combinations thereof. In some embodiments, a structural support is selected from the following list: polyvinyl fluoride, polyvinylidene fluoride, polyvinyl chloride, polyvinylidene chloride, polyethylene, polypropylene, polyphenylene sulfide, polytetrafluoroethylene, polytetrofluoroethylene, sulfonated polytetrofluoroethylene, polystyrene, polydivinylbenzene, polybutadiene, sulfonated polymer, carboxylated polymer, Nafion, copolymers thereof, and combinations thereof. In some embodiments, a structural support is selected from the following list: polyvinylidene difluoride, polyvinyl chloride, sulfonated polytetrofluoroethylene, polystyrene, polydivinylbenzene, copolymers thereof, or combinations thereof. In some embodiments, a structural support is selected from the following list: titanium dioxide, zirconium dioxide, silicon dioxide, solid solutions thereof, or combinations thereof. In some embodiments, the matrix material is selected for thermal resistance, acid resistance, and/or other chemical resistance.

In some embodiments, the porous bead is formed by mixing the ion exchange particles, the matrix material, and the filler material together at once. In some embodiments, the porous bead is formed by first mixing the ion exchange particles and the matrix material, and then mixing with the filler material. In some embodiments, the porous bead is formed by first mixing the ion exchange particles and the filler material, and then mixing with the matrix material. In some embodiments, the porous bead is formed by first mixing the matrix material and the filler material, and then mixing with the ion exchange particles.

In some embodiments, the porous bead is formed by mixing the ion exchange particles, the matrix material, and/or the filler material with a solvent that dissolves once or more of the components. In some embodiments, the porous bead is formed by mixing the ion exchange particles, the matrix material, and/or the filler material as dry powders in a mixer or ball mill. In some embodiments, the porous bead is formed by mixing the ion exchange particles, the matrix material, and/or the filler material in a spray drier.

In some embodiments, the matrix material is a polymer that is dissolved and mixed with the ion exchange particles and/or filler material using a solvent from the following list: n-methyl-2-pyrrolidone, dimethyl sulfoxide, tetrahydrofuran, dimethylformamide, dimethylacetamide, methyl ethyl ketone, or combinations thereof. In some embodiments, the filler material is a salt that is dissolved and mixed with the ion exchange particles and/or matrix material using a solvent from the following list: water, ethanol, iso-propyl alcohol, acetone, or combinations thereof.

In some embodiments, the filler material is a salt that is dissolved out of the bead to form pores using a solution selected from the following list: water, ethanol, iso-propyl alcohol, a surfactant mixture, an acid a base, or combinations thereof. In some embodiments, the filler material is a material that thermally decomposes to form a gas at high temperature so that the gas can leave the bead to form pores, where the gas is selected from the following list: water vapor, oxygen, nitrogen, chlorine, carbon dioxide, nitrogen oxides, organic vapors, or combinations thereof.

In some embodiments, the porous ion exchange bead is formed from dry powder using a mechanical press, a pellet press, a tablet press, a pill press, a rotary press, or combinations thereof. In some embodiments, the porous ion exchange bead is formed from a solvent slurry by dripping the slurry into a different liquid solution. The solvent slurry is optionally formed using a solvent of n-methyl-2-pyrrolidone, dimethyl sulfoxide, tetrahydrofuran, dimethylformamide, dimethylacetamide, methyl ethyl ketone, or combinations thereof. The different liquid solution is optionally formed using water, ethanol, iso-propyl alcohol, acetone, or combinations thereof.

In some embodiments, the porous ion exchange bead is approximately spherical with an average diameter selected from the following list: less than 10 um, less than 100 um, less than 1 mm, less than 1 cm, or less than 10 cm. In some embodiments, the porous ion exchange bead is approximately spherical with an average diameter selected from the following list: less than 200 um, less than 2 mm, or less than 20 mm. In certain embodiments, the porous ion exchange bead is approximately spherical with an average diameter between 10 um and 2 mm.

In some embodiments, the porous ion exchange bead is tablet-shaped with a diameter of less than 1 mm, less than 2 mm, less than 4 mm, less than 8 mm, or less than 20 mm and with a height of less than 1 mm, less than 2 mm, less than 4 mm, less than 8 mm, or less than 20 mm. In certain embodiments, the porous ion exchange bead is tablet-shaped with a diameter between 500 um and 10 mm.

In some embodiments, the porous ion exchange bead is embedded in a support structure, which is optionally a membrane, a spiral-wound membrane, a hollow fiber membrane, or a mesh. In some embodiments, the porous ion exchange bead is embedded on a support structure comprised of a polymer, a ceramic, or combinations thereof. In some embodiments, the porous ion exchange bead is loaded directly into an ion exchange column with no additional support structure.

In some embodiments, the liquid resource is selected from the following list: a natural brine, a dissolved salt flat, a geothermal brine, seawater, concentrated seawater, desalination effluent, a concentrated brine, a processed brine, liquid from an ion exchange process, liquid from a solvent extraction process, a synthetic brine, leachate from ores, leachate from minerals, leachate from clays, leachate from recycled products, leachate from recycled materials, or combinations thereof. In some embodiments, a liquid resource is selected from the following list: a natural brine, a dissolved salt flat, a concentrated brine, a processed brine, a synthetic brine, a geothermal brine, liquid from an ion exchange process, liquid from a solvent extraction process, leachate from minerals, leachate from clays, leachate from recycled products, leachate from recycled materials, or combinations thereof. In some embodiments, the liquid resource is optionally pre-treated prior to entering the ion exchange reactor to remove suspended solids, hydrocarbons, or organic molecules. In some embodiments, the liquid resource is optionally enter the ion exchange reactor without any pre-treatment following from its source.

In some embodiments, the liquid resource is selected with a lithium concentration selected from the following list: less than 100,000 mg/L, less than 10,000 mg/L, less than 1,000 mg/L, less than 100 mg/L, less than 10 mg/L, or combinations thereof. In some embodiments, a liquid resource is selected with a lithium concentration selected from the following list: less than 5,000 mg/L, less than 500 mg/L, less than 50 mg/L, or combinations thereof.

Process of Extracting Lithium from a Liquid Resource

In one aspect described herein, is a process for lithium extraction from a liquid resource comprising treating ion exchange beads alternately with acid, brine, and optionally other solutions, in a configuration where the beads move in the net opposite direction to the acid, brine, and optionally other solutions, thereby producing a lithium-enriched solution from the liquid resource. In one embodiment, the process comprises: (a) treating the ion exchange beads with acid under conditions suitable to absorb hydrogen to generate hydrogen-enriched beads and release lithium to generate a lithium-enriched solution; (b) optionally, washing the hydrogen-enriched beads with water to generate hydrogen-enriched beads substantially free of residual acid; (c) treating the hydrogen-enriched beads with the liquid resource under conditions suitable to absorb lithium to generate lithium-enriched beads; (d) optionally, washing the lithium-enriched beads with water to generate lithium-enriched beads substantially free of liquid resource; and (e) repeating the cycle to produce a lithium-enriched solution from the liquid resource.

In some embodiment, the process of extracting lithium occurs by contacting solutions described above with ion exchange beads occurs within one or more of the devices for lithium extraction disclosed herein. Examples of lithium extraction with such devices are provided in examples 1 to 18 and associated figures.

In one aspect described herein, is a process for lithium extraction from a liquid resource comprising treating ion exchange material alternately with acid, brine, and optionally other solutions, in a configuration where the ion exchange material moves in the net opposite direction to the acid, brine, and optionally other solutions, thereby producing a lithium-enriched solution from the liquid resource. In one aspect described herein, is a process for lithium extraction from a liquid resource comprising treating ion exchange material alternately with acid, the liquid resource, and optionally other solutions, in a configuration where the ion exchange material moves in the net opposite direction to the acid, liquid resource, and optionally other solutions, thereby producing a lithium-enriched solution from the liquid resource. In one aspect described herein, is a process for lithium extraction from a liquid resource comprising treating ion exchange material alternately with acid, brine, and optionally other solutions, in a configuration where the ion exchange material moves in the net opposite direction to the acid, brine, and optionally other solutions, thereby producing a lithium-enriched solution from the brine. In one embodiment, the process comprises: (a) treating the ion exchange material with acid under conditions suitable to absorb hydrogen to generate hydrogen-enriched material and release lithium to generate a lithium-enriched solution; (b) optionally, washing the hydrogen-enriched material with water to generate hydrogen-enriched material substantially free of residual acid; (c) treating the hydrogen-enriched material with the liquid resource under conditions suitable to absorb lithium to generate lithium-enriched material; (d) optionally, washing the lithium-enriched beads with water to generate lithium-enriched beads substantially free of liquid resource; and (e) repeating the cycle to produce a lithium-enriched solution from the liquid resource.

In one embodiment, the ion exchange beads comprise ion exchange particles that reversibly exchange lithium and hydrogen and a structural matrix material, and having a pore network. In one embodiment, the liquid resource comprises a natural brine, a dissolve salt flat, a concentrated brine, a processed brine, a filtered brine, a liquid from an ion exchange process, a liquid from a solvent extraction process, a synthetic brine, leachate from ores, leachate from minerals, leachate from clays leachate from recycled products, leachate from recycled materials, or combinations thereof.

In some embodiments herein, is a process for lithium extraction from a liquid resource comprising treating ion exchange beads alternately with acid, brine, and optionally other solutions, in a configuration where the beads move in the net opposite direction to the acid, brine, and optionally other solutions, thereby producing a lithium-enriched solution from the liquid resource, wherein the process comprises: a) treating the ion exchange beads with acid under conditions suitable to absorb hydrogen to generate hydrogen-enriched beads and release lithium to generate a lithium-enriched solution; b) optionally, washing the hydrogen-enriched beads with water to generate hydrogen-enriched beads substantially free of residual acid; c) treating the hydrogen-enriched beads with the liquid resource under conditions suitable to absorb lithium to generate lithium-enriched beads; d) optionally, washing the lithium-enriched beads with water to generate lithium-enriched beads substantially free of liquid resource; and e) repeating the cycle to produce a lithium-enriched solution from the liquid resource.

In one aspect described herein, is a process for lithium extraction from a liquid resource comprising treating ion exchange particles alternately with the liquid resource, washing fluid, and acid, in a system for the extraction of lithium ions from a liquid resource, comprising: a. an ion exchange material; b. a ion exchange vessel; and c. a pH modulating setup for increasing the pH of the liquid resource in the system.

In one aspect described herein, is a process for lithium extraction from a liquid resource comprising treating ion exchange particles alternately with the liquid resource, a washing fluid, and an acid solution, with a system for the extraction of lithium ions from a liquid resource, comprising a stirred rank reactor, an ion exchange material, a pH modulating setup for increasing the pH of the liquid resource in the ion exchange vessel, and a compartment for containing the ion exchange material in the ion exchange vessel while allowing for removal of liquid resource, washing fluid, and acid solutions from the ion exchange vessel.

Process of Modulating pH for the Extraction of Lithium

An aspect of the invention described herein is a process for the extraction of lithium ions from a liquid resource, comprising: a) contacting an ion exchange material with the liquid resource; and b) increasing the pH of the liquid resource before contact with the ion exchange material, during contact with the ion exchange material, after contact with the ion exchange material and combinations thereof.

In some embodiment, the process of contacting a liquid resource with an ion exchange material occurs within one or more of the devices for lithium extraction disclosed herein. In some embodiments, several such devices are connected, and the liquid resource undergoes a treatment to increase its pH when flowing from one such vessel to the next. Examples of networks of such devices incorporating a process wherein the pH of the liquid resource is increased are included in examples 9 to 14 and 17, and associated figures.

Another aspect described herein is a process for the extraction of lithium ions from a liquid resource, comprising: a) contacting an ion exchange material with the liquid resource; and b) increasing the pH of the liquid resource before contact with the ion exchange material, during contact with the ion exchange material, after contact with the ion exchange material, or combinations thereof. In some embodiments of the process, increasing the pH of the liquid resource is before contacting the ion exchange material with the liquid resource. In some embodiments of the process, increasing the pH of the liquid resource is during contacting the ion exchange material with the liquid resource. In some embodiments of the process, increasing the pH of the liquid resource is after contacting the ion exchange material with the liquid resource. In some embodiments of the process, increasing the pH of the liquid resource is before and during contacting the ion exchange material with the liquid resource. In some embodiments of the process, increasing the pH of the liquid resource is before and after contacting the ion exchange material with the liquid resource. In some embodiments of the process, increasing the pH of the liquid resource is during and after contacting the ion exchange material with the liquid resource. In some embodiments of the process, increasing the pH of the liquid resource is before, during, and after contacting the ion exchange material with the liquid resource.

An aspect of the invention described herein is a process, wherein the ion exchange material is loaded into a column. In an embodiment, the process further comprises: a) loading a liquid resource into one or more liquid resource tanks; b) connecting the column to the one or more liquid resource tanks; and c) passing the liquid resource from the one or more liquid resource tanks through the column, wherein the passing of the liquid resource occurs at least once. In an embodiment, the process further comprises increasing the pH of the liquid resource in one or more pH increasing tanks. In an embodiment, the process further comprises settling precipitates in one or more settling tanks. In an embodiment, the process further comprises storing the liquid resource in one or more storing tanks prior to or after circulating the liquid resource through the column.

An aspect of the invention described herein is a process, wherein the process further comprises: a) loading the liquid resource into one or more liquid resource tanks; b) connecting the column to the one or more liquid resource tanks; c) passing the liquid resource from the one or more liquid resource tanks through the column, wherein the passing of the liquid resource occurs at least once; d) increasing the pH of the liquid resulting from c. in one or more pH increasing tanks; e) settling precipitates of the liquid resulting from d. in one or more settling tanks; and f) storing the liquid resulting from e. in one or more storing tanks.

An aspect of the invention described herein is a process, wherein the ion exchange material is loaded in a plurality of columns. In an embodiment, a plurality of tanks is connected to the plurality of columns, wherein each of the plurality of tanks is immediately connected to one of the plurality of columns. In an embodiment, two or more of the plurality of columns forms at least one circuit. In an embodiment, at least one circuit is selected from a liquid resource circuit, a water washing circuit and an acid solution circuit. In an embodiment, the pH of the liquid resource is increased in the plurality of tanks connected to the plurality of columns in the liquid resource circuit. In an embodiment, the liquid resource circuit includes a plurality of columns connected to a plurality of tanks, wherein each of the plurality of tanks is immediately connected to one of the plurality of columns.

An aspect of the invention described herein is a process, wherein the process further comprises: a) passing the liquid resource through a plurality of columns in the liquid resource circuit; b) passing an acid solution through a plurality of columns in the acid solution circuit one or more times; and c) passing water through a plurality of columns in the water washing circuit. In an embodiment, the process further comprises interchanging a plurality of columns between the liquid resource circuit, the water washing circuit and the acid solution circuit, such that: a) at least one of the plurality of columns in the liquid resource circuit becomes at least one of the plurality of columns in the water washing circuit and/or at least one of the plurality of columns in the acid solution circuit; b) at least one of the plurality of columns in the water washing circuit becomes at least one of the plurality of columns in the acid solution circuit and/or at least one of the plurality of columns in the liquid resource circuit; and/or c) at least one of the plurality of columns in the acid solution circuit becomes at least one of the plurality of columns in the liquid resource circuit and/or at least one of the plurality of columns in the water washing circuit.

An aspect of the invention described herein is a process, wherein the ion exchange material is loaded into one or more compartments in a tank. In an embodiment, the process further comprises moving the liquid resource through the one or more compartments in the tank. In an embodiment, the tank comprises injection ports. In an embodiment, the process further comprises using the injection ports to increase the pH of the liquid resource before contact with the ion exchange material, during contact with the ion exchange material, after contact with the ion exchange material and combinations thereof.

In some embodiments, the process further comprises using the injection ports to increase the pH of the liquid resource before contact with the ion exchange material, during contact with the ion exchange material, after contact with the ion exchange material, or combinations thereof.

An aspect of the invention described herein is a process, wherein the column further comprises a plurality of injection ports. In an embodiment, the process further comprises using the plurality of injection ports to increase the pH of the liquid resource before contact with the ion exchange material, during contact with the ion exchange material, after contact with the ion exchange material and combinations thereof.

In some embodiments, the process further comprises using the plurality of injection ports to increase the pH of the liquid resource before contact with the ion exchange material, during contact with the ion exchange material, after contact with the ion exchange material, or combinations thereof.

In an embodiment, the ion exchange material comprises a plurality of ion exchange particles. In an embodiment, the plurality of ion exchange particles in the ion exchange material is selected from uncoated ion exchange particles, coated ion exchange particles and combinations thereof. In an embodiment, the ion exchange material is an ion exchange material. In an embodiment, the ion exchange material comprises a network of pores that allows liquids to move quickly from the surface of the ion exchange material to the plurality of ion exchange particles. In an embodiment, the ion exchange material is in the form of ion exchange beads.

In an embodiment, the ion exchange material extracts lithium ions from a liquid resource. During the extraction of lithium ions from a liquid resource by the ion exchange material, the pH of the liquid resource optionally decreases. Increasing the pH of the liquid resource in the system maintains the pH in a range that is suitable for lithium ion uptake by the ion exchange material. In an embodiment, increasing the pH comprises measuring the pH of the system and adjusting the pH of the system to an ideal pH range for lithium extraction. In an embodiment, for ion exchange material to absorb lithium from brine, an ideal pH range for the brine is optionally 6 to 9, a preferred pH range is optionally 4 to 9, and an acceptable pH range is optionally 2 to 9. In an embodiment, increasing the pH comprises measuring the pH of the system and wherein the pH of the system is less than 6, less than 4, or less than 2, the pH of the system is adjusted to a pH of 2 to 9, a pH of 4 to 9, or a pH of 6 to 9.

Continuous Process for Lithium Extraction

Lithium is an essential element for batteries and other technologies. Lithium is found in a variety of liquid resources, including natural and synthetic brines and leachate solutions from minerals, clays, and recycled products. Lithium can be extracted from such liquid resources using an ion exchange process based on inorganic ion exchange materials. These inorganic ion exchange materials absorb lithium from a liquid resource while releasing hydrogen, and then elute lithium in acid while absorbing hydrogen. This ion exchange process can be repeated to extract lithium from a liquid resource and yield a concentrated lithium solution. The concentrated lithium solution can be further processed into chemicals for the battery industry or other industries.

Ion exchange materials are typically small particles, which together constitute a fine powder. Small particle size is required to minimize the diffusion distance that lithium must travel into the core of the ion exchange particles. In some cases, these particles may be coated with protective surface coatings to minimize dissolution of the ion exchange materials while allowing efficient transfer of lithium and hydrogen to and from the particles, as disclosed in U.S. provisional application 62/421,934, filed on Nov. 14, 2016, entitled "Lithium Extraction with Coated Ion Exchange Particles," and incorporated in its entirety by reference.

One major challenge for lithium extraction using inorganic ion exchange particles is the loading of the particles into an ion exchange column in such a way that brine and acid are pumped efficiently through the column with minimal clogging. The materials is formed into beads, and the beads are loaded into the column. This bead loading creates void spaces between the beads, and these void spaces facilitate pumping through the column. The beads hold the ion exchange particles in place and prevent free movement of the particles throughout the column. When the materials are formed into beads, the penetration of brine and acid solutions into the beads may become slow and challenging. A slow rate of convection and diffusion of the acid and brine solutions into the bead slows the kinetics of lithium absorption and release. Such slow kinetics can create problems for column operation. Slow kinetics can require slow pumping rates through the column. Slow kinetics can also lead to low lithium recovery from the brine and inefficient use of acid to elute the lithium.

In some embodiments, the ion exchange beads are ion exchange beads with networks of pores that facilitate the transport into the beads of solutions that are pumped through an ion exchange column. Pore networks are strategically controlled to provide fast and distributed access for the brine and acid solutions to penetrate into the bead and deliver lithium and hydrogen to the ion exchange particles.

In some embodiments, the ion exchange beads are formed by mixing of ion exchange particles, a matrix material, and a filler material. These components are mixed and formed into a bead. Then, the filler material is removed from the bead to leave behind pores. The filler material is dispersed in the bead in such a way to leave behind a pore structure that enables transport of lithium and hydrogen with fast kinetics. This method may involve multiple ion exchange materials, multiple polymer materials, and multiple filler materials.

Another major challenge for lithium extraction using inorganic ion exchange materials is dissolution and degradation of the materials, especially during lithium elution in acid but also during lithium uptake in liquid resources. To yield a concentrated lithium solution from the ion exchange process, it is desirable to use a concentrated acid solution to elute the lithium. However, concentrated acid solutions dissolve and degrade inorganic ion exchange materials, which decreases the performance and lifespan of the materials. Therefore, the ion exchange beads may contain coated ion exchange particle for lithium extraction that are comprised of an ion exchange material and a coating material protecting the particle surface. The coating protects the ion exchange material from dissolution and degradation during lithium elution in acid, during lithium uptake from a liquid resource, and during other aspects of an ion exchange process. This coated particle enables the use of concentrated acids in the ion exchange process to yield concentrated lithium solutions.

In one aspect described herein, the ion exchange material is selected for high lithium absorption capacity, high selectivity for lithium in a liquid resource relative to other ions such as sodium and magnesium, strong lithium uptake in liquid resources including those with low concentrations of lithium, facile elution of lithium with a small excess of acid, and fast ionic diffusion. In one aspect described herein, a coating material is selected to protect the particle from dissolution and chemical degradation during lithium recovery in acid and also during lithium uptake in various liquid resources. In some embodiments, the coating material may also be selected to facilitate one or more of the following objectives: diffusion of lithium and hydrogen between the particles and the liquid resources, enabling adherence of the particles to a structural support, and suppressing structural and mechanical degradation of the particles.

When the ion exchange beads are used in an ion exchange column, the liquid resource containing lithium is pumped through the ion exchange column so that the ion exchange particles absorb lithium from the liquid resource while releasing hydrogen. After the beads have absorbed lithium, an acid solution is pumped through the column so that the particles release lithium into the acid solution while absorbing hydrogen. The column may be operated in co-flow mode with the liquid resource and acid solution alternately flowing through the column in the same direction, or the column may be operated in counter-flow mode with a liquid resource and acid solution alternately flowing through the column in opposite directions. Between flows of the liquid resource and the acid solution, the column may be treated or washed with water or other solutions for purposes such as adjusting pH in the column or removing potential contaminants. The beads may form a fixed or moving bed, and the moving bed may move in counter-current to the brine and acid flows. The beads may be moved between multiple columns with moving beds where different columns are used for brine, acid, water, or other flows. Before or after the liquid resource flows through the column, the pH of the liquid may be adjusted with NaOH or other chemicals to facilitate the ion exchange reaction as well as handling or disposal of the spent liquid resource. Before or after the liquid resource flows through the column, the liquid resource may be subjected to other processes including other ion exchange processes, solvent extraction, evaporation, chemical treatment, or precipitation to remove lithium, to remove other chemical species, or to otherwise treat the brine.

When the ion exchange particles are treated with acid, a lithium solution is produced. This lithium solution may be further processed to produce lithium chemicals. These lithium chemicals may be supplied for an industrial application.

In some embodiments, an ion exchange material is selected from the following list: an oxide, a phosphate, an oxyfluoride, a fluorophosphate, or combinations thereof. In some embodiments, an ion exchange material is selected from the following list: $Li_4Mn_5O_{12}$, $Li_4Ti_5O_{12}$, $Li_2MO_3$ (M=Ti, Mn, Sn), $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, $Al(OH)_3$, $LiCl\cdot xAl(OH)_3\cdot yH_2O$, $SnO_2\cdot xSb_2O_5\cdot yH_2O$, $TiO_2\cdot xSb_2O_5\cdot yH_2O$, solid solutions thereof, or combinations thereof. In some embodiments, an ion exchange material is selected from the following list: $Li_4Mn_5O_{12}$, $Li_4Ti_5O_{12}$, $Li_{1.6}Mn_{1.6}O_4$, $Li_2MO_3$ (M=Ti, Mn, Sn), $LiFePO_4$, solid solutions thereof, or combinations thereof.

In some embodiments, a coating material for protecting the surface of the ion exchange material is selected from the following list: a carbide, a nitride, an oxide, a phosphate, a fluoride, a polymer, carbon, a carbonaceous material, or combinations thereof. In some embodiments, a coating material is selected from the following list: $TiO_2$, $ZrO_2$, $MoO_2$, $SnO_2$, $Nb_2O_5$, $Ta_2O_5$, $SiO_2$, $Li_2TiO_3$, $Li_2ZrO_3$, $Li_2SiO_3$, $Li_2MnO_3$, $Li_2MoO_3$, $LiNbO_3$, $LiTaO_3$, $AlPO_4$, $LaPO_4$, $ZrP_2O_7$, $MoP_2O_7$, $Mo_2P_3O_{12}$, $BaSO_4$, $AlF_3$, SiC, TiC, ZrC, $Si_3N_4$, ZrN, BN, carbon, graphitic carbon, amorphous carbon, hard carbon, diamond-like carbon, solid solutions thereof, or combinations thereof. In some embodiments, a coating material is selected from the following list: $TiO_2$, $ZrO_2$, $MoO_2$, $SiO_2$, $Li_2TiO_3$, $Li_2ZrO_3$, $Li_2SiO_3$, $Li_2MnO_3$, $LiNbO_3$, $AlF_3$, SiC, $Si_3N_4$, graphitic carbon, amorphous carbon, diamond-like carbon, or combinations thereof.

In some embodiments, the ion exchange particles may have an average diameter that is selected from the following list: less than 10 nm, less than 100 nm, less than 1,000 nm, less than 10,000 nm, or less than 100,000 nm. In some embodiments, the ion exchange particles may have an average size that is selected from the following list: less than 200 nm, less than 2,000 nm, or less than 20,000 nm.

In some embodiments, the ion exchange particles may be secondary particles comprised of smaller primary particles that may have an average diameter selected from the following list: less than 10 nm, less than 100 nm, less than 1,000 nm, or less than 10,000 nm.

In some embodiments, the ion exchange particles have a coating material with a thickness selected from the following list: less than 1 nm, less than 10 nm, less than 100 nm, or less than 1,000 nm. In some embodiments, the coating material has a thickness selected from the following list: less than 1 nm, less than 10 nm, or less than 100 nm.

In some embodiments, the ion exchange material and a coating material may form one or more concentration gradients where the chemical composition of the particle ranges between two or more compositions. In some embodiments, the ion exchange materials and the coating materials may form a concentration gradient that extends over a thickness selected from the following list: less than 1 nm, less than 10 nm, less than 100 nm, less than 1,000 nm, less than 10,000 nm, or less than 100,000 nm.

In some embodiments, the ion exchange material is synthesized by a method selected from the following list: hydrothermal, solvothermal, sol-gel, solid state, molten salt flux, ion exchange, microwave, ball milling, precipitation, or vapor deposition. In some embodiments, the ion exchange material is synthesized by a method selected from the following list: hydrothermal, solid state, or microwave.

In some embodiments, a coating material is deposited by a method selected from the following list: chemical vapor deposition, atomic layer deposition, physical vapor deposition, hydrothermal, solvothermal, sol-gel, solid state, molten salt flux, ion exchange, microwave, wet impregnation, precipitation, titration, aging, ball milling, or combinations thereof. In some embodiments, the coating material is deposited by a method selected from the following list: chemical vapor deposition, hydrothermal, titration, solvothermal, wet impregnation, sol-gel, precipitation, microwave, or combinations thereof.

In some embodiments, a coating material is deposited with physical characteristics selected from the following list: crystalline, amorphous, full coverage, partial coverage, uniform, non-uniform, or combinations thereof.

In some embodiments, multiple coatings may be deposited on the ion exchange material in an arrangement selected from the following list: concentric, patchwork, or combinations thereof.

In some embodiments, the matrix is selected from the following list: a polymer, an oxide, a phosphate, or combinations thereof. In some embodiments, a structural support is selected from the following list: polyvinyl fluoride, polyvinylidene difluoride, polyvinyl chloride, polyvinylidene dichloride, polyethylene, polypropylene, polyphenylene sulfide, polytetrafluoroethylene, polytetrofluoroethylene, sulfonated polytetrofluoroethylene, polystyrene, polydivinylbenzene, polybutadiene, sulfonated polymer, carboxylated polymer, Nafion, copolymers thereof, and combinations thereof. In some embodiments, a structural support is selected from the following list: polyvinylidene difluoride, polyvinyl chloride, sulfonated polytetrofluoroethylene, polystyrene, polydivinylbenzene, copolymers thereof, or combinations thereof. In some embodiments, a structural support is selected from the following list: titanium dioxide, zirconium dioxide, silicon dioxide, solid solutions thereof, or combinations thereof. In some embodiments, the matrix material is selected for thermal resistance, acid resistance, and/or other chemical resistance.

In some embodiments, the porous bead is formed by mixing the ion exchange particles, the matrix material, and the filler material together at once. In some embodiments, the porous bead is formed by first mixing the ion exchange particles and the matrix material, and then mixing with the filler material. In some embodiments, the porous bead is formed by first mixing the ion exchange particles and the filler material, and then mixing with the matrix material. In some embodiments, the porous bead is formed by first mixing the matrix material and the filler material, and then mixing with the ion exchange particles.

In some embodiments, the porous bead is formed by mixing the ion exchange particles, the matrix material, and/or the filler material with a solvent that dissolves once or more of the components. In some embodiments, the porous bead is formed by mixing the ion exchange particles, the matrix material, and/or the filler material as dry powders in a mixer or ball mill. In some embodiments, the porous bead is formed by mixing the ion exchange particles, the matrix material, and/or the filler material in a spray drier.

In some embodiments, the matrix material is a polymer that is dissolved and mixed with the ion exchange particles and/or filler material using a solvent from the following list: n-methyl-2-pyrrolidone, dimethyl sulfoxide, tetrahydrofuran, dimethylformamide, dimethylacetamide, methyl ethyl ketone, or combinations thereof. In some embodiments, the filler material is a salt that is dissolved and mixed with the ion exchange particles and/or matrix material using a solvent from the following list: water, ethanol, iso-propyl alcohol, acetone, or combinations thereof.

In some embodiments, the filler material is a salt that is dissolved out of the bead to form pores using a solution selected from the following list: water, ethanol, iso-propyl alcohol, a surfactant mixture, an acid a base, or combinations thereof. In some embodiments, the filler material is a material that thermally decomposes to form a gas at high temperature so that the gas can leave the bead to form pores, where the gas is selected from the following list: water vapor, oxygen, nitrogen, chlorine, carbon dioxide, nitrogen oxides, organic vapors, or combinations thereof.

In some embodiments, the porous ion exchange bead is formed from dry powder using a mechanical press, a pellet press, a tablet press, a pill press, a rotary press, or combinations thereof. In some embodiments, the porous ion exchange bead is formed from a solvent slurry by dripping the slurry into a different liquid solution. The solvent slurry may be formed using a solvent of n-methyl-2-pyrrolidone, dimethyl sulfoxide, tetrahydrofuran, dimethylformamide, dimethylacetamide, methyl ethyl ketone, or combinations thereof. The different liquid solution may be formed using water, ethanol, iso-propyl alcohol, acetone, or combinations thereof.

In some embodiments, the porous ion exchange bead is approximately spherical with an average diameter selected from the following list: less than 10 um, less than 100 um, less than 1 mm, less than 1 cm, or less than 10 cm. In some embodiments, the porous ion exchange bead is approximately spherical with an average diameter selected from the following list: less than 200 um, less than 2 mm, or less than 20 mm.

In some embodiments, the porous ion exchange bead is tablet-shaped with a diameter of less than 1 mm, less than 2 mm, less than 4 mm, less than 8 mm, or less than 20 mm and with a height of less than 1 mm, less than 2 mm, less than 4 mm, less than 8 mm, or less than 20 mm.

In some embodiments, the porous ion exchange bead is embedded in a support structure, which may be a membrane, a spiral-wound membrane, a hollow fiber membrane, or a mesh. In some embodiments, the porous ion exchange bead is embedded on a support structure comprised of a polymer, a ceramic, or combinations thereof. In some embodiments, the porous ion exchange bead is loaded directly into an ion exchange column with no additional support structure.

In some embodiments, the liquid resource is selected from the following list: a natural brine, a dissolved salt flat, a geothermal brine, seawater, concentrated seawater, desalination effluent, a concentrated brine, a processed brine, liquid from an ion exchange process, liquid from a solvent extraction process, a synthetic brine, leachate from ores, leachate from minerals, leachate from clays, leachate from recycled products, leachate from recycled materials, or combinations thereof. In some embodiments, a liquid resource is selected from the following list: a natural brine, a dissolved salt flat, a concentrated brine, a processed brine, a synthetic brine, a geothermal brine, liquid from an ion exchange process, liquid from a solvent extraction process, leachate from minerals, leachate from clays, leachate from recycled products, leachate from recycled materials, or combinations thereof.

In some embodiments, the liquid resource is selected with a lithium concentration selected from the following list: less than 100,000 mg/L, less than 10,000 mg/L, less than 1,000 mg/L, less than 100 mg/L, less than 10 mg/L, or combinations thereof. In some embodiments, a liquid resource is selected with a lithium concentration selected from the following list: less than 5,000 mg/L, less than 500 mg/L, less than 50 mg/L, or combinations thereof.

In some embodiments, the acid used for recovering lithium from the porous ion exchange beads is selected from the following list: hydrochloric acid, sulfuric acid, phosphoric acid, hydrobromic acid, chloric acid, perchloric acid, nitric acid, formic acid, acetic acid, or combinations thereof. In some embodiments, the acid used for recovering lithium from the porous ion exchange beads is selected from the following list: hydrochloric acid, sulfuric acid, nitric acid, or combinations thereof.

In some embodiments, the acid used for recovering lithium from the porous ion exchange beads has a concentration selected from the following list: less than 0.1 M, less than 1.0 M, less than 5 M, less than 10 M, or combinations thereof.

In some embodiments, the porous ion exchange beads perform the ion exchange reaction repeatedly over a number of cycles selected from the following list: greater than 10 cycles, greater than 30 cycles, greater than 100 cycles, greater than 300 cycles, or greater than 1,000 cycles. In some embodiments, the porous ion exchange beads perform the ion exchange reaction repeatedly over a number of cycles selected from the following list: greater than 50 cycles, greater than 100 cycles, or greater than 200 cycles.

In some embodiments, the concentrated lithium solution that is yielded from the porous ion exchange beads is further processed into lithium raw materials using methods selected from the following list: solvent extraction, ion exchange, chemical precipitation, electrodialysis, electrowinning, evaporation with direct solar energy, evaporation with concentrated solar energy, evaporation with a heat transfer medium heated by concentrated solar energy, evaporation with heat from a geothermal brine, evaporation with heat from combustion, or combinations thereof.

In some embodiments, the concentrated lithium solution that is yielded from the porous ion exchange beads is further processed into lithium chemicals selected from the following list: lithium chloride, lithium carbonate, lithium hydroxide, lithium metal, lithium metal oxide, lithium metal phosphate, lithium sulfide, or combinations thereof. In some embodiments, the concentrated lithium solution that is yielded from the porous ion exchange beads is further processed into lithium chemicals that are solid, liquid, hydrated, or anhydrous.

In some embodiments, the lithium chemicals produced using the porous ion exchange beads are used in an industrial application selected from the following list: lithium batteries, metal alloys, glass, grease, or combinations thereof. In some embodiments, the lithium chemicals produced using the coated ion exchange particles are used in an application selected from the following list: lithium batteries, lithium-ion batteries, lithium sulfur batteries, lithium solid-state batteries, and combinations thereof.

In some embodiments, the ion exchange materials are synthesized in a lithiated state with a sublattice fully or partly occupied by lithium. In some embodiments, the ion exchange materials are synthesized in a hydrated state with a sublattice fully or partly occupied by hydrogen.

System of Modulating pH for the Extraction of Lithium

The release of hydrogen during lithium uptake will acidify the brine and limit lithium uptake unless the pH of the brine is optionally maintained in a suitable range to facilitate thermodynamically favorable lithium uptake and concomitant hydrogen release. To control the pH of the brine and maintain the pH in a range that is suitable for lithium uptake in an ion exchange column, bases such as NaOH, $Ca(OH)_2$, CaO, KOH, or $NH_3$ are optionally added to the brine as solids, aqueous solutions, or in other forms. For brines that contain divalent ions such as Mg, Ca, Sr, or Ba, addition of base to the brine causes precipitation of solids, such as $Mg(OH)_2$ or $Ca(OH)_2$, which can cause problems for the ion exchange reaction. These precipitates cause problems in at least three ways. First, precipitation removes base from solution, leaving less base available in solution to neutralize protons and maintain pH in a suitable range for lithium uptake in the ion exchange column. Second, precipitates that form due to base addition can clog the ion exchange column, including clogging the surfaces and pores of ion exchange beads and the voids between ion exchange beads. This clogging can prevent lithium from entering the beads and being absorbed by the ion exchange material. The clogging can also cause large pressure heads in the column. Third, precipitates in the column dissolve during acid elution and thereby contaminate the lithium concentrate produced by the ion exchange system. For ion exchange beads to absorb lithium from brine, an ideal pH range for the brine is optionally 6 to 9, a preferred pH range is optionally 4 to 9, and an acceptable pH range is optionally 2 to 9.

An aspect of the invention described herein is an ion exchange reactor for lithium extraction with a form that allows for pH control during lithium uptake from a brine or other lithium ion-containing liquid resource. This reactor functions to neutralize hydrogen that is released during lithium uptake, while solving the problems associated with precipitation from base addition.

An aspect of the invention described herein is a system for the extraction of lithium ions from a liquid resource, comprising: a) an ion exchange material; and b) a pH modulating setup for increasing pH of the liquid resource in the system. The ion exchange material extracts lithium ions from a liquid resource. During the extraction of lithium ions from a liquid resource by the ion exchange material, the pH of the liquid resource optionally decreases. Increasing the pH of the liquid resource in the system by using a pH modulating setup maintains the pH in a range that is suitable for lithium ion uptake by the ion exchange material. In an embodiment, the pH modulating setup comprises measuring the pH of the system and adjusting the pH of the system to an ideal pH range for lithium extraction. In an embodiment, for ion exchange material to absorb lithium from brine, an ideal pH range for the brine is optionally 6 to 9, a preferred pH range is optionally 4 to 9, and an acceptable pH range is optionally 2 to 9. In an embodiment, the pH modulating setup comprises measuring the pH of the system and wherein the pH of the system is less than 6, less than 4, or less than 2, the pH of the system is adjusted to a pH of 2 to 9, a pH of 4 to 9, or a pH of 6 to 9.

Recirculating Batch System

In an embodiment of the system, the ion exchange material is loaded in a column. In an embodiment of the system, the pH modulating setup is connected to the column loaded with the ion exchange material. In an embodiment of the system, the pH modulating setup comprises one or more tanks.

In some embodiments of the systems described herein, the ion exchange material is loaded in a vessel. In some embodiments, the pH modulating setup is in fluid communication with the vessel loaded with the ion exchange material. In some embodiments, the pH modulating setup is in fluid communication with the column loaded with the ion exchange material.

In one embodiment of the system, one or more ion exchange columns are loaded with a fixed or fluidized bed of ion exchange beads. In one embodiment of the system, the ion exchange column is a cylindrical construct with entry and exit ports. In a further embodiment, the ion exchange column is optionally a non-cylindrical construct with entry and exit ports. In a further embodiment, the ion exchange column optionally has entry and exit ports for brine pumping, and additional doors or hatches for loading and unloading ion exchange beads to and from the column. In a further embodiment, the ion exchange column is optionally equipped with one or more security devices to decrease the risk of theft of the ion exchange beads. In one embodiment, these beads contain ion exchange material that can reversibly absorb lithium from brine and release lithium in acid. In one embodiment, the ion exchange material is comprised of particles that are optionally protected with coating material such as $SiO_2$, $ZrO_2$, or $TiO_2$ to limit dissolution or degradation of the ion exchange material. In one embodiment, these beads contain a structural component such as an acid-resistant polymer that binds the ion exchange materials. In one embodiment, the beads contain pores that facilitate penetration of brine, acid, aqueous, and other solutions into the beads to deliver lithium and hydrogen to and from the bead or to wash the bead. In one embodiment, the bead pores are structured to form a connected network of pores with a distribution of pore sizes and are structured by incorporating filler materials during bead formation and later removing that filler material in a liquid or gas.

In one embodiment of the system, the system is a recirculating batch system, which comprises an ion exchange column that is connected to one or more tanks for mixing base into the brine, settling out any precipitates following base addition, and storing the brine prior to reinjection into the ion exchange column or the other tanks. In one embodiment of the recirculating batch system, the brine is loaded into one or more tanks, pumped through the ion exchange column, pumped through a series of tanks, and then returned to the ion exchange column in a loop. In one embodiment, the brine optionally traverses this loop repeatedly. In one embodiment, the brine is recirculated through the ion exchange column to enable optimal lithium uptake by the beads. In one embodiment, base is added to the brine in such a way that pH is maintained at an adequate level for lithium uptake and in such a way that the amount of base-related precipitates in the ion exchange column is minimized.

In one embodiment, as the brine is pumped through the recirculating batch system, the brine pH drops in the ion exchange column due to hydrogen release from the ion exchange beads during lithium uptake, and the brine pH is adjusted upward by the addition of base as a solid, aqueous solution, or other form. In one embodiment, the ion exchange system drives the ion exchange reaction to near completion, and the pH of the brine leaving the ion exchange column approaches the pH of the brine entering the ion exchange column. In one embodiment, the amount of base added is optionally controlled to neutralize the hydrogen released by the ion exchange beads in such a way that no basic precipitates form. In one embodiment, an excess of base or a transient excess of base is optionally added in such a way that basic precipitates form. In one embodiment, the basic precipitates form transiently and then are redissolved partially or fully by the hydrogen that is released from the ion exchange column. In one embodiment of the system, base is optionally added to the brine flow prior to the ion exchange column, after the ion exchange column, prior to one or more tanks, or after one or more tanks.

In one embodiment of the recirculating batch system, the tanks include a mixing tank where the base is mixed with the brine. In one embodiment, the tanks include a settling tank, where precipitates such as $Mg(OH)_2$ optionally settle to the bottom of the settling tank to avoid injection of the precipitates into the ion exchange column. In one embodiment, the tanks include a storage tank where the brine is stored prior to reinjection into the ion exchange column, mixing tank, settling tank, or other tanks. In one embodiment, the tanks include an acid recirculation tank. In one embodiment, some tanks in the recirculating batch reactor optionally serve a combination of purposes including base mixing tank, settling tank, acid recirculation tank, or storage tank. In any embodiment, a tank optionally does not fulfil two functions at the same time. For example, a tank is not a base mixing tank and a settling tank.

In one embodiment of the recirculating batch system, base is added to a mixing tank, which is optionally a continuous stirred tank system, a confluence of acidified brine flow and base flow followed by a static mixer, a confluence of acidified brine flow and base flow followed by a paddle mixer, a confluence of acidified brine flow and base flow followed by a turbine impeller mixer, or a continuous stirred tank system in the shape of a vertical column which is well mixed at the bottom and settled near the top. In one embodiment, the base is optionally added as a solid or as an aqueous solution. In one embodiment, the base is optionally added continuously at a constant or variable rate. In one embodiment, the base is optionally added discretely in constant or variable aliquots or batches. In one embodiment, the base is optionally added according to one or more pH meters, which optionally samples brine downstream of the ion exchange column or elsewhere in the recirculating batch system. In one embodiment, filters are optionally used to prevent precipitates from leaving the mixing tank. In one embodiment, the filters are optionally plastic mesh screens, small packed columns containing granular media such as sand, silica, or alumina, small packed columns containing porous media filter, or a membrane.

In one embodiment of the recirculating batch system, the settling tank is optionally a settling tank with influent at bottom and effluent at top or a settling tank with influent on one end and effluent on another end. In one embodiment, chambered weirs are used to fully settle precipitates before brine is recirculated into reactor. In one embodiment, solid base precipitates are collected at the bottom of the settling tank and recirculated into the mixer. In one embodiment, precipitates such as $Mg(OH)_2$ optionally settle near the bottom of the tank. In one embodiment, brine is removed from the top of the settling tank, where the amount of suspended precipitates is minimal. In one embodiment, the precipitates optionally settle under forces such as gravity, centrifugal action, or other forces. In one embodiment, filters are optionally used to prevent precipitates from leaving the settling tank. In one embodiment, the filters are optionally plastic mesh screens, small packed columns containing granular media such as sand, silica, or alumina, small packed columns containing porous media filter, or a membrane. In one embodiment, baffles are optionally used to ensure settling of the precipitate and to prevent the precipitate from exiting the settling tank and entering the column.

In one embodiment of the recirculating batch system, basic precipitates are optionally collected from the settling tank and reinjected into the brine in a mixing tank or elsewhere to adjust the pH of the brine.

In one embodiment of the recirculating batch system, one or more ion exchange columns are optionally connected to one or more tanks or set of tanks. In one embodiment of the recirculating batch system, there are optionally multiple ion exchange columns recirculating brine through a shared set of mixing, settling, and storage tanks. In one embodiment of the recirculating batch system, there is optionally one ion exchange column recirculating brine through multiple sets of mixing, settling, and storage tanks.

Column Interchange System

An aspect of the invention described herein is a system wherein the ion exchange material is loaded in a plurality of columns. In an embodiment, the pH modulating setup comprises a plurality of tanks connected to the plurality of columns, wherein each of the plurality of tanks is immediately connected to one of the plurality of columns. In an embodiment, two or more of the plurality of tanks connected to the plurality of columns forms at least one circuit. In an embodiment, three or more of the plurality of tanks connected to the plurality of columns forms at least two circuits. In an embodiment, three or more of the plurality of tanks connected to the plurality of columns forms at least three circuits. In an embodiment, at least one circuit is a liquid resource circuit. In an embodiment, at least one circuit is a water washing circuit. In an embodiment, at least one circuit is an acid solution circuit. In an embodiment, at least two circuits are water washing circuits.

In one embodiment of the ion exchange system, the system is a column interchange system where a series of ion exchange columns are connected to form a brine circuit, an acid circuit, a water washing circuit, and optionally other circuits. In one embodiment of the brine circuit, brine flows through a first column in the brine circuit, then into a next column in the brine circuit, and so on, such that lithium is removed from the brine as the brine flows through one or more columns. In one embodiment of the brine circuit, base is added to the brine before or after each ion exchange column or certain ion exchange columns in the brine circuit to maintain the pH of the brine in a suitable range for lithium uptake by the ion exchange beads. In one embodiment of the acid circuit, acid flows through a first column in the acid circuit, then into the next column in the acid circuit, and so on, such that lithium is eluted from the columns with acid to produce a lithium concentrate. In one embodiment of the acid circuit, acid flows through a first column in the acid circuit, then optionally into a next column in the acid circuit, and so on, such that lithium is eluted from the columns with acid to produce a lithium concentrate. In one embodiment of the water washing circuit, water flows through a first column in the water washing circuit, then optionally into a next column in the water washing circuit, and so on, such that brine in the void space, pore space, or head space of the columns in the water washing circuit is washed out.

In one embodiment of the column interchange system, ion exchange columns are interchanged between the brine circuit, the water washing circuit, and the acid circuit. In one embodiment, the first column in the brine circuit is loaded with lithium and then interchanged into the water washing circuit to remove brine from the void space, pore space, or head space of the column. In one embodiment, the first column in the water washing circuit is washed to remove brine, and then interchanged to the acid circuit, where lithium is eluted with acid to form a lithium concentrate. In one embodiment, the first column in the acid circuit is eluted with acid and then interchanged into the brine circuit to absorb lithium from the brine. In one embodiment of the column interchange system, two water washing circuits are used to wash the columns after both the brine circuit and the acid circuit. In one embodiment of the column interchange system, only one water washing circuit is used to wash the columns after the brine circuit, whereas excess acid is neutralized with base or washed out of the columns in the brine circuit.

In one embodiment of the column interchange system, the first column in the brine circuit is interchanged to become the last column in the water washing circuit. In one embodiment of the column interchange system, the first column in the water washing circuit is interchanged to become the last column in the acid circuit. In one embodiment of the column interchange system, the first column in the acid circuit is interchanged to become the last column in the brine circuit.

In one embodiment of the column interchange system, each column in the brine circuit contains one or more tanks or junctions for mixing base into the brine and optionally settling any basic precipitates that form following base addition. In one embodiment of the column interchange system, each column in the brine circuit has associated one or more tanks or junctions for removing basic precipitates or other particles via settling or filtration. In one embodiment of the column interchange system, each column or various clusters of columns have associated one or more settling tanks or filters that remove particles including particles that detach from ion exchange beads.

In one embodiment of the column interchange system, the number of the columns in the brine circuit is optionally less than about 3, less than about 10, less than about 30, or less than about 100. In one embodiment of the column interchange system, the number of the columns in the acid circuit is optionally less than about 3, less than about 10, less than about 30, or less than about 100. In one embodiment of the column interchange system, the number of the columns in the water washing circuit is optionally less than about 3, less than about 10, less than about 30, or less than about 100. In certain embodiments, the number of columns in the brine circuit is 1 to 10. In some embodiments, the number of columns in the acid circuit is 1 to 10. In some embodiments, the number of columns in washing circuit is 1 to 10.

In one embodiment of the column interchange system, there is optionally one or more brine circuits, one or more acid circuits, and one or more water washing circuits. In one embodiment of the column interchange system, ion exchange columns are optionally supplied with fresh ion exchange beads without interruption to operating columns. In one embodiment of the column interchange system, ion exchange columns with beads that have been depleted in capacity is optionally replaced with ion exchange columns with fresh ion exchange beads without interruption to operating columns.

In one embodiment of the column interchange system, the columns contain fluidized beds of ion exchange material. In one embodiment of the column interchange system, the columns have means of created a fluidized bed of ion exchange material such as overhead stirrers or pumps. In one embodiment of the column interchange system, the columns contain fluidized beds of ion exchange material. In one embodiment of the ion exchange system, the system is an interchange system and the vessels are ion exchange vessels. In one embodiment of the interchange system, base may be added directly to the columns or other tanks containing the ion exchange material. In one embodiment of the interchange system, base may be added to the brine or another solution in a separate mixing tank and then added to the columns or other tanks containing the ion exchange material.

In one embodiment of the ion exchange system, ion exchange beads are loaded into ion exchange columns and following lithium uptake from brine, lithium is eluted from the ion exchange columns using an acid recirculation loop. In one embodiment of the acid recirculation loop, acid is flowed through an ion exchange column, into a tank, and then recirculated through the ion exchange column to optimize lithium elution. In one embodiment of the ion exchange system, ion exchange beads are loaded into ion exchange columns and following lithium uptake from brine, lithium is eluted from each ion exchange column using a once-through flow of acid. In one embodiment of the ion exchange system, ion exchange beads are loaded into an ion exchange column and following lithium uptake from brine, lithium is eluted from the ion exchange column using a column interchange circuit.

In one embodiment of the ion exchange system, ion exchange columns are loaded with lithium by flowing brine through the columns using a recirculating batch system and then lithium is eluted from the columns using a column interchange system. In one embodiment of the ion exchange system, ion exchange columns are loaded with lithium by flowing brine through the columns using a column interchange system and then lithium is eluted from the columns using a recirculating batch system. In one embodiment of the ion exchange system, ion exchange columns are loaded with lithium by flowing brine through the columns using a recirculating batch system and then lithium is eluted from the columns using a recirculating batch system. In one embodiment of the ion exchange system, ion exchange columns are loaded with lithium by flowing brine through the columns using a column interchange system and then lithium is eluted from the columns using a column interchange system.

Stirred Tank System

An aspect of the invention described herein is a system wherein the pH modulating setup is a tank comprising: a) one or more compartments; and b) a means for moving the liquid resource through the one or more compartments. In an embodiment, the ion exchange material is loaded in at least one compartment. In an embodiment, the means for moving the liquid resource through the one or more compartments is a pipe. In a further embodiment, the means for moving the liquid resource through the one or more compartments is a pipe and suitably a configured pump. In an embodiment, the tank further comprises a means for circulating the liquid resource throughout the tank. In an embodiment, the means for circulating the liquid resource throughout the tank is a mixing device. In an embodiment, the tank further comprises an injection port.

In some embodiments, the tank further comprises one or more injection ports. In some embodiments, the tank further comprises a plurality of injection ports.

An aspect described herein is a system for the extraction of lithium ions from a liquid resource, comprising a tank, wherein the tank further comprises: a) one or more compartments; b) an ion exchange material; c) a mixing device; and d) a pH modulating setup for changing the pH of the system, wherein the ion exchange material is used to extract lithium ions from the liquid resource. In one embodiment, the pH modulating setup changes the pH of the liquid resource in the system.

In some embodiments, the ion exchange material is loaded in at least one of the one or more compartments. In some embodiments, the ion exchange material is fluidized in at least one of the one or more compartments. In some embodiments, the ion exchange material is non-fluidized in at least one of the one or more compartments. In some embodiments, the ion exchange material occupies a fixed position in at least one of the one or more compartments.

In some embodiments, the pH modulating setup comprises a pH measuring device and an inlet for adding base. In some embodiments, the pH measuring device is a pH probe. In some embodiments, the inlet is a pipe. In some embodiments, the inlet is an injection port.

In some embodiments, the tank further comprises a porous partition. In some embodiments, the porous partition is a porous polymer partition. In some embodiments, the porous partition is a mesh or membrane. In some embodiments, the porous partition is a polymer mesh or polymer membrane. In some embodiments, the porous partition comprises one or more layers of mesh, membrane, or other porous structure. In some embodiments, the porous partition comprises one or more coarse meshes that provide structural support and one or more fine meshes and/or membranes that provide filtration. In some embodiments, the porous partition comprises a polyether ether ketone mesh, a polypropylene mesh, a polyethylene mesh, a polysulfone mesh, a polyester mesh, a polyamide mesh, a polytetrafluoroethylene mesh, an ethylene tetrafluoroethylene polymer mesh, a stainless steel mesh, a stainless steel mesh coated in polymer, a stainless steel mesh coated in ceramic, or a combination thereof, wherein the mesh is a course mesh, a fine mesh, or a combination thereof. In some embodiments, the porous polymer partition comprises a mesh comprising one or more blends of two or more of a polyether ether ketone, a polypropylene, a polyethylene, a polysulfone, a polyester, a polyamide, a polytetrafluoroethylene, or an ethylene tetrafluoroethylene polymer. In some embodiments, the porous partition comprises a polyether ether ketone membrane, a polypropylene membrane, a polyethylene membrane, a polysulfone membrane, a polyester membrane, a polyamide membrane, a polytetrafluoroethylene membrane, an ethylene tetrafluoroethylene polymer membrane, or combinations thereof.

In one embodiment of the ion exchange system, the system is a stirred tank system comprised of a tank of brine containing permeable bead compartments such as permeable pallets, cases, boxes, or other containers that are loaded with ion exchange beads, and the brine is stirred through the tank in a batch process. In one embodiment of the stirred tank system, the base is optionally added directly to the tank gradually or all at once as a solid or in an aqueous solution. In one embodiment of the stirred tank system, after a brine uptake stage is complete, the permeable bead containers are optionally moved to another tank for acid elution. In one embodiment of the stirred tank system, the permeable bead compartments are located at the bottom of the stirred tank during the brine stage and after the brine stage is completed, then brine is removed, and the bottom of the stirred tank is filled with acid to elute lithium in such a way that the permeable bead compartments are covered with an optimal volume of acid.

In one embodiment of the stirred tank system, the ion exchange beads are suspended using plastic structural supports in a tank with an internal mixing device. In one embodiment of the stirred tank system, a stream of brine is removed from the tank and passed through a column where hydrogen ions in the brine produced by ion exchange are neutralized using sacrificial base in solution or added as solid, or by an ion exchange resin. This pH-corrected stream is sent back into the system where the lithium is continued to be removed. In one embodiment of the stirred tank system, brine that has passed through the bead compartment is returned to the opposite end of the tank through a pipe that is optionally internal or external to the tank. In one embodiment of the stirred tank system, base is optionally added to the brine inside the tank or in a base addition tank outside the tank.

In one embodiment of the stirred tank system, fresh brine is fed to the system so as to operate in continuous stirred tank system mode instead of batch mode. In one embodiment of the recirculating batch system, fresh brine is fed to the system so as to operate in continuous stirred tank system mode instead of batch mode.

In one embodiment of the ion exchange system, the ion exchange material is mixed with a liquid resource in a stirred tank reactor. In one embodiment, the ion exchange material may be comprised of coated particles, uncoated particles, porous beads, or combinations thereof.

In one embodiment of the ion exchange system, a stirred tank reactor is used to fluidize the ion exchange material in a liquid resource to enable absorption of lithium from the liquid resource into the ion exchange material. In one embodiment, a stirred tank reactor is used to fluidize the ion exchange material in a washing fluid to remove residual brine, acid, or other contaminants from the ion exchange materials. In one embodiment, a stirred tank reactor is used to fluidize the ion exchange material in an acid solution to elute lithium from the ion exchange material while replacing the lithium in the ion exchange material with protons. In one embodiment, a single stirred tank reactor is used to mix ion exchange material with a liquid resource, washing fluid, and acid solution.

In some embodiments, the system for the extraction of lithium ions from a liquid resource, comprising a tank, wherein the tank further comprises: a) one or more compartments; b) an ion exchange material; c) a mixing device; and d) a pH modulating setup for changing the pH of the liquid resource in the system, wherein the ion exchange material is used to extract lithium ions from the liquid resource, further comprises another tank, wherein the other tank further comprises: a) one or more compartments; b) an ion exchange material; c) a mixing device; and d) a pH modulating setup for changing the pH of the liquid resource in the system. In some embodiments, the tank is in fluid communication with the other tank.

In some embodiments, the system for the extraction of lithium ions from a liquid resource, comprising a tank, wherein the system further comprises another tank, wherein the other tank further comprises: a) one or more compartments; b) an ion exchange material; c) a mixing device; and d) an acid inlet for adding acid to the system. In a further embodiment, the ion exchange material is moved between the tank and the other tank.

In some embodiments, the system for the extraction of lithium ions from a liquid resource, comprising a tank, wherein the tank further comprises: a) one or more compartments; b) an ion exchange material; c) a mixing device; and d) a pH modulating setup for changing the pH of the liquid resource in the system, wherein the ion exchange material is used to extract lithium ions from the liquid resource, further comprises a plurality of tanks, each tank further comprising: a) one or more compartments; b) an ion exchange material; c) a mixing device; and d) a pH modulating setup for changing the pH of the liquid resource in the system. In some embodiments, each tank of the system is in fluid communication with each other tank of the system.

In some embodiments, the system further comprises another plurality of tanks, wherein each tank further comprises: a) one or more compartments; b) an ion exchange material; and c) a mixing device.

In some embodiments, the system is configured to operate in a batch mode. In some embodiments, the system is configured to operate in a continuous mode. In some embodiments, the system is configured to operate in a batch mode and a continuous mode. In some embodiments, one or more tanks in the system are configured to operate in a batch mode and one or more tanks in the system are configured to operate in a continuous mode. In some embodiments, one or more tanks in the system are configured to operate in a batch mode and one or more tanks in the system are configured to operate in a semi-continuous mode. In some embodiments, one or more tanks in the system are configured to operate in a semi-continuous mode and one or more tanks in the system are configured to operate in a continuous mode. In some embodiments, one or more tanks in the system are configured to operate in a batch mode, one or more tanks in the system are configured to operate in a semi-continuous mode, and one or more tanks in the system are configured to operate in a continuous mode. In some embodiments, the system is configured to operate in a semi-continuous mode, a batch mode, a continuous mode, or combinations thereof.

In one embodiment of the ion exchange system, a plurality of stirred tank reactors are used to mix ion exchange material with a liquid resource, washing fluid, and acid solution. In one embodiment, the stirred tank reactors may be different sizes and may contain different volumes of a liquid resource, washing fluid, and acid solution. In one embodiment, the stirred tanks may be cylindrical, conical, rectangular, pyramidal, or a combination thereof. In one embodiment of the ion exchange system, the ion exchange material may move through the plurality of stirred tank reactors in the opposite direction of the liquid resource, the washing fluid, or the acid solution.

In one embodiment of the ion exchange system, a plurality of stirred tank reactors may be used where one or more stirred tank reactors mix the ion exchange material with a liquid resource, one or more stirred tank reactors mix the ion exchange material with a washing fluid, and one or more stirred tank reactors mix the ion exchange material with an acid solution.

In one embodiment of the ion exchange system, stirred tank reactors may be operated in a continuous, semi-continuous, or batch mode where a liquid resource flows continuously, semi-continuously, or batch-wise through the stirred tank reactor. In one embodiment of the ion exchange system, stirred tank reactors may be operated in a continuous, semi-continuous, or batch mode where the ion exchange material flows continuously, semi-continuously, or batch-wise through the stirred tank reactor. In one embodiment of the ion exchange system, stirred tank reactors may be operated in a mode where the ion exchange material remains in the tank while flows of liquid resource, washing fluid, or acid solution are flowed through the tank in continuous, semi-continuous, or batch flows.

In one embodiment, ion exchange material may be loaded into or removed from the stirred tank reactors through the top, the bottom, or the side of the tank.

In one embodiment of the ion exchange system, stirred tank reactors may comprise one or more compartments. In one embodiment, the compartments may contain ion exchange material in a bed that is fluidized, fixed, partially fluidized, partially fixed, alternatively fluidized, alternatively fixed, or combinations thereof. In one embodiment, the compartments may be comprised of a porous support at the bottom of the compartment, the sizes of the compartment, the top of the compartment, or combinations thereof. In one embodiment, the compartments may be conical, cylindrical, rectangular, pyramidal, other shapes, or combinations thereof. In one embodiment, the compartment may be located at the bottom of the tank. In one embodiment, the shape of the compartment may conform to the shape of the stirred tank reactor. In one embodiment, the compartment may be partially or fully comprised of the tank of the stirred tank reactor.

In one embodiment, the compartment may be comprised of a porous structure. In one embodiment, the compartment may be comprised of a polymer, a ceramic, a metal, or combinations thereof. In one embodiment, the compartment may be comprised be comprised partially or fully of a porous material or a mesh. In one embodiment, the compartment may be at the top of the tank. In one embodiment, the compartment may be separated from the rest of the tank with one or more porous materials. In one embodiment, the compartment may be at the top of the tank. In one embodiment, the compartment may be separated from the rest of the tank with a bilayer mesh comprising one layer of coarse mesh for strength and one layer of fine mesh to contain smaller particles in the compartment. In one embodiment, the compartment may allow liquid to flow freely through the stirred tank reactor and through the compartment. In one embodiment, the compartment may be open on the top. In one embodiment, the compartment may contain the ion exchange material in the tank but allow the ion exchange material to move throughout the tank. In one embodiment, the compartment may comprise a majority or minority of the tank volume. In one embodiment, the compartment may represent a fraction of the volume of the tank that is greater than 1 percent, greater than 10 percent, greater than 50 percent, greater than 90 percent, greater than 99 percent, or greater than 99.9 percent. In one embodiment, one or more devices for stirring, mixing, or pumping may be used to move fluid through the compartment, the stirred tank reactor, or combinations thereof.

In one embodiment of the ion exchange system, stirred tank reactors may be arranged into a network where flows of brine, washing fluid, and acid solutions are directly through different columns. In one embodiment, a network of stirred tank reactors may involve physical movement of the ion exchange material through the various stirred tank reactors. In one embodiment, a network of stirred tank reactors may involve no physical movement of the ion exchange material through the various stirred tank reactors. In one embodiment, a network of stirred tank reactors may involve switching of flows of brine, washing fluid, and acid solutions through the various stirred tank reactors. In one embodiment, brine may into stirred tank reactors in continuous or batch mode. In one embodiment, brine may be mixed with ion exchange material in one or more reactors before exiting the system. In one embodiment, a network of stirred tank reactors may involve a brine circuit with counter-current exposure of ion exchange material to flows of brine. In one embodiment, a network of stirred tank reactors may involve a washing circuit with counter-current exposure of ion exchange material to flows of washing fluid. In one embodiment, a network of stirred tank reactors may involve an acid circuit with counter-current exposure of ion exchange material to flows of acid solution. In one embodiment, the washing fluid may be water, an aqueous solution, or a solution containing an anti-scalant.

In one embodiment of the stirred tank reactor, acid is added at the beginning of elution. In one embodiment of the stirred tank reactor, acid is added at the beginning of elution and again during elution. In one embodiment of the stirred tank reactor, an acid of lower concentration is added at the start of elution and additional acid of high concentration is added to continue elution.

An aspect described herein is a system for the extraction of lithium ions from a liquid resource, comprising: a) an ion exchange material; b) a tank comprising one or more compartments; and c) a mixing device, wherein the ion exchange material is used to extract lithium ions from the liquid resource.

In some embodiments, the ion exchange material is loaded in at least one of the one or more compartments. In some embodiments, the ion exchange material is fluidized or partially fluidized in at least one of the one or more compartments. In some embodiments, the ion exchange material occupies a fixed position in at least one of the one or more compartments. In some embodiments, the ion exchange material is mounted in at least one of the one or more compartments.

An aspect described herein is a system for the extraction of lithium ions from a liquid resource, comprising: a) a column comprising an ion exchange material; and b) a pH modulating setup for changing the pH of the liquid resource in the system, wherein the pH modulating setup is in fluid communication with the column, wherein the ion exchange material is used to extract lithium ions from the liquid resource.

Other Types of Systems

An aspect described herein is a system for the extraction of lithium ions from a liquid resource, comprising: a) a plurality of columns, wherein each of the plurality of columns comprises an ion exchange material; and b) a pH modulating setup for changing the pH of the liquid resource in the system, wherein the pH modulating setup is in fluid communication with each of the plurality of columns, wherein the ion exchange material is used to extract lithium ions from the liquid resource.

In some embodiments, the pH modulating setup comprises a plurality of tanks, wherein each of the plurality of tanks is immediately connected to one of the plurality of columns. In one embodiment, the pH modulating setup comprises a plurality of tanks, wherein each of the plurality of tanks is in immediate liquid communication with one of the plurality of columns. In some embodiments, two or more of the plurality of tanks connected to two or more of the plurality of columns forms at least one circuit. In some embodiments, two or more of the plurality of tanks connected to two or more of the plurality of columns forms at least two circuits. In some embodiments, three or more of the plurality of tanks connected to three or more of the plurality of columns forms at least two circuits. In some embodiments, three or more of the plurality of tanks connected to three or more of the plurality of columns forms at least three circuits.

In some embodiments, the pH modulating setup comprises a plurality of tanks, wherein each of the plurality of tanks is connected to the of the plurality of columns through a filtration system. In some embodiments, two or more of the plurality of tanks are connected to two or more of the plurality of columns through a filter system to form at least one circuit. In some embodiments, two or more of the plurality of tanks are connected to two or more of the plurality of columns through a filter system to form at least two circuits. In some embodiments, three or more of the plurality of tanks are connected to two or more of the plurality of columns through a filter system to form at least two circuits. In some embodiments, three or more of the plurality of tanks are connected to two or more of the plurality of columns through a filter system to form at least three circuits.

In some embodiments, the filtration system comprises a bag filter, a candle filter, a cartridge filter, a media filter, a depth filter, a sand filter, a membrane filter, an ultrafiltration system, a microfiltration filter, a nanofiltration filter, a cross-flow filter, a dead-end filter, a drum filter, a filter press, or a combination thereof. In some embodiments, the openings in this filter are of less than about 0.02 µm, less than about 0.1 µm, less than about 0.2 µm, less than about 1 µm, less than about 2 µm, less than about 5 µm, less than about 10 µm, less than about 25 µm, less than about 100 µm, less than about 1000 µm. In some embodiments, the perforated openings in outer-perforated walls are of dimension of more than about 0.02 µm, more than about 0.1 µm, more than about 0.2 µm, more than about 1 µm, more than about 2 µm, more than about 5 µm, more than about 10 µm, more than about 25 µm, more than about 100 µm. In some embodiments, the perforated openings in outer-perforated walls are of dimension of about 0.02 µm to about 0.1 µm, from about 0.1 µm to about 0.2 µm, from about 0.2 µm to about 0.5 µm, from about 0.5 µm to about 1 µm, from about 1 µm to about 5 µm, from about 5 µm to about 10 µm, from about 10 µm to about 25 µm, from about 25 µm to about 100 µm. In some embodiments, the filter martial comprises low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly(chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluoro-3,6-dioxa-4-methyl-7-octene-sulfonic acid (NAFION® (copolymer of perfluoro-3,6-dioxa-4-methyl-7-octene-sulfonic acid and tetrafluoroethylene)), polyethylene oxide, polyethylene glycol, sodium polyacrylate, polyethylene-block-poly (ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof. In some embodiments, the filter martial comprises iron, stainless steel, nickel, carbon steel, titanium, Hastelloy, Inconel, zirconium, tantalum, alloys thereof, mixtures thereof, or combinations thereof.

In some embodiments, at least one circuit is a liquid resource circuit. In some embodiments, at least one circuit is a water washing circuit. In some embodiments, at least two circuits are water washing circuits. In some embodiments, at least one circuit is an acid solution circuit.

An aspect described herein is a system for the extraction of lithium ions from a liquid resource comprising an ion exchange material and a plurality of vessels, wherein each of the plurality of vessels is configured to transport the ion exchange material along the length of the vessel and the ion exchange material is used to extract lithium ions from the liquid resource. In some embodiments, at least one of the plurality of vessels comprises an acidic solution. In some embodiments, at least one of the plurality of vessels comprises the liquid resource. In some embodiments, each of the plurality of vessels is configured to transport the ion exchange material by a pipe system or an internal conveyer system.

An aspect described herein is a system for the extraction of lithium ions from a liquid resource comprising an ion exchange material and a plurality of columns, wherein each of the plurality of columns is configured to transport the ion exchange material along the length of the column and the ion exchange material is used to extract lithium ions from the liquid resource.

In some embodiments, at least one of the plurality of columns comprises an acidic solution. In some embodiments, at least one of the plurality of columns comprises the liquid resource. In some embodiments, each of the plurality of columns is configured to transport the ion exchange material by a pipe system or an internal conveyer system.

In some embodiments, the ion exchange material comprises ion exchange particles. In some embodiments, at least a portion of the ion exchange material is in the form of ion exchange particles. In some embodiments, the ion exchange particles are selected from uncoated ion exchange particles, coated ion exchange particles, and combinations thereof. In some embodiments, the ion exchange particles comprise uncoated ion exchange particles. In some embodiments, the ion exchange particles comprise coated ion exchange particles. In some embodiments, the ion exchange particles comprise a mixture of uncoated and coated ion exchange particles.

In some embodiments, the coated ion exchange particles comprise an ion exchange material and a coating material.

In some embodiments, the coating material of the coated ion exchange particles comprises a carbide, a nitride, an oxide, a phosphate, a fluoride, a polymer, carbon, a carbonaceous material, or combinations thereof. In some embodiments, the coating material of the coated ion exchange particles is selected from the group consisting of $TiO_2$, $ZrO_2$, $MoO_2$, $SnO_2$, $Nb_2O_5$, $Ta_2O_5$, $SiO_2$, $Li_2TiO_3$, $Li_2ZrO_3$, $Li_2SiO_3$, $Li_2MnO_3$, $Li_2MoO_3$, $LiNbO_3$, $LiTaO_3$, $AlPO_4$, $LaPO_4$, $ZrP_2O_7$, $MoP_2O_7$, $Mo_2P_3O_{12}$, $BaSO_4$, $AlF_3$, SiC, TiC, ZrC, $Si_3N_4$, ZrN, BN, carbon, graphitic carbon, amorphous carbon, hard carbon, diamond-like carbon, solid solutions thereof, and combinations thereof.

In some embodiments, the ion exchange material of the coated ion exchange particles comprises an oxide, a phosphate, an oxyfluoride, a fluorophosphate, or combinations thereof. In some embodiments, the ion exchange material of the coated ion exchange particles is selected from the group consisting of $Li_4Mn_5O_{12}$, $Li_4Ti_5O_{12}$, $Li_2TiO_3$, $Li_2MnO_3$, $Li_2SnO_3$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, $Al(OH)_3$, $LiCl \cdot xAl(OH)_3 \cdot yH_2O$, $SnO_2 \cdot xSb_2O_5 \cdot yH_2O$, $TiO_2 \cdot xSb_2O_5 \cdot yH_2O$, solid solutions thereof, and combinations thereof, wherein x is from 0.1-10; and y is from 0.1-10.

In some embodiments, the uncoated ion exchange particles comprise an ion exchange material. In some embodiments, the ion exchange material of the uncoated ion exchange particles comprises an oxide, a phosphate, an oxyfluoride, a fluorophosphate, or combinations thereof. In some embodiments, the ion exchange material of the uncoated ion exchange particles is selected from the group consisting of $Li_4Mn_5O_{12}$, $Li_4Ti_5O_{12}$, $Li_2TiO_3$, $Li_2MnO_3$, $Li_2SnO_3$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, $Al(OH)_3$, $LiCl \cdot xAl(OH)_3 \cdot yH_2O$, $SnO_2 \cdot xSb_2O_5 \cdot yH_2O$, $TiO_2 \cdot xSb_2O_5 \cdot yH_2O$, solid solutions thereof, and combinations thereof, wherein x is from 0.1-10; and y is from 0.1-10.

In some embodiments, the ion exchange material is porous. In some embodiments, the porous ion exchange material comprises a network of pores that allows liquids to move quickly from the surface of the porous ion exchange material to a plurality of ion exchange particles. In some embodiments, the porous ion exchange material comprises a network of pores that allows a liquid to move from the surface of the porous ion exchange material to a plurality of ion exchange particles. In some embodiments, the porous ion exchange material comprises a network of pores that allows a liquid to move quickly from the surface of the porous ion exchange material to a plurality of ion exchange particles. In some embodiments, the porous ion exchange material is porous ion exchange beads. In some embodiments, the porous ion exchange material is comprised of porous ion exchange beads.

In some embodiments of the systems described herein, the liquid resource is a natural brine, a dissolved salt flat, seawater, concentrated seawater, a desalination effluent, a concentrated brine, a processed brine, waste brine from a bromine-extraction process, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof. In some embodiments of the systems described herein, the liquid resource is a brine. In some embodiments of the systems described herein, the liquid resource comprises a natural brine, a synthetic brine, or a mixture of a natural and a synthetic brine. In some embodiments of the systems described herein, the liquid resource is a natural brine, a dissolved salt flat, seawater, concentrated seawater, a desalination effluent, a concentrated brine, a processed brine, waste brine from a bromine-extraction process, an oilfield brine, a liquid from an ion exchange process, or combinations thereof.

An aspect of the invention described herein is a system, wherein the column further comprises a plurality of injection ports, wherein the plurality of injection ports are used to increase the pH of the liquid resource in the system In one embodiment of the ion exchange system, the system is a mixed base system comprising an ion exchange column and a mixing chamber where base is mixed into the brine immediately prior to injection of the brine into the column.

In one embodiment of the ion exchange system, the system is a ported ion exchange column system with multiple ports for injection of aqueous base spaced at intervals along the direction of brine flow through the column. As brine flows through the column, there is a region of the column where the beads experience the greatest rate of lithium absorption, and this region moves through the column in the direction of brine flow. In the ported ion exchange column system, base is injected near that region to neutralize protons released by the ion exchange reaction. In regions of the columns where the beads have been saturated with lithium and the rate of release of protons has slowed, base injected is decreased or terminated to avoid formation of basic precipitates.

In one embodiment of the ion exchange system, the system has a moving bed of beads that moves in a direction opposite to the flow of brine and base is injected at one or more fixed points in the column in a region near where the ion exchange reaction occurs at a maximum rate in the column to neutralize the protons released from the ion exchange reaction. In one embodiment of the ion exchange system, the base added to the brine is optionally NaOH, KOH, $Mg(OH)_2$, $Ca(OH)_2$, CaO, $NH_3$, $Na_2SO_4$, $K_2SO_4$, $NaHSO_4$, $KHSO_4$, NaOCl, KOCl, $NaClO_4$, $KClO_4$, $NaH_2BO_4$, $Na_2HBO_4$, $Na_3BO_4$, $KH_2BO_4$, $K_2HBO_4$, $K_3BO_4$, $MgHBO_4$, $CaHBO_4$, $NaHCO_3$, $KHCO_3$, $NaCO_3$, $KCO_3$, $MgCO_3$, $CaCO_3$, $Na_2O$, $K_2O$, $Na_2CO_3$, $K_2CO_3$, $Na_3PO_4$, $Na_2HPO_4$, $NaH_2PO_4$, $K_3PO_4$, $K_2HPO_4$, $KH_2PO_4$, $CaHPO_4$, $MgHPO_4$, sodium acetate, potassium acetate, magnesium acetate, poly(vinylpyridine), poly(vinylamine), polyacrylonitrile, other bases, or combinations thereof. In one embodiment, the base is optionally added to the brine in its pure form or as an aqueous solution. In one embodiment, the base is optionally added in a gaseous state such as gaseous $NH_3$. In one embodiment, the base is optionally added to the brine in a steady stream, a variable stream, in steady aliquots, or in variable aliquots. In one embodiment, the base is optionally created in the brine by using an electrochemical cell to remove $H_2$ and $Cl_2$ gas, which is optionally combined in a separate system to create HCl acid to be used for eluting lithium from the system or for other purposes.

In some embodiments, a solid base is mixed with a liquid resource to create a basic solution. In some embodiments, a solid base is mixed with a liquid resource to create a basic solution, and the resulting basic solution is added to a second volume of a liquid resource to increase the pH of the second volume of the liquid resource. In some embodiments, solid base is mixed with a liquid resource to create a basic solution, wherein the resulting basic solution is used to adjust or control the pH of a second solution. In some embodiments, a solid base is mixed with a liquid resource to create a basic slurry. In some embodiments, a solid base is mixed with a liquid resource to create a basic slurry, and the resulting basic slurry is added to a second volume of a liquid resource to increase the pH of the second volume of the liquid resource. In some embodiments, solid base is mixed with a liquid resource to create a basic slurry, wherein the resulting basic slurry is used to adjust or control the pH of a second solution. In some embodiments, base may be added to a liquid resource as a mixture or slurry of base and liquid resource.

In one embodiment of the ion exchange system, the brine flows through a pH control column containing solid sacrificial base particles such as NaOH, CaO, or $Ca(OH)_2$, which dissolve into the brine and raise the pH of the brine. In one embodiment of the ion exchange system, the brine flows through a pH control column containing immobilized regeneratable OH-containing ion exchange resins which react with hydrogen ions, or regeneratable base species such as immobilized polypyridine, which conjugate HCl, thereby neutralizing the acidified brine. When the ion exchange resin has been depleted of its OH groups or is saturated with HCl, it is optionally regenerated with a base such as NaOH.

In one embodiment of the ion exchange system, pH meters are optionally installed in tanks, pipes, column, and other components of the system to monitor pH and control the rates and amounts of base addition at various locations throughout the system.

In one embodiment of the ion exchange system, the columns, tanks, pipes, and other components of the system are optionally constructed using plastic, metal with a plastic lining, or other materials that are resistant to corrosion by brine or acid.

In one embodiment of the ion exchange system, the ion exchange columns are optionally washed with water that is mildly acidic, optionally including a buffer, to remove any basic precipitates from the column prior to acid elution.

After the ion exchange column is saturated or nearly saturated with lithium, the lithium is flushed out of the ion exchange column using acid. The acid is optionally flowed through the column one or more times to elute the lithium. In one embodiment, the acid is optionally flowed through the ion exchange column using a recirculating batch system comprised of the ion exchange column connected to a tank. In one embodiment, the tank used for acid flows is optionally the same tank used for the brine flows. In a further embodiment, the tank used for acid flows is optionally a different tank than the one used for brine flows. In a further embodiment, the acid is distributed at the top of the ion exchange column and allowed to percolate through and immediately recirculated into the column with no extra tank. In an embodiment, acid addition optionally occurs without a tank used for acid flows.

In one embodiment of the ion exchange system, the column is optionally washed with water after the brine and/or acid steps, and the effluent water from washing is optionally treated using pH neutralization and reverse osmosis to yield process water.

In one embodiment of the ion exchange system, the ion exchange column is optionally shaped like a cylinder, a rectangle, or another shape. In one embodiment, the ion exchange column optionally has a cylinder shape with a height that is greater or less than its diameter. In one embodiment, the ion exchange column optionally has a cylinder shape with a height that is less than 10 cm, less than 1 meter, or less than 10 meters. In one embodiment, the ion exchange column optionally has a cylinder shape with a diameter that is less than 10 cm, less than 1 meter, or less than 10 meters.

In one embodiment of the ion exchange system, the system is optionally resupplied with fresh ion exchange beads by swapping out an ion exchange column with a new column loaded with fresh ion exchange beads. In one embodiment of the ion exchange system, the system is optionally resupplied with fresh ion exchange beads by removing the beads from the column and loading new beads into the column. In one embodiment of the ion exchange system, new beads are optionally supplied to all columns in the system simultaneously. In one embodiment of the ion exchange system, new beads are optionally supplied to one or more columns at a time. In one embodiment of the ion exchange system, new beads are optionally supplied to one or more columns without interruption to other columns that optionally continue operating.

In one embodiment of the ion exchange system, brine pumping optionally continues until the ion exchange beads approach a point of lithium saturation over a period of time that is optionally less than about 1 hours, less than about 2 hours, less than about 4 hours, less than about 8 hours, less than about 24 hours, less than about 48 hours, or less than about one week. In one embodiment of the ion exchange system, brine pumping optionally continues until the ion exchange beads approach a point of lithium saturation over a period of time that is optionally greater than about one week. In certain embodiments of the ion exchange system, brine pumping optionally continues until the ion exchange beads approach a point of lithium saturation over a period of time that is optionally between 30 minutes and 24 hours. In one embodiment of the ion exchange system, acid pumping optionally continues until the ion exchange beads approach a point of hydrogen saturation over a period of time that is optionally less than about 1 hours, less than about 2 hours, less than about 4 hours, less than about 8 hours, less than about 24 hours, or less than about 48 hours. In one embodiment of the ion exchange system, brine pumping optionally continues until the ion exchange beads approach a point of hydrogen saturation over a period of time that is optionally greater than about one 48 hours. In certain embodiments of the ion exchange system, brine pumping optionally continues until the ion exchange beads approach a point of hydrogen saturation over a period of time that is optionally between 30 minutes and 24 hours.

Ion Exchange Material

An aspect of the invention described herein is a system wherein the ion exchange material comprises a plurality of ion exchange particles. In an embodiment, the plurality of ion exchange particles in the ion exchange material is selected from uncoated ion exchange particles, coated ion exchange particles and combinations thereof. In an embodiment, the ion exchange material is a porous ion exchange material. In an embodiment, the porous ion exchange material comprises a network of pores that allows liquids to move quickly from the surface of the porous ion exchange material to the plurality of ion exchange particles. In an embodiment, the ion exchange material is in the form of porous ion exchange beads. In an embodiment, the liquid resource is a natural brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

Ion exchange materials are typically small particles, which together constitute a fine powder. In some embodiments small particle size minimizes the diffusion distance that lithium must travel into the core of the ion exchange particles. In some cases, these particles are optionally coated with protective surface coatings to minimize dissolution of the ion exchange materials while allowing efficient transfer of lithium and hydrogen to and from the particles.

In an embodiment, the coated ion exchange particles are comprised of an ion exchange material and a coating material wherein the ion exchange material comprises $Li_4Mn_5O_{12}$, $Li_{1.6}Mn_{1.6}O_4$, $Li_2MO_3$ (M=Ti, Mn, Sn), $LiFePO_4$, solid solutions thereof, or combinations thereof and the coating material comprises $TiO_2$, $ZrO_2$, $MoO_2$, $Li_2TiO_3$, $Li_2ZrO_3$, $LiNbO_3$, $AlF_3$, SiC, $Si_3N_4$, graphitic carbon, amorphous carbon, diamond-like carbon, or combinations thereof. The coated ion exchange particles have an average diameter less than about 100 nm, less than about 1,000 nm, or less than about 10,000 nm, and the coating thickness is less than about 1 nm, less than about 10 nm, or less than about 100 nm. The particles are created by first synthesizing the ion exchange material using a method such as hydrothermal, solid state, or microwave. The coating material is then deposited on the surface of the ion exchange material using a method such as chemical vapor deposition, hydrothermal, solvothermal, sol-gel, precipitation, or microwave. The coated ion exchange particles are treated with an acid solution prepared with hydrochloric acid, sulfuric acid, nitric acid, or combinations thereof wherein the concentration of the acid solution is greater than about 0.1 M, greater than about 1.0 M, greater than about 5 M, greater than about 10 M, or combinations thereof. During acid treatment, the particles absorb hydrogen while releasing lithium. The ion exchange material is converted to a hydrated state with a hydrogen-rich composition. The coating material allows diffusion of hydrogen and lithium respectively to and from the ion exchange material while providing a protective barrier that limits dissolution of the ion exchange material. After treatment in acid, the hydrated coated ion exchange particles are treated with a liquid resource wherein the liquid resource is a natural brine, a dissolved salt flat, a concentrated brine, a processed brine, a synthetic brine, liquid from an ion exchange process, liquid from a solvent extraction process, leachate from minerals, leachate from clays, leachate from recycled products, leachate from recycled materials, or combinations thereof. The coated ion exchange particles absorb lithium while releasing hydrogen. The lithium salt solution is then collected. The coated ion exchange particles are capable then perform the ion exchange reaction repeatedly over a number of cycles greater than about 10 cycles, greater than about 30 cycles, greater than about 100 cycles, or greater than about 300 cycles.

One major challenge for lithium extraction using inorganic ion exchange particles is the loading of the particles into an ion exchange column in such a way that brine and acid are optionally pumped efficiently through the column with minimal clogging. The materials are optionally formed into beads, and the beads are optionally loaded into the column. This bead loading creates void spaces between the beads, and these void spaces facilitate pumping through the column. The beads hold the ion exchange particles in place and prevent free movement of the particles throughout the column. When the materials are formed into beads, the penetration of brine and acid solutions into the beads become slow and challenging. A slow rate of convection and diffusion of the acid and brine solutions into the bead slows the kinetics of lithium absorption and release. Such slow kinetics can create problems for column operation. Slow kinetics can require slow pumping rates through the column. Slow kinetics can also lead to low lithium recovery from the brine and inefficient use of acid to elute the lithium.

In some embodiments, the ion exchange beads are porous ion exchange beads with networks of pores that facilitate the transport into the beads of solutions that are pumped through an ion exchange column. Pore networks are optionally strategically controlled to provide fast and distributed access for the brine and acid solutions to penetrate into the bead and deliver lithium and hydrogen to the ion exchange particles.

In some embodiments, the ion exchange beads are formed by mixing ion exchange particles, a matrix material, and a filler material. These components are mixed and formed into a bead. Then, the filler material is removed from the bead to leave behind pores. The filler material is dispersed in the bead in such a way to leave behind a pore structure that enables transport of lithium and hydrogen with fast kinetics. This method optionally involves multiple ion exchange materials, multiple polymer materials, and multiple filler materials.

Another major challenge for lithium extraction using inorganic ion exchange materials is dissolution and degradation of the materials, especially during lithium elution in acid but also during lithium uptake in liquid resources. To yield a concentrated lithium solution from the ion exchange process, it is desirable to use a concentrated acid solution to elute the lithium. However, concentrated acid solutions dissolve and degrade inorganic ion exchange materials, which decrease the performance and lifespan of the materials. Therefore, the porous ion exchange beads optionally contain coated ion exchange particle for lithium extraction that are comprised of an ion exchange material and a coating material protecting the particle surface. The coating protects the ion exchange material from dissolution and degradation during lithium elution in acid, during lithium uptake from a liquid resource, and during other aspects of an ion exchange process. This coated particle enables the use of concentrated acids in the ion exchange process to yield concentrated lithium solutions.

In this invention, the ion exchange material is selected for high lithium absorption capacity, high selectivity for lithium in a liquid resource relative to other ions such as sodium and magnesium, strong lithium uptake in liquid resources including those with low concentrations of lithium, facile elution of lithium with a small excess of acid, and fast ionic diffusion. A coating material is optionally selected to protect the particle from dissolution and chemical degradation during lithium recovery in acid and also during lithium uptake in various liquid resources. A coating material optionally is also selected to facilitate diffusion of lithium and hydrogen between the particles and the liquid resources, to enable adherence of the particles to a structural support, and to suppress structural and mechanical degradation of the particles.

When the porous ion exchange beads are used in an ion exchange column, the liquid resource containing lithium is pumped through the ion exchange column so that the ion exchange particles absorb lithium from the liquid resource while releasing hydrogen. After the beads have absorbed lithium, an acid solution is pumped through the column so that the particles release lithium into the acid solution while absorbing hydrogen. The column is optionally operated in co-flow mode with the liquid resource and acid solution alternately flowing through the column in the same direction, or the column is optionally operated in counter-flow mode with a liquid resource and acid solution alternately flowing through the column in opposite directions. Between flows of the liquid resource and the acid solution, the column is optionally treated or washed with water or other solutions for purposes such as adjusting pH in the column or removing potential contaminants. The beads optionally form a fixed or moving bed, and the moving bed optionally moves in counter-current to the brine and acid flows. The beads are optionally moved between multiple columns with moving beds where different columns are used for brine, acid, water, or other flows. Before or after the liquid resource flows through the column, the pH of the liquid is optionally adjusted with NaOH or other chemicals to facilitate the ion exchange reaction as well as handling or disposal of the spent liquid resource. Before or after the liquid resource flows through the column, the liquid resource is optionally subjected to other processes including other ion exchange processes, solvent extraction, evaporation, chemical treatment, or precipitation to remove lithium, to remove other chemical species, or to otherwise treat the brine.

When the ion exchange particles are treated with acid, a lithium solution is produced. This lithium solution is optionally further processed to produce lithium chemicals. These lithium chemicals are optionally supplied for an industrial application. In some embodiments, an ion exchange material is selected from the following list: an oxide, a phosphate, an oxyfluoride, a fluorophosphate, or combinations thereof. In some embodiments, an ion exchange material is selected from the following list: $LiFePO_4$, $LiMnPO_4$, $Li_2MO_3$ (M=Ti, Mn, Sn), $Li_4Ti_5O_{12}$, $Li_4Mn_5O_{12}$, $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $Li_2CuP_2O_7$, $Al(OH)_3$, $LiCl \cdot xAl(OH)_3 \cdot yH_2O$, $SnO_2 \cdot xSb_2O_5 \cdot yH_2O$, $TiO_2 \cdot xSb_2O_5 \cdot yH_2O$, solid solutions thereof, or combinations thereof. In a further aspect, an ion exchange material comprises $LiFePO_4$, $Li_2SnO_3$, $Li_2MnO_3$, $Li_2TiO_3$, $Li_4Ti_5O_{12}$, $Li_4Mn_5O_{12}$, $Li_{1.6}Mn_{1.6}O_4$, solid solutions thereof, or combinations thereof.

In a further aspect described herein, the coating material allows diffusion to and from the ion exchange material. In particular, the coating material facilitates diffusion of lithium and hydrogen between the particles and the liquid resources, enables adherence of the particles to a structural support, and suppresses structural and mechanical degradation of the particles. In a further aspect described herein, the coating material comprises a carbide, a nitride, an oxide, a phosphate, a fluoride, a polymer, carbon, a carbonaceous material, or combinations thereof. In a further aspect, the coating material comprises polyvinylidene difluoride, polyvinyl chloride, a fluoro-polymer, a chloro-polymer, or a fluoro-chloro-polymer. In a further aspect, a coating material comprises $Nb_2O_5$, $Ta_2O_5$, $MoO_2$, $TiO_2$, $ZrO_2$, $SnO_2$, $SiO_2$, $Li_2O$, $Li_2TiO_3$, $Li_2ZrO_3$, $Li_2MoO_3$, $LiNbO_3$, $LiTaO_3$, $Li_2SiO_3$, $Li_2Si_2O_5$, $Li_2MnO_3$, $ZrSiO_4$, $AlPO_4$, $LaPO_4$, $ZrP_2O_7$, $MoP_2O_7$, $Mo_2P_3O_{12}$, $BaSO_4$, $AlF_3$, SiC, TiC, ZrC, $Si_3N_4$, ZrN, BN, carbon, graphitic carbon, amorphous carbon, hard carbon, diamond-like carbon, solid solutions thereof, or combinations thereof. In a further aspect, a coating material comprises $TiO_2$, $ZrO_2$, $SiO_2$, $Li_2TiO_3$, $Li_2ZrO_3$, $Li_2MnO_3$, $ZrSiO_4$, or $LiNbO_3$. In a further aspect, a coating material comprises a chloro-polymer, a fluoro-polymer, a chloro-fluoro-polymer, a hydrophilic polymer, a hydrophobic polymer, co-polymers thereof, mixtures thereof, or combinations thereof. In a further aspect, a coating material comprises a co-polymer, a block co-polymer, a linear polymer, a branched polymer, a cross-linked polymer, a heat-treated polymer, a solution processed polymer, co-polymers thereof, mixtures thereof, or combinations thereof. In a further aspect, a coating material comprises low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly(chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluoro-3,6-dioxa-4-methyl-7-octene-sulfonic acid (NAFION® (copolymer of perfluoro-3,6-dioxa-4-methyl-7-octene-sulfonic acid and tetrafluoroethylene)), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof. In a further aspect, a coating is deposited onto an ion exchange particle by dry mixing, mixing in solvent, emulsion, extrusion, bubbling one solvent into another, casting, heating, evaporating, vacuum evaporation, spray drying, vapor deposition, chemical vapor deposition, microwaving, hydrothermal synthesis, polymerization, co-polymerization, cross-linking, irradiation, catalysis, foaming, other deposition methods, or combinations thereof. In a further aspect, a coating is deposited using a solvent comprising N-methyl-2-pyrrolidone, dimethyl sulfoxide, tetrahydrofuran, dimethylformamide, dimethylacetamide, methyl ethyl ketone, ethanol, acetone, other solvents, or combinations thereof. In a further aspect, a coating is deposited using a solvent comprising N-methyl-2-pyrrolidone, dimethyl sulfoxide, tetrahydrofuran, dimethylformamide, dimethylacetamide, methyl ethyl ketone, ethanol, acetone, or combinations thereof.

In a further aspect described herein, the coated ion exchange particles have an average diameter less than about 10 nm, less than about 100 nm, less than about 1,000 nm, less than about 10,000 nm, or less than about 100,000 nm. In a further aspect, the coated ion exchange particles have an average size less than about 100 nm, less than about 1,000 nm, or less than about 10,000 nm. In a further aspect, the coated ion exchange particles are optionally secondary particles comprised of smaller primary particles that have an average diameter less than about 10 nm, less than about 100 nm, less than about 1,000 nm, less than about 10,000 nm, or less than about 100,000 nm. In a further aspect, the coating optionally coats the primary ion exchange particles. In a further aspect, the coating optionally coats the secondary ion exchange particles. In a further aspect, the coating optionally coats the secondary ion exchange particles. In a further aspect, the coating optionally coats both the primary ion exchange particles and the secondary ion exchange particles. In a further aspect, the primary ion exchange particles optionally have a first coating and the secondary ion exchange particles optionally have a second coating that is optionally identical, similar, or different in composition to the first coating.

In some embodiments described herein, the coating material has a thickness less than about 1 nm, less than about 10 nm, less than about 100 nm, less than about 1,000 nm, or less than about 10,000 nm. In further embodiments, the coating material has a thickness less than about 5 nm, less than about 50 nm, or less than about 500 nm. In some embodiments, the ion exchange particles have a coating material with a thickness selected from the following list: less than 1 nm, less than 10 nm, less than 100 nm, or less than 1,000 nm. In some embodiments, the coating material has a thickness selected from the following list: less than 1 nm, less than 10 nm, or less than 100 nm. In certain embodiments, the coating material has a thickness between about 0.5 nm to about 1000 nm. In some embodiments, the coating material has a thickness between about 1 nm to about 100 nm.

In a further aspect described herein, the ion exchange material and the coating material form one or more concentration gradients where the chemical composition of the particle ranges between two or more compositions. In a further aspect, the chemical composition optionally varies between the ion exchange materials and the coating in a manner that is continuous, discontinuous, or continuous and discontinuous in different regions of the particle. In a further aspect, the ion exchange materials and the coating materials form a concentration gradient that extends over a thickness less than about 1 nm, less than about 10 nm, less than about 100 nm, less than about 1,000 nm, less than about 10,000 nm, or less than about 100,000 nm. In a further aspect, the ion exchange materials and the coating materials form a concentration gradient that extends over a thickness of about 1 nm to about 1,000 nm.

In a further aspect described herein, the ion exchange material is synthesized by a method such as hydrothermal, solvothermal, sol-gel, solid state, molten salt flux, ion exchange, microwave, ball milling, chemical precipitation, co-precipitation, vapor deposition, or combinations thereof. In a further aspect, the ion exchange material is synthesized by a method such as chemical precipitation, hydrothermal, solid state, or combinations thereof.

In a further aspect described herein, the coating material is deposited by a method such as chemical vapor deposition, atomic layer deposition, physical vapor deposition, hydrothermal, solvothermal, sol-gel, solid state, molten salt flux, ion exchange, microwave, chemical precipitation, co-precipitation, ball milling, pyrolysis, or combinations thereof. In a further aspect, the coating material is deposited by a method such as sol-gel, chemical precipitation, or combinations thereof. In a further aspect, the coating materials is deposited in a reactor that is optionally a batch tank reactor, a continuous tank reactor, a batch furnace, a continuous furnace, a tube furnace, a rotary tube furnace, or combinations thereof.

In some embodiments, a coating material is deposited with physical characteristics selected from the following list: crystalline, amorphous, full coverage, partial coverage, uniform, non-uniform, or combinations thereof.

In some embodiments, multiple coatings are optionally deposited on the ion exchange material in an arrangement selected from the following list: concentric, patchwork, or combinations thereof.

In some embodiments, the matrix is selected from the following list: a polymer, an oxide, a phosphate, or combinations thereof. In some embodiments, a structural support is selected from the following list: polyvinyl fluoride, polyvinylidene fluoride, polyvinyl chloride, polyvinylidene chloride, polyethylene, polypropylene, polyphenylene sulfide, polytetrafluoroethylene, polytetrofluoroethylene, sulfonated polytetrofluoroethylene, polystyrene, polydivinylbenzene, polybutadiene, sulfonated polymer, carboxylated polymer, Nafion, copolymers thereof, and combinations thereof. In some embodiments, a structural support is selected from the following list: polyvinylidene difluoride, polyvinyl chloride, sulfonated polytetrofluoroethylene, polystyrene, polydivinylbenzene, copolymers thereof, or combinations thereof. In some embodiments, a structural support is selected from the following list: titanium dioxide, zirconium dioxide, silicon dioxide, solid solutions thereof, or combinations thereof. In some embodiments, the matrix material is selected for thermal resistance, acid resistance, and/or other chemical resistance.

In some embodiments, the porous bead is formed by mixing the ion exchange particles, the matrix material, and the filler material together at once. In some embodiments, the porous bead is formed by first mixing the ion exchange particles and the matrix material, and then mixing with the filler material. In some embodiments, the porous bead is formed by first mixing the ion exchange particles and the filler material, and then mixing with the matrix material. In some embodiments, the porous bead is formed by first mixing the matrix material and the filler material, and then mixing with the ion exchange particles.

In some embodiments, the porous bead is formed by mixing the ion exchange particles, the matrix material, and/or the filler material with a solvent that dissolves once or more of the components. In some embodiments, the porous bead is formed by mixing the ion exchange particles, the matrix material, and/or the filler material as dry powders in a mixer or ball mill. In some embodiments, the porous bead is formed by mixing the ion exchange particles, the matrix material, and/or the filler material in a spray drier.

In some embodiments, the matrix material is a polymer that is dissolved and mixed with the ion exchange particles and/or filler material using a solvent from the following list: n-methyl-2-pyrrolidone, dimethyl sulfoxide, tetrahydrofuran, dimethylformamide, dimethylacetamide, methyl ethyl ketone, or combinations thereof. In some embodiments, the filler material is a salt that is dissolved and mixed with the ion exchange particles and/or matrix material using a solvent from the following list: water, ethanol, iso-propyl alcohol, acetone, or combinations thereof.

In some embodiments, the filler material is a salt that is dissolved out of the bead to form pores using a solution selected from the following list: water, ethanol, iso-propyl alcohol, a surfactant mixture, an acid a base, or combinations thereof. In some embodiments, the filler material is a material that thermally decomposes to form a gas at high temperature so that the gas can leave the bead to form pores, where the gas is selected from the following list: water vapor, oxygen, nitrogen, chlorine, carbon dioxide, nitrogen oxides, organic vapors, or combinations thereof.

In some embodiments, the porous ion exchange bead is formed from dry powder using a mechanical press, a pellet press, a tablet press, a pill press, a rotary press, or combinations thereof. In some embodiments, the porous ion exchange bead is formed from a solvent slurry by dripping the slurry into a different liquid solution. The solvent slurry is optionally formed using a solvent of n-methyl-2-pyrrolidone, dimethyl sulfoxide, tetrahydrofuran, dimethylformamide, dimethylacetamide, methyl ethyl ketone, or combinations thereof. The different liquid solution is optionally formed using water, ethanol, iso-propyl alcohol, acetone, or combinations thereof.

In some embodiments, the porous ion exchange bead is approximately spherical with an average diameter selected from the following list: less than 10 um, less than 100 um, less than 1 mm, less than 1 cm, or less than 10 cm. In some embodiments, the porous ion exchange bead is approximately spherical with an average diameter selected from the following list: less than 200 um, less than 2 mm, or less than 20 mm. In certain embodiments, the porous ion exchange bead is approximately spherical with an average diameter between 10 um and 2 mm.

In some embodiments, the porous ion exchange bead is tablet-shaped with a diameter of less than 1 mm, less than 2 mm, less than 4 mm, less than 8 mm, or less than 20 mm and with a height of less than 1 mm, less than 2 mm, less than 4 mm, less than 8 mm, or less than 20 mm. In certain embodiments, the porous ion exchange bead is tablet-shaped with a diameter between 500 um and 10 mm.

In some embodiments, the porous ion exchange bead is embedded in a support structure, which is optionally a membrane, a spiral-wound membrane, a hollow fiber membrane, or a mesh. In some embodiments, the porous ion exchange bead is embedded on a support structure comprised of a polymer, a ceramic, or combinations thereof. In some embodiments, the porous ion exchange bead is loaded directly into an ion exchange column with no additional support structure.

In some embodiments, the liquid resource is selected from the following list: a natural brine, a dissolved salt flat, a geothermal brine, seawater, concentrated seawater, desalination effluent, a concentrated brine, a processed brine, liquid from an ion exchange process, liquid from a solvent extraction process, a synthetic brine, leachate from ores, leachate from minerals, leachate from clays, leachate from recycled products, leachate from recycled materials, or combinations thereof. In some embodiments, a liquid resource is selected from the following list: a natural brine, a dissolved salt flat, a concentrated brine, a processed brine, a synthetic brine, a geothermal brine, liquid from an ion exchange process, liquid from a solvent extraction process, leachate from minerals, leachate from clays, leachate from recycled products, leachate from recycled materials, or combinations thereof. In some embodiments, the liquid resource is optionally pre-treated prior to entering the ion exchange reactor to remove suspended solids, hydrocarbons, or organic molecules. In some embodiments, the liquid resource is optionally enter the ion exchange reactor without any pre-treatment following from its source.

In some embodiments, the liquid resource is selected with a lithium concentration selected from the following list: less than 100,000 mg/L, less than 10,000 mg/L, less than 1,000 mg/L, less than 100 mg/L, less than 10 mg/L, or combinations thereof. In some embodiments, a liquid resource is selected with a lithium concentration selected from the following list: less than 5,000 mg/L, less than 500 mg/L, less than 50 mg/L, or combinations thereof.

Definitions

The terms "lithium", "lithium ion", "Li" and "Li$^+$" describe a cationic lithium atom species without reference to any particular counterion and are used interchangeably in the present specification. These terms are synonymous unless specifically noted to the contrary.

The term "lithium salt" is used to denote a chemical entity including at least one lithium cation and at least one anion.

The terms "hydrogen", "hydrogen ion", "proton", and "H" describe a cationic hydrogen atom and are used interchangeably in the present specification and these terms are synonymous unless specifically noted to the contrary.

As used herein, the words "column" and "vessel" are used interchangeably. In some embodiments described herein referring to a "vessel", the vessel is a column. In some embodiments described herein referring to a "column", the column is a vessel.

The term pH refers to the concentration of hydrogen ions of a liquid, and its numerical value is defined as the negative of the base ten logarithm of the activity of hydrogen ions in solution. When the term "the pH of the system" or "the pH of" a component of a system is used, pH refers to the pH of the liquid medium contained or present in the system, or contained or present in one or more components of said system. In some embodiments, one more fluids are present in one or more components of the system. In some embodiments, the liquid medium contained in the system, or one or more components thereof, is a liquid resource. In some embodiments, the liquid medium contained in the system, or one or more components thereof, is a brine. In some embodiments, the liquid medium contained in the system, or one or more components thereof, is an acid solution, an aqueous solution, a wash solution, a salt solution, a salt solution comprising lithium ions, or a lithium-enriched solution.

As used herein, the term "bed" of ion exchange material refers to a compartment within a vessel filled with ion exchange material, wherein fluid can flow into and out of said compartment. In some embodiments, such a "bed" is a "packed bed", or "fixed bed", wherein the ion exchange material is immobile as a process fluid is flowed across the compartment containing the ion exchange material. In some embodiments, such a "bed" is a "fluidized bed", wherein the ion exchange material is agitated and is suspended in the process fluid present in the compartment containing the ion exchange material.

As used herein, the term "fluid communication" refers to the ability of fluid to freely flow from one section of a vessel to a different section of said vessel, driven by hydrostatic pressure. In some embodiments, fluid communication implies that a fluid path exists between two parts of a vessel; such a path may include compartment, porous partitions, pipes, flow distributors, and other flow components.

As used herein, the term "permeable" refers to a component of a vessel that enables fluid communication across said component. In one embodiment, a permeable partition is a partition within the vessel wherein fluid can freely flow from one side of said partition to another when pressure is applied. Examples of permeable partitions include porous partitions and partitions with slits or regularized geometric shaped orifices.

As used herein, the term "flow distributor" refers to a component that delivers flow from one or more locations to a different set of one or more locations through a fluid path. In some embodiments, flow distributors are pipes that deliver fluid from the inlet of a vessel to one or more ion exchange beds. In some embodiments, flow distributors are pipes that deliver fluid from one or more ion exchange beds to the outlet of the vessel. In some embodiments, flow distributors comprise pipes, screens, meshes, fluid splitters, fluid concentrators, and other components that serve to direct flow. In some embodiments, a flow distributor optimizes the flow of a liquid through the vessels, systems, and devices described herein. In some embodiments, a flow distributor allows for a reduction of liquid pressure required for the vessels, systems, and devices described herein to operate. In some embodiments, a flow distributer increases the efficiency of the vessels, systems, and devices described herein by reducing the hydrostatic pressure required to pump a liquid across vessels, systems, and devices described herein. A reduction in hydrostatic pressure leads to a reduction in the power requirements and decreases the cost of components. In some embodiments, a flow distributor increases the efficiency of the vessels, systems, and devices described herein by increasing the amount of lithium extracted from the liquid resource. In some embodiments, a flow distributer increases the efficiency of the vessels, systems, and devices described herein by increasing the amount of lithium extracted from the liquid resource as compared to a vessels, systems, and devices without flow distributers and using the same pressure.

As used herein, the hydrostatic pressure required to pump a liquid across an ion exchange vessel refers to the difference in hydrostatic pressure between the inlet and the outlet of said vessel, as measured by a pressure measuring device. In some embodiments, such pressure measuring devices include pressure gauges, pressure indicators, pressure transmitters, manometers, barometers, aneroids, pressure sensors, piezoresistive pressure sensor, other pressure measurement devices, or combinations thereof.

EXAMPLES

Example 1: Lithium Extraction Device Using a Vessel with Filter Banks Loaded with Ion Exchange Beads Lithium is extracted from a brine using a vessel comprising filter banks filled with ion exchange beads arranged along the length of the vessel, with parallel flow to and from each filter bank. (FIG. 1). Each filter bank acts as an individual ion-exchange compartment.

The internal characteristics of the vessel are shown in FIG. 1. The vessel is rectangular and arranged horizontally, is approximately 75 cm long, and has a width and height of approximately 15 cm. It is constructed of polymer-coated stainless steel with ceramic internal divisions. The vessel consists of 3 filter banks that act as ion-exchange compartments (103) and empty pipes that distribute the flow to each of the three filter banks and collect the outlet flow from each of the three filter banks. The liquid delivery and collection systems are independent of each other. Inlet and outlet flow distribution systems connect to each other only through the ion-exchange compartments. The pipes that distribute flow are rectangular with a width and diameter of 2.5 cm.

The ion-exchange compartments (103) are 10 cm wide and 10 cm tall, with a length of 5 cm. The inlet and outlet of the ion-exchange bead compartment consists of a polyethylene terephthalate mesh with 50 micron pore size, to prevent escape of beads. In each ion exchange compartment, fluid is transported by pressure-driven flow through the ion exchange bed, through the polymer support, and into the fluid collection system. Even flow to each ion-exchange compartment is ensured because the pressure-drop across the ion-exchange bead is 120 times larger than pressure drop due to frictional losses in the inlet and outlet flow distribution systems.

The ion-exchange beads are loaded into each of the ion-exchange compartments by mechanically separating each flow ion exchange compartment, and loading the ion exchange beads in the interstitial space. The porous ion exchange beads are comprised of ion exchange particles and a polymer matrix. The ion exchange particles are coated ion exchange particles comprised of a $Li_2TiO_3$ core with a $SiO_2$ coating. The particles are approximately spherical with a mean diameter of 5.0 microns to 30.0 microns, and the coating thickness is approximately 10.0 nm. The polymer matrix is comprised of polyvinylidene difluoride. The porous beads contain porous networks with a controlled distribution of pore sizes providing diffusion channels from the bead surface into the bead interior and to the ion exchange particles. The beads have a 400 micron average diameter.

The liquid resource flows into the vessel from a side flange (101), where it flows into the flow distribution pipes which delivers them to each one of the ion-exchange chambers. The liquid flows through the above-mentioned mesh, through the bed of ion-exchange beads (103), out of the above-mentioned mesh, and into the outlet flow distribution pipes. The collected effluent then exits through a flange (102) on the other side of the ion-exchange vessel.

The brine from which lithium is extracted consists of a natural aqueous chloride solution containing approximately 100 mg/L Li, 60,000 mg/L Na, 10,000 mg/L Ca, and 30,000 mg/L Mg, and other chemical species including K and chloride. When this liquid resource enters the vessel, the pressure needed to flow said resource at a rate of 10 L/min is 10 psi. Flow through this ion exchange material results in an outlet flow that contains approximately 12 mg/L Li, 60,000 mg/L Na, 10,000 mg/L Ca, and 30,000 mg/L Mg, and other chemical species including K and chloride.

Figure 2:
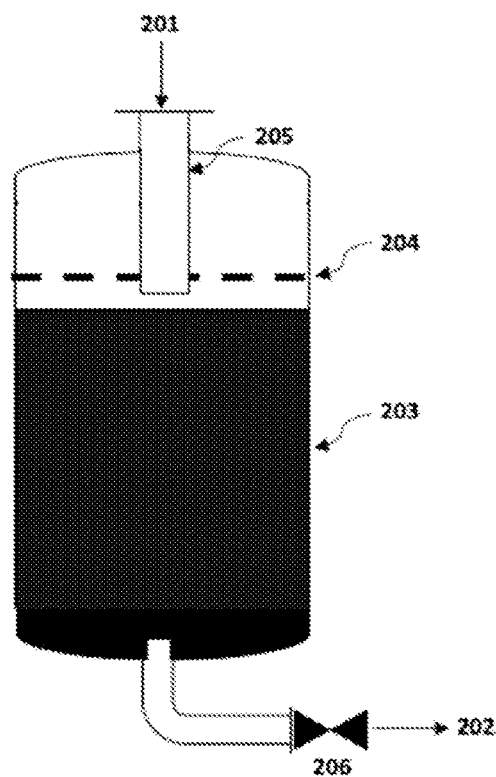
FIG. 2 illustrates a lithium extraction device comprising a vessel with one or more fluid level controllers loaded with ion exchange beads.

Example 2: Lithium Extraction Device Using a Vessel Comprising Fluid Level Controllers Loaded with Ion Exchange Beads Lithium was extracted from a brine using a vessel containing ion-exchange beads, where the fluid level in the vessel is controlled to fully submerge ion exchange beads (FIG. 2). The internal characteristics of the vessel comprising fluid level controllers is shown in FIG. 2. The vessel was cylindrical and arranged vertically, was approximately 120 cm tall, and had a diameter of approximately 15 cm. It was constructed of polyvinyl chloride.

Fluid flowed into the vessel from atop flange (201) into a dome at the top of the vessel, where it flowed through a pipe (205), to the main fluid level (204). The fluid level was constantly monitored using a level switch (206), and the level was adjusted continuously to remain at a height such that the ion-exchange beads was constantly submerged (204). The liquid level of the tank was maintained at 100 cm from the bottom of the vessel. Control of the fluid level was achieved via a an on-off controllers that turns the pump feeding the tank on (when fluid level is below the switch) and off (when fluid level is above the switch). The top of the tank was maintained at a constant pressure of 15 psi by means of the pump delivering brine into the vessel.

The ion-exchange beads partially filled the volume of the vessel. The height of the ion exchange beads (203) was 18 cm from the bottom of the vessel, and the top 20 cm of the vessel were filled with gas. The outlet of the vessel comprised a porous polymer support consisting of a polyethylene terephthalate mesh with 20 micron pore size, to prevent escape of beads. Fluid was transported by pressure-driven flow through the ion exchange bed, through the polymer support, and through the bottom outlet of the vessel (202).

The ion-exchange beads were conveyed into the vessel when initially loaded, by mechanically removing the top flange of the vessel which is attached through to the rest of the vessel through a bolted PVC flange.

The ion exchange vessel was loaded with a packed bed of porous ion exchange beads. The porous ion exchange beads were comprised of coated ion exchange particles and a polymer matrix. The ion exchange particles were coated ion exchange particles comprised of a $Li_2Mn_2O_5$ core with a PVC coating. The particles were approximately spherical with a mean diameter of 5 microns to 10 microns, and the coating thickness is approximately 6.0 nm. The polymer matrix was comprised of polyvinylidene difluoride. The porous beads contained porous networks with a controlled distribution of pore sizes providing diffusion channels from the bead surface into the bead interior and to the ion exchange particles. The beads had a 200 micron average diameter.

The brine from which lithium was extracted consisted of a natural aqueous chloride solution containing approximately 2,000 mg/L Li, 75,000 mg/L Na, 500 mg/L Ca, and 15,000 mg/L Mg, and other chemical species including K and chloride. Flow through this ion exchange material results in an outlet flow that contains approximately 100 mg/L Li, 75,000 mg/L Na, 500 mg/L Ca, and 15,000 mg/L Mg, and other chemical species including K and chloride.

After the lithium-selective ion exchange beads were loaded with lithium, residual brine was washed from the lithium-selective ion exchange beads. An acidic chloride solution was then flowed into the vessel to elute lithium from the lithium-selective ion exchange beads while the lithium-selective ion exchange beads absorbed protons. Lithium in the acidic chloride solution was eluted at a lithium concentration of 800 mg/L, while the concentration of sodium in the acidic chloride solution was below 500 mg/L.

Example 3: Lithium Extraction Device Using a Vessel with Radial-Flow Packed Ion-Exchange Beds with Minimal Flow Resistance Lithium was extracted from a brine using a vessel containing ion-exchange beads packed in radial-flow beds with minimal flow resistance (FIG. 3). The internal characteristics of the radial-flow ion exchange vessel is shown in FIG. 3. The vessel was cylindrical and arranged vertically, was approximately 30 cm tall, and has a diameter of approximately 10 cm. It was constructed of metal and PVC plastic.

A liquid resource or other process fluid flowed into the ion exchange column from a flange at the bottom of the vessel (301). Fluid passes from the inner flow-distribution compartment (307), through the inner-perforated wall (306), through ion-exchange bead compartment (303), through the outer-perforated wall (305) and into the outer-flow distribution compartment (308). From there, the fluid flowed into the top of the vessel and exits the vessel through a tope flanged connection (302).

This inner-flow distribution compartment (307) was defined by a cylinder with a diameter of approximately 10 cm that lies within the inner-perforated wall (306). The outer-flow distribution compartment (308) was defined by the annular region between the outer-perforated wall (308), with a diameter of approximately 8 cm, and the vessel-outer wall (304), with a diameter of 10 cm. The ion-exchange bead compartment was defined by the annular region between the outer-perforated wall, with a diameter of approximately 8 cm, and the inner-perforated wall, with a diameter of approximately 3 cm. Therefore, the total flow path through the annular ion-exchange bed was approximately 2.5 cm.

These compartments were separated by a porous polyethylene wall with 10 micron pore size. The porous polymer support contains the ion exchange beads within the ion-exchange compartment, and allows fluid to flow into and out from the ion-exchange bead compartment without conveying the ion-exchange beads from this compartment.

The ion exchange column was loaded with porous ion exchange beads. The porous ion exchange beads were comprised of ion exchange particles and a polymer matrix. The ion exchange particles were uncoated ion exchange particles comprised of an uncoated $Li_4Ti_5O_{12}$ core. The particles were approximately spherical with a mean diameter of 3 to 5 microns. The polymer matrix was comprised of polyvinylidene difluoride. The porous beads contain porous networks with a controlled distribution of pore sizes providing diffusion channels from the bead surface into the bead interior and to the ion exchange particles. The beads have a 150 micron average diameter.

The brine from which lithium was extracted consists of a natural aqueous chloride solution containing approximately 1000 mg/L Li, 60,000 mg/L Na, 10,000 mg/L K, 5,000 mg/L Ca, and 5,000 mg/L Mg, and other chemical species including sulfates. When this liquid resource enters the vessel, the pressure was 70 psi. Flow through this ion exchange material results in an outlet flow that contains 100 mg/L Li, 60,000 mg/L Na, 10,000 mg/L K, 5,000 mg/L Ca, and 5,000 mg/L Mg, and other chemical species including sulfates.

After the lithium-selective ion exchange beads were loaded with lithium, residual brine was washed from the lithium-selective ion exchange beads. An acidic chloride solution was then flowed into the vessel to elute lithium from the lithium-selective ion exchange beads while the lithium-selective ion exchange beads absorbed protons. Lithium in the acidic chloride solution was eluted at a lithium concentration of 1000 mg/L, while the concentration of sodium in the acidic chloride solution was below 400 mg/L.

Figure 4:
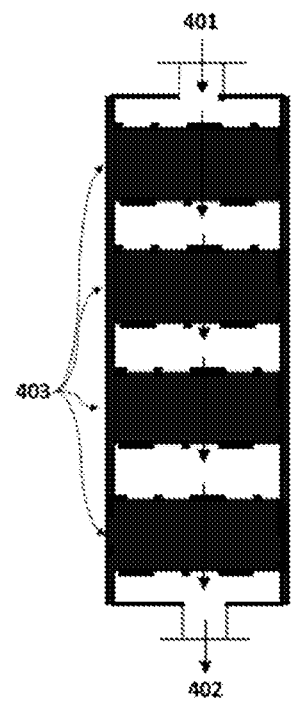
FIG. 4 illustrates a lithium extraction device comprising a vessel with trays loaded with ion exchange beads.

Example 4: Lithium Extraction Device Using a Vessel Comprising Trays Loaded with Ion Exchange Beads Lithium is extracted from a brine using a vessel comprising trays loaded with ion exchange beads. The trays are stacked vertically along the height of the vessel (FIG. 4). Each tray acts as an individual ion-exchange compartment. The internal characteristics of the vessel are shown in FIG. 4. The vessel is cylindrical and arranged vertically, is approximately 200 cm long, and has a width and height of approximately 45 cm. It is constructed of stainless-steel that is coated with a 1 mm of polytetrafluoroethylene. The vessel consists of four trays that are loaded with ion-exchange beads (403).

The liquid resource flows into the vessel from a top flange (401), where it flows into the first ion-exchange tray. The liquid flows through the ion-exchange bed on the tray, and into the next tray, eventually flowing through all four ion-exchange trays. The collected effluent then exits through a flange on the bottom of the ion-exchange vessel (402).

The ion-exchange tray supports an ion-exchange bed that is approximately 25 cm thick and 45 cm in diameter. The tray is structurally reinforced with metal to support the pressure on the tray. The inlet and outlet of the ion-exchange bead compartment consists of polymer nozzles with 100 micron slits, to prevent escape of beads. The ion-exchange beads are loaded into each of the ion-exchange compartments by mechanically separating each tray, and loading the ion exchange beads within each tray lined with the containing mesh. In each tray, fluid is transported by pressure-driven flow through the ion exchange bed, through the slits and polymer mesh, and into the liquid collection system.

The porous ion exchange beads are comprised of ion exchange particles and a polymer matrix. The ion exchange particles are coated ion exchange particles comprised of a $Li_4Mn_5O_{12}$ core with a $ZrO_2$ coating. The particles are approximately spherical with a mean diameter of 10 microns, the coating is approximately 2 nm thick. The porous beads contain porous networks with a controlled distribution of pore sizes providing diffusion channels from the bead surface into the bead interior and to the ion exchange particles. The polymer matrix is comprised of polyvinyl chloride. The beads have a 250 micron average diameter.

The brine from which lithium is extracted consists of a natural aqueous chloride solution containing approximately 250 mg/L Li, 80,000 mg/L Na, 1,000 mg/L Ca, and 1,000 mg/L Mg, and other chemical species including K and sulphates. When this liquid resource enters the vessel, the pressure needed to flow said resource at a rate of 12 L/min is 25 psi. Flow through this ion exchange material results in an outlet flow that contains approximately 25 mg/L Li, 80,000 mg/L Na, 1,000 mg/L Ca, and 1,000 mg/L Mg, and other chemical species including K and sulphates.

If the ion exchange beads are arranged in a single ion exchange column that is 1 m long, rather than divided into four ion exchange beds within four trays that are 25 cm long each, the pressure drop across the ion exchange bed is 100 psi, with the outlet flow containing 50 mg/L of Li. Therefore, the design of an ion exchange vessel containing a plurality of ion exchange beds reduces the energy associated with pumping a liquid resource through an ion exchange bed to absorb lithium, and improves lithium recovery, improving the overall process of lithium production via ion exchange.

Figure 5:
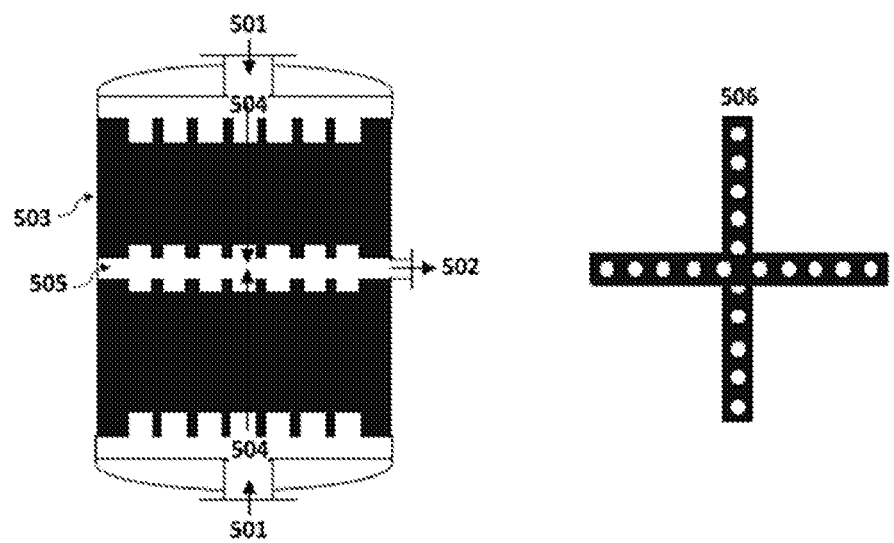
FIG. 5 illustrates a lithium extraction device comprising a vessel with ion exchange beads with internal flow distributors.

Example 5: Lithium Extraction Device Using a Vessel with Internal Flow Distributors Lithium is extracted from a brine using a vessel comprising internal flow distributors. (FIG. 5). The internal characteristics of the vessel are shown in FIG. 5. The vessel is cylindrical and arranged vertically, is approximately 120 cm long, and has a diameter of 120 cm. It is constructed of fiberglass. The vessel is oriented vertically.

The vessel contains one internal compartment where ion-exchange beads are loaded (503). Said ion-exchange compartment further contains three flow distributors (top view shown in 506). Two flow distributors deliver brine into the top and the bottom of the ion-exchange compartment (504). One flow distributor located at the half-way vertical point of the ion-exchange bed collects liquid that has undergone ion-exchange and removes it from the ion-exchange bed (505). The flow distributors are composed of perforated polyvinyl chloride pipe. Each flow distributor is surrounded by a polyester mesh with an average 55 micron pore size, to prevent fluid from conveying beads out of the ion-exchange compartment.

The liquid resource flows into the vessel from top and bottom flanges (501), where it flows into the top and bottom flow distributors (504). This distributor ensures uniform flow of the liquid resource into the ion-exchange bead compartment. The liquid resource flows through the ion-exchange beads (503), and into the liquid distributor in the middle of the tank (505). This latter distributor collects the resource that has undergone ion-exchange, which exits the vessel through a flange at the side (502).

The ion exchange medium is loaded by opening up the top of the vessel through a flanged opening, and closing the vessel. The ion-exchange beads occupy the entirety of the vessel. The flow distributors are submerged within the ion-exchange beads.

The porous ion exchange beads are comprised of ion exchange particles and a polymer matrix. The ion exchange particles are coated ion exchange particles comprised of a $Li_4Ti_5O_{12}$ core with a $SiO_2$ coating. The particles are approximately spherical with a mean diameter of 5 microns, the coating is approximately 10 nm thick. The porous beads contain porous networks with a controlled distribution of pore sizes providing diffusion channels from the bead surface into the bead interior and to the ion exchange particles. The polymer matrix is comprised of polyvinylidene fluoride. The beads have a 400 micron average diameter.

The brine from which lithium is extracted consists of a natural aqueous chloride solution containing approximately 850 mg/L Li, 20,000 mg/L Na, 20,000 mg/L Ca, and 20,000 mg/L Mg, and other chemical species including K and sulphates. When this liquid resource enters the vessel, the pressure is 150 psi. Flow through this ion exchange material results in an outlet flow that contains approximately 85 mg/L Li, 20,000 mg/L Na, 20,000 mg/L Ca, and 20,000 mg/L Mg, and other chemical species including K and sulphates.

Figure 6:
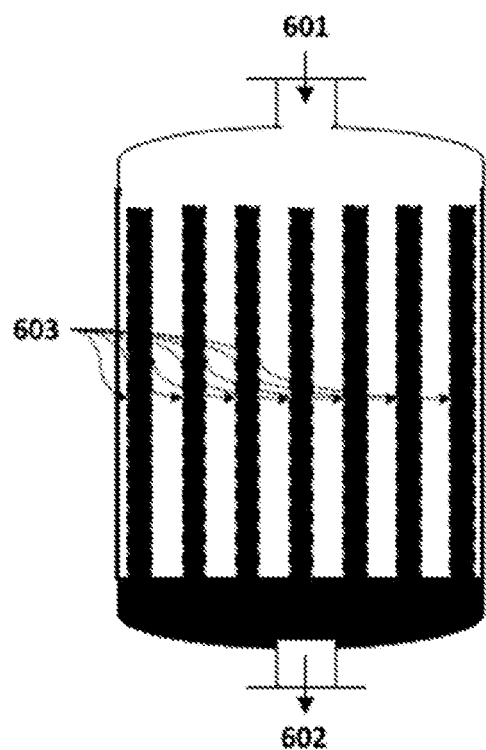
FIG. 6 illustrates a lithium extraction device comprising a vessel with internal flow distributors loaded with ion exchange beads.

Example 6: Lithium Extraction Device Using a Vessel with Ion Exchange Beads Loaded into a Flow Distributor Lithium is extracted from a brine using a vessel comprising internal flow distributors that are filled with ion exchange beads (FIG. 6). The internal characteristics of the vessel are shown in FIG. 6. The vessel is cylindrical, is approximately 150 cm long, and has a diameter of 120 cm. It is constructed of titanium.

The vessel contains thirty narrow compartments with perforated walls (603) that are connected to an outlet at the bottom of the ion exchange vessel (602). Each compartments contain an internal perforated pipe surrounded by a bed of ion exchange beads.

The perforated compartments consist of cylindrical perforated polyvinyl chloride pipe that is 10 cm in diameter. All pipes, are surrounded by a polyester mesh with an average 70 micron pore size, to prevent fluid from conveying beads out of the ion-exchange compartment. The ion exchange medium is loaded into the inside of the compartments by pumping a slurry of the ion-exchange material into the compartments.

Under operation, the liquid resource flows into the vessel from atop flange (601), where it flows into compartment that is spanned by the perforated compartments containing ion exchange beads. This compartment becomes filled with liquid, which is then pushed into the perforated pipes through the perforations and retaining mesh described above. The fluid then flows through the bed of ion exchange particles (603) and through the internal perforated pipes inside the compartments, and eventually exits the bottom of the vessel (602).

The porous ion exchange beads are comprised of ion exchange particles and a polymer matrix. The ion exchange particles are coated ion exchange particles comprised of a $Li_4Mn_5O_{12}$ core with a $TiO_2$ coating. The particles are approximately spherical with a mean diameter of 8 microns micron, the coating is approximately 20 nm thick. The porous beads contain porous networks with a controlled distribution of pore sizes providing diffusion channels from the bead surface into the bead interior and to the ion exchange particles. The polymer matrix is comprised of polyvinylidene fluoride. The beads have a 150 micron average diameter.

The brine from which lithium is extracted consists of a natural aqueous chloride solution containing approximately 500 mg/L Li, 20,000 mg/L Na, 20,000 mg/L Ca, and 20,000 mg/L Mg, and other chemical species including K and sulphates. When this liquid resource is pumped into the vessel at 60 psi of pressure. Flow through this ion exchange material results in an outlet flow that contains approximately 75 mg/L Li, 20,000 mg/L Na, 20,000 mg/L Ca, and 20,000 mg/L Mg, and other chemical species including K and sulphates.

Example 7: Lithium Extraction Device Using a Vessel Comprising Fluid Level Controllers Loaded with Ion Exchange Beads Co-Loaded with Inert Filler Material Lithium was extracted from a brine using a vessel containing ion-exchange beads, where the fluid level in the vessel was controlled to fully submerge ion exchange beads (FIG. 7).

The internal characteristics of the vessel comprising fluid level controllers is shown in FIG. 7. The vessel was cylindrical and arranged vertically, was approximately 10 cm tall, and had a diameter of approximately 3 cm. It was constructed of PVC.

Fluid flowed into the vessel from atop flange (701) into a dome at the top of the vessel, where it flowed through a 0.2 cm diameter and 1 cm long pipe (705), to the main fluid level (704). The fluid level was constantly monitored using an ultrasonic level sensor, and the level was adjusted continuously to remain at a height such that the ion-exchange beads was constantly submerged (704). The liquid level of the tank was maintained at 6 cm from the bottom of the vessel. Control of the fluid level was achieved via a proportional-integral-derivative controller that modulates the drain rate through the valve (706) at the bottom of the tank. The top of the tank was maintained at a constant pressure of 10 psi by means of the pump delivering brine into the vessel.

The ion-exchange beads partially filled the volume of the vessel. The height of the ion exchange beads (703) was 6 cm from the bottom of the vessel, and the top 4 cm of the vessel are filled with gas. The outlet of the vessel comprised a flow distributor with 100 micron slits to prevent escape of beads. Fluid was transported by pressure-driven flow through the ion exchange bed, through the polymer support, and through the bottom outlet of the vessel (702).

The ion-exchange beads (707) were conveyed into the vessel when initially loaded, by mechanically removing the top of the vessel which was attached through to the rest of the vessel through a union. The ion-exchange beads (707) were co-loaded with an inert filler material (708), comprising polymer spheres with an average diameter of 24 mm.

The porous ion exchange beads comprised coated ion exchange particles and a polymer matrix. The ion exchange particles were coated ion exchange particles comprised of a $Li_2TiO_3$ core with a $TiO_2$ coating. The particles were approximately spherical with a mean diameter of 15.0 microns to 40.0 microns, and the coating thickness was approximately 3.0 nm. The polymer matrix comprised polyvinylidene difluoride. The porous beads contained porous networks with a controlled distribution of pore sizes providing diffusion channels from the bead surface into the bead interior and to the ion exchange particles. The beads had a 400 micron average diameter.

The brine from which lithium was extracted consists of a natural aqueous chloride solution containing approximately 350 mg/L Li, 60,000 mg/L Na, 5,000 mg/L Ca, and 5,000 mg/L Mg, and other chemical species including K, chloride, and sulfate. When this liquid resource enters the vessel, the pressure needed to flow said resource at a rate of 25 L/min. Flow through this ion exchange material results in an outlet flow that contains approximately 45 mg/L Li, 30,000 mg/L Na, 5,000 mg/L Ca, and 5,000 mg/L Mg, and other chemical species including K, chloride, and sulfate.

After the lithium-selective ion exchange beads were loaded with lithium, residual brine was washed from the lithium-selective ion exchange beads. An acidic chloride solution was then flowed into the vessel to elute lithium from the lithium-selective ion exchange beads while the lithium-selective ion exchange beads absorbed protons. Lithium in the acidic chloride solution was eluted at a lithium concentration of 750 mg/L, while the concentration of sodium in the acidic solution was maintained below 400 mg/L.

Example 8: Lithium Extraction Device Using a Vessel Comprising Fluid Level Controllers Loaded with Ion Exchange Beads and Inert Filler Material Lithium is extracted from a brine using a vessel containing ion-exchange beads, where the fluid level in the vessel is controlled to fully submerge ion exchange beads (FIG. 8).

The internal characteristics of the vessel comprising fluid level controllers is shown in FIG. 8. The vessel is cylindrical and arranged vertically, is approximately 90 cm tall, and has a diameter of approximately 20 cm. It is constructed of polyvinyl chloride.

Fluid flows into the vessel from a top flange (801) into a dome at the top of the vessel, where it flowed through a 5 cm diameter and 50 cm long pipe (805), to the main fluid level (804). The fluid level is constantly monitored using an ultrasonic level sensor, and the level is adjusted continuously to remain at a height such that the ion-exchange media is constantly submerged (804). The liquid level of the tank is maintained at 60 cm from the bottom of the vessel. Control of the fluid level is achieved via a proportional-integral-derivative controller that modulates the aperture of the valve (806) at the bottom of the tank. The top of the tank is maintained at a constant pressure of 25 psi by means of the pump delivering brine into the vessel.

The ion-exchange beads partially fill the volume of the vessel. The height of the ion exchange beads (803) is 35 cm from the bottom of the vessel. The outlet of the vessel comprises a porous polymer support consisting of a polyester mesh with 45 micron pore size, to prevent escape of beads. Fluid is transported by pressure-driven flow through the ion exchange bed, through the polymer support, and through the bottom outlet of the vessel (802).

The ion-exchange beads are conveyed into the vessel when initially loaded, by mechanically removing the top-dome of the vessel which is attached through to the rest of the vessel through a bolted stainless-steel flange. Once ion-exchange beads are loaded, the remaining empty space within the vessel is filled up with an inert filler material (807), comprising titanium cross-shaped filler material with a width of 50 mm.

The porous ion exchange beads are comprised of coated ion exchange particles and a polymer matrix. The ion exchange particles are coated ion exchange particles comprised of a $Li_4Mn_5O_{12}$ core with a $ZrO_2$ coating. The particles are approximately spherical with a mean diameter of 5.0 microns to 25.0 microns, and the coating thickness is approximately 10.0 nm. The polymer matrix is comprised of polyvinylidene difluoride. The porous beads contain porous networks with a controlled distribution of pore sizes providing diffusion channels from the bead surface into the bead interior and to the ion exchange particles. The beads have a 600 micron average diameter.

The brine from which lithium is extracted consists of a natural aqueous chloride solution containing approximately 450 mg/L Li, 60,000 mg/L Na, 5,000 mg/L Ca, and 15,000 mg/L Mg, and other chemical species including K, chloride, and sulfate. When this liquid resource enters the vessel, the pressure needed to flow said resource at a rate of 25 L/min. Flow through this ion exchange material results in an outlet flow that contains approximately 75 mg/L Li, 30,000 mg/L Na, 15,000 mg/L Ca, and 5,000 mg/L Mg, and other chemical species including K, chloride, and sulfate.

Example 9: Lithium Extraction Device Using a Network of Vessels Comprising Filter Banks Loaded with Ion Exchange Beads Connected with pH Modulating Units Lithium is extracted from a liquid resource using a network of vessels containing ion-exchange beads.

Figure 9:
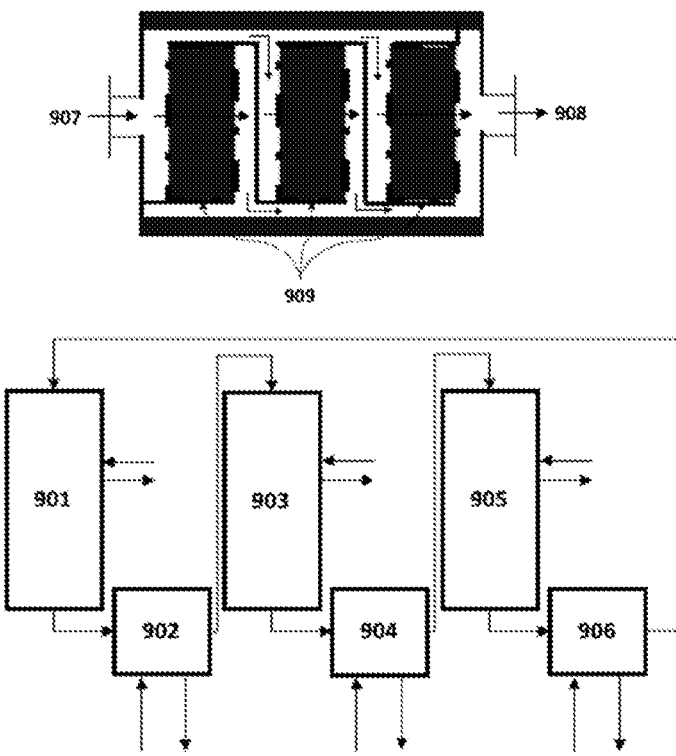
FIG. 9 illustrates a lithium extraction device comprising a network of vessels with filter banks loaded with ion exchange beads connected with pH modulating units.

Each vessel comprises filter banks filled with ion exchange beads arranged along the length of the vessel, with parallel flow to and from each filter bank. Each filter bank acts as an individual ion-exchange compartment. The internal characteristics of the vessel are shown in FIG. 9. The vessel is rectangular and arranged horizontally, is approximately 180 cm long, and has a width and height of approximately 50 cm. It is constructed of polymer-coated stainless steel. The vessel consists of 3 filter banks that act as ion-exchange compartments (909), and flow channels that distribute the flow to each of the three filter banks and collect the outlet flow from each of the three filter banks. Inlet and outlet flow distribution systems connect to each other only through the ion-exchange compartments.

The ion-exchange compartments (909) are 40 cm wide and 40 cm tall, with a length of 40 cm. The inlet and outlet of each ion-exchange bead compartment consists of polymer nozzles with 100 micron slits. In each ion exchange compartment, fluid is transported by pressure-driven flow through the ion exchange bed, through the polymer support, and into the fluid collection system. Even flow to each ion-exchange compartment is ensured because the pressure-drop across the ion-exchange bead is approximately 100 times larger than pressure drop due to frictional losses in the inlet and outlet flow distributors.

The ion-exchange beads are loaded into each of the ion-exchange compartments by mechanically separating each flow ion exchange compartment, and loading the ion exchange beads in the interstitial space. The porous ion exchange beads are comprised of ion exchange particles and a polymer matrix. The ion exchange particles are coated ion exchange particles comprised of a $Li_2Mn_2O_5$ core with a $TiO_2$ coating. The particles are approximately spherical with a mean diameter of 10 microns, and the coating thickness is approximately 5 nm. The polymer matrix is comprised of polyvinyl chloride. The porous beads contain porous networks with a controlled distribution of pore sizes providing diffusion channels from the bead surface into the bead interior and to the ion exchange particles. The beads have a 200 microns average diameter.

The liquid resource flows into each vessel from a side flange (907), where it flows into the flow distribution pipes which delivers them to each one of the ion-exchange chambers. The liquid flows through the above-mentioned mesh, through the bed of ion-exchange beads (909), out of the above-mentioned mesh, and into the outlet flow distribution pipes. The collected effluent then exits through a flange (908) on the other side of the ion-exchange vessel.

The brine from which lithium is extracted consists of a natural aqueous chloride solution containing approximately 1000 mg/L Li, 60,000 mg/L Na, 10,000 mg/L Ca, and 30,000 mg/L Mg, and other chemical species including K and chloride.

Three such vessels are connected to form a network. The vessels are connected via tanks where the pH of the brine is adjusted, as illustrated in FIG. 9. The network consists of ion exchange vessels (901, 903, 905), and mixing tanks for base and brine (902, 904, 906). For the mixing tanks in the brine circuit (902, 904, 906), an aqueous base solution of NaOH is added to increase the pH of the brine to 7.5. The pH of the brine is monitored before and after each mixing tank in the brine circuit to control the rate of addition of aqueous base solution.

For the purposes of this example, a flow configuration would be: a liquid resource flows into tank 902, then into vessel 903, into tank 904, into vessel 905, into tank 906 from which it leaves the system. Acid is concurrently flowed through vessel 901.

At any point during the operation of the network of three vessels, lithium is being extracted from brine with two vessels. Brine flows into a first mixing tank (e.g. 902) at pH of 6.5, and its pH is adjusted to a value of 7.5. This brine is fed to the first ion-exchange vessel (e.g. 902). The first vessel absorbs (e.g. 903) most of the lithium, releasing protons; this results in a drop in Li concentration from 1000 to 200 mg/L and a drop in pH to a value of 3.0. Subsequently, in the subsequent mixing tank (e.g. 904), the pH of said brine is raised to about 7.5, and the brine is flowed into a second column (e.g. 905) which absorbs remaining lithium, and the Li concentration drops from 200 to 90 g/L.

The third vessel (e.g. 901) is saturated with lithium from a previous ion-exchange cycle, and is therefore treated with 1.0 M hydrochloric acid to yield a lithium chloride concentrate. The acid solution flows through the ion exchange vessel, where the protons from the acid enter the ion exchange beads and are exchanged for lithium. Lithium is thereby released from the beads and enters the acid solution.

When the rate of lithium uptake by the ion exchange beads slows, pumping through the system is terminated, and the vessels containing brine are washed with water. Then, the flows of brine, water, and acid are redirected such that a new vessel is treated with acid and the others with brine.

These system operations are repeated, loading lithium into each column until saturation, and redirecting flow to the next configuration of flows while the saturated column is treated with acid to release lithium. The process extracts lithium from brine and yield a lithium chloride concentrate which is then treated with sodium carbonate to precipitate a lithium carbonate product.

Figure 10:
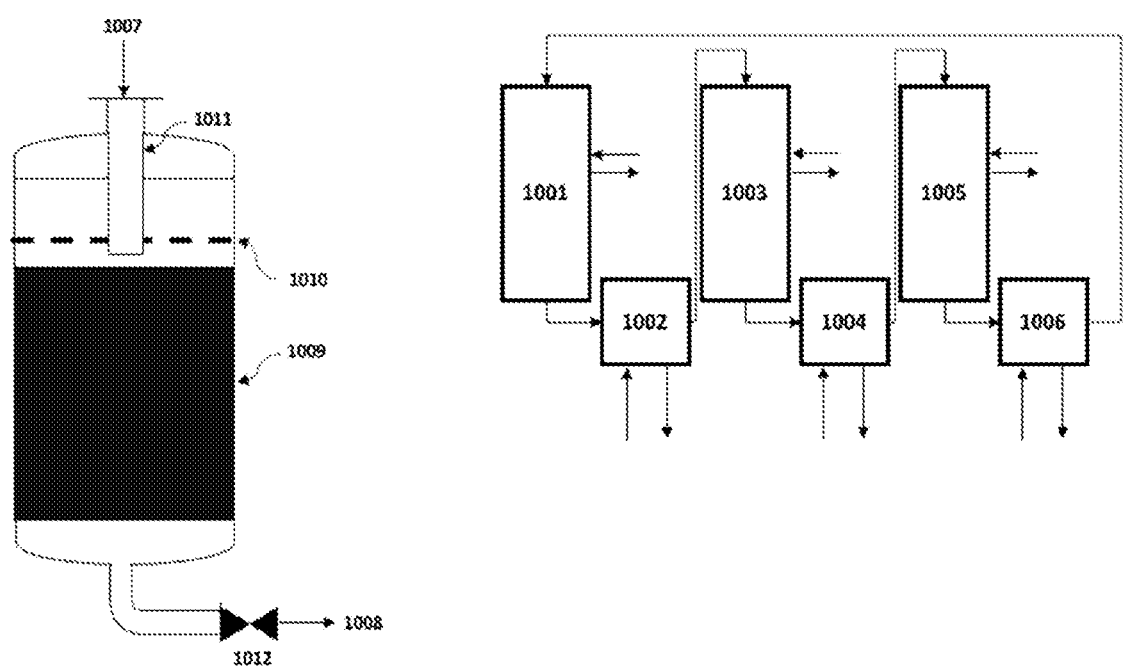
FIG. 10 illustrates a lithium extraction device comprising a network of vessels with a fluid level controller loaded with ion exchange beads connected with pH modulating units.

Example 10: Lithium Extraction Device Using a Network of Vessels Comprising Fluid Level Controllers Loaded with Ion Exchange Beads Connected with pH Modulating Units Lithium is extracted from a brine using a network of vessels containing ion-exchange beads, where the fluid level in the vessel is controlled to fully submerge ion exchange beads (FIG. 10). The vessels in the network are connected by pH modulating tanks.

The internal characteristics of the vessel comprising fluid level controllers is shown in FIG. 10. The vessel is cylindrical and arranged vertically, is approximately 150 cm tall, and has a diameter of approximately 150 cm. It is constructed of titanium.

Fluid flows into the vessel from a top flange (1007) into a dome at the top of the vessel, where it flows through a pipe (1011), to the main fluid level (1010). The fluid level is constantly monitored using an ultrasonic level sensor, and the level is adjusted continuously to remain at a height such that the ion-exchange media is constantly submerged (1010). The liquid level of the tank is maintained at 100 cm from the bottom of the vessel. Control of the fluid level is achieved via a proportional-integral-derivative controller that modulates the aperture of the valve (1012) at the bottom of the tank. Brine is pumped into the vessel at 120 psi.

The ion-exchange beads partially fill the volume of the vessel. The height of the ion exchange beads (1009) is 70 cm from the bottom of the vessel. The outlet of the vessel comprises a distributor with nozzles having 100 micron slits. Fluid is transported by pressure-driven flow through the ion exchange bed, through the polymer support, and through the bottom outlet of the vessel (1008).

The ion-exchange beads are conveyed into the vessel when initially loaded, by mechanically removing the top-dome of the vessel which is attached through to the rest of the vessel through a bolted stainless-steel flange.

The porous ion exchange beads are comprised of coated ion exchange particles and a polymer matrix. The ion exchange particles are coated ion exchange particles comprised of a $Li_2TiO_3$ core with a PVC coating. The particles are approximately spherical with a mean diameter of 5 microns, and the coating thickness is approximately 10 nm. The polymer matrix is comprised of polyvinylidene difluoride. The porous beads contain porous networks with a controlled distribution of pore sizes providing diffusion channels from the bead surface into the bead interior and to the ion exchange particles. The beads have a 250 micron average diameter.

The brine from which lithium is extracted consists of a natural aqueous chloride solution containing approximately 450 mg/L Li, 80,000 mg/L Na, 5,000 mg/L Ca, and 5,000 mg/L Mg, and other chemical species including K and chloride.

Three such vessels are connected to form a network. The vessels are connected via tanks where the pH of the brine is adjusted, as illustrated in FIG. 10. The network consists of ion exchange vessels (1001, 1003, 1005), and mixing tanks for base and brine (1002, 1004, 1006). For the mixing tanks in the brine circuit (1002, 1004, 1006), an aqueous base solution of NaOH is added to increase the pH of the brine to 7.5. The pH of the brine is monitored before and after each mixing tank in the brine circuit to control the rate of addition of aqueous base solution.

For the purposes of this example, a flow configuration would be: a liquid resource flows into tank 1002, then into vessel 1003, into tank 1004, into vessel 1005, into tank 1006 from which it leaves the system. Acid is flowed through vessel 1001.

At any point during the operation of the network of three vessels, lithium is being extracted from brine with two vessels. The third vessel (e.g. 1001) which was saturated with lithium from a previous ion-exchange cycle, and is therefore treated with 0.1 M hydrochloric acid to yield a lithium chloride solution. The acid solution flows through the ion exchange vessel, where the protons from the acid enter the ion exchange beads and are exchanged for lithium. Lithium is thereby released from the beads and enters the acid solution.

When the rate of lithium uptake by the ion exchange beads slows, pumping through the system is terminated, and the vessels containing brine are washed with water. Then, the flows of brine, water, and acid are redirected to treat with acid one of the vessels recently treated with brine.

These system operations are repeated, loading lithium into each column until saturation, and redirecting flow to the next configuration of flows while the saturated column is treated with acid to release lithium. The process extracts lithium from brine and yield a lithium chloride concentrate which is treated with sodium carbonate to precipitate lithium carbonate and then treated with lime to yield lithium hydroxide which is crystallized in an evaporator.

Figure 11:
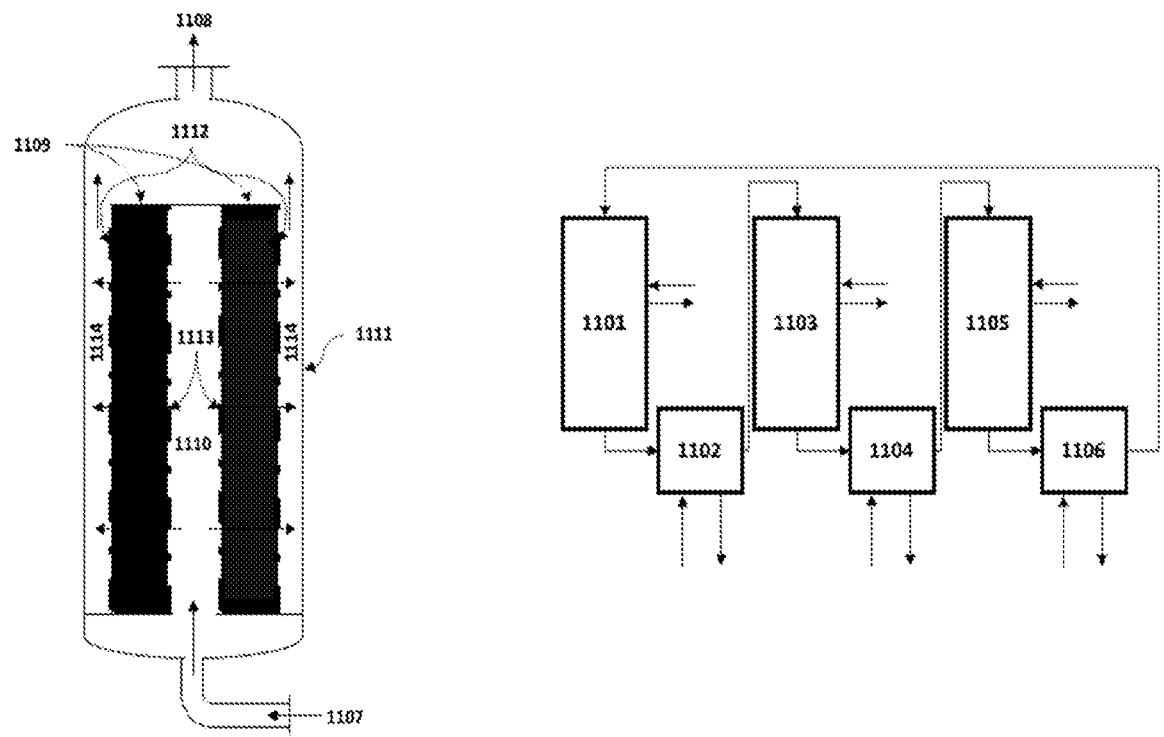
FIG. 11 illustrates a lithium extraction device comprising a network of vessels with a radial-flow packed ion-exchange bed connected with pH modulating units.

Example 11: Lithium Extraction Device Using a Network of Vessels Comprising Radial-Flow Packed Ion-Exchange Beds Connected with pH Modulating Units Lithium is extracted from a brine using a network of vessels containing ion-exchange beads packed in radial-flow beds with minimal flow resistance (FIG. 11). The vessels in the network are connected by pH modulating tanks.

The internal characteristics of the radial-flow ion exchange vessel is shown in FIG. 11. The vessel is cylindrical and arranged vertically, is approximately 300 cm tall, and has a diameter of approximately 80 cm. It is constructed of polymer-coated stainless steel.

A liquid resource or other process fluid flows into the ion exchange vessel from a flange at the bottom of the vessel (1107). Fluid passes from the inner flow-distribution compartment (1110), through the inner-perforated wall (1113), through ion-exchange bead compartment (1109), through the outer-perforated wall (1112) and into the outer-flow distribution compartment (1114). From there, the fluid flows into the top of the vessel and exits the vessel through a tope flanged connection (1108).

This inner-flow distribution compartment (1110) is defined by a cylinder with a diameter of approximately 7.5 cm that lies within the inner-perforated wall (1113). The outer-flow distribution compartment (1114) is defined by the annular region between the outer-perforated wall (1112), with a diameter of approximately 75 cm, and the vessel-outer wall (1111), with a diameter of 80 cm. The ion-exchange bead compartment (is defined by the annular region between the outer-perforated wall, with a diameter of approximately 75 cm, and the inner-perforated wall, with a diameter of approximately 7.5 cm. Therefore, the total flow path through the annular ion-exchange bed is of 67.5 cm.

These compartments are separated by a perforated walls with evenly spaced perforations that are ⅛ inch in diameter. On the inside diameter of the outer perforated-wall, and the inside diameter of the inner perforated-wall, is a porous polymer support consisting of a polypropylene mesh with 50 micron pore size. The porous polymer support contains the ion exchange beads within the ion-exchange compartment, and allows fluid to flow into and out from the ion-exchange bead compartment without conveying the ion-exchange beads from this compartment.

The ion exchange vessel is loaded with a radial bed of porous ion exchange beads. The porous ion exchange beads are comprised of ion exchange particles and a polymer matrix. The ion exchange particles are coated ion exchange particles comprised of a $Li_2Mn_2O_5$ core with a $TiO_2$ coating. The particles are approximately spherical with a mean diameter of 20 microns, the coating is approximately 10 nm thick. The porous beads contain porous networks with a controlled distribution of pore sizes providing diffusion channels from the bead surface into the bead interior and to the ion exchange particles. The polymer matrix is comprised of polyvinyl chloride. The beads have a 350 microns average diameter.

The brine from which lithium is extracted consists of a natural aqueous chloride solution containing approximately 200 mg/L Li, 100,000 mg/L Na, 3,000 mg/L Ca, and 3,000 mg/L Mg, and other chemical species including K and chloride.

Three such vessels are connected to form a network. The vessels are connected via tanks where the pH of the brine is adjusted, as illustrated in FIG. 11. The network consists of ion exchange vessels (1101, 1103, 1105), and mixing tanks for base and brine (1102, 1104, 1106). For the mixing tanks in the brine circuit (1102, 1104, 1106), an aqueous base solution of NaOH is added to increase the pH of the brine to 7.5. The pH of the brine is monitored before and after each mixing tank in the brine circuit to control the rate of addition of aqueous base solution.

For the purposes of this example, a flow configuration would be: a liquid resource flows into tank 1102, then into vessel 1103, into tank 1104, into vessel 1105, into tank 1106 from which it leaves the system. Acid is concurrently flowed through vessel 1101.

At any point during the operation of the network of three vessels, lithium is being extracted from brine with two vessels. Brine flows into a first mixing tank (e.g. 1102) at pH of 4, and its pH is adjusted to a value of 8. This brine is fed to the first ion-exchange vessel (e.g. 1102). The first vessel absorbs (e.g. 1103) most of the lithium, releasing protons; this results in a drop in Li concentration from 200 to 120 mg/L and a drop in pH to a value of 4. Subsequently, in the subsequent mixing tank (e.g. 1104), the pH of said brine is raised to about 8, and the brine is flowed into a second column (e.g. 1105) which absorbs remaining lithium, and the Li concentration drops from 120 to 40 g/L.

The third vessel (e.g. 1101) is saturated with lithium from a previous ion-exchange cycle, and is therefore treated with 1.0 M hydrochloric acid to yield a lithium chloride concentrate. The acid solution flows through the ion exchange vessel, where the protons from the acid enter the ion exchange beads and are exchanged for lithium. Lithium is thereby released from the beads and enters the acid solution.

When the rate of lithium uptake by the ion exchange beads slows, pumping through the system is terminated, and the vessels containing brine are washed with water. Then, the flows of brine, water, and acid are redirected, such that a vessel recently treated with brine is then treated with acid.

These system operations are repeated, loading lithium into each column until saturation, and redirecting flow to the next configuration of flows while the saturated column is treated with acid to release lithium. The process extracts lithium from brine and yield a lithium chloride concentrate for production of lithium carbonate and other lithium chemicals.

Example 12: Lithium Extraction Device Using a Network of Vessels Comprising Trays Loaded with Ion Exchange Beads Connected with pH Modulating Units Lithium is extracted from a brine using a network of vessels comprising trays loaded with ion exchange beads. The vessels in the network are connected by pH modulating tanks.

Figure 12:
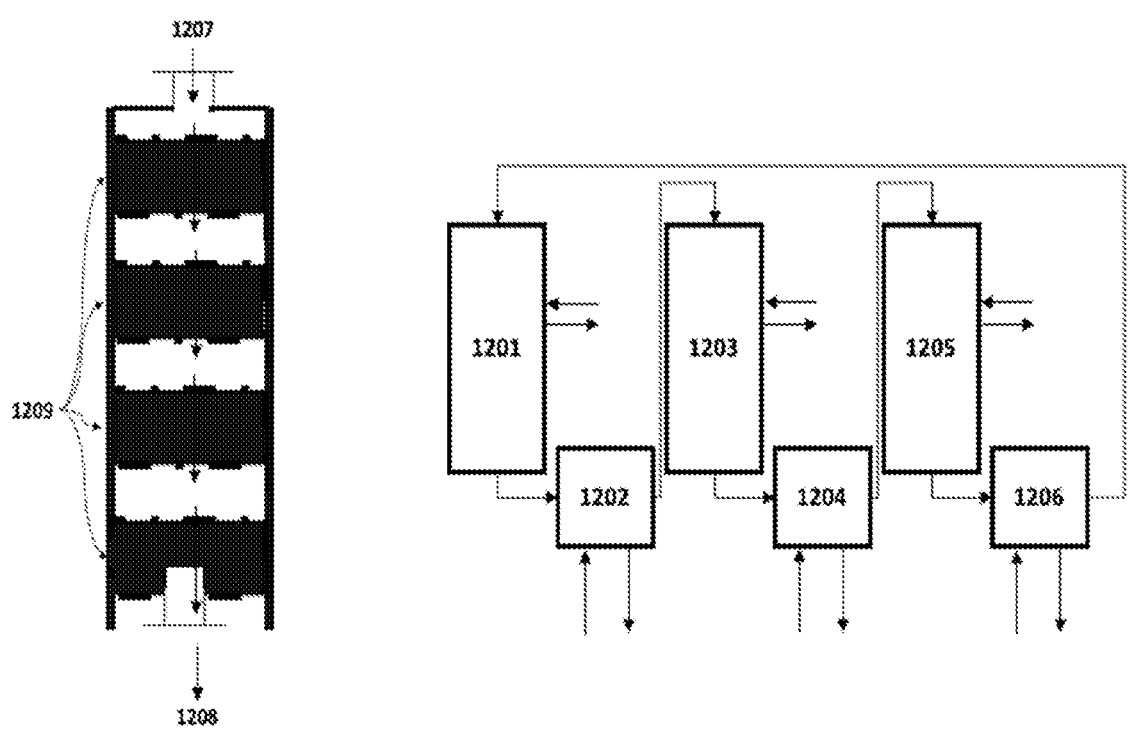
FIG. 12 illustrates a lithium extraction device comprising a network of vessels with comprising trays loaded with ion exchange beads connected with pH modulating units.

Within each vessel, the trays are stacked vertically along the height of the vessel (FIG. 12). Each tray acts as an individual ion-exchange compartment. The internal characteristics of the vessel are shown in FIG. 12. The vessel is square and arranged vertically, is approximately 50 cm long, and has a width and height of approximately 10 cm. It is constructed of titanium. The vessel consists of four trays that are loaded with ion-exchange beads (1209).

The liquid resource flows into the vessel from a top flange (1207), where it flows into the first ion-exchange tray. The liquid flows through the ion-exchange bed on the tray, and into the next tray, eventually flowing through all four ion-exchange trays. The collected effluent then exits through a flange on the bottom of the ion-exchange vessel (1208).

The ion-exchange tray supports an ion-exchange bed that is approximately 7.5 cm thick and 10 cm in diameter. The thickness of metal constituting the tray is ¼ inch. The inlet and outlet of the ion-exchange bead compartment consists of a polyester mesh with 50 micron pore size, to prevent escape of beads. The bottom of the tray contains narrow slits that span the entire width of the tray. Each slit is ⅛ inch wide, and each slit is separated ¼ inch. The ion-exchange beads are loaded into each of the ion-exchange compartments by mechanically separating each tray, and loading the ion exchange beads within each tray lined with the containing mesh. In each tray, fluid is transported by pressure-driven flow through the ion exchange bed, through the slits and polymer mesh, and into the liquid collection system.

The porous ion exchange beads are comprised of ion exchange particles and a polymer matrix. The ion exchange particles are uncoated ion exchange particles comprised of an uncoated $Li_4MnO_2$ core. The particles are approximately spherical with a mean diameter of 10 microns. The porous beads contain porous networks with a controlled distribution of pore sizes providing diffusion channels from the bead surface into the bead interior and to the ion exchange particles. The beads have a 250 micron average diameter.

The brine from which lithium is extracted consists of a natural aqueous chloride solution containing approximately 1000 mg/L Li, 75,000 mg/L Na, 5,000 mg/L Ca, and 5,000 mg/L Mg, and other chemical species including K and chloride.

Three such vessels are connected to form a network. The vessels are connected via tanks where the pH of the brine is adjusted, as illustrated in FIG. 12. The network consists of ion exchange vessels (1201, 1203, 1205), and mixing tanks for base and brine (1202, 1204, 1206). For the mixing tanks in the brine circuit (1202, 1204, 1206), an aqueous base solution of NaOH is added to increase the pH of the brine to 7.5. The pH of the brine is monitored before and after each mixing tank in the brine circuit to control the rate of addition of aqueous base solution.

For the purposes of this example, a flow configuration would be: a liquid resource flows into tank 1202, then into vessel 1203, into tank 1204, into vessel 1205, into tank 1206 from which it leaves the system. Acid is concurrently flowed through vessel 1201.

At any point during the operation of the network of three vessels, lithium is being extracted from brine with two vessels. Brine flows into a first mixing tank (e.g. 1202) at pH of 6.5, and its pH is adjusted to a value of 7.5. This brine is fed to the first ion-exchange vessel (e.g. 1202). The first vessel absorbs (e.g. 1203) most of the lithium, releasing protons; this results in a drop in Li concentration from 1000 to 300 mg/L and a drop in pH to a value of 3.0. Subsequently, in the subsequent mixing tank (e.g. 1204), the pH of said brine is raised to about 7.5, and the brine is flowed into a second column (e.g. 1205) which absorbs remaining lithium, and the Li concentration drops from 300 to 100 g/L.

The third vessel (e.g. 1201) is saturated with lithium from a previous ion-exchange cycle, and is therefore treated with 0.1 M hydrochloric acid to yield a lithium chloride concentrate. The acid solution flows through the ion exchange vessel, where the protons from the acid enter the ion exchange beads and are exchanged for lithium. Lithium is thereby released from the beads and enters the acid solution.

When the rate of lithium uptake by the ion exchange beads slows, pumping through the system is terminated, and the vessels containing brine are washed with water. Then, the flows of brine, water, and acid are redirected, such that a vessel recently treated with brine is then treated with acid.

These system operations are repeated, loading lithium into each column until saturation, and redirecting flow to the next set of columns while the saturated column is treated with acid to release lithium. The process extracts lithium from brine and yield a lithium chloride concentrate for production of lithium carbonate or other lithium chemicals.

Figure 13:
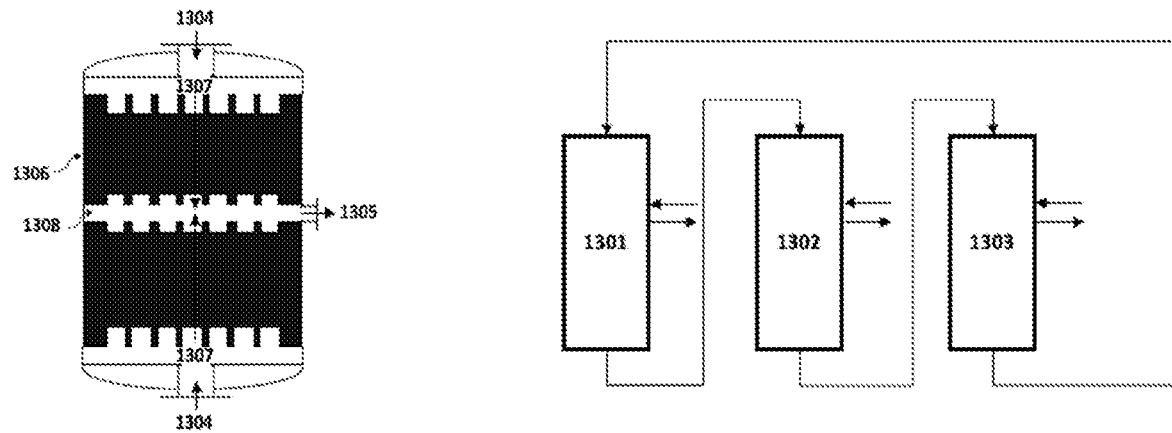
FIG. 13 illustrates a lithium extraction device comprising a network of vessels with ion exchange beads with internal flow distributors connected with pH modulating units.

Example 13: Lithium Extraction Device Using a Network of Vessels Loaded with Ion Exchange Beads with Internal Flow Distributors Lithium is extracted from a brine using a network of vessels comprising internal flow distributors. (FIG. 13). The internal characteristics of the vessel are shown in FIG. 13. The vessel is cylindrical and arranged vertically, is approximately 150 cm long, and has a diameter of 120 cm. It is constructed of fiber-glass reinforced polymer. The vessel is oriented vertically.

The vessel contains one internal compartment where ion-exchange beads are loaded (1306). Two flow distributors deliver brine into the top and the bottom of the ion-exchange compartment (1307). One flow distributor located at the half-way vertical point of the ion-exchange bed collects liquid that has undergone ion-exchange and removes it from the ion-exchange bed (1308). The flow distributors are composed of perforated polyvinyl chloride pipe that is 2-4 cm in diameter, with polymer nozzles with 100 micron slits to facilitate flow while immobilizing the beads.

The liquid resource flows into the vessel from atop and bottom flanges (1304), where it flows into the top and bottom flow distributors (1307). This distributor ensures uniform flow of the liquid resource into the ion-exchange bead compartment. The liquid resource flows through the ion-exchange beads (1306), and into the liquid distributor in the middle of the tank (1308). This latter distributor collects the resource that has undergone ion-exchange, which exits the vessel through a flange at the side (1305).

The ion exchange medium is loaded by opening up the top of the vessel through a flanged opening, and closing the vessel. The ion-exchange beads occupy the entirety of the vessel. The flow distributors are submerged within the ion-exchange beads.

The porous ion exchange beads are comprised of ion exchange particles and a polymer matrix. The ion exchange particles are coated ion exchange particles comprised of a $Li_4Ti_5O_{12}$ core with a $ZrO_2$ coating. The particles are approximately spherical with a mean diameter of 10 microns, the coating is approximately 5 nm thick. The porous beads contain porous networks with a controlled distribution of pore sizes providing diffusion channels from the bead surface into the bead interior and to the ion exchange particles. The polymer matrix is comprised of polyvinylidene fluoride. The beads have a distribution of shapes with a 100 micron mm average diameter.

The brine from which lithium is extracted consists of a natural aqueous chloride solution containing approximately 300 mg/L Li, 100,000 mg/L Na, 1,000 mg/L Ca, and 2,000 mg/L Mg, and other chemical species including K and chloride.

Three such vessels are connected to form a network, as illustrated in FIG. 13. The network consists of ion exchange vessels (1301, 1302, 1303). For the purposes of this example, a flow configuration would be: a liquid resource flows into vessel 1301, into vessel 1302, from which it leaves the system. Acid is concurrently flowed through vessel 1303.

At any point during the operation of the network of three vessels, lithium is being extracted from brine with two vessels. This brine is fed to the first ion-exchange vessel (e.g. 1301). The first vessel absorbs (e.g. 1301) most of the lithium, releasing protons; this results in a drop in Li concentration from 300 to 180 mg/L, and the brine is flowed into a second column (e.g. 1302) which absorbs remaining lithium, and the Li concentration drops from 180 to 50 g/L.

The third vessel (e.g. 1303) is saturated with lithium from a previous ion-exchange cycle, and is therefore treated with 1.0 M hydrochloric acid to yield a lithium chloride concentrate. The acid solution flows through the ion exchange vessel, where the protons from the acid enter the ion exchange beads and are exchanged for lithium. Lithium is thereby released from the beads and enters the acid solution.

When the rate of lithium uptake by the ion exchange beads slows, pumping through the system is terminated, and the vessel containing beads saturated with lithium is washed with water. Then, the flows of brine, water, and acid are redirected, such that a vessel recently saturated with lithium is then treated with acid.

These system operations are repeated, loading lithium into each column until saturation, and redirecting flow to the next set of columns while the saturated column is treated with acid to release lithium. The process extracts lithium from brine and yield a lithium chloride concentrate for production of lithium carbonate and other lithium chemicals.

Example 14: Lithium Extraction Device Using a Network of Vessels Comprising Filter Banks Loaded with Ion Exchange Beads Connected with pH Modulating Units Lithium was extracted from a liquid resource using a network of vessels containing ion-exchange beads.

Figure 14:
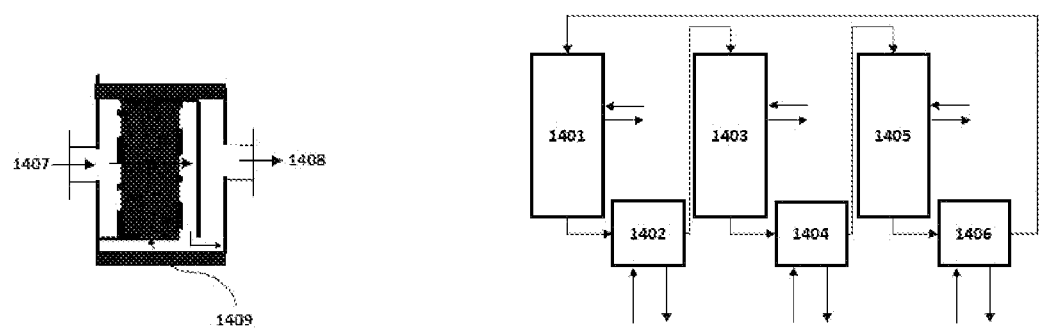
FIG. 14 illustrates a lithium extraction device comprising a network of vessels with a filter bank loaded with ion exchange beads connected with pH modulating units.

Each vessel comprised a filter bank filled with ion exchange beads arranged along the length of the vessel. Each filter bank acted as an individual ion-exchange compartment. The internal characteristics of the vessel are shown in FIG. 14. The vessel was cylindrical and arranged horizontally, approximately 25 cm long, and had a width and height of approximately 2 m. It was constructed of PVC. The vessel consisted of one filter bank that acted as an ion-exchange compartments (1409), and flow distributors that distributed the flow to the filter bank and collected the outlet flow from each of the three filter banks.

The ion-exchange compartments (1409) were 1.5 cm wide and 24 cm tall, with a length of 24 cm. The inlet and outlet of each ion-exchange bead compartment consisted of polymer meshes with 50-micron slits. In each ion exchange compartment, fluid was transported by pressure-driven flow through the ion exchange bed, through the polymer support, and into the fluid collection system. Even flow to each ion-exchange compartment was ensured because the pressure-drop across the ion-exchange bead is approximately 100 times larger than pressure drop due to frictional losses in the inlet and outlet flow distributors.

The ion-exchange beads were loaded into each of the ion-exchange compartments by mechanically separating the ion exchange compartment, and loading the ion exchange beads into the interstitial space. The porous ion exchange beads comprised ion exchange particles and a polymer matrix. The ion exchange particles were coated ion exchange particles comprised of a $Li_2Mn_2O_5$ core with a $TiO_2$ coating. The particles were approximately spherical with a mean diameter of 10 microns, and the coating thickness was approximately 5 nm. The polymer matrix comprised of polyvinyl chloride. The porous beads contained porous networks with a controlled distribution of pore sizes providing diffusion channels from the bead surface into the bead interior and to the ion exchange particles. The beads had a 200 microns average diameter.

The liquid resource flowed into each vessel from a union (1407), where it flowed into the flow distribution mesh and into the ion-exchange chamber. The liquid flowed through the above-mentioned mesh, through the bed of ion-exchange beads (1409), out of the above-mentioned mesh, and into the outlet flow distribution pipes. The collected effluent then exits through a union (1408) on the other side of the ion-exchange vessel.

The brine from which lithium is extracted consisted of a natural aqueous chloride solution containing approximately 275 mg/L Li, 100,000 mg/L Na, 500 mg/L Ca, and 4,000 mg/L Mg, and other chemical species including K and chloride.

Three such vessels were connected to form a network. The vessels were connected via tanks where the pH of the brine is adjusted, as illustrated in FIG. 14. The network consisted of ion exchange vessels (1401, 1403, 1405), and mixing tanks for base and brine (1402, 1404, 1406). For the mixing tanks in the brine circuit (1402, 1404, 1406), an aqueous base solution of NaOH was added to increase the pH of the brine to 7.5. The pH of the brine was monitored before and after each mixing tank in the brine circuit to control the rate of addition of aqueous base solution.

For the purposes of this example, the flow configuration would have been: a liquid resource flowed into tank 1402, then into vessel 1403, into tank 1404, into vessel 1405, into tank 1406 from which it left the system. Acid was concurrently flowed through vessel 1401.

At any point during the operation of the network of three vessels, lithium was being extracted from brine with two vessels. Brine flowed into a first mixing tank (e.g. 1402) at pH of 6.5, and its pH is adjusted to a value of 7.5. This brine was fed to the first ion-exchange vessel (e.g. 1402). The first vessel absorbed (e.g. 1403) most of the lithium, releasing protons; this results in a drop in Li concentration from 275 to 75 mg/L and a drop in pH to a value of 3.0. Subsequently, in the subsequent mixing tank (e.g. 1404), the pH of said brine was raised to about 7.5, and the brine flowed into a second column (e.g. 1405) which absorbed remaining lithium, and the Li concentration drops from 75 to 50 mg/L.

The third vessel (e.g. 1401) was saturated with lithium from a previous ion-exchange cycle, and was therefore treated with 1.0 M hydrochloric acid to yield a lithium chloride concentrate. The acid solution flowed through the ion exchange vessel, where the protons from the acid enter the ion exchange beads and were exchanged for lithium. Lithium was thereby released from the beads and enters the acid solution. The lithium was eluted at a lithium concentration of 2000 mg/L, while the concentration of sodium in the acidic chloride solution was maintained below 700 mg/L.

When the rate of lithium uptake by the ion exchange beads slowed, pumping through the system is terminated, and the vessels containing brine are washed with water. Then, the flows of brine, water, and acid were redirected such that a new vessel was treated with acid and the others with brine.

These system operations were repeated, loading lithium into each column until saturation, and redirecting flow to the next configuration of flows while the saturated column was treated with acid to release lithium. The process extracted lithium from brine and yield a lithium chloride concentrate which is then treated with sodium carbonate to precipitate a lithium carbonate product.

Figure 15:
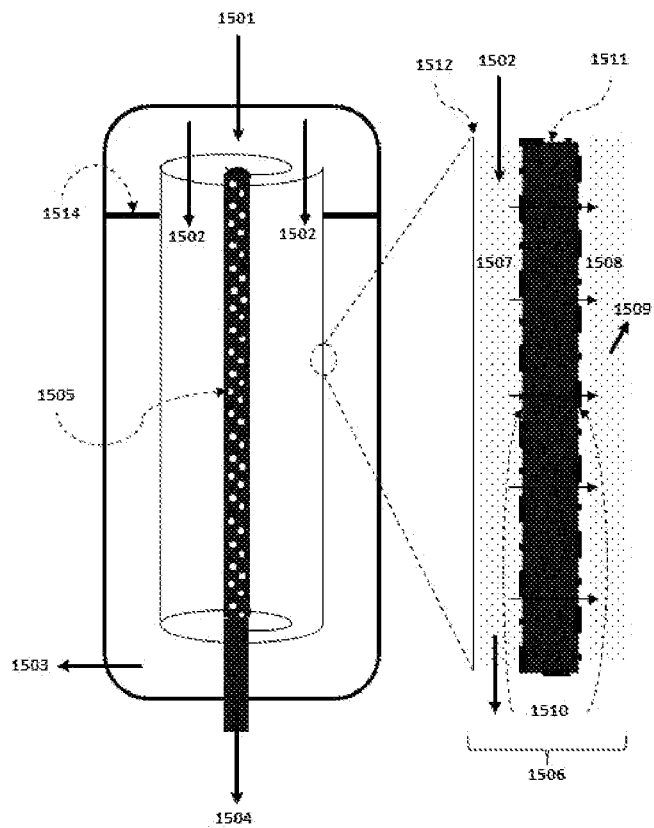
FIG. 15 illustrates a lithium extraction device comprising a network of vessels with a bed of ion exchange beads contained between membranes and wound into a spiral.

Example 15. Lithium Extraction Using a Vessel with Packed Ion-Exchange Beds Contained Between Membranes for Minimal Flow Distance Lithium is extracted from a brine using a vessel containing ion-exchange beads contained between two membranes that form a wound ion-exchange element, resulting in a minimal flow distance (FIG. 15). The internal characteristics of the ion-exchange vessel is shown in FIG. 15. The vessel is cylindrical and arranged vertically, is approximately 60 cm tall, and has a diameter of approximately 12 cm. It is constructed of fiber-reinforced plastic.

A liquid resource or other process fluid flows into the ion-exchange vessel from an inlet at the top of the vessel (1501) into a top-fluid distribution chamber separated from the bottom of the vessel by an EPDM gasket (1514), where flow is distributed to flow through the wound ion exchange element flow channels (1502) tangentially along the axial direction of said element.

The membrane cross section 1506 is shown in FIG. 15. The membrane is constructed by stacking several constituent components. First, a non-permeable membrane comprising polyethylene 1512 is laid, followed by a spacer with 5 mm rhomboidal openings composed of polyethylene (1507) and a porous microfiltration membrane composed of polyvinyl fluoride with 0.2 micron porous openings (1510). Following this, a thin 4 mm layer of porous ion exchange particles is deposited (1511) and covered by another microfiltration membrane (1510) and a downstream collection spacer with 7 mm rhomboidal openings composed of polyethylene (1508). One side of this stack is attached to a perforated collection tube (1505), and the element is wound into a spiral. In this example, the membrane is 50 cm and 10 cm wide, and spun around one and a half times around its short end.

A lithium-rich brine passes through the flow channels (1502) at a flow rate of 1 L/s and is discharged from the bottom of the vessel through outlet 1503 at a flow rate of 800 mL/s; fluid enters through 1501 and exits the membrane element through 1503 at pressures of 10 and 8 psi, respectively. As fluid passes through the flow channel 1502, a portion (200 mL/s) permeates through the microfiltration membranes (1510), through the ion exchange beads (1511) and into the downstream collection space (1508). The lithium-depleted brine flows angularly (1509) around the spiral wound element through this collection space and into the perforated collection tube from where it exits the vessel (1504). The total pressure drop across the ion exchange beads is therefore less than 10 psi. Any brine that did not permeate through the ion exchange beads and left the vessel through 1503 is recirculated back into the ion exchange vessel until the ion exchange beads do not absorb any more lithium.

The ion exchange beads are porous ion exchange beads. The porous ion exchange beads are comprised of ion exchange particles and a polymer matrix. The ion exchange particles are uncoated ion exchange particles comprised of an uncoated $Li_4Ti_5O$, core. The particles are approximately spherical with a mean diameter of 3 to 5 microns. The polymer matrix is comprised of polyvinylidene difluoride. The porous beads contain porous networks with a controlled distribution of pore sizes providing diffusion channels from the bead surface into the bead interior and to the ion exchange particles. The beads have a 25 micron average diameter.

The brine from which lithium is extracted consists of a natural aqueous chloride solution containing approximately 250 mg/L Li, 70,000 mg/L Na, 10,000 mg/L K, 3,000 mg/L Ca, and 2,000 mg/L Mg, and other chemical species including sulfates. When this liquid resource enters the vessel, the pressure is 70 psi. Flow through this ion exchange material results in an outlet flow that contains 50 mg/L Li, 70,000 mg/L Na, 10,000 mg/L K, 3,000 mg/L Ca, and 2,000 mg/L Mg, and other chemical species including sulfates.

Figure 16:
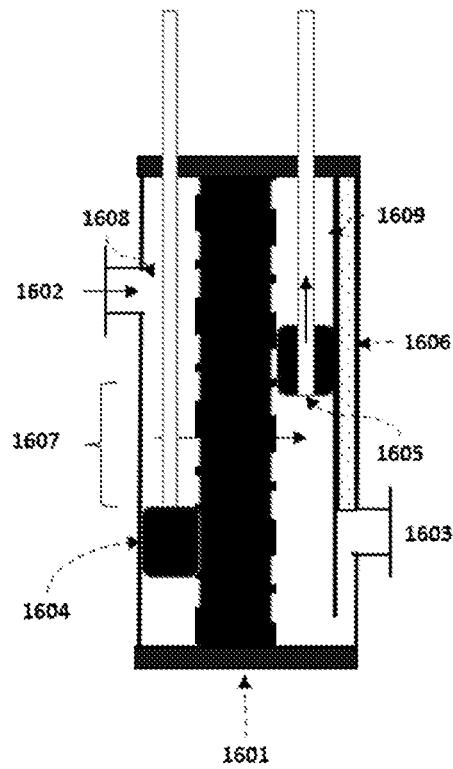
FIG. 16 illustrates a lithium extraction device comprising a bed of ion exchange beads formed using a device for forming ion exchange beads.

Example 16: Lithium Extraction Using a Vessel with Formed Beds of Packed Ion-Exchange Beads within a Filter Bank Ion exchange beads are packed inside a vessel comprising a filter bank (FIG. 16). The internal characteristics of the ion exchange vessel is shown in FIG. 16. The vessel is comprised of a filter bank filled with ion exchange beads arranged along the length of the vessel. Each filter bank acts as an individual ion-exchange compartment. The internal characteristics of the vessel are shown in FIG. 16. The vessel is squared and arranged horizontally, approximately 20 cm long, and has a width and height of approximately 2 m. It is constructed of carbon steel. The vessel consists of one filter bank that acts as an ion-exchange compartments (1601), and flow channels that distribute the flow to the filter bank and collected the outlet flow from each of the. The thickness of the ion exchange bed is 10 cm. The vessel contains two fluid diversion devices, 1604 and 1605. These are connected to side ports on the vessel and moved in placed by opening the ends of the vessel.

The porous ion exchange beads are comprised of ion exchange particles and a polymer matrix. The ion exchange particles are uncoated ion exchange particles comprised of an uncoated $Li_4Ti_5O_{12}$ core. The particles are approximately spherical with a mean diameter of 5 to 10 microns. The polymer matrix is comprised of PVC. The porous beads contain porous networks with a controlled distribution of pore sizes providing diffusion channels from the bead surface into the bead interior and to the ion exchange particles.

To compact the ion exchange bed into a uniform and compact powder, so as to ensure optimal flow characteristics, fluid diversion devices (1604 and 1605) are used. Said fluid diversion devices direct flow to only certain parts of the ion exchange bed. Fluid comprising water flows into the ion exchange device at a flow rate of 1 gallon per minute, entering said vessel through flanged connection (1602) into a fluid distribution compartment (1608). Fluid encounters a first diversion device (1604), consisting of a solid EPDM inflatable plug that slides along the length of the inlet fluid distribution compartment and is inflated with compressed air that is injected into the fluid diversion device through a pipe connected to a side port on the vessel. Upon inflation, this fluid diversion device occupies the entire cross-section of the vessel along its longest dimension. Upon encountering said first fluid diversion device, flow is diverted to the ion exchange bed (1601) which is contained within the filter cloths of the filter bank. Water flows through the ion exchange bed at a velocity of at least 1 cm/sec. Upon crossing the ion exchange bed, fluid exits into an outlet fluid distribution compartment (1609). The flanged outlet (1603) of the vessel is blocked with a gasketed blank flange. This forces fluid to exit through a pipe contained in a second fluid diversion device (1605) within the outlet fluid distribution compartment. (1609). This second fluid diversion device consists of a solid EPDM plug device that occupies the entire cross-section of the vessel along its longest dimension, and contains a pipe that traverses it and is connected with the fluid compartment. This pipe is connected to the outside of the vessel through a side port. Flow does not occur above or below the location of the fluid diversion devices because flow is blocked, forcing flow to occur through the limited section of the vessel 1607. This results in compacting the ion exchange beads in the section 1607.

To prevent fluid from flowing to other areas other vessel, aluminum oxide inert beads are loaded inside sections of the outlet flow distribution compartment where flow is not desired (1606); the size of these beads is between 50 and 100 um. These beads are removed upon completion of the packing process so outlet port 1603.

After one section (1607) of the ion exchange bed is packed, the fluid diversion devices are moved to a different section of the bed by deflating the inflatable packing device (1604) or moving the solid packing device (1605) up along the vessel, until all sections of the vessel have been treated. Six iterations or sections are done on this vessel.

Lithium is extracted from a brine using the beads packed into the vessel as described above. The brine from which lithium was extracted consists of a natural aqueous chloride solution containing approximately 800 mg/L Li, 65,000 mg/L Na, 5,000 mg/L K, 5,000 mg/L Ca, and 5,000 mg/L Mg, and other chemical species including sulfates. Flow through this ion exchange material results in an outlet flow that contains 100 mg/L Li, 65,000 mg/L Na, 5,000 mg/L K, 5,000 mg/L Ca, and 5,000 mg/L Mg, and other chemical species including sulfates.

Figure 17:
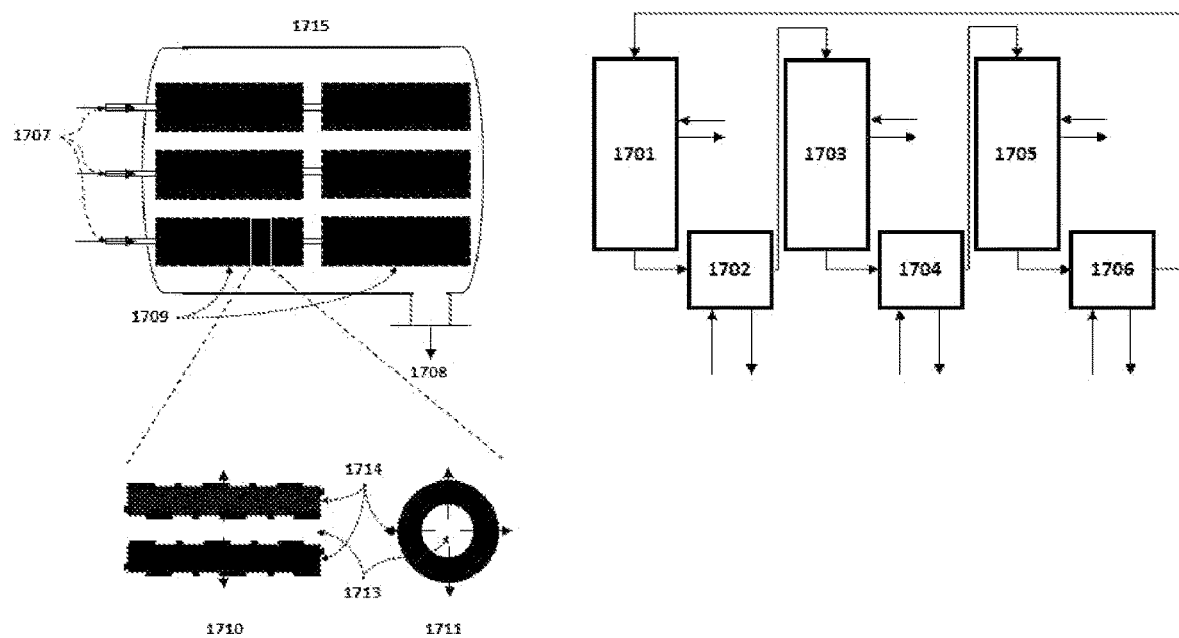
FIG. 17 illustrates a lithium extraction device comprising a network of vessels with containing beds of ion-exchange beads in a radial-flow configuration, connected with pH modulating units.

Example 17: Lithium Extraction Device Using a Network of Vessels Comprising Vessel Containing Multiple Radial-Flow Packed Ion-Exchange Beds Connected with pH Modulating Units Lithium is extracted from a brine using a network of vessels comprising multiple radial-flow packed ion exchange beds (FIG. 17). The vessels in the network are connected by pH modulating tanks.

Each vessel (1715) contains tubular compartments (1709) comprising ion exchange beds (1709). Two of these tubular compartments are connected in series, and three of these two-compartment units are contained within each vessel. Each of the two-compartment unit acts as an individual ion-exchange unit. The internal characteristics of the vessel are shown in FIG. 17. The vessel is cylindrical and arranged horizontally, is approximately 100 cm long, and has a width and height of approximately 50 cm. It is constructed of titanium-lined carbon steel. Each ion-exchange compartment is 40 cm long and 10 cm in diameter.

A side- (1710) and cross sectional- (1711) view of each tubular compartment is shown in FIG. 17. Each compartment comprises a radial flow bed where an annular ion-exchange compartment (1714) surrounds an inner perforated tubular partition along which liquid flows (1713). This inner tubular partition (1713) is defined by a cylinder with a diameter of 2 cm, and is contained within porous titanium walls with average opening of 20 um. The ion exchange bed (1714) is contained within the annular region between this inner tubular partition and the outer wall of the tubular ion-exchange compartment (1709). This outer wall has a diameter of 10 cm and is constructed of porous titanium walls with an average opening of 20 um. Therefore, the total flow path through the annular ion-exchange bed is approximately 4 cm.

The liquid resource flows into the vessel through tubes (1707) that connect to each two-compartment unit, and into the inner tubular partition (1713), from which it flows outwards radially through the ion-exchange bed (1714) and into the main vessel (1715), where it is collected at the bottom of the vessel and exits the vessel through an outlet flange (1708). Flow is driven by pressure, and the total pressure drop between the inlet (1707) and outlet (1708) is 10 psi.

The ion exchange beads are porous ion exchange beads, and are comprised of ion exchange particles and a polymer matrix. The ion exchange particles are uncoated ion exchange particles comprised of an uncoated $Li_4MnO_2$ core. The particles are approximately spherical with a mean diameter of 5 microns. The porous beads contain porous networks with a controlled distribution of pore sizes providing diffusion channels from the bead surface into the bead interior and to the ion exchange particles. The beads have a 150 micron average diameter.

The brine from which lithium is extracted consists of a natural aqueous chloride solution containing approximately 1,000 mg/L Li, 75,000 mg/L Na, 5,000 mg/L Ca, and 5,000 mg/L Mg, and other chemical species including K and chloride.

Three such vessels (1715) are connected to form a network. The vessels are connected via tanks where the pH of the brine is adjusted, as illustrated in FIG. 17. The network consists of ion exchange vessels (1701, 1703, 1705), and mixing tanks for base and brine (1702, 1704, 1706). For the mixing tanks in the brine circuit (1702, 1704, 1706), an aqueous base solution of NaOH is added to increase the pH of the brine to 7.5. The pH of the brine is monitored before and after each mixing tank in the brine circuit to control the rate of addition of aqueous base solution. A filter bag with a characteristic maximum opening of 5 microns is installed at the outlet of each of these tanks.

For the purposes of this example, a flow configuration would be: a liquid resource flows into tank 1702, then into vessel 1703, into tank 1704, into vessel 1705, into tank 1706 from which it leaves the system. Acid is concurrently flowed through vessel 1701.

At any point during the operation of the network of three vessels, lithium is being extracted from brine with two vessels. Brine flows into a first mixing tank (e.g. 1702) at pH of 6.5, and its pH is adjusted to a value of 7.5. This brine is fed to the first ion-exchange vessel (e.g. 1702). The first vessel absorbs (e.g. 1703) most of the lithium, releasing protons; this results in a drop in Li concentration from 1000 to 300 mg/L and a drop in pH to a value of 3.0. Subsequently, in the subsequent mixing tank (e.g. 1704), the pH of said brine is raised to about 7.5, and the brine is flowed into a second column (e.g. 1705) which absorbs remaining lithium, and the Li concentration drops from 300 to 100 mg/L.

The third vessel (e.g. 1701) is saturated with lithium from a previous ion-exchange cycle, and is therefore treated with 0.25 M hydrochloric acid to yield a lithium chloride concentrate. The acid solution flows through the ion exchange vessel, where the protons from the acid enter the ion exchange beads and are exchanged for lithium. Lithium is thereby released from the beads and enters the acid solution.

When the rate of lithium uptake by the ion exchange beads slows, pumping through the system is terminated, and the vessels containing brine are washed with water. Then, the flows of brine, water, and acid are redirected, such that a vessel recently treated with brine is then treated with acid.

These system operations are repeated, loading lithium into each column until saturation, and redirecting flow to the next set of columns while the saturated column is treated with acid to release lithium. The process extracts lithium from brine and yield a lithium chloride concentrate for production of lithium carbonate or other lithium chemicals.

Figure 18:
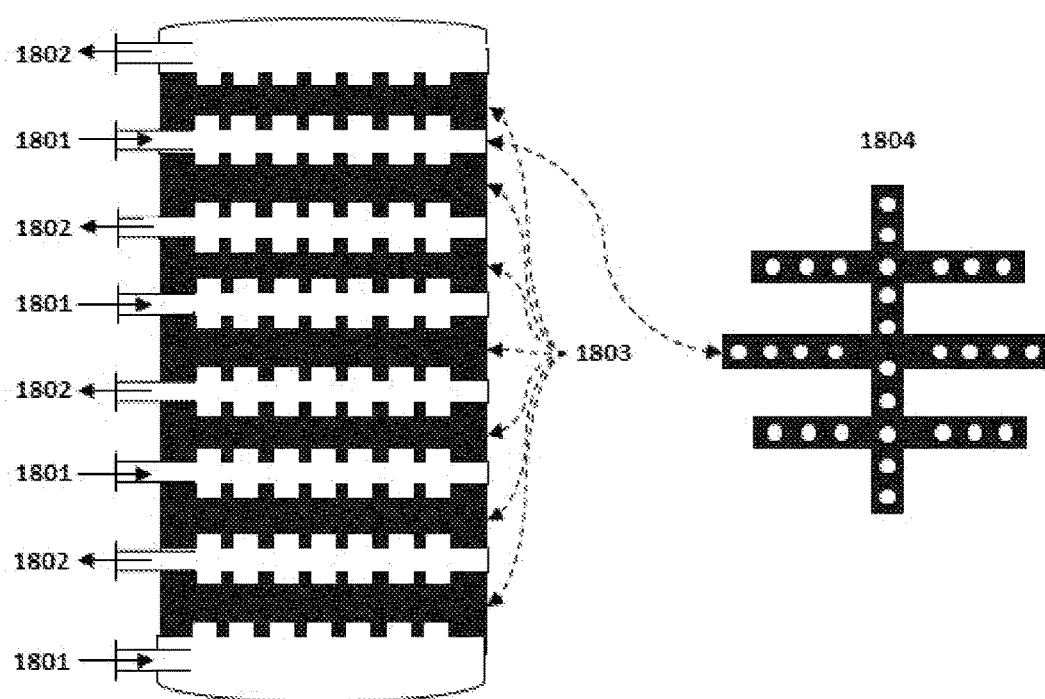
FIG. 18 illustrates a lithium extraction device comprising a network of vessels with ion exchange beads with internal flow distributors.

Example 18: Lithium Extraction Device Using a Vessel with Multiple Internal Flow Distributors Lithium is extracted from a brine using a vessel comprising multiple internal flow distributors. (FIG. 18). The internal characteristics of the vessel are shown in FIG. 18. The vessel is cylindrical and arranged vertically, is approximately 140 cm long, and has a diameter of 30 cm. It is constructed of Hastelloy C276. The vessel is oriented vertically.

The main vessel is loaded ion-exchange beads. Within said vessel, eight flow distributors (detail in 1804) are located and equally distributed along the vessel, 20 cm apart. Four flow distributors deliver brine into the ion-exchange compartment (1801), while four outlet flow distributors (1802) collect liquid that has undergone ion-exchange and removes it from the ion-exchange bed. The flow distributors are composed of polyvinyl chloride pipe that has slits cut along its circumference. Slits are 5 mm apart and have an opening of 50 microns, preventing the fluid from conveying beads out of the ion-exchange compartment.

The liquid resource flows into the vessel from inlet flow distributors (1801), through the ion exchange beads (1803), and out of the vessel through outlet flow distributors (1802) where the fluid exits the vessel. These distributors ensure uniform flow of the liquid resource into and through the ion-exchange bead compartment.

The ion exchange medium is loaded by opening up the top of the vessel through a flanged opening, and closing the vessel. The ion-exchange beads occupy the entirety of the vessel. The flow distributors are submerged within the ion-exchange beads.

The porous ion exchange beads are comprised of ion exchange particles and a polymer matrix. The ion exchange particles are coated ion exchange particles comprised of a $Li_4Mn_5O_{12}$ core with a $SiO_2$ coating. The particles are approximately spherical with a mean diameter of 10 microns, the coating is approximately 5 nm thick. The porous beads contain porous networks with a controlled distribution of pore sizes providing diffusion channels from the bead surface into the bead interior and to the ion exchange particles. The polymer matrix is comprised of polyvinylidene fluoride. The beads have a 200 micron average diameter.

The brine from which lithium is extracted consists of a natural aqueous chloride solution containing approximately 1,000 mg/L Li, 20,000 mg/L Na, 20,000 mg/L Ca, and 20,000 mg/L Mg, and other chemical species including K and sulphates. When this liquid resource enters the vessel, the pressure is 10 psi. Flow through this ion exchange material results in an outlet flow that contains approximately 150 mg/L Li, 20,000 mg/L Na, 20,000 mg/L Ca, and 20,000 mg/L Mg, and other chemical species including K and sulphates.

Additional Embodiments

Embodiment 1. A device for lithium extraction from a liquid resource, comprising a vessel with internal flow channels directing flow of said liquid resource through multiple beds of ion exchange material inside said vessel.

Embodiment 2. A device for lithium extraction from a liquid resource, comprising:
 a) a vessel;
 b) multiple beds of ion exchange material inside said vessel;
 c) flow channels directing flow of said liquid resource through said multiple beds of ion exchange material.

Embodiment 3. A device for lithium extraction from a liquid resource, comprising:
 a) a vessel defining a plurality of flow channels therein;
 b) a plurality of beds of ion exchange material disposed within the vessel and in fluid communication with the plurality of flow channels, such that a fluid is configured to be directed to flow across the plurality of beds of ion exchange material via the plurality of flow channels.

Embodiment 4. The device of any one of embodiments 1-3, wherein each bed of the plurality of beds is configured to receive the fluid through a corresponding flow channel of the plurality of flow channels, and discharge the fluid to another corresponding flow channel of the plurality of channels.

Embodiment 5. The device of any one of embodiments 1-4, wherein said liquid resource flows through said multiple beds of ion exchange material in parallel.

Embodiment 6. The device of embodiments 1-2, wherein said liquid resource flows through said multiple beds of ion exchange material in series.

Embodiment 7. The device of embodiments 1-4, wherein said multiple beds of ion exchange material are mounted inside said vessel with structural supports.

Embodiment 8. A device for lithium extraction from a liquid resource, comprising a vessel containing a bed of ion exchange material and a volume of gas which is controlled using a level sensor.

Embodiment 9. A device for lithium extraction from a liquid resource, comprising a cylindrical vessel containing an interior compartment loaded with ion exchange material arranged such that said liquid resource flows through said ion exchange material in a direction that is oriented radially to said cylindrical vessel.

Embodiment 10. A device for lithium extraction from a liquid resource, comprising a cylindrical vessel containing ion exchange material located between two concentric cylindrical structures.

Embodiment 11. A device for lithium extraction from a liquid resource, comprising a vessel containing ion exchange material and a perforated pipe near the center of the vessel facilitating flow of said liquid resource through the ion exchange material in a direction oriented radially to the vessel.

Embodiment 12. A device for lithium extraction from a liquid resource, comprising a vessel housing, said vessel housing comprising an inner cylindrical vessel and an outer cylindrical vessel with ion exchange material housed between said inner cylindrical vessel and said outer cylindrical vessel.

Embodiment 13. The device of embodiment 12, where said inner cylindrical vessel and said outer cylindrical vessel are permeable to facilitate flow of said liquid resource through said ion exchange material.

Embodiment 14. The device of embodiment 12, where said inner cylindrical vessel and/or said outer cylindrical vessel are fixed with holes, slits, nozzles, meshes, or a combination thereof to facilitate flow of said liquid resource through said ion exchange material while containing said ion exchange material inside of said vessel housing.

Embodiment 15. A device for lithium extraction from a liquid resource, comprising a cylindrical vessel containing ion exchange material located between an outer concentric cylindrical structure and an inner concentric cylindrical structure, wherein an inlet to the cylindrical vessel is in fluid communication with an inner volume defined by the inner concentric cylindrical structure, such that said liquid resource is configured to enter the cylindrical vessel into the inner volume and pass through the inner concentric cylindrical structure, the ion exchange material, and the outer concentric cylindrical structure before exiting the cylindrical vessel.

Embodiment 16. The device of any one of embodiments 8-15, where said liquid resource flows in a radial orientation through said ion exchange material from near the outside of said vessel to near the inside of said vessel.

Embodiment 17. The device of any one of embodiments 8-15, where said liquid resource flows in a radial orientation through said ion exchange material from near the inside of said vessel to near the outside of said vessel.

Embodiment 18. A device for lithium extraction from a liquid resource, comprising a vessel comprising internal flow distributors and containing ion exchange material.

Embodiment 19. A device for lithium extraction from a liquid resource, comprising a vessel loaded with ion exchange material, wherein said liquid resource enters said vessel from multiple flow distributors located near two opposite ends of said vessel and exits said vessel from one or more flow distributors located near the center point between said two opposite ends of the vessel.

Embodiment 20. A device for lithium extraction from a liquid resource, comprising a vessel loaded with ion exchange material wherein said liquid resource exits said vessel from multiple flow distributors located near two opposite ends of said vessel and enters said vessel from one or more flow distributors located near the center point between said two opposite ends of the vessel.

Embodiment 21. A device for lithium extraction from a liquid resource, comprising a vessel containing one or more candles, where each said candle comprises two concentric structures that are permeable to flow of said liquid resource and contain ion exchange material.

Embodiment 22. A device for lithium extraction from a liquid resource, comprising a vessel containing one or more candles, where each said candle comprises two concentric cylindrical structures that are permeable to flow of said liquid resource and contain ion exchange material.

Embodiment 23. The device of any one of embodiments 21-22, wherein said liquid resource flows into said vessel, through the outer concentric structure, through the ion exchange material, through the inner concentric structure, and then exits the vessel.

Embodiment 24. The device of any one of embodiments 21-22, wherein said liquid resource flows into said vessel, through the inner concentric structure, through the ion exchange material, through the outer concentric structure, and then exits the vessel.

Embodiment 25. The device of any one of embodiments 21-24, wherein said one or more candles comprise four or more candles.

Embodiment 26. The device of any one of embodiments 21-24, wherein said one or more candles comprise eight or more candles.

Embodiment 27. The device of any one of embodiments 21-24, wherein said one or more candles comprise 20 or more candles.

Embodiment 28. The device of any one of embodiments 21-24, wherein said one or more candles comprise 50 or more candles.

Embodiment 29. The device of any one of embodiments 21-24, wherein said one or more candles comprise 100 or more candles.

Embodiment 30. A device for lithium extraction from a liquid resource, comprising a vessel loaded with ion exchange material and a filler material.

Embodiment 31. A device for lithium extraction from a liquid resource, comprising a vessel loaded with 1) one or more filler materials near the top and/or bottom of the vessel and 2) ion exchange material.

Embodiment 32. A device for lithium extraction from a liquid resource, comprising a vessel loaded with ion exchange material and a filler material mixed together.

Embodiment 33. A device for lithium extraction from a liquid resource, comprising a vessel loaded with ion exchange material and a filler material, wherein the filler material is mixed with the ion exchange material to reduce pressure across the ion exchange material.

Embodiment 34. A device for lithium extraction from a liquid resource, comprising a vessel loaded with ion exchange material and a filler material, wherein the filler material is mixed with the ion exchange material to improve the strength of the bed of ion exchange material.

Embodiment 35. A device for lithium extraction from a liquid resource, comprising a vessel loaded with one or more beds of ion exchange material and a filler material, wherein the filler material is mixed with the one or more beds of ion exchange material, thereby providing support for the one or more beds and/or enabling for better flow distribution for said liquid resource or another fluid entering the vessel.

Embodiment 36. The device of any one of embodiments 30-35, wherein said filler material is inert to acid and brine.

Embodiment 37. The device of any one of embodiments 30-36, wherein said filler material is constructed from a polymer or ceramic.

Embodiment 38. The device of any one of embodiments 30-37, wherein said filler material has pores containing ion exchange material.

Embodiment 39. The device of any one of embodiments 30-38, wherein said filler material has pores larger than about 10 microns or about 100 microns containing ion exchange material.

Embodiment 40. The device of any one of embodiments 30-38, wherein said filler material has pores larger than about 1 millimeter, about 1 centimeter, or about 10 centimeters containing ion exchange material.

Embodiment 41. The device of any one of embodiments 30-38, wherein said filler material has pores larger than about 10 centimeters or about 25 centimeters containing ion exchange material.

Embodiment 42. The device of any one of embodiments 30-38, wherein said filler material has pores smaller than about 10 microns or about 100 microns containing ion exchange material.

Embodiment 43. The device of any one of embodiments 30-38, wherein said filler material has pores smaller than about 1 millimeter, about 1 centimeter, or about 10 centimeters containing ion exchange material.

Embodiment 44. The device of any one of embodiments 30-38, wherein said filler material has pores smaller than about 10 centimeters or about 25 centimeters containing ion exchange material.

Embodiment 45. The device of any one of embodiments 30-44, wherein said filler material is a rigid scaffolding.

Embodiment 46. A device for lithium extraction from a liquid resource, comprising a network of multiple vessels described in embodiments 1 to 45.

Embodiment 47. A device for lithium extraction from a liquid resource, comprising a network of multiple vessels described in embodiments 1 to 45 where said liquid resource flows through one vessel and into another vessel.

Embodiment 48. A device for lithium extraction from a liquid resource, comprising a network of a plurality of vessels described in embodiments 1 to 45, where said liquid resource flows through one or more vessels of the plurality of vessels sequentially.

Embodiment 49. A device for lithium extraction from a liquid resource, comprising a network of multiple vessels described in embodiments 1 to 45 where said liquid resource flows through one vessel, through a unit which increases the pH of the liquid resource, and into another vessel.

Embodiment 50. A device for lithium extraction from a liquid resource, comprising a network of multiple vessels described in embodiments 1 to 45, where said liquid resource flows through one vessel, through a unit which increases the pH of the liquid resource, and into another vessel.

Embodiment 51. The device of any one of embodiments 1 to 50, where the ion exchange material comprises porous ion exchange beads.

Embodiment 52. The device of any one of embodiments 1 to 51, where said ion exchange material comprises porous ion exchange beads with a mean diameter of 50 microns to 100 microns.

Embodiment 53. The device of any one of embodiments 1 to 51, where said ion exchange material comprises porous ion exchange beads with a mean diameter of 100 microns to 200 microns.

Embodiment 54. The device of any one of embodiments 1 to 51, where said ion exchange material comprises porous ion exchange beads with a mean diameter of 200 microns to 300 microns.

Embodiment 55. The device of any one of embodiments 1 to 51, where said ion exchange material comprises porous ion exchange beads with a mean diameter of 200 microns to 400 microns.

Embodiment 56. The device of any one of embodiments 1 to 51, where said ion exchange material comprises porous ion exchange beads with a mean diameter of 400 microns to 600 microns.

Embodiment 57. The device of any one of embodiments 1 to 51, where said ion exchange material comprises porous ion exchange beads with a mean diameter of 400 microns to 800 microns.

Embodiment 58. The device of any one of embodiments 1 to 57, where flow of said liquid resource through said ion exchange material applies a pressure on said ion exchange material of less than 20 psi.

Embodiment 59. The device of any one of embodiments 1 to 57, where flow of said liquid resource through said ion exchange material applies a pressure on said ion exchange material of less than 50 psi.

Embodiment 60. The device of any one of embodiments 1 to 57, where flow of said liquid resource through said ion exchange material applies a pressure on said ion exchange material of less than 100 psi.

Embodiment 61. The device of any one of embodiments 1 to 57, where flow of said liquid resource through said ion exchange material applies a pressure on said ion exchange material of less than 200 psi.

Embodiment 62. The device of any one of embodiments 1 to 61, further comprising a pH modulating setup for increasing the pH of the liquid resource in the system.

Embodiment 63. The device of any one of embodiments 1 to 61, further comprising a pH modulating setup for increasing the pH of the liquid resource in the system to neutralize the liquid resource.

Embodiment 64. The device of any one of embodiments 1 to 63, wherein perforated material is used to immobilize the ion exchange material.

Embodiment 65. The device of any one of embodiments 1 to 63, wherein mesh material is used to immobilize the ion exchange material.

Embodiment 66. The device of any one of embodiments 1 to 63, wherein perforated material and mesh material are used to immobilize the ion exchange material.

Embodiment 67. The device of any one of embodiments 1 to 66, wherein the ion exchange material absorbs lithium from the liquid resource while releasing protons.

Embodiment 68. The device of any one of embodiments 1 to 67, wherein said ion exchange material is loaded with lithium from the liquid resource, and then the lithium is eluted from said ion exchange material using an acid.

Embodiment 69. The device of any one of embodiments 1 to 68, wherein said ion exchange material is contained in said vessel using nozzles, slits, holes, or meshes constructed of polymer or ceramic material.

Embodiment 70. The device of any one of embodiments 1 to 68, wherein said ion exchange material is contained in said vessel using nozzles, slits, holes, meshes, or a combination thereof constructed of polyether ether ketone, polypropylene, polyethylene, polysulfone, polyester, polyamide, polytetrafluoroethylene, polyvinylidene difluoride, ethylene tetrafluoroethylene, stainless steel, coated stainless steel, stainless steel coated in polymer, titanium, high nickel alloy, or a combination thereof.

Embodiment 71. The device of any one of embodiments 1 to 70, wherein said ion exchange material comprises $LiFePO_4$, $LiMnPO_4$, $Li_2MO_3$ (M=Ti, Mn, Sn), $Li_4Ti_5O_{12}$, $Li_4Mn_5O_{12}$, $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $Li_2CuP_2O_7$, modifications thereof, solid solutions thereof, or a combination thereof.

Embodiment 72. The device of any one of embodiments 1 to 71, wherein said ion exchange material is a coated ion exchange material with a coating that is selected from an oxide, a polymer, or combinations thereof.

Embodiment 73. The device of any one of embodiments 1 to 72, wherein said ion exchange material is a coated ion exchange material with a coating that is selected from $SiO_2$, $TiO_2$, $ZrO_2$, polyvinylidene difluoride, polyvinyl chloride, polystyrene, polybutadiene, polydivinylbenzene, or combinations thereof.

Embodiment 74. The device of any one of embodiments 1 to 73, wherein said liquid resource is a natural brine, a pretreated brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

What is claimed is:

1. A system for industrial lithium extraction from a liquid resource, the system comprising one or more beds and one or more flow distributors,
   wherein the one or more flow distributors are configured to direct a flow of a liquid through the one or more beds,
   wherein the one or more beds comprise an ion exchange material, wherein the ion exchange material exchanges lithium ions and hydrogen ions, wherein the ion exchange material selectively absorbs lithium relative to other ions,
   wherein the one or more flow distributors and one or more beds are configured to minimize a distance required to flow the liquid through each of the one or more beds,
   wherein the distance required to flow the liquid through each of the one or more beds is less than about one meter, and
   wherein the distance required to flow the liquid through each of the one or more beds is less than the diameter, height, or width of the one or more beds.

2. The system of claim 1, wherein minimizing the distance required to flow the liquid through each of the one or more beds reduces the pressure change across the one or more beds.

3. The system of claim 2, wherein the pressure change across each of the one or more beds is less than 100 psi.

4. The system of claim 1, wherein the one or more flow distributors comprise perforated tubes or plates.

5. The system of claim 1, wherein the one or more flow distributors comprise porous tubes or plates.

6. The system of claim 1, wherein the one or more flow distributors comprise nozzles, slits, holes, or meshes constructed of polymer or ceramic material.

7. The system of claim 1, where the ion exchange material is contained within said one or more beds by said one or more flow distributors.

8. The system of claim 1, wherein the one or more beds comprise walls,
   wherein at least one of said walls comprises one of the one or more flow distributors, wherein the one or more flow distributors comprise openings or perforations,
wherein the openings or perforations are shaped as circles, ovals, vertical or horizontal slits, squares, crosses, rectangles, triangles, irregular shapes, or any combination thereof.

9. The system of claim 1, wherein the one or more flow distributors comprise one or more walls, wherein the one or more walls come together to form one or more compartments, wherein the one or more compartments contain the one or more beds comprising the ion exchange material, and wherein the one or more walls comprise a mesh or polymer membrane.

10. The system of claim 1, wherein the one or more beds is a plurality of beds, and each bed is configured to receive the liquid through a first flow distributor and discharge the liquid to a second flow distributor.

11. The system of claim 10, wherein the liquid is configured to flow through the plurality of beds in parallel.

12. The system of claim 10, wherein the liquid is configured to flow through the plurality of beds in series.

13. The system of claim 10, wherein the liquid is configured to flow through a first portion of the plurality of beds in parallel, and through a second portion of the plurality of beds in series.

14. The system of claim 1, wherein the one or more beds are mounted inside said system with structural supports.

15. The system of claim 1, wherein the system further comprises a volume of gas and a system for measuring a liquid level.

16. The system of claim 1, wherein the ion exchange material comprises ion exchange beads.

17. The system of claim 16, wherein the ion exchange beads have an average diameter of less than about 2000 μm.

18. The system of claim 1, wherein said ion exchange material comprises $LiFePO_4$, $LiMnPO_4$, $Li_2TiO_3$, $Li_2MnO_3$, $Li_2SnO_3$, $Li_4Ti_5O_{12}$, $Li_4Mn_5O_{12}$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $Li_2CuP_2O_7$, modifications thereof, solid solutions thereof, or a combination thereof.

19. The system of claim 1, wherein said ion exchange material is a coated ion exchange material with a coating that is selected from $SiO_2$, $TiO_2$, $ZrO_2$, polyvinylidene difluoride, polyvinyl chloride, polystyrene, polybutadiene, polydivinylbenzene, or combinations thereof.

20. The system of claim 1, wherein said liquid resource is a natural brine, a pretreated brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

21. The system of claim 1, wherein the one or more beds comprising the ion exchange material are within one or more filter banks.

22. The system of claim 21, wherein the ion exchange material is porous.

23. The system of claim 21, wherein the one or more filter banks comprise two or more filter banks, and the two or more filter banks are arranged vertically or horizontally.

24. The system of claim 21, wherein the one or more filter banks comprise two or more filter banks, and the two or more filter banks are held together with tension or compression to minimize the flow distance.

25. The system of claim 21, wherein the one or more filter banks comprise two or more filter banks, and the two or more filter banks are configured to be separated for loading or unloading of the ion exchange material.

26. The system of claim 21, wherein the one or more beds comprise two or more beds, and the two or more beds are networked.

27. The system of claim 21, wherein the one or more beds comprise two or more beds, and the two or more beds are connected by one or more pH modulation devices.

28. The system of claim 1, wherein the one or more beds are configured radially within a cylinder.

29. The system of claim 28, wherein the one or more beds are between an inner flow distribution compartment and an outer flow distribution compartment configured such that the liquid resource flows through the inner flow distribution compartment and radially through the one or more beds.

30. The system of claim 28, wherein the one or more beds comprise two or more beds, and the two or more beds are networked and connected by one or more pH modulation devices.

* * * * *